(12) United States Patent
Raleigh et al.

(10) Patent No.: US 10,803,518 B2
(45) Date of Patent: Oct. 13, 2020

(54) VIRTUALIZED POLICY AND CHARGING SYSTEM

(71) Applicant: Headwater Research LLC, Tyler, TX (US)

(72) Inventors: Gregory G. Raleigh, Woodside, CA (US); James Lavine, Corte Madera, CA (US)

(73) Assignee: HEADWATER RESEARCH LLC, Tyler, TX (US)

( * ) Notice: Subject to any disclaimer, the term of this patent is extended or adjusted under 35 U.S.C. 154(b) by 0 days.

(21) Appl. No.: 16/251,629

(22) Filed: Jan. 18, 2019

(65) Prior Publication Data

US 2019/0259097 A1     Aug. 22, 2019

Related U.S. Application Data

(60) Division of application No. 15/479,719, filed on Apr. 5, 2017, now Pat. No. 10,248,996, which is a
(Continued)

(51) Int. Cl.
| | |
|---|---|
| *G06Q 40/02* | (2012.01) |
| *H04M 15/00* | (2006.01) |
| *H04W 4/24* | (2018.01) |

(52) U.S. Cl.
CPC .......... *G06Q 40/025* (2013.01); *H04M 15/00* (2013.01); *H04M 15/68* (2013.01);
(Continued)

(58) Field of Classification Search
CPC ....... H04W 4/24; H04M 15/00; H04M 15/68; H04M 15/8083; H04M 2215/0192; G06Q 40/025
(Continued)

(56) References Cited

U.S. PATENT DOCUMENTS

| | | |
|---|---|---|
| 5,131,020 A | 7/1992 | Liebesny et al. |
| 5,283,904 A | 2/1994 | Carson et al. |

(Continued)

FOREIGN PATENT DOCUMENTS

| | | |
|---|---|---|
| CA | 2688553 A1 | 12/2008 |
| CN | 1310401 A | 8/2001 |

(Continued)

OTHER PUBLICATIONS

"3rd Generation Partnership Project; Technical Specification Group Services and System Aspects; Policy and charging control architecture (Release 11)," 3GPP Standard; 3GPP TS 23.203 v11.6.0; Sophia Antipolis, France; pp. 1-177; Jun. 2012.
(Continued)

*Primary Examiner* — Andrew Joseph Rudy
(74) *Attorney, Agent, or Firm* — James E. Harris

(57) ABSTRACT

A network system for providing one or more services to one or more end-user devices communicatively coupled to the network system over a wireless access network, the network system comprising: a policy enforcement function, a first policy element, a second policy element, and a network element, wherein the network element is communicatively coupled to the policy enforcement function, the first policy element, and the second policy element, and wherein the network element is configured to communicate first policy information between the policy enforcement function and the first policy element, and communicate second policy information between the first policy enforcement function and the second policy element.

20 Claims, 103 Drawing Sheets

Related U.S. Application Data continuation of application No. 14/214,492, filed on Mar. 14, 2014, now abandoned.

(60) Provisional application No. 61/794,116, filed on Mar. 15, 2013, provisional application No. 61/792,765, filed on Mar. 15, 2013, provisional application No. 61/793,894, filed on Mar. 15, 2013, provisional application No. 61/799,710, filed on Mar. 15, 2013, provisional application No. 61/801,074, filed on Mar. 15, 2013.

(52) U.S. Cl.
CPC ......... *H04M 15/8083* (2013.01); *H04W 4/24* (2013.01); *H04M 2215/0192* (2013.01)

(58) Field of Classification Search
USPC ............... 455/406–409, 414.1, 432.1, 456.1; 705/28, 30, 34; 709/217–226; 726/2, 3; 370/352
See application file for complete search history.

(56) References Cited

U.S. PATENT DOCUMENTS

| | | | |
|---|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |

(56) References Cited

U.S. PATENT DOCUMENTS

| | | |
|---|---|---|
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,020,781 B1 | 3/2006 | Saw et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | Mckenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,320,781 B2 | 1/2008 | Lambert et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |

(56) References Cited

U.S. PATENT DOCUMENTS

| | | |
|---|---|---|
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,794 B2 | 3/2009 | Feather et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,585,217 B2 * | 9/2009 | Lutnick ............... G07F 17/32 463/16 |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,788,700 B1 | 8/2010 | Feezel et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schlüter et al. |

(56) References Cited

U.S. PATENT DOCUMENTS

| | | |
|---|---|---|
| 7,805,606 B2 | 9/2010 | Birger et al. |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,477 B2 | 12/2010 | Cristofalo et al. |
| 7,853,255 B2 | 12/2010 | Karaoguz et al. |
| 7,853,656 B2 | 12/2010 | Yach et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,873,985 B2 | 1/2011 | Baum |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,740 B2 | 4/2011 | Math et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,017 B2 | 11/2011 | Schlicht et al. |
| 8,060,463 B1 | 11/2011 | Spiegel |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |

(56) References Cited

U.S. PATENT DOCUMENTS

| | | |
|---|---|---|
| 8,094,551 B2 | 1/2012 | Huber et al. |
| 8,095,112 B2 | 1/2012 | Chow et al. |
| 8,095,124 B2 | 1/2012 | Balia |
| 8,095,175 B2 | 1/2012 | Todd et al. |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,249 B2 | 9/2012 | Hu |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,518 B1 | 11/2012 | Gailloux |
| 8,306,741 B2 | 11/2012 | Tu |
| 8,307,067 B2 | 11/2012 | Ryan |
| 8,307,095 B2 | 11/2012 | Clark et al. |
| 8,310,943 B2 | 11/2012 | Mehta et al. |
| 8,315,198 B2 | 11/2012 | Corneille et al. |

(56) References Cited

U.S. PATENT DOCUMENTS

| | | |
|---|---|---|
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,472 B2 | 3/2013 | Hao et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,429,409 B1 | 4/2013 | Wall et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,057 B2 * | 7/2013 | Cuervo .............. H04L 12/1407 370/230 |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,227 B2 | 7/2013 | Kaminsky et al. |
| 8,495,360 B2 | 7/2013 | Falk et al. |
| 8,495,700 B2 * | 7/2013 | Shahbazi .......... H04W 12/0027 726/1 |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 * | 8/2013 | Raleigh ............ G06Q 10/06375 726/2 |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,013 B2 * | 9/2013 | Guba .................... H04W 4/027 455/569.2 |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,402 B2 | 9/2013 | Vidal et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |

(56) References Cited

U.S. PATENT DOCUMENTS

| | | |
|---|---|---|
| 8,548,428 B2 | 10/2013 | Raleigh |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,588,240 B2 | 11/2013 | Ramankutty et al. |
| 8,589,541 B2 | 11/2013 | Raleigh et al. |
| 8,589,955 B2 | 11/2013 | Roundtree et al. |
| 8,594,665 B2 | 11/2013 | Anschutz |
| 8,595,186 B1 | 11/2013 | Mandyam et al. |
| 8,600,850 B2 * | 12/2013 | Zabawskyj ............ H04L 12/14 370/259 |
| 8,600,895 B2 | 12/2013 | Felsher |
| 8,601,125 B2 | 12/2013 | Huang et al. |
| 8,605,691 B2 | 12/2013 | Soomro et al. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,621,056 B2 | 12/2013 | Coussemaeker et al. |
| 8,626,115 B2 | 1/2014 | Raleigh et al. |
| 8,630,314 B2 | 1/2014 | York |
| 8,630,925 B2 * | 1/2014 | Bystrom ............... H04L 47/72 705/30 |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,852 B2 | 3/2014 | Maes |
| 8,676,682 B2 | 3/2014 | Kalliola |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2 | 4/2014 | Dua |
| 8,701,015 B2 | 4/2014 | Bonnat |
| 8,705,361 B2 | 4/2014 | Venkataraman et al. |
| 8,706,863 B2 | 4/2014 | Fadell |
| 8,712,631 B2 | 4/2014 | Tietjen et al. |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,792,857 B2 * | 7/2014 | Cai .................... H04L 12/14 455/408 |
| 8,793,304 B2 | 7/2014 | Lu et al. |
| 8,799,227 B2 | 8/2014 | Ferguson et al. |
| 8,799,440 B2 * | 8/2014 | Zhou ................... H04L 12/14 709/223 |
| 8,804,517 B2 | 8/2014 | Oerton |
| 8,804,695 B2 | 8/2014 | Branam |
| 8,811,338 B2 | 8/2014 | Jin et al. |
| 8,811,991 B2 | 8/2014 | Jain et al. |
| 8,812,525 B1 | 8/2014 | Taylor, III |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,837,322 B2 | 9/2014 | Venkataramanan et al. |
| 8,838,686 B2 | 9/2014 | Getchius |
| 8,838,752 B2 | 9/2014 | Lor et al. |
| 8,843,849 B2 | 9/2014 | Neil et al. |
| 8,845,415 B2 | 9/2014 | Lutnick et al. |
| 8,849,297 B2 | 9/2014 | Balasubramanian |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,868,725 B2 | 10/2014 | Samba |
| 8,868,727 B2 | 10/2014 | Yumerefendi et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,898,748 B2 | 11/2014 | Burks et al. |
| 8,908,516 B2 | 12/2014 | Tzamaloukas et al. |
| 8,929,374 B2 | 1/2015 | Tönsing et al. |
| 8,930,238 B2 | 1/2015 | Coffman et al. |
| 8,930,551 B2 * | 1/2015 | Pandya ................. H04L 12/14 709/224 |
| 8,943,551 B2 | 1/2015 | Ganapathy et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,972,537 B2 | 3/2015 | Bastian et al. |
| 8,977,284 B2 | 3/2015 | Reed |
| 8,977,856 B2 | 3/2015 | Malek et al. |
| 8,983,860 B1 | 3/2015 | Beda, III et al. |
| 8,995,952 B1 | 3/2015 | Baker et al. |
| 9,002,322 B2 | 4/2015 | Cotterill |
| 9,002,342 B2 | 4/2015 | Tenhunen et al. |
| 9,014,973 B2 | 4/2015 | Ruckart |
| 9,015,331 B2 | 4/2015 | Lai et al. |
| 9,021,069 B2 | 4/2015 | Ducrou et al. |
| 9,026,100 B2 * | 5/2015 | Castro Castro ......... H04L 12/14 370/252 |
| 9,030,934 B2 | 5/2015 | Shah et al. |
| 9,032,427 B2 | 5/2015 | Gallant et al. |
| 9,042,923 B1 | 5/2015 | Mirho |
| 9,043,462 B2 | 5/2015 | Badiee et al. |
| 9,047,651 B2 | 6/2015 | Roumeliotis et al. |
| 9,049,010 B2 | 6/2015 | Jueneman et al. |
| 9,064,275 B1 | 6/2015 | Lu et al. |
| 9,105,031 B2 | 8/2015 | Shen et al. |
| 9,111,088 B2 | 8/2015 | Ghai et al. |
| 9,135,037 B1 | 9/2015 | Petrescu-Prahova et al. |
| 9,137,286 B1 | 9/2015 | Yuan |
| 9,137,389 B2 | 9/2015 | Neal et al. |
| 9,172,553 B2 | 10/2015 | Dawes et al. |
| 9,173,090 B2 | 10/2015 | Tuchman et al. |
| 9,176,913 B2 | 11/2015 | Millet et al. |
| 9,177,455 B2 | 11/2015 | Remer |
| 9,191,394 B2 | 11/2015 | Novak et al. |
| 9,277,433 B2 * | 3/2016 | Raleigh ............... H04L 43/0882 |
| 9,282,460 B2 | 3/2016 | Souissi |
| 9,286,469 B2 | 3/2016 | Kraemer et al. |
| 9,286,604 B2 | 3/2016 | Aabye et al. |
| 9,298,723 B1 | 3/2016 | Vincent |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,361,451 B2 | 6/2016 | Oberheide et al. |
| 9,363,285 B2 | 6/2016 | Kitamura |
| 9,367,680 B2 | 6/2016 | Mahaffey et al. |

(56) References Cited

U.S. PATENT DOCUMENTS

| | | | |
|---|---|---|---|
| 9,369,959 B2 | 6/2016 | Ruutu et al. |
| 9,386,045 B2 | 7/2016 | Kgil et al. |
| 9,402,254 B2 | 7/2016 | Kneckt et al. |
| 9,413,546 B2 | 8/2016 | Meier et al. |
| 9,418,381 B2 | 8/2016 | Ahuja et al. |
| 9,454,598 B2 | 9/2016 | Hwang et al. |
| 9,459,767 B2 | 10/2016 | Cockcroft et al. |
| 9,479,917 B1 * | 10/2016 | Gota .................... H04M 15/66 |
| 9,501,803 B2 | 11/2016 | Bilac et al. |
| 9,589,117 B2 | 3/2017 | Ali et al. |
| 9,609,459 B2 | 3/2017 | Raleigh |
| 9,634,850 B2 | 4/2017 | Taft et al. |
| 9,648,022 B2 | 5/2017 | Peterka et al. |
| 9,681,003 B1 * | 6/2017 | Kim .................... H04M 15/66 |
| 10,002,332 B2 | 6/2018 | Spong |
| 10,057,775 B2 * | 8/2018 | Raleigh ............... G06Q 20/145 |
| 10,171,988 B2 * | 1/2019 | Raleigh ............... H04L 12/1403 |
| 10,171,990 B2 * | 1/2019 | Raleigh ............... H04M 15/41 |
| 10,248,996 B2 | 4/2019 | Raleigh |
| 10,264,138 B2 | 4/2019 | Raleigh et al. |
| 10,285,025 B1 * | 5/2019 | Baker .................... H04W 4/24 |
| 10,462,627 B2 * | 10/2019 | Raleigh ............... H04M 15/765 |
| 10,492,102 B2 * | 11/2019 | Raleigh ............... H04W 28/10 |
| 10,582,375 B2 * | 3/2020 | Raleigh ............... H04W 4/24 |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0114553 A1 | 6/2004 | Jiang et al. |
| 2004/0116140 A1 | 6/2004 | Babbar et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | DeMello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0226178 A1 | 10/2005 | Forand et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |

(56) References Cited

U.S. PATENT DOCUMENTS

| | | |
|---|---|---|
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0182137 A1 | 8/2006 | Zhou |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0111740 A1 | 5/2007 | Wandel |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0265003 A1 | 11/2007 | Kezys et al. |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0101291 A1 | 5/2008 | Jiang et al. |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |

(56) References Cited

U.S. PATENT DOCUMENTS

| | | |
|---|---|---|
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0170554 A1 | 7/2009 | Want et al. |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027525 A1 | 2/2010 | Zhu |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0042675 A1 | 2/2010 | Fujii |
| 2010/0043068 A1 | 2/2010 | Varadhan et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0318652 A1 | 12/2010 | Samba |

(56) References Cited

U.S. PATENT DOCUMENTS

| | | |
|---|---|---|
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0252430 A1 | 10/2011 | Chapman et al. |
| 2011/0264923 A1 | 10/2011 | Kocher et al. |
| 2011/0277019 A1 | 11/2011 | Pritchard, Jr. |
| 2012/0020296 A1 | 1/2012 | Scherzer et al. |
| 2012/0029718 A1 | 2/2012 | Davis |
| 2012/0101952 A1 | 4/2012 | Raleigh et al. |
| 2012/0108225 A1 | 5/2012 | Luna et al. |
| 2012/0144025 A1 | 6/2012 | Melander et al. |
| 2012/0155296 A1 | 6/2012 | Kashanian |
| 2012/0166364 A1 | 6/2012 | Ahmad et al. |
| 2012/0166604 A1 | 6/2012 | Fortier et al. |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0095787 A1 | 4/2013 | Kashanian |
| 2013/0103376 A1 | 4/2013 | Gaddam et al. |
| 2013/0111572 A1 | 5/2013 | Gaddam et al. |
| 2013/0117140 A1 | 5/2013 | Kashanian |
| 2013/0117382 A1 | 5/2013 | Gaddam et al. |
| 2013/0144789 A1 | 6/2013 | Aaltonen et al. |
| 2013/0149994 A1 | 6/2013 | Gaddam et al. |
| 2013/0183937 A1 | 7/2013 | Neal et al. |
| 2013/0275583 A1 | 10/2013 | Roach et al. |
| 2013/0326356 A9 | 12/2013 | Zheng et al. |
| 2014/0066101 A1 | 3/2014 | Lyman et al. |
| 2014/0073291 A1 | 3/2014 | Hildner et al. |
| 2014/0080458 A1 | 3/2014 | Bonner et al. |
| 2014/0241342 A1 | 8/2014 | Constantinof |
| 2015/0181628 A1 | 6/2015 | Haverinen et al. |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| EP | 2466831 A1 | 6/2012 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| WO | 1998058505 | 12/1998 |
| WO | 1999027723 | 6/1999 |
| WO | 1999065185 | 12/1999 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 2003014891 | 2/2003 |
| WO | 2003017063 A2 | 2/2003 |
| WO | 2003017065 A2 | 2/2003 |
| WO | 2003058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005053335 A1 | 6/2005 |
| WO | 2005083934 A1 | 9/2005 |
| WO | 2006004467 | 1/2006 |
| WO | 2006004784 A1 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 A | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 A1 | 7/2008 |
| WO | 2008099802 | 8/2008 |
| WO | 2009008817 A1 | 1/2009 |
| WO | 2009091295 A1 | 7/2009 |
| WO | 2010088413 | 8/2010 |
| WO | 2010128391 A2 | 11/2010 |
| WO | 2011002450 A1 | 1/2011 |

(56) References Cited

FOREIGN PATENT DOCUMENTS

| | | |
|---|---|---|
| WO | 2011149532 A1 | 12/2011 |
| WO | 2012047275 A | 4/2012 |

OTHER PUBLICATIONS

"Ads and movies on the run," the Gold Coast Bulletin, Southport, Qld, Jan. 29, 2008.
"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4):155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"Prevent iCloud Documents & Data from using your data plan," Oct. 26, 2011; CNET webarchive, by Jason Ciprian.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
3rd Generation Partnership Project; "Technical Specification Group Services and System Aspects; IP Flow Mobility and seamless WLAN offload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and Ip Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Chandrasekhar et al., "Femtocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.

Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Ehnert, "Small application to monitor IP trafic on a Blackberry—1.01.03 ", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/datatmeasures/index_en.htm."
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer-Institute for Secure Information Technology Sit; Germany; Ncnc 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and the Challenges," Scroll, vol. 1, No. 1, 2008.
Loopt User Guide, metroPCS, Jul. 17, 2008.
Muntermann et al., "Potentials und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Quintana, David, "Mobile Multitasking," Apr. 14, 2010.
Rao et al., "Evolution of Mobile Location-Based Services," Communication of the ACM, Dec. 2003.

(56) References Cited

OTHER PUBLICATIONS

Richtel, "Cellphone consumerism; If even a debit card is too slow, now you have a new way to act on impulse: [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT , CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Thurston, Richard, "WISPr 2.0 Boosts Roaming Between 3G and Wi-Fi"; Jun. 23, 2010; Web page from zdnet.com; Zdnet.com/Wispr-2-0-boosts-roaming-between-3g-and-wi-fi-3040089325/.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2_0 Offer Parents Full Family Security Solution," Aug. 18, 2008.
Wi-Fi Alliance Hotspot 2.0 Technical Task Group, "Wi-Fi Certified Passpoint™ (Release 1) Deployment Guidelines—Version 1.0—Oct. 2012".
Wi-Fi Alliance Technical Committee Hotspot 2.0 Technical Task Group, "Hotspot 2.0 (Release 1) Technical Specification—Version 1.0.0"; 2012.
Windows7 Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.

* cited by examiner

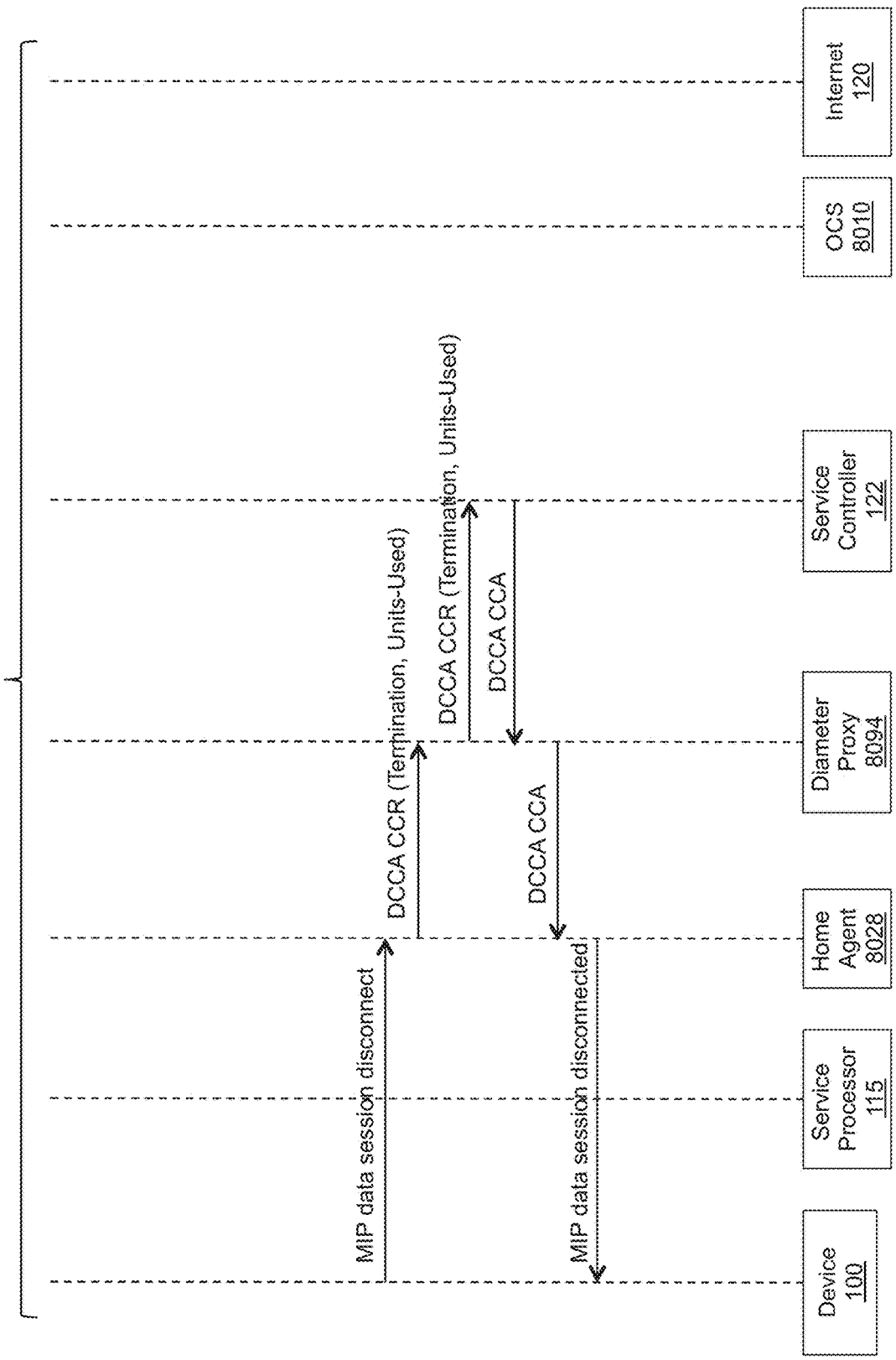

Hierarchical Design Environment

Policy Priority Management

| Service Component Class | Service Component | Filter | Plan Classes/Plans | | | | |
|---|---|---|---|---|---|---|---|
| | | | Sponsored Plans | | User-Paid Plans | | |
| | | | One-Day Sponsored Twitter Plan | Three-Day Sponsored Social Networking Plan | 30-Day, 10 MB General Access Plan With Bonus | Non-Expiring 50 MB General Access Plan | |
| Sponsored Service Components | Facebook | Facebook App Filter | | X | X | | |
| | | Facebook Messenger Filter | | X | X | | |
| | | Facebook Web Access Filter | | X | X | | |
| | Twitter | Twitter App Filter | X | X | X | | |
| | | Twitter Web Access Filter | X | X | X | | |
| Open-Access Service Components | Open Access | All-pass Filter | | | X | X | | descending priority →

FIG. 56

Policy Priority Management

| Service Component Class | Service Component | Filter | Sponsored Plans | | User-Paid Plans | |
|---|---|---|---|---|---|---|
| | | | One-Day Sponsored Twitter Plan | Three-Day Sponsored Social Networking Plan | One-Week 50 MB General Access Plan | 30-Day, 10 MB General Access Plan With Bonus |
| Sponsored Service Components | Facebook | Facebook App Filter | | X | | X |
| | | Facebook Messenger Filter | | X | | X |
| | | Facebook Web Access Filter | | X | | X |
| | Twitter | Twitter App Filter | X | X | | X |
| | | Twitter Web Access Filter | X | X | | X |
| Open-Access Service Components | Open Access | All-pass Filter | | | X | X | descending priority →

↑ descending priority

FIG. 57

Single-Match/Multi-Match Design Capability

Single-Match/Multi-Match Design Capability

FIG. 60 Multi-Match Example: Cap and Re-Match

FIG. 61 Input-Modified Policy Set Example: Marketing Interceptor

FIG. 62 Provisioning Instruction Translator

Policy System Architecture

FIG. 64 Policy Provisioning and Enforcement

VIRTUALIZED POLICY AND CHARGING SYSTEM

COPYRIGHT & TRADEMARK NOTICES

A portion of the disclosure of this patent document may contain material which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BRIEF DESCRIPTION OF THE DRAWINGS

The disclosed embodiments may be better understood by referring to the figures in the attached drawings, as provided below.

FIGS. 24A-24F illustrate the interaction between the home agent and the service controller via the diameter proxy/router in accordance with some embodiments.

FIGS. 56 and 57 illustrate the value and power of intra-class prioritization with regard to plans, in accordance with one embodiment.

Features, elements, and aspects that are referenced by the same numerals in different figures represent the same, equivalent, or similar features, elements, or aspects, in accordance with one or more embodiments.

DETAILED DESCRIPTION

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

In accordance with one embodiment, an enterprise integration interfaces (EAI) is provided that is exposed to a Service Controller to allow information to be exchanged between the Service Controller and the Operator IT systems, network infrastructure and management platforms. The network infrastructure elements generally follow either a 3GPP (GPRS or EPC) or 3GPP2 (CMDA/Simple and Mobile IP) specification (standard). The document then highlights typical integration embodiments into various network architectures. The detailed integration descriptions for 3GPP are based on a GPRS core and EPC network implementation. On the 3GPP2 technology front, the detailed integration information in this document will be provided on Mobile IP networks using a standard 3GPP2 core. Additionally, on the 3GPP2 technology front, a non-standard integration using a Gy interface to the Home Agent is also described.

Although this document describes various embodiments in the context of a GPRS core, it may be appreciated by a person having ordinary skill in the art that the disclosed embodiments may also be applied in other packet core contexts, including, but not limited to, mobile IP, evolved packet core (EPC), 3GPP2, Wimax, etc. Gy and Ro interfaces have been consolidated in the 3GPP standard. The Ro functionality encompasses both the legacy Ro capabilities and the Gy capabilities. 3GPP refers to the consolidated interface as "Ro" in Release 10 and beyond.

Service Controller Interface Technology

These interfaces describe the generic application programming interfaces (APIs) used by the Service Controller platform to interact with the various elements of the Operator network. In one embodiment, the Service Controller uses these interfaces to manage service and subscriber provisioning, exchange subscriber usage and session records, and interact with Operator customer resource management (CRM) systems.

Figure 1:
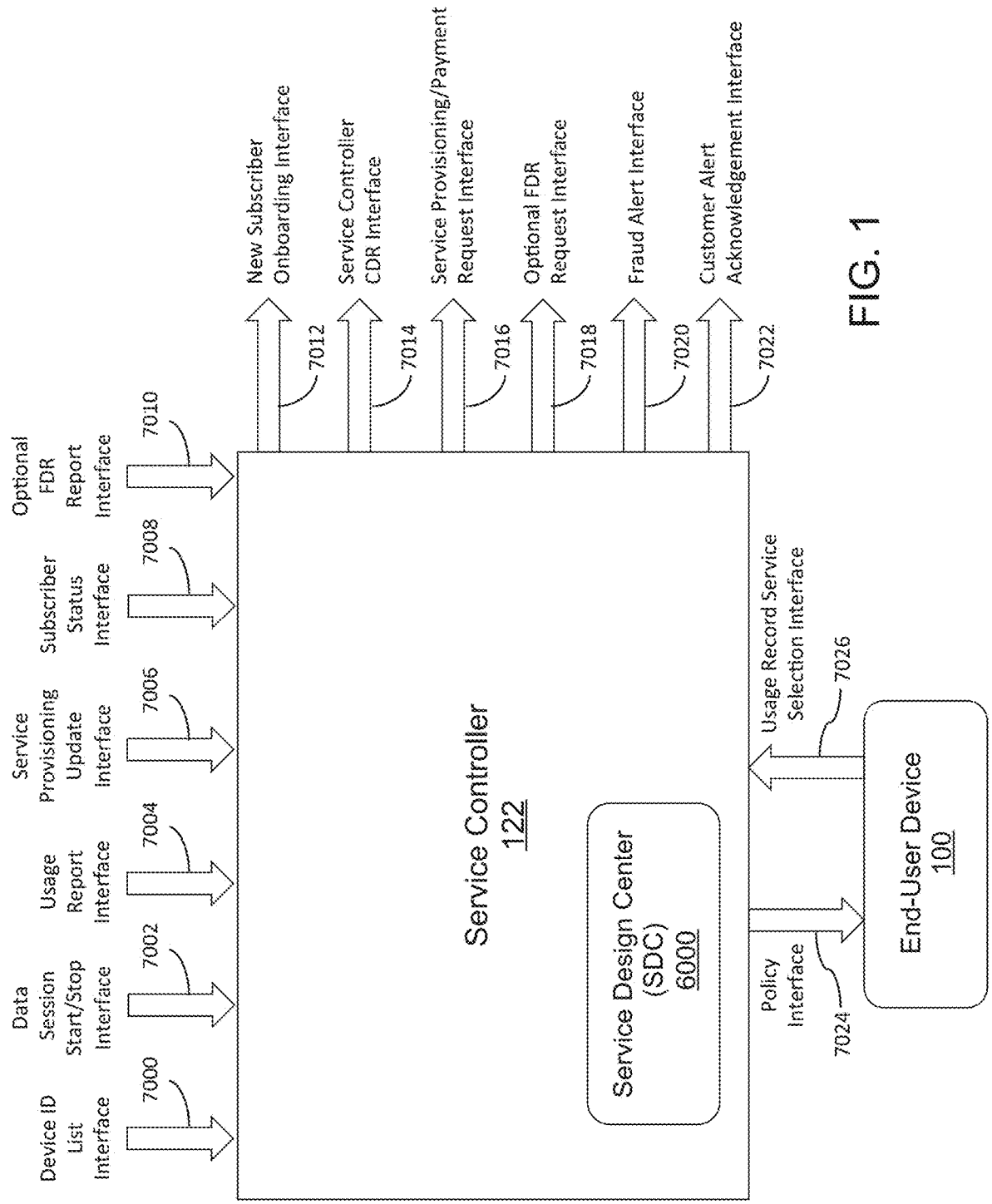
FIG. 1 is a high-level functional interface APIs that the Service Controller exposes to the Operator network in accordance with one or more embodiments.

Referring to FIG. 1, a high-level functional interface APIs is provided that the Service Controller 122 exposes to the Operator network in accordance with one or more embodiments. Depending on the Operator's systems, some of these functional interfaces are combined into a single interface. A single functional interface is broken out into multiple Operator interfaces, for example.

In order to expose a consistent API structure across multiple Operator environments, the Service Controller 122 may isolate the core business logic from the exposed interfaces. The Service Controller 122 implements an internal API layer to interact with the Service Controller core software and an interface translation layer to provide a protocol translation layer between the Operator network and IT systems and the Service Controller API layer.

Figure 2:
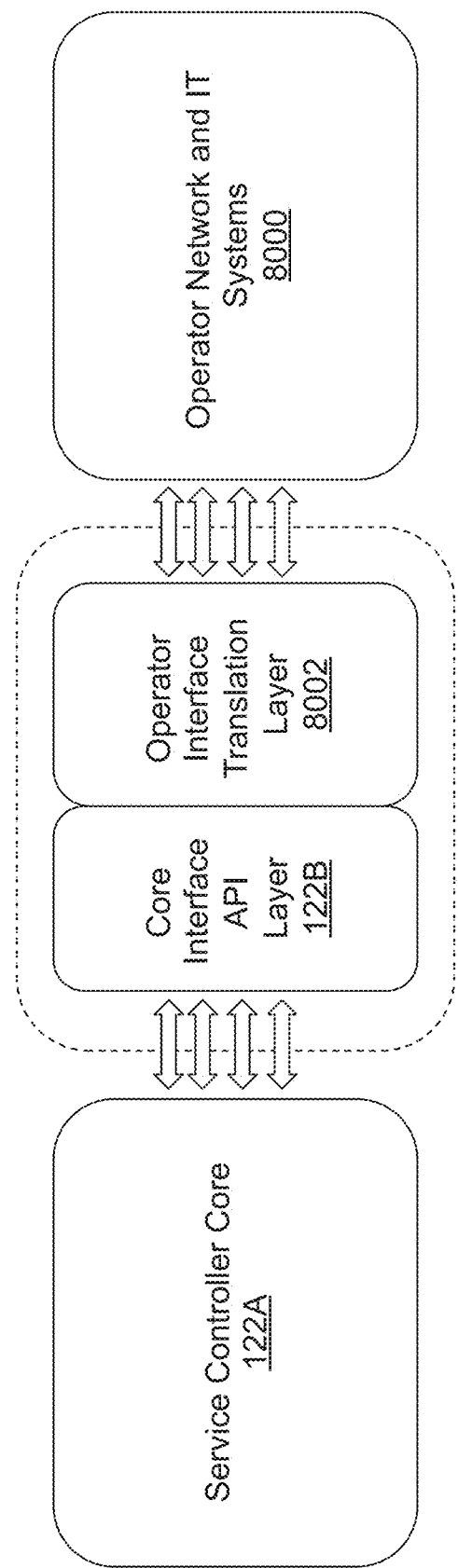
FIG. 2 is an architecture comprising a protocol translation layer in accordance with one or more embodiments is provided in accordance with one or more embodiments.
Figure 3:
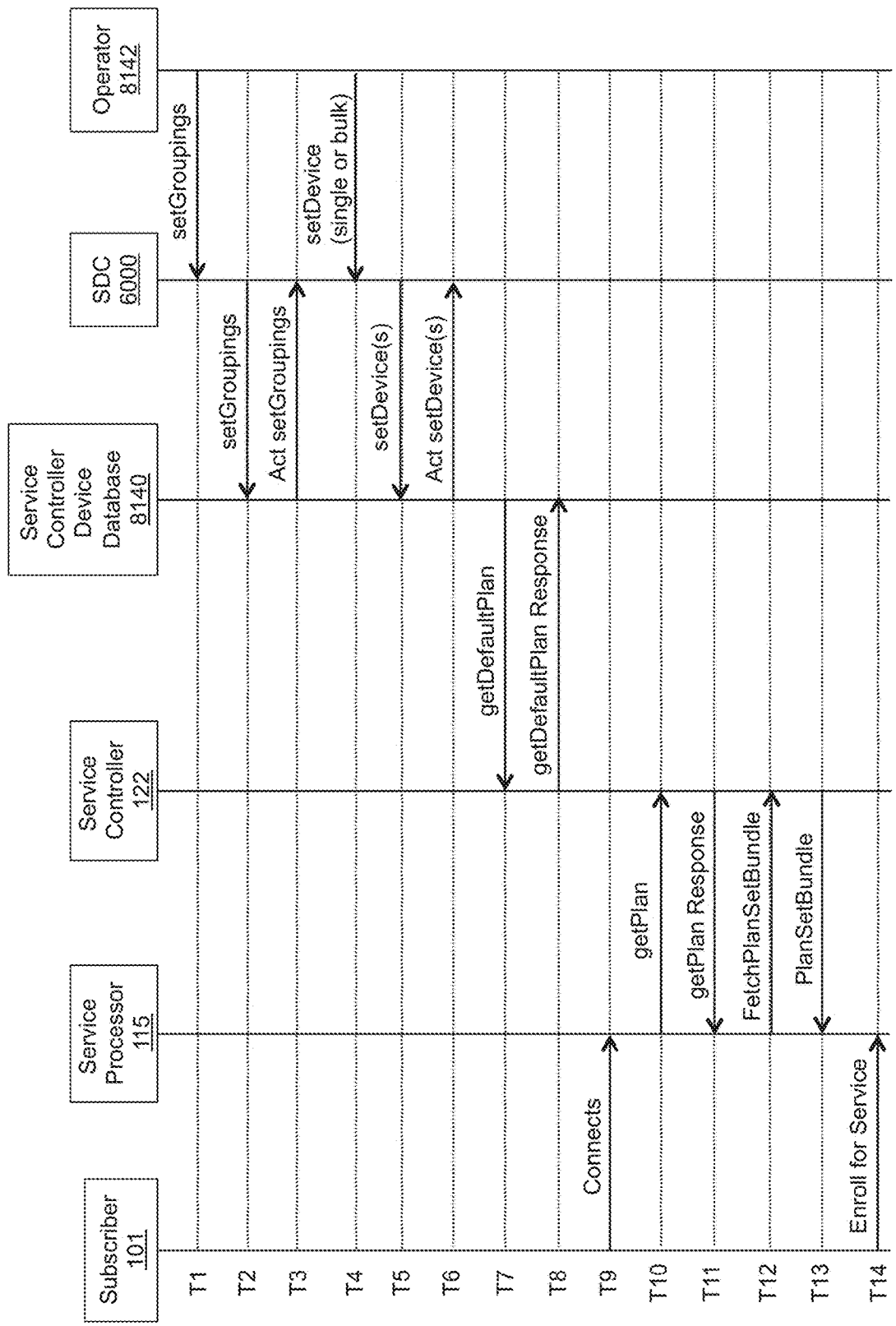
FIGS. 3 through 9 illustrate high-level call flows representative of how an action may be implemented in an operator network in accordance with one embodiment.
Figure 4:
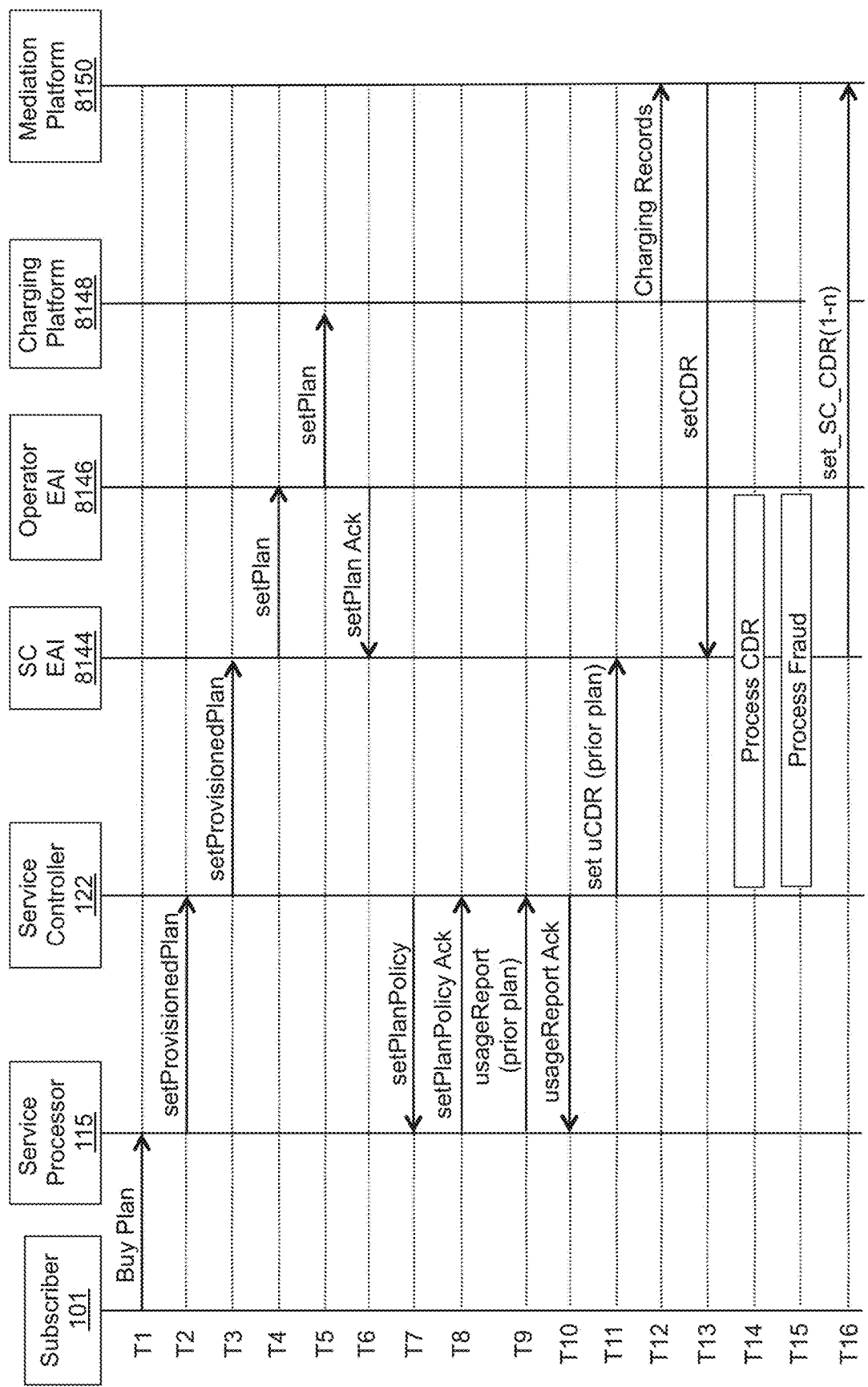
Figure 5:
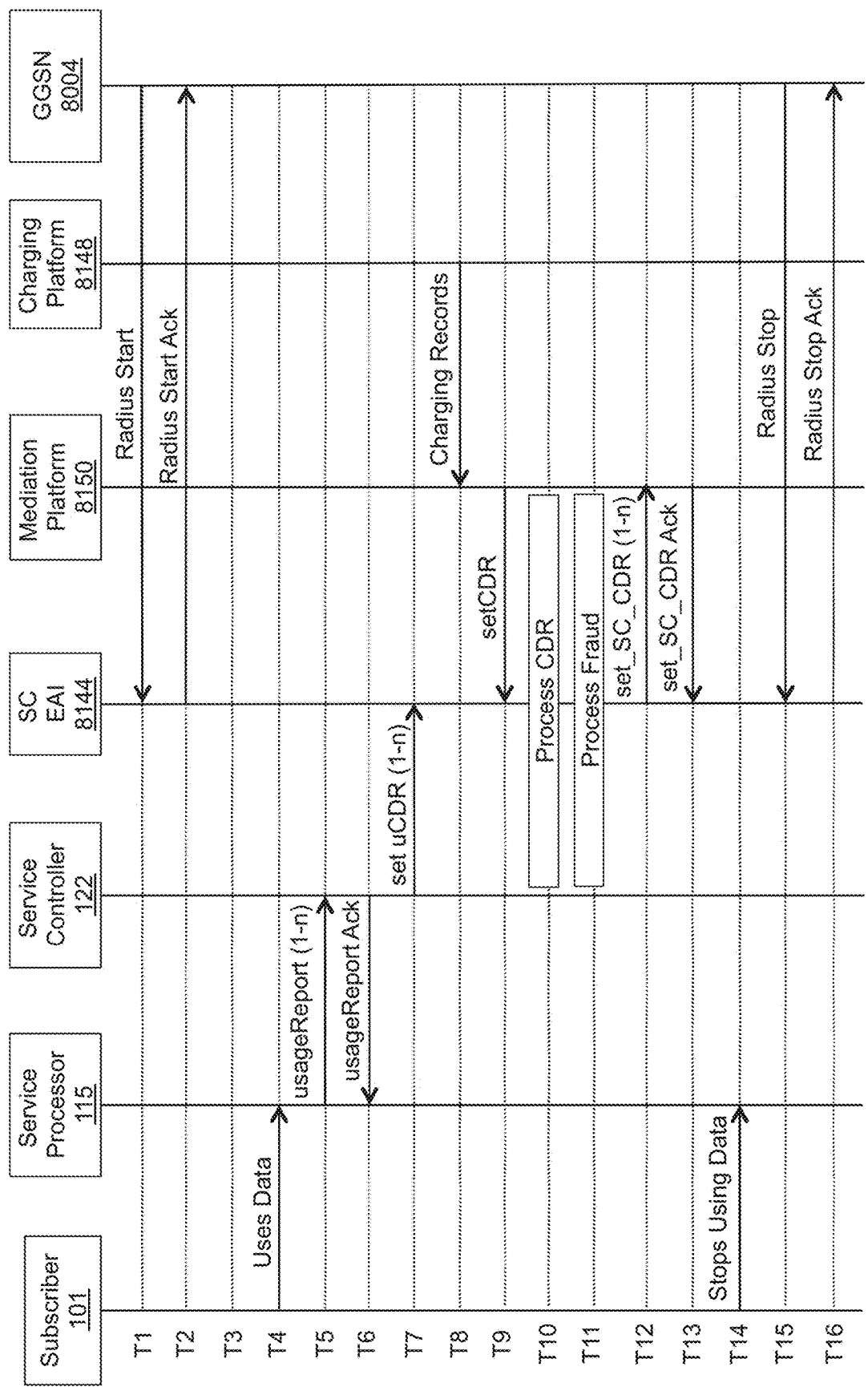
Figure 6:
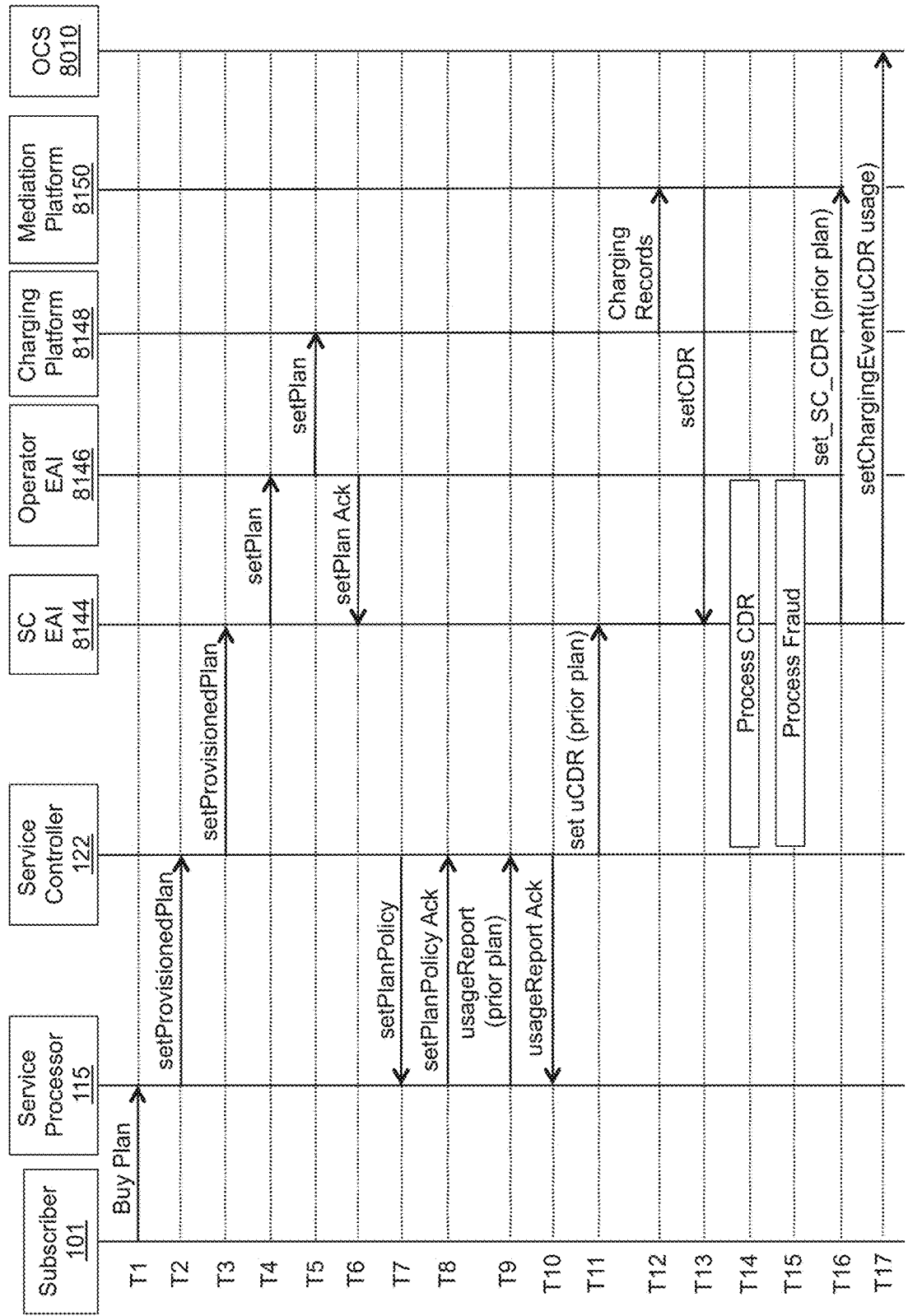
Figure 7A:
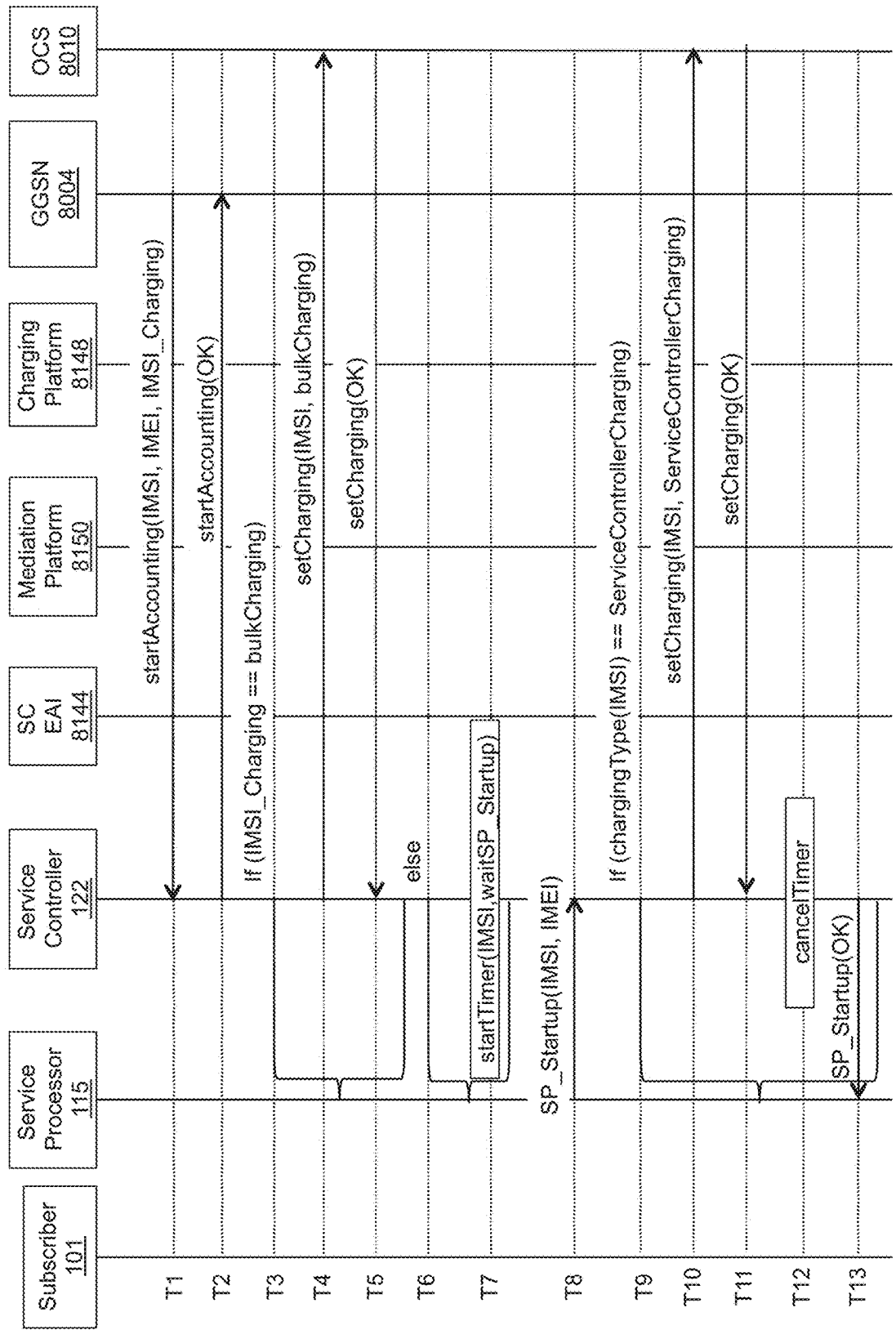
Figure 7B:
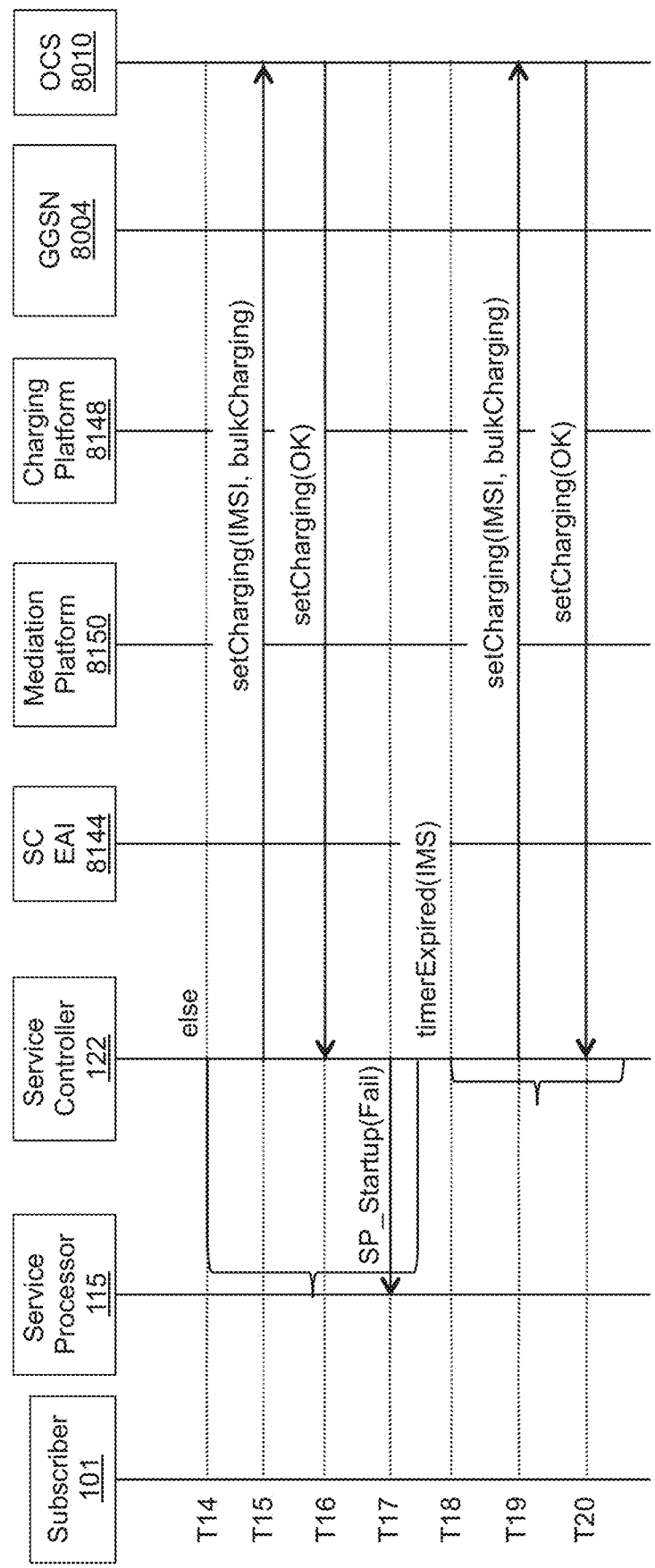
Figure 7C:
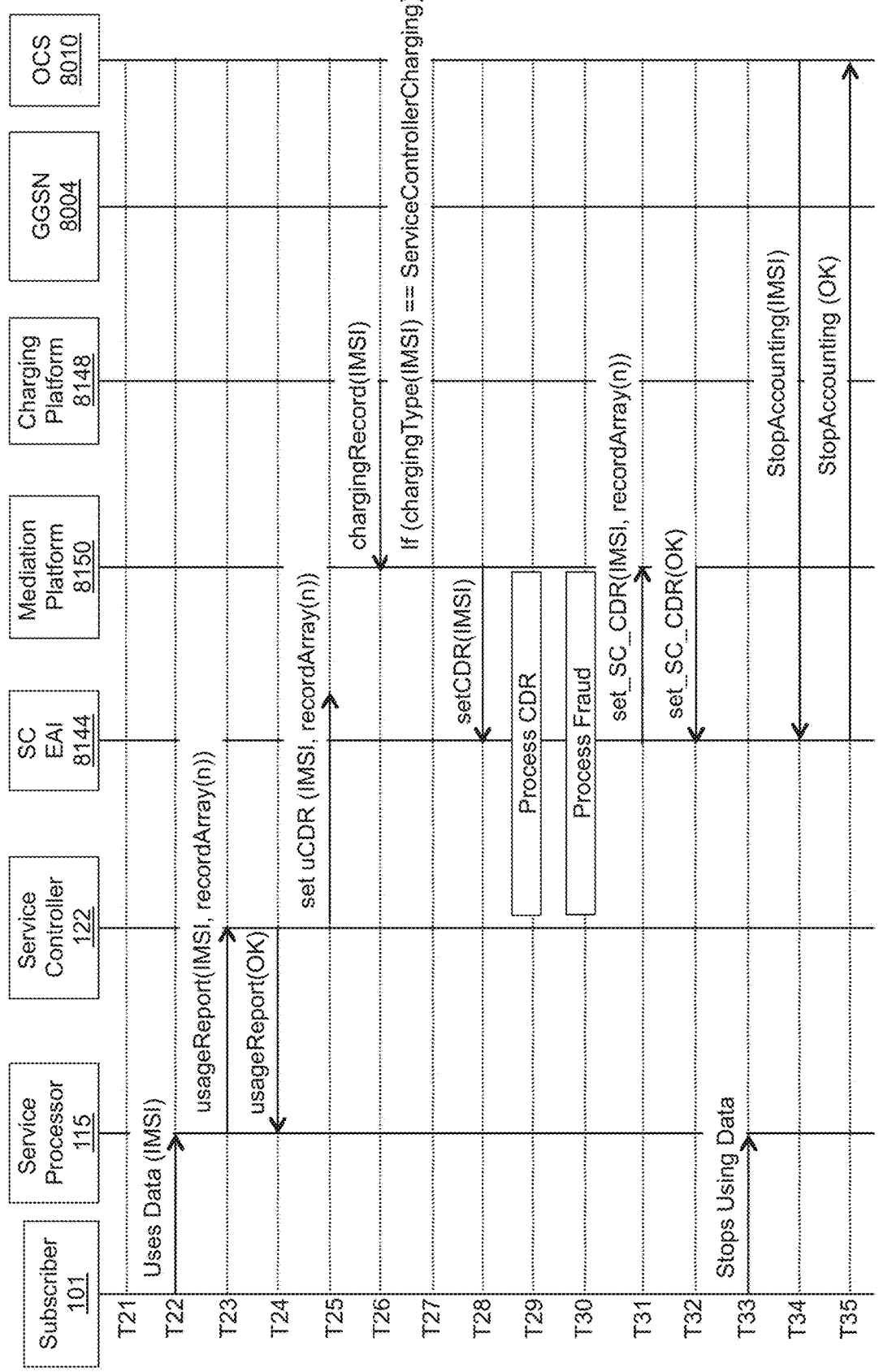
Figure 8:
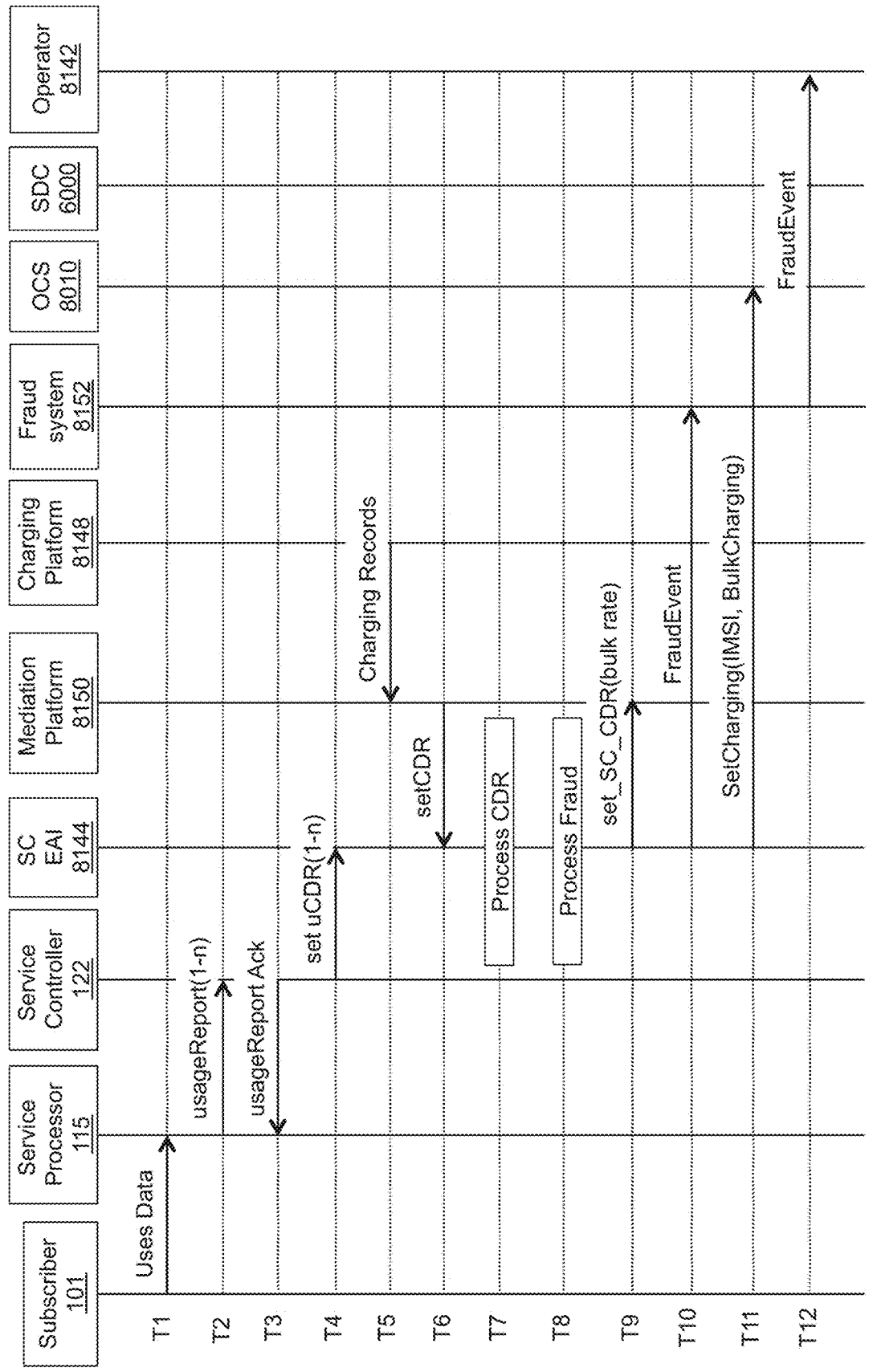
Figure 9:
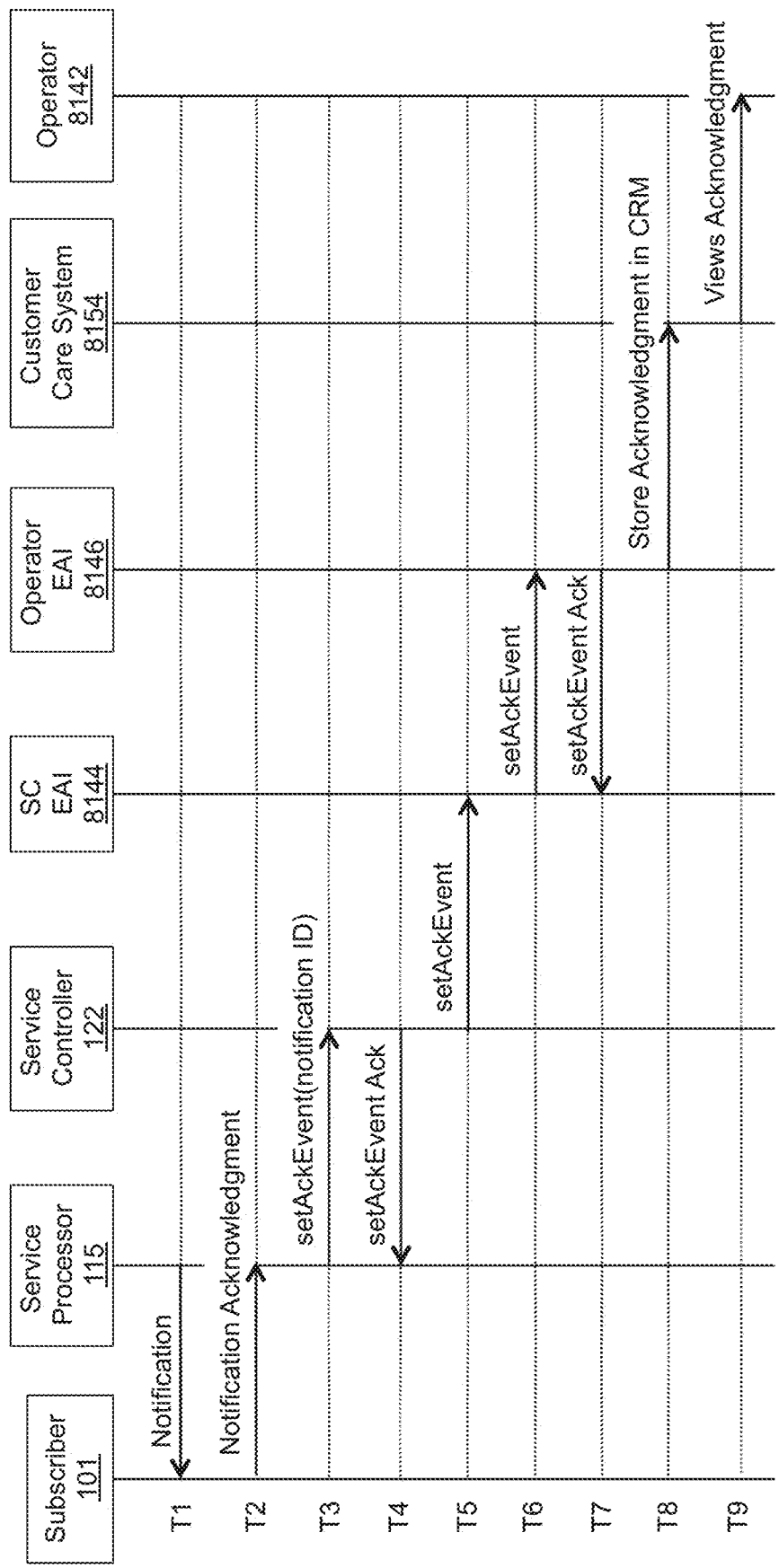

Referring to FIG. 2, an architecture comprising a protocol translation layer in accordance with one or more embodiments is provided.

Service Controller Core—The service controller core 122A implements the Service Controller core business logic and functionality that is common across Operator implementations.

Core Interface API Layer—The core interface API layer 122B provides a common interface layer between the Operator Interface Translation Layer 8002 and the Service Controller Core 122A. This layer allows the Operator-specific interface management/logic to be separated from the core Service Controller logic and enables the Service Controller to easily adapt to multiple operating environments, interface types (e.g., 3GPP, 3GPP2, web services, batch, custom, etc.) and network technologies (e.g., CDMA, GPRS, EPC, WiMax, etc.).

Operator Interface Translation Layer—The operator interface translation layer 8002 implements the Operator-specific interfaces to support the Service Controller functionality in the Operator's network. The integration work is performed by implementing the necessary business logic/interface management to support the Operator-specific interface points. In one embodiment in which there is not a one-to-one mapping between a Service Controller Interface API and a single Operator interface point, the Operator Interface Translation Layer 8002 manages the workflow to either combine or split up the functionality and workflow across the appropriate Operator interface(s).

In one embodiment, for a Service Controller interface (as defined in FIG. 1), the Core Interface API Layer 122B specifies what data elements may implement the interface. The Operator Interface Translation Layer 8002 may be responsible for implementing the Operator-specific interface protocols and logic (e.g., 3GPP, 3GPP2, web services, RADIUS, Diameter, batch, custom, etc.) to interact with the appropriate Operator systems to exchange the appropriate data.

Service Controller Interface Definitions

In one embodiment, the interfaces that are exposed by the Service Controller 122 are implemented as provided in further detail below. For an exposed interface, the purpose, preferred interface protocol and format, and data elements are described. Although the Service Controller 122 may support any interface protocol and format across these interfaces, the preferred protocols and strategies indicated are meant as a guide based on interfaces that implement similar functionality. It may be appreciated by a person having ordinary skill in the art that other or alternative protocols and strategies are within the scope of the disclosure and that the provided details herein shall not be construed as limiting the scope of the disclosed subject matter to any particular details.

Inbound Interfaces

In the following we provide the interfaces by which the Operator network and/or IT systems provide information to the Service Controller in accordance with some embodiments.

Subscriber List Interface

In one embodiment, the Subscriber List Interface provides the Service Controller 122 with subscriber IDs (i.e., information that identifies a subscriber) and credentials of subscribers that are managed by the Service Controller 122. A subscriber ID may refer to subscriber (e.g., IMSI, MSID, MSISDN, MDN, IPv4/6 address, etc.), a subscriber's device ID (e.g., IMEI, MEID, MAC, etc.), or a combination of the two. In one embodiment, when subscribers are loaded to the Service Controller 122, they are assigned an EID (Equipment ID—Service Controller internal ID) and associated with a Subscriber Group.

In one embodiment, the rules for converting Subscriber ID to EID are implementation-specific, and the mapping of the external parameters to EID is defined via the Service Design Center (SDC) 6000. In one embodiment, decoupling the Operator IDs from the Service Controller IDs allows the Service Controller 122 to manage subscribers by an ID that identifies the account, the device, or a combination of the two.

In one embodiment, subscribers are pre-loaded on the Service Controller 122 via this interface. In one embodiment, subscribers are provisioned by the Service Controller 122 in real-time by the Service Controller 122 detecting new IDs (see New Subscriber Onboarding interface definition).

In one embodiment, the interface strategy for the Subscriber List Interface is batched via an FTP-type transfer protocol that delivers a fixed-length record file to the Service Controller 122. In one embodiment, the format of the data file is operator-specific but includes particular data elements (described below). In one embodiment, these files are uploaded manually as a CSV format via the Service Design Center (SDC) 6000.

In one embodiment, the Subscriber List Interface is implemented as a real-time interface through which subscribers are provisioned on the Service Controller 122 in a real-time (or near real-time) fashion on a device-by-device basis. In some such embodiments, the interface is a web services interface with an XML-based payload.

In one embodiment, the data elements that the Service Controller 122 obtains through the Subscriber List Interface include one or more of Subscriber ID (one or more of IMSI/MSID, MDN/MSISDN, MEID/IMEI, and IPv4/6 MAC) and Subscriber Group. In one embodiment, this API is expanded to include additional Subscriber ID types based on Operator environment.

Data Session Start/Stop Interface

In one embodiment, the Data Session Start/Stop Interface provides the Service Controller 122 with a near-time or a real-time notification that a subscriber's data session has either started or stopped.

In one embodiment, the Service Controller 122 uses these notifications as inputs to fraud processing algorithms. Examples of notification usage include: 1) Upon receipt of a Data Session Start notification, the Service Controller 122 expects to receive a Device Login Event (DLE) within a prescribed period of time (e.g., 30 seconds) to ensure that Service Processor on the device is functional; 2) Upon receipt of Data Session Stop notification, the Service Controller 122 no longer expects to receive periodic usage reports from the Service Processor.

In one embodiment, the interface strategy for the Data Session Start/Stop Interface is real-time, using RADIUS (e.g., Access Request, Accounting Start/Stop, etc.) or Diameter (Diameter Credit Control Application (DCCA) via Credit Control (CCR)). In the case of Diameter or RADIUS, this feed may be combined with the data session usage reporting.

In one embodiment, the Data Session Start/Sop Interface is implemented using web services with an Operator-specific data payload (e.g., OCS via a web services interface).

In one embodiment, the data elements that the Service Controller 122 obtains through the Data Session Start/Stop Interface include one or more of Status (start/stop), subscriber ID (one or more of IMSI/MSID, MDN/MSISDN, MEID/IMEI, IPv4 MAC or IP, IPv6 MAC or IP), APN (if applicable), and event network time. In one embodiment, the Service Controller 122 accepts network-based usage information in conjunction with the start/stop notification (e.g., total session data usage with Data Session Stop notification).

Service Provisioning Update Interface

In one embodiment, the Service Provisioning Update Interface provides the Service Controller 122 with a near-time or a real-time notification that a subscriber's provisioned service has been modified outside the context of the Service Processor/Service Controller 122 (e.g., Customer Care manually added/deleted a service plan from the user's account, subscriber purchased a new service plan via an IVR or Operator website, etc.).

In one embodiment, the Service Controller 122 uses the messages received via the Service Provisioning Update Interface to update the subscriber's plans (add and/or remove) and the subscriber's active Service Plan Bundle. In one embodiment, the updated Service Plan Bundle is sent to the Service Processor on the device upon next check in with the Service Controller 122. In one embodiment, the Service Processor checks-in with the Service Controller 122 when either 1) the subscriber powers on a device; 2) the Service Processor detects a network change where the device is entering cellular coverage (e.g., switch from WiFi to 3G); 3) the Service Processor has a usage report to deliver to the Service Controller 122; 4) the subscriber looks at either the product catalog or his expired plans; or 5) periodic Service Processor check-in with the Service Controller 122.

In one embodiment, the interface strategy for the Service Provisioning Update Interface is real-time, using web services with an XML data payload or another suitable M2M transfer mechanism and protocol.

In one embodiment, the Service Provisioning Update Interface is implemented as a periodic batch update via an FTP-type transfer protocol that delivers a fixed-length record file to the Service Controller 122. In one embodiment, the format of the data file is Operator-specific, but includes particular data elements (described below).

In one embodiment, the data elements that the Service Controller 122 obtains on the Service Provisioning Update Interface include one or more of subscriber ID (one or more of IMSI/MSID, MDN/MSISDN, MEID/IMEI, IPv4/6 or IP), Service Plan ID, Action (add/delete/reset to default state), and Service Plan charging code(s). In one embodiment, for Service Provisioning Updates where the Action is "add," the following data elements are also present:Service Plan start date/time, Service Plan stop date/time, billing cycle day, expiration date and time, and amount to charge to the subscriber's account ("0"=no charge to the subscriber).

Subscriber Status (CRM) Interface

In one embodiment, the Subscriber Status Interface provides the Operator CRM systems with a "window" into the Service Controller 122. Through this interface, the CRM system may query the Service Controller 122 for status related to a subscriber's plans and Service Controller 122 interactions.

Examples of the functions available over the Subscriber Status Interface, in one embodiment, include: 1) View a subscriber's current plans; 2) View a subscriber's current plan usage; 3) Events associated with the subscriber (e.g., notifications shown to the subscriber, notification responses from subscriber, plan usage history, plan purchase history, blocking events, subscriber responses to blocking events, etc.); 4) Device log file, etc.

In one embodiment, through the Subscriber Status interface, the CRM system may modify data associated with the subscriber. Examples of the functions available include: 1) Modify usage in current plans; 2) Modify usage allowance in a current plan; 3) Move subscriber to a different Subscriber Group; 4) Modify/reset subscriber credentials.

In one embodiment, the interface strategy for the Subscriber Status Interface is real-time, using web services with an XML data payload.

In one embodiment, the data elements that the Service Controller 122 obtains on the Service Provisioning Update Interface request include one or more of subscriber ID (one or more of IMSI/MSID, MDN/MSISDN, MEID/IMEI, IPv4/6 MAC or IP), requested action (e.g., view plans, view plans usage, modify usage, etc.), supplemental data to support requested action (e.g., for modify usage→Plan ID, Charging Code, new usage amount (bytes MO, bytes MT)). In one embodiment, the response data elements are specific to the requested action (e.g., View current plan usage returns an array of plans with plan name, Plan ID, usage amounts, plan limits, plan cycle date, plan expiration).

Network Usage Report Interface

In one embodiment, the Network Usage Report Interface provides the Service Controller 122 with near-time or a real-time subscriber data usage information. In one embodiment, Network Usage Reports are only sent for Service Controller-managed devices/subscriber. In one embodiment, the Service Controller 122 implements a filtering function that is placed ahead of the interface to filter out non-Service Controller-managed devices/subscribers.

In one embodiment, the Service Controller 122 uses the messages received via the Network Usage Report Interface as input to the usage reconciliation and verification (fraud), and the usage reporting processes. In one embodiment, when the Service Controller 122 receives a Network Usage Report for a subscriber, it uses it to validate bulk-level network usage counts vs. device usage reports for the time specified in the network usage report. In one embodiment, if the fraud processing does not detect fraud, the Service Controller 122 generates a device-usage report for the time interval specified in the network usage report.

In one embodiment, the interface strategy for the Network Usage Report Interface is real-time, using RADIUS (Accounting Update) or Diameter (DCCA via CCR). In the case of Diameter or RADIUS, this feed may be combined with the data session start/stop feed.

In one embodiment, the Network Usage Report Interface is implemented as a periodic batch update via an FTP-type transfer protocol that delivers a fixed-length record file to the Service Controller 122. In one embodiment, the format of the data file is operator-specific (however 3GPP CDR is preferred), but includes particular data elements (described below). In one embodiment, when implementing the Network Usage Report Interface in the batch mode, delays in receiving the batch file delay the fraud check of comparing device usage reports to network usage reports. Therefore, batch reporting on this interface is not desirable in one embodiment.

In one embodiment, the data elements that the Service Controller 122 obtains on the Network Usage Report Interface include one or more of subscriber ID (one or more of IMSI/MSID, MDN/MSISDN, MEID/IMEI, IPv4/6 MAC or IP), usage report start date/time, usage report end date/time, APN (if applicable), MO bytes used, MT bytes used, and bulk charging code.

FDR Report Interface

In one embodiment, the FDR (Flow Data Record) Report Interface provides the Service Controller 122 with detailed data flow and usage information for a subscriber. In one embodiment, depending on Operator capabilities, data arrives on this interface based on: 1) Service Controller 122 requests (e.g., where the Service Controller 122 queries a network system for FDRs for a specific subscriber/device for a specific period of time (See FDR Request Interface)); 2) FDRs for Service Controller-managed subscribers/devices only; or 3) FDRs for all subscribes/devices (in which case the Service Controller 122 implements a filtering function that is placed ahead of the interface to filter out reports for non-Service Controller-managed devices/subscribers. In one embodiment, this interface is optional. In one embodiment, the FDR Report Interface is present if the Operator may support it and expects advanced verification capabilities from the Service Controller 122.

In one embodiment, the Service Controller 122 uses the messages received via the FDR Report Interface as input to the enhanced verification (fraud) process. In one embodiment, the Service Controller 122 fraud process performs FDR-based verification with the device usage reports for a subscriber only when the subscriber's fraud score indicates that it is likely that fraud is occurring.

In one embodiment, the interface strategy for the FDR Report Interface is near-time or a real-time, using web services with an XML data payload.

In one embodiment, the FDR Report Interface is implemented as a periodic batch update via an FTP-type transfer protocol that delivers a fixed-length record file to the Service Controller 122. In one embodiment, the format of the data file is Operator-specific but includes the data elements described below.

In one embodiment, the data elements that the Service Controller 122 obtains on the FDR Report Interface include one or more of subscriber ID (one or more of IMSI/MSID, MDN/MSISDN, MEID/IMEI, IPv4 MAC or IP, IPv6 MAC or IP), usage report start date/time, usage report end date/time, APN (if applicable), remote IP address, remote port, MO bytes used, and MT bytes used.

Outbound Interfaces

This section identifies and describes the interfaces where the Service Controller 122 is providing information to the Operator network and/or IT systems in accordance with some embodiments.

New Subscriber Onboarding Interface

In one embodiment, the New Subscriber Onboarding Interface enables the Service Controller 122 to notify an Operator system that a subscriber that previously was unknown to the Service Controller 122 has successfully activated on the platform and has an active Service Plan Bundle on his device. In one embodiment, this interface is also used to convey additional one-time information related to the subscriber to the Operator (e.g., device ID, subscriber ID, billing data, acceptance of terms and conditions (T&Cs), and selected service plans and charging codes). In one embodiment, the Operator systems use this information to provision the new subscriber in its systems, e.g., billing, IT and network systems.

In one embodiment, the interface strategy for the New Subscriber Onboarding Interface is near-time or a real-time, using web services with an XML data payload.

In one embodiment, the New Subscriber Onboarding Interface is implemented as a periodic batch update via an FTP-type transfer protocol that delivers a fixed-length record file to the appropriate Operator B/OSS system. In one embodiment, the format of the data file is Operator-specific.

In one embodiment, the data elements that the Service Controller 122 makes available for delivery on the New Subscriber Onboarding Interface are one or more of device ID (e.g., MEID, IMEI), Operator subscriber ID (e.g., IMSI, MSID, MDN, MSISDN, IPv4 MAC or IP, IPv6 MAC or IP), billing data (name, address, etc.), billing data (credit card info, billing address, top up card info, etc.), selected service plan(s) and charging code(s), and acceptance of T&Cs. In one embodiment, additional fields are supported based on Operator business requirements. In one embodiment, this is accomplished by collecting the additional information via the device client user interface (UI) during the enrollment process.

Service Controller CDR Delivery Interface

In one embodiment, the Service Controller CDR Delivery Interface enables the Service Controller 122 to send its CDRs to an Operator business/operational support system (B/OSS) system. In one embodiment, the Service Controller CDRs contain detailed usage based on the service plans that the subscriber currently has active on his device (e.g., Amazon plan, Google Maps plan, General Access Plan, etc.). In one embodiment, a Service Controller CDR contains information about the usage within an active plan along with the charging code associated with the plan. In one embodiment, the Service Controller 122 generates a Service Controller CDR for an active plan on the subscriber's device where usage was reported during the reporting interval. In one embodiment, the Operator uses these usage records to enable it to bill third-party sponsors (for sponsored or enterprise plans), the Operator itself (for Operator plans, e.g., (DNS usage, network admin traffic, etc.), or the subscriber (e.g., General Access Plan, Skype Plan, News Plan, etc.).

In one embodiment, the interface strategy for the Service Controller CDR Delivery Interface is a periodic batch update via an FTP-type transfer protocol that delivers a fixed-length record file to the appropriate Operator B/OSS system. In one embodiment, the format of the data file is Operator-specific.

In one embodiment, the Service Controller CDR Delivery Interface is implemented as a near-time or a real-time interface using web services and an XML payload or a derivative of a Diameter DCCA message.

In one embodiment, the data elements that the Service Controller 122 makes available for delivery on the Service Controller CDR Delivery Interface are device ID (e.g., MEID, IMEI), Operator subscriber ID (e.g., IMSI, MSID, MDN, MSISDN, IPv4 MAC or IP, IPv6 MAC or IP), usage start date/time, usage end date/time, Service Plan ID, Charging Code, MO bytes used, MT bytes used, APN, Network Type, and Roaming state. In one embodiment, additional fields are supported based on Operator business requirements. In one embodiment, one or more fields available in the Device Usage Reporting Record are made available to the Operator on the Service Controller CDR Delivery Interface.

Service Provisioning/Payment Request Interface

In one embodiment, the Service Provisioning/Payment Request Interface enables the Service Controller 122 to provide Operator B/OSS systems with subscriber service selection information as well as payment request (e.g., credit card on file, prepaid card, etc.). In one embodiment, the Service Provisioning/Payment Request Interface is the primary interface that the Service Controller 122 uses to inform the Operator B/OSS systems that the user has either added a new plan or canceled an existing plan. In one embodiment, the Operator uses the information provided over this interface for various purposes, including one or more of: 1) updating the subscriber purchase history; 2) debiting the subscriber's wallet; 3) charging the plan to the subscriber's credit card on file; 3) performing any necessary network provisioning; 4) itemizing the purchase on the subscriber's bill; 5) refunding (if applicable) a canceled plan.

In one embodiment, the interface strategy for the Service Provisioning/Payment Request Interface is real-time, using web services with an XML data payload.

In one embodiment, due to the nature of this interface, it may not lend itself to a batch process. In one embodiment, alternatives to the preferred interface strategy are proprietary point-to-point protocols with Operator-specific payload definitions.

In one embodiment, the data elements that the Service Controller 122 makes available for delivery on the Service Controller Service Provisioning/Payment Request Interface are one or more of device ID (e.g., MEID, IMEI), Operator subscriber ID (e.g., IMSI, MSID, MDN, MSISDN, IPv4 MAC or IP, IPv6 MAC or IP), selected Service Plan ID, Charging Code, action (add/delete), Acceptance of Terms and Conditions, and payment method (e.g., credit card, debit card, prepay voucher, card on file, etc.). In one embodiment, additional fields are supported based on Operator business requirements.

FDR Request Interface

In one embodiment, the FDR Request Interface enables the Service Controller 122 to request a set of flow data records (FDRs) for a specified period of time for a specified subscriber. In one embodiment, the Service Controller 122 uses the FDRs when the verification algorithms suspect fraudulent activity. In one embodiment, the Service Controller 122 compares the Service Processor generated usage records with the network generated flow-usage records. In one embodiment, the verification process on the Service Controller 122 compares destination IP addresses, ports and byte counts between the two sets of reports and generates a fraud notification if the records differ.

In one embodiment, the FDR interface is optional because not all operators generate FDRs and not all operators support the ability to query for FDRs for a specific time range for a specific subscriber. In one embodiment in which the Operator may not filter the FDRs based on time range and/or subscriber, the Service Controller 122 receives the entire FDR feed and retains the data for a period of time sufficient to perform verification of suspected fraudulent usage (e.g., 2 days of FDRs, etc.)

In one embodiment, the interface strategy for the FDR Request Interface is real-time, using web services with an XML data payload.

In one embodiment, the FDR Request Interface may be implemented as a periodic batch update via an FTP-type transfer protocol that delivers a fixed-length record file to the appropriate Operator B/OSS system. In one embodiment, the format of the data file is Operator-specific.

In one embodiment, the data elements that the Service Controller 122 makes available for delivery on the FDR Request Interface are one or more of device ID (e.g., MEID, IMEI), Operator subscriber ID (e.g., IMSI, MSID, MDN, MSISDN, IPv4 MAC or IP, IPv6 MAC or IP), start date/time, end date/time. In one embodiment, additional fields are supported based on Operator business requirements.

Fraud Alert Interface

In one embodiment, the Fraud Alert Interface enables the Service Controller 122 to notify the Operator B/OSS that it suspects fraudulent activity related to a subscriber and/or device. In one embodiment, the Service Controller 122 allows the Operator user to configure different alert levels based on a "confidence-level" of the fraud scoring algorithms (e.g., for lower scores, an alert is sent to the Operator to indicate that the counts are off, but not significantly, and for higher scores, the Service Controller 122 sends a fraud alert that causes the device to be quarantined until remediation has completed, etc.). In one embodiment, the Service Controller Fraud Alert Interface sends reports to an Operator B/OSS system for notification and/or review. In one embodiment, the Service Controller Fraud Alert Interface interacts directly with a system that may manage policy (e.g., PCRF, PCEF, OCS, etc.).

In one embodiment, the interface strategy for the Fraud Alert Interface is real-time, either using web services with an XML data payload or an Ro, Rx, RADIUS, or DCCA type 3GPP/3GPP2 interface and payload to enforce network-based policy changes.

In one embodiment, the Fraud Alert Interface is implemented as a periodic batch update via an FTP-type transfer protocol that delivers a fixed-length record file to the appropriate Operator B/OSS system. In one embodiment, the format of the data file is Operator-specific.

In one embodiment, the data elements that the Service Controller 122 makes available for delivery on the Fraud Alert Interface are one or more of device ID (e.g., MEID, IMEI), Operator subscriber ID (e.g., IMSI, MSID, MDN, MSISDN, IPv4 MAC or IP, IPv6 MAC or IP), start date/time, end date/time, usage, confidence level, affected plan and/or charging code, fraud type (e.g., no usage reports, usage report mismatch, etc.), and for 3GPP/3GPP2 type interfaces, PCC rule, RADIUS Reauthorization Request (RAR), Diameter DCCA CCA with no Granted Units and/or redirect to quarantine and/or filter rule). In one embodiment, additional fields are supported based on Operator business requirements.

Customer Acknowledgement Interface

In one embodiment, the Customer Acknowledgement Interface enables the Service Controller 122 to notify the Operator B/OSS that a subscriber has responded to a notification where the notification is configured (via the SDC) to send the subscriber response to the Service Controller 122. Examples of usage of this include opting-in for roaming charges, acknowledging overage, accepting a buy or buy-up in response when an attempted access is not supported by the current plans on the device, etc.

In one embodiment, the interface strategy for the Customer Acknowledgement Alert Interface is real-time, using web services with an XML data payload.

In one embodiment, the Customer Acknowledgement Alert Interface is implemented as a periodic batch update via an FTP-type transfer protocol that delivers a fixed-length record file to the appropriate Operator B/OSS system. In one embodiment, the format of the data file is Operator-specific.

In one embodiment, the data elements that the Service Controller 122 makes available for delivery on the Customer Acknowledgement Interface are one or more of device ID (e.g., MEID, IMEI), Operator subscriber ID (e.g., IMSI, MSID, MDN, MSISDN, IPv4 MAC or IP, IPv6 MAC or IP), notification ID, button selected, date/time of selection, associated service plan and/or charging code (if applicable), and notification type (e.g., overage, roaming, no capable plan [also referred to as no-match], etc.). In one embodiment, additional fields are supported based on Operator business requirements.

Other CRM Interfaces

Plan Catalog Synchronization—In one embodiment, the Service Controller 122 supports an additional interface that allows the Operator synchronize the Service Controller Plan Catalog with its existing Product Catalog function. In one embodiment, this interface provides import and export capabilities to enable the Operator to update the Service Controller Plan Catalog with changes to the product catalog (e.g., add plan, delete plan, update plan details, price, etc.) Additionally, in one embodiment, this interface may be configured to send Service Controller Plan changes to the Operators Product Catalog.

In one embodiment, usage of this interface, while optional, allows for bi-directional updating of plans and details between the Service Controller 122 and the Operator's existing product support infrastructure.

In one embodiment, the interface strategy for the Plan Catalog Synchronization Interface is real-time, using web services with an XML data payload. In one embodiment, the format of the XML data payload is Operator-specific.

In one embodiment, the Plan Catalog Synchronization Interface is implemented as a periodic batch update via an FTP-type transfer protocol that delivers a fixed-length record file between the Service Controller 122 and the Operator's product support infrastructure. In one embodiment, the format of the data file is Operator-specific.

In one embodiment, the data elements that the Service Controller 122 makes available over this interface include one or more of plan name, plan description (long), plan description (short), billing codes, display price, internal price (usually a modified price that may not include taxes), plan limits (e.g., MB, time, etc.), cycle length, cycle day, duration, and usage charging codes. In one embodiment, additional fields are supported based on Operator business requirements.

Call Flows and Workflows

This section describes high-level call flows via a series of call flow (or pong) charts (see FIGS. 3 through 9). The call flows described are representative of how a particular action may be implemented in an Operator network. Additionally, the system names have been generalized to describe their functionality (e.g., Charging Platform could refer to an OCS or a Billing System) and the calls are generalized to their functional purpose (e.g., setPlan could refer to an XML-based purchase request to an OCS or it could represent an WL-based purchase request to a CRM system).

The workflows describe the functionality from the perspective of the Service Controller 122. The details of processing and workflow behind the network and operator interfaces are not defined here and are defined and refined during an integration engagement with an Operator, as would be appreciated by a person having ordinary skill in the art.

The following workflows are described herein:
Device Provisioning
Post-Pay Plan Purchasing
Post-Pay CDR Processing
Prepay Plan Purchasing
Prepay CDR Processing—Including Support for Verifying Usage
Fraud Alert Processing
Subscriber Notification Acknowledgement Processing
Service Controller Integration Options In one embodiment, the Service Controller 122 is designed to integrate easily into an Operator network 8000. In one embodiment, by leveraging the Operator Interface Translation Layer 8002, most of the integration work is localized to a set of translation modules. In one embodiment, this type of integration allows the Service Controller 122 to operate in a wide variety of network configurations as well as support multiple architectures within a single operator (e.g., CDMA and GSM, GSM and EPC, etc.).

This section examines a variety of network architectures where the Service Controller 122 is supporting Service Controller-managed devices and subscribers. These integration options are not meant to be exhaustive, but rather to give the reader an overview of how the Service Controller 122 leverages different Operator interfaces and how it could be implemented in a variety of configurations.

The implementations describe the interfaces and call flows from the perspective of the Service Controller 122. The exact details of processing and call flows behind the network and operator-specific interfaces are not defined here and may be defined and refined during an integration engagement with an Operator, as would be appreciated by a person having ordinary skill in the art.

For an implementation example, the following aspects are discussed:
General Considerations
Fraud Detection
Integration Embodiments
General Considerations
Logical Isolation Given the need to override or extend existing network-based billing capabilities for Service Controller-managed services and offerings, In one embodiment it is desirable to logically isolate these services from the current services and offerings.

In one embodiment, a separate APN is used for Service Controller-managed services and offerings. This approach has several advantages that will be highlighted in the following sections. In one embodiment, logical isolation is achieved using a common, not-dedicated APN. This solution trades the complexity of network integration for the simplification of not proliferating APNs.

Zero-Rating/Service Controller-Specific Rating

In one embodiment, the Service Controller 122 interworks with the existing network-based entities responsible for accounting, rating, charging, and control. In one embodiment, this implies the capability to dynamically override existing rating capabilities to effectively zero-rate usage from an existing network entity perspective. In one embodiment, the use of a separate APN for Service Controller-managed services offerings makes this task slightly easier since the rules may be applied on an APN basis. In one embodiment, such as in an APN-agnostic environment, a service-level permission/entitlement indicator is inspected by a Gy or Radius proxy to determine how to route credit control and usage reporting information (e.g., to the Service Controller or to an OCS).

Provisioning

In one embodiment, a subscriber is provisioned on the Service Controller 122 prior to the subscriber attempting to use a Service Controller-managed device. In one embodiment, the Service Controller 122 provides a specific interface to provision the platform with the credentials of subscribers and/or devices that are Service Controller-managed. In one embodiment, subscribers are provisioned on the Service Controller 122 and associated with the appropriate Subscriber Group.

In one embodiment, if real-time activation is required, a web services-type interface is implemented. In one embodiment, if real-time activation is not required, a non-real-time interface (e.g., batch file via FTP) is used.

Fraud Detection

In one embodiment, the Service Controller 122 platform relies on a device client (Service Processor) for enhanced policy enforcement and accounting. In such embodiments, there is an inherent risk that subscribers may attempt to hack or subvert the Service Processor in order to gain access to services for free or at a reduced cost.

There are several ways in which a subscriber may attempt to "attack" or subvert the service processor in order to gain access for free (or at a reduced cost). Subscribers can:

Remove a Service Controller-managed SIM and place in a non-Service Controller-managed device (e.g., a device without a Service Processor installed).

Hack the Service Processor to prevent (or download additional software that prevents) the sending of usage reports to the Service Controller 122.

Hack the Service Processor and modify the usage reports it sends to the Service Controller 122.

To mitigate these and other potential fraud scenarios, in one embodiment the platform provides mechanisms that may reliably detect and act upon this type of fraudulent behavior.

Although fraud is not discussed in this paper in detail, one solution to this problem is to compare the detailed usage information from the Service Processor with network generated usage information. To accomplish this task, In one embodiment the Service Controller 122 creates Service Controller CDRs from the device usage reports and compares them to the bulk network usage reports. In one embodiment, if a discrepancy is detected, the Service Controller 122 generates a Fraud Notification, which it provides to the Operator. In one embodiment, after the verification is complete, the Service Controller 122 forwards the Service Controller CDRs to the Operator Mediation or billing platform.

Integration Embodiments with 3GPP Networks

The integration embodiments discussed this section have been identified considering that:

In one embodiment, the Service Design Center allows the plan designer to define the volume (e.g., MB) and time reporting intervals for a given plan at design time. In one embodiment, this enables the Service Controller 122 to determine if the Service Processor's sending of usage reports has been blocked (e.g., through a modified client or by additional software). In one embodiment, the Service Controller 122 detects that no usage information has been received for a time greater that the established reporting period. In one embodiment, if the subscriber is known to be in an active data session, and the Service Processor is sending reports, the Service Controller 122 determines that the network reports for data usage during the reporting interval indicate that the device's usage is greater than the usage indicated by the Service Processor's reports for the reporting interval for the user's active plan.

In one embodiment, when a data session is established, the Service Processor contacts the Service Controller 122 in order to authenticate, to synchronize, and to check for plan updates (e.g., new plans added outside the Service Controller environment, plan expirations, plan rollovers, etc.).

Dedicated APN

Figure 10:
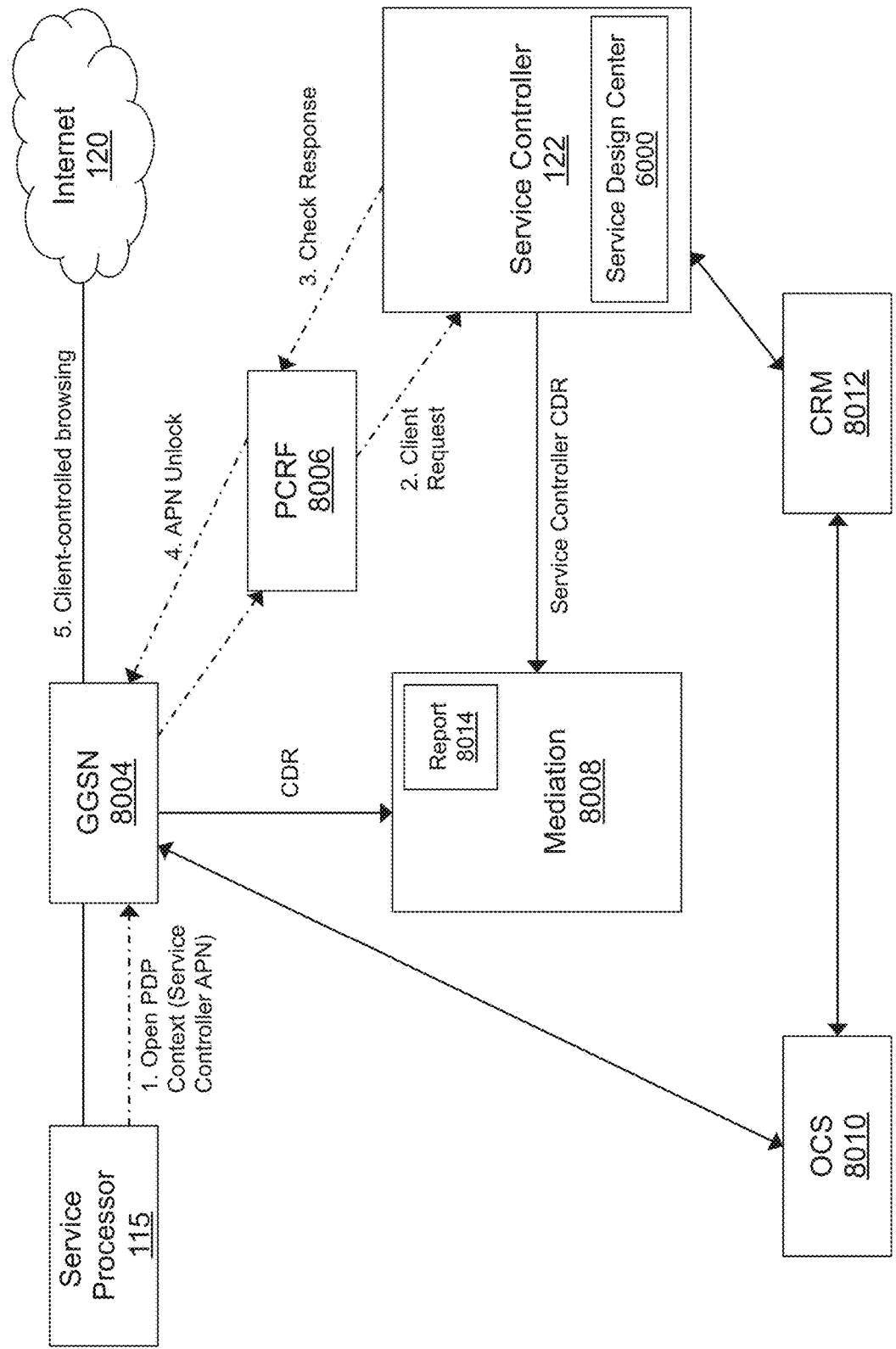
FIG. 10 illustrates an example dedicated, zero-rated APN configured in the network for the specific purpose of handling Service Controller-managed subscribers, in accordance with one embodiment.

In one embodiment (illustrated in FIG. 10), a dedicated, zero-rated APN is configured in the network for the specific purpose of handling Service Controller-managed subscribers and devices. In one embodiment, the APN is set up to be verified, and the subscriber's record in the HLR is provisioned with the APN. In one embodiment, the APN is set up to be unverified, and there is no check performed at the HLR to validate whether or not the subscriber is allowed to connect to the APN.

This section focuses on unverified APN embodiments. As would be appreciated by a person having ordinary skill in the art, embodiments using a verified APN are configuration/provisioning extensions of embodiments using an unverified APN.

Two exemplary embodiments are presented:

Network-controlled dedicated APN (via PCRF)

Service Controller-controlled dedicated APN (via Diameter Gy)

In one embodiment, at the start of the data session, the PCRF 8006 limits the APN connectivity so that, optionally, the device exclusively communicates with the Service Controller 122 (this may be the default Rulebase, and effectively blocks data traffic except the traffic towards the specific Service Controller IP address). When the data session is established, the Service Processor 115 contacts the Service Controller 122 to authenticate, log in, synchronize, and check for newly available plans. After the Service Processor 115 successfully authenticates with the Service Controller 122, the Service Controller 122 informs the PCRF 8006 (via Rx or equivalent) that the client is authenticated and to change the Rulebase to zero-rated "General Access" for the length of this data session. The PCRF 8006 sends the new rules to the GGSN 8004 (via Gx) to be added to the Rulebase so that all the traffic is allowed and is zero-rated by the network. From this point forward, the Service Controller 122 and Service Processor 115 are managing service and traffic flow rules (based on active plans on the device).

In one embodiment, the GGSN 8004 generates periodic (e.g., after a particular amount of time has elapsed or after a particular amount of data has been used, etc.) usage reports (G-CDRs) for the data traffic flow associated with one or more Service Controller-managed devices/subscribers passing traffic though the dedicated APN and delivers the reports to the Service Controller 122. In one embodiment, the Service Controller 122 uses these reports for fraud detection (e.g., by comparing the network usage counts with the device-based usage counts, etc.). In one embodiment, the PCRF 8006 sets a monitor request in the GGSN Rulebase (e.g., via Gx) to report usage to the PCRF based on usage in that Rulebase, which it then forwards it to the Service Controller 122.

Figure 11:
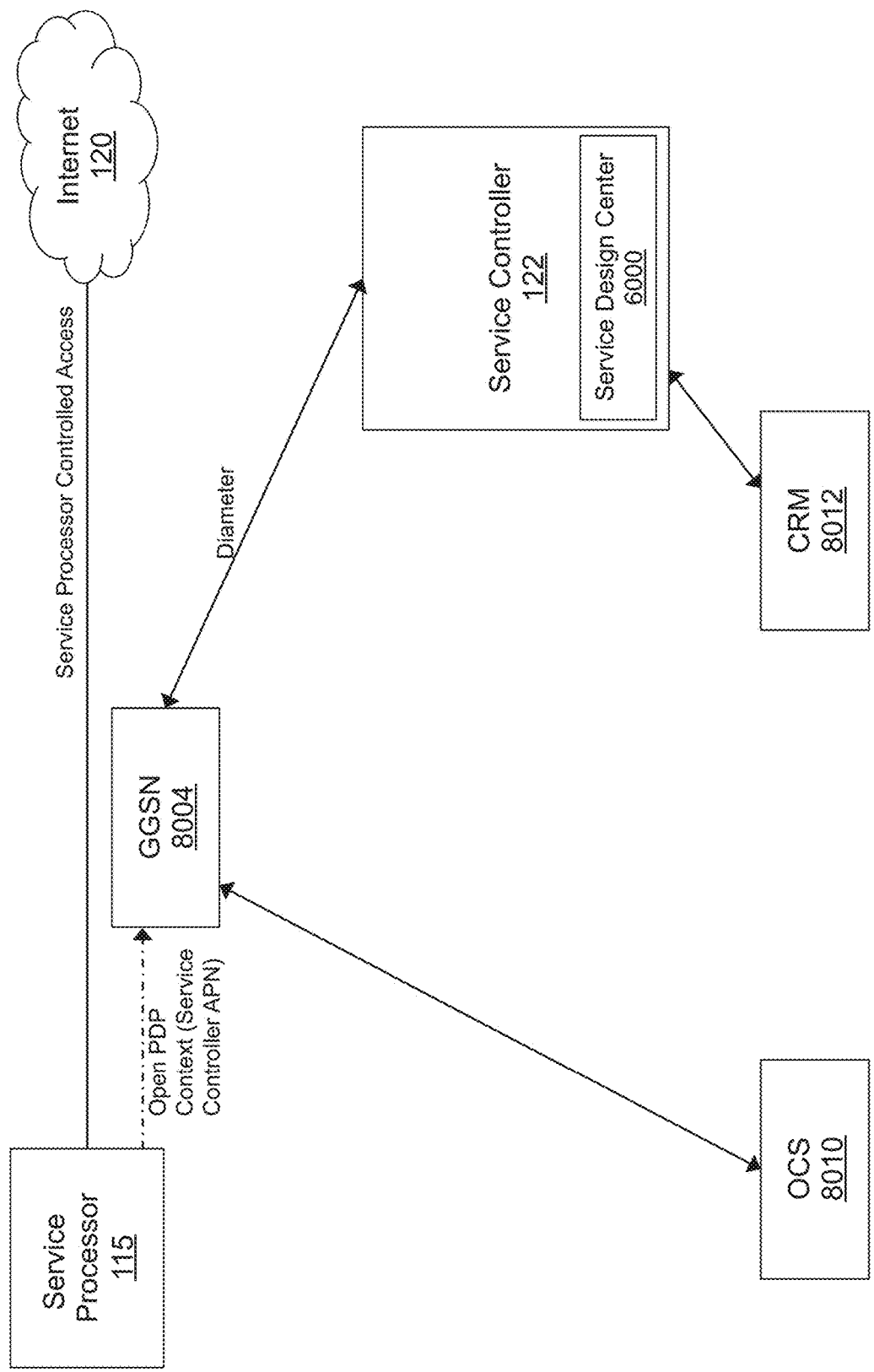
FIG. 11 illustrates an example embodiment in which the control of APN access is managed by the Service Controller.
Figure 12A:
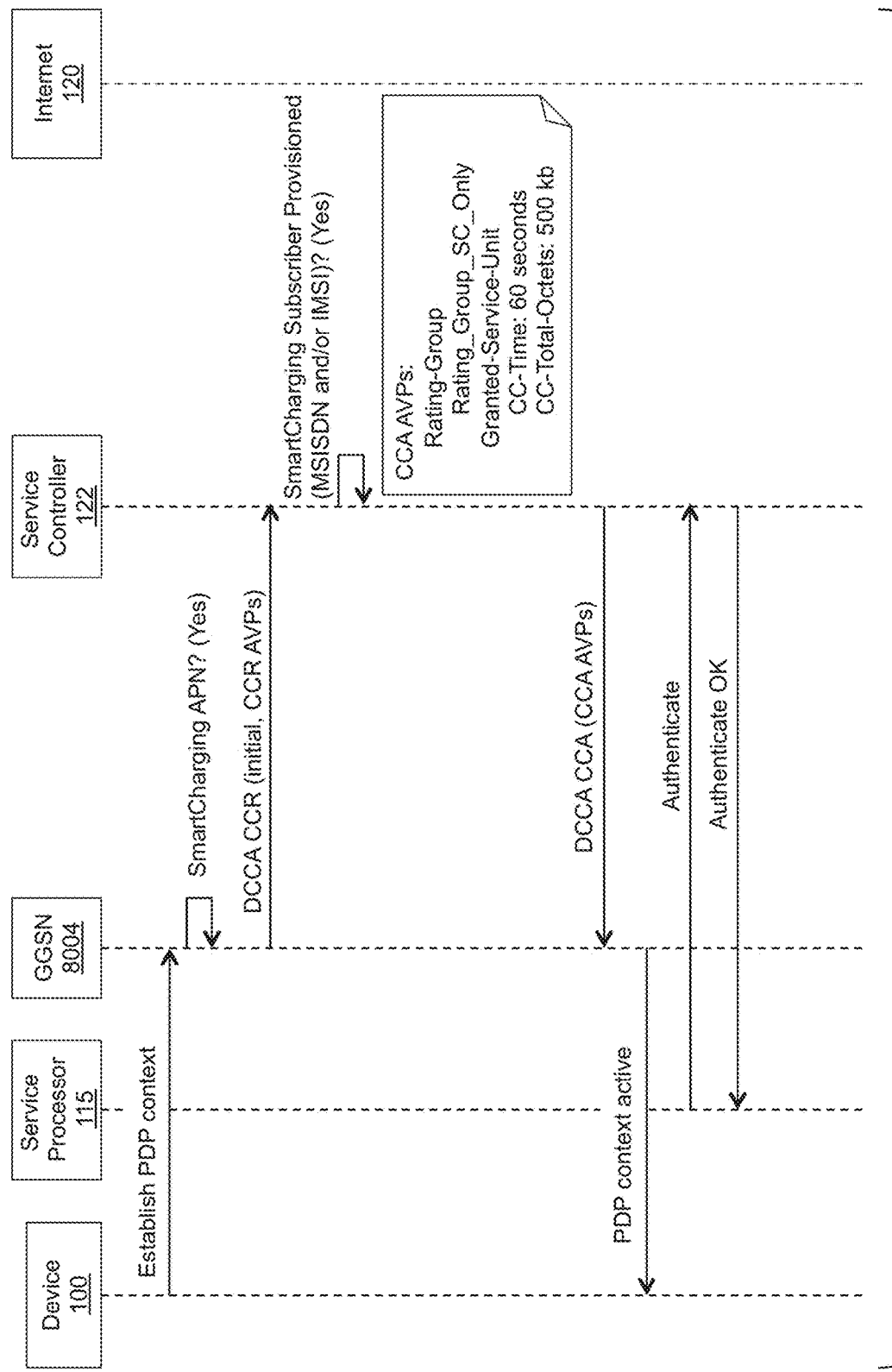
FIGS. 12A-12D illustrate the interaction between the GGSN and the Service Controller 122, in accordance with one or more embodiments.
Figure 12B:
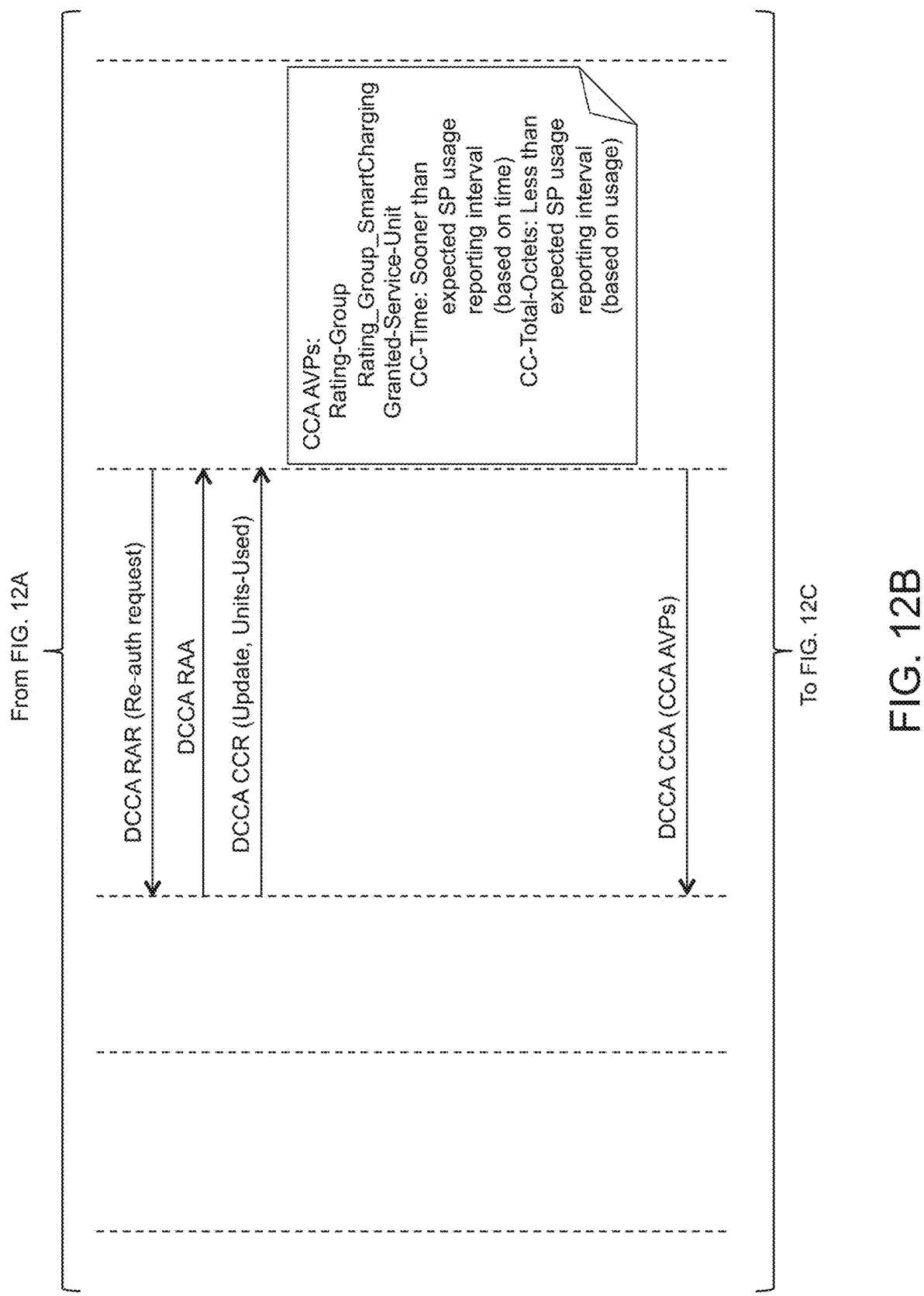
Figure 12C:
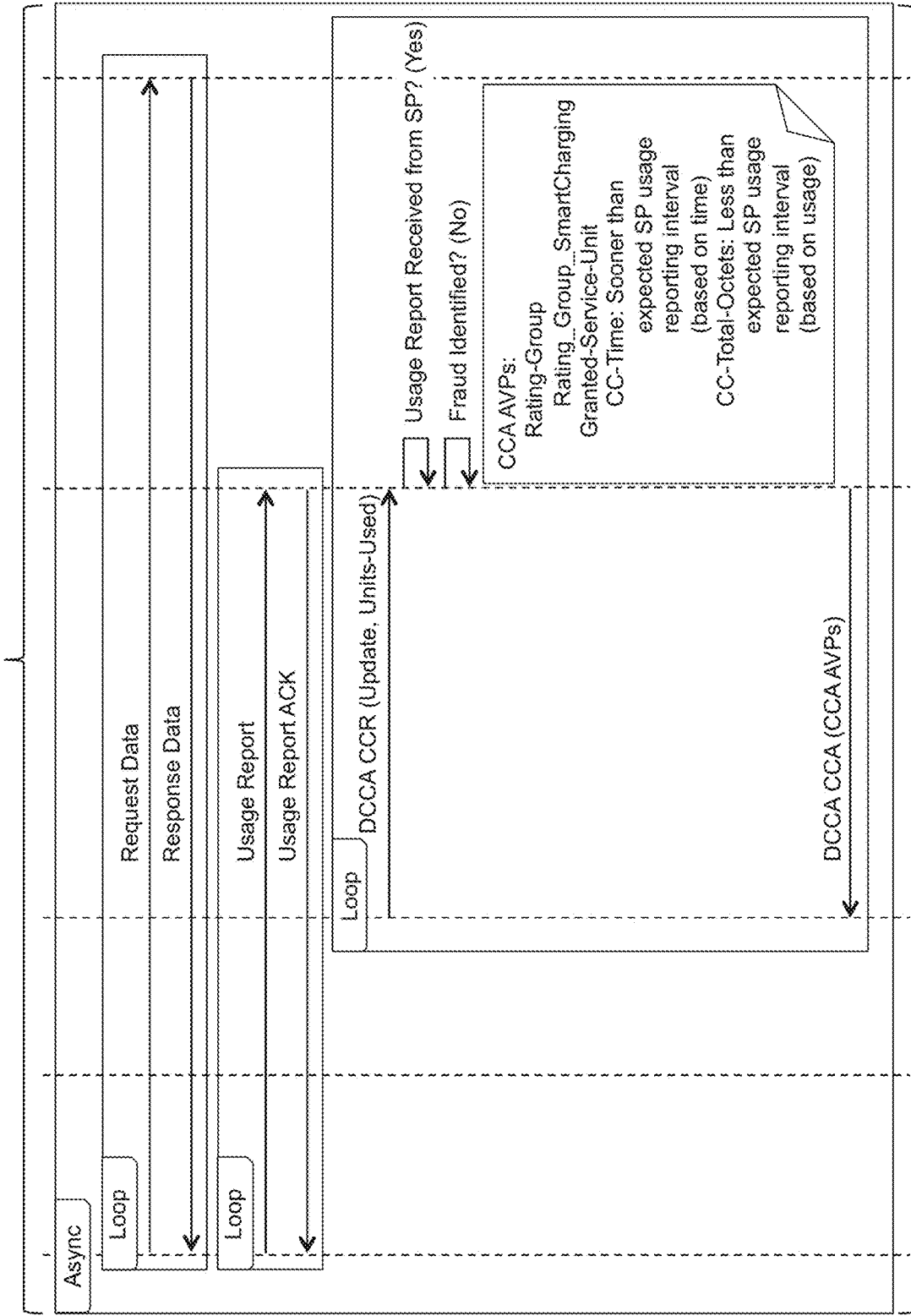
Figure 12D:
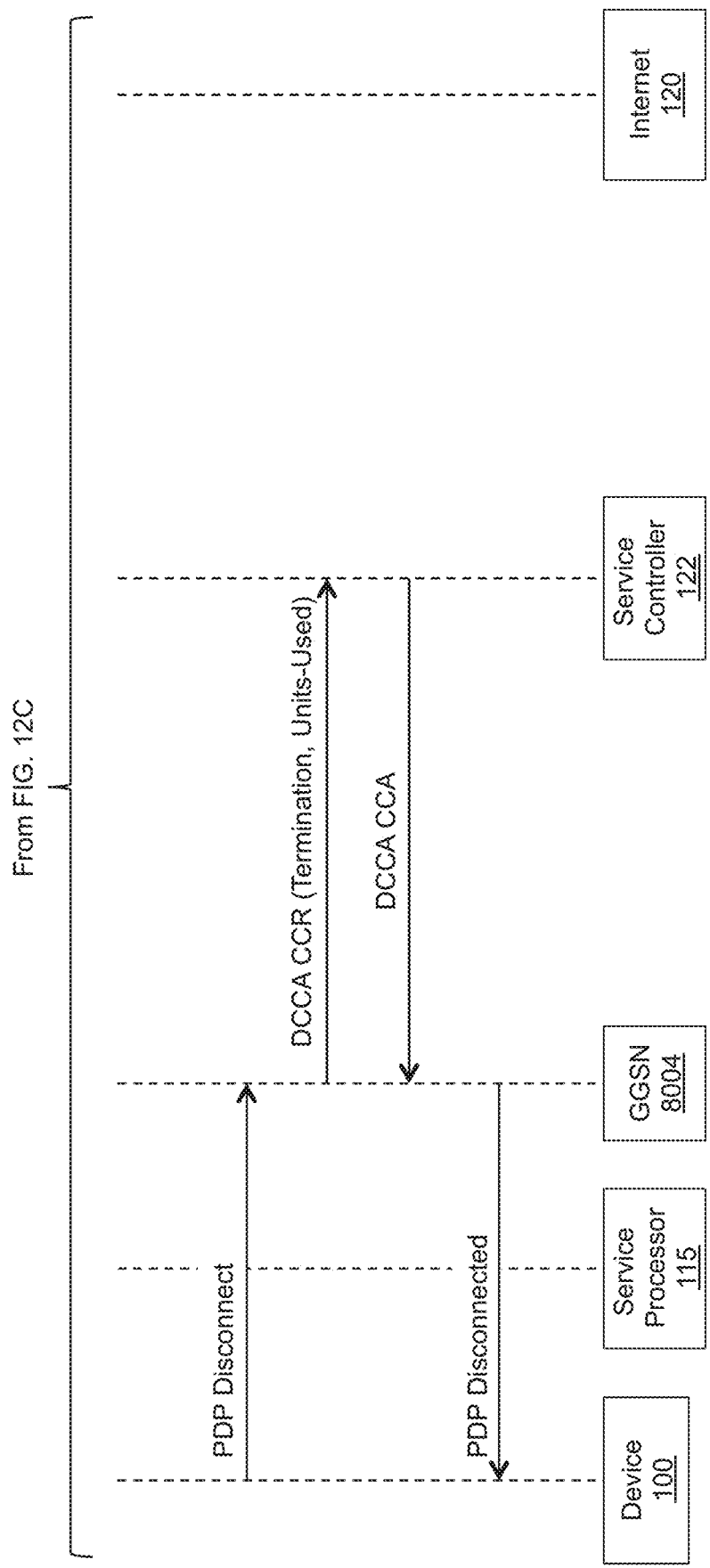

In one embodiment, such as the embodiment illustrated in FIG. 11, the control of APN access is entirely managed by the Service Controller 122 that interworks with the GGSN 8004 via a Gy Interface, which replicates the interaction between the GGSN and OCS. In one embodiment, the GGSN 8004 interacts with the Service Controller 122 to allow the PDP context creation and manage the traffic quota.

In an exemplary embodiment, at the start of the data session, the GGSN 8004 receives the Create PDP context request coming from the mobile (on the dedicated APN) and uses the Gy interface to communicate with the Service Controller 122 (providing IMSI and MSISDN) requesting traffic quota. The Service Controller 122 verifies that the IMSI/MSISDN pair is provisioned in the Subscriber database on the Service Controller 122. The Service Controller 122 sends back either a message to the GGSN allowing limited access between the device and the Service Controller 122 (pair exists; "success case"), or a reject message (pair may not exist—PDP creation aborts).

The success case allows the creation of the PDP context so that the Service Processor 115 may communicate with the Service Controller 122 to authenticate, log in, synchronize with the Service Controller 122, and check for newly available plans. In one embodiment, after this completes successfully, the Service Controller 122 updates the GGSN 8004 with additional rating groups and quotas to enable the subscriber to start using data.

In one embodiment, if the Service Controller 122 does not receive traffic from the Service Processor 115 within the prescribed timeframe, the Service Controller 122 sends a message to the GGSN 8004 to tear down the PDP context (which terminates the data session).

In one embodiment, the Service Controller 122 receives network usage updates via the Diameter CCR/CCA exchange. In one embodiment, the Service Controller 122 may control the frequency of the updates based on the time/usage quota granted in the CCA response. In one embodiment, the Service Controller 122 uses these reports as one of the elements for fraud detection (by comparing the network usage counts with the device-based usage counts).

FIGS. 12A-12D illustrate in more detail the interaction between the GGSN and the Service Controller 122 (success case with no fraud detected) in accordance with one or more embodiments.

Non-dedicated APN

This section provides exemplary embodiments in which the Service Controller-managed services share the same APN(s) as the existing data services. In one embodiment, at session start, the Service Processor 115 permits, optionally exclusively, data traffic to/from the Service Controller 122 until authentication and synchronization is complete.

Figure 13:
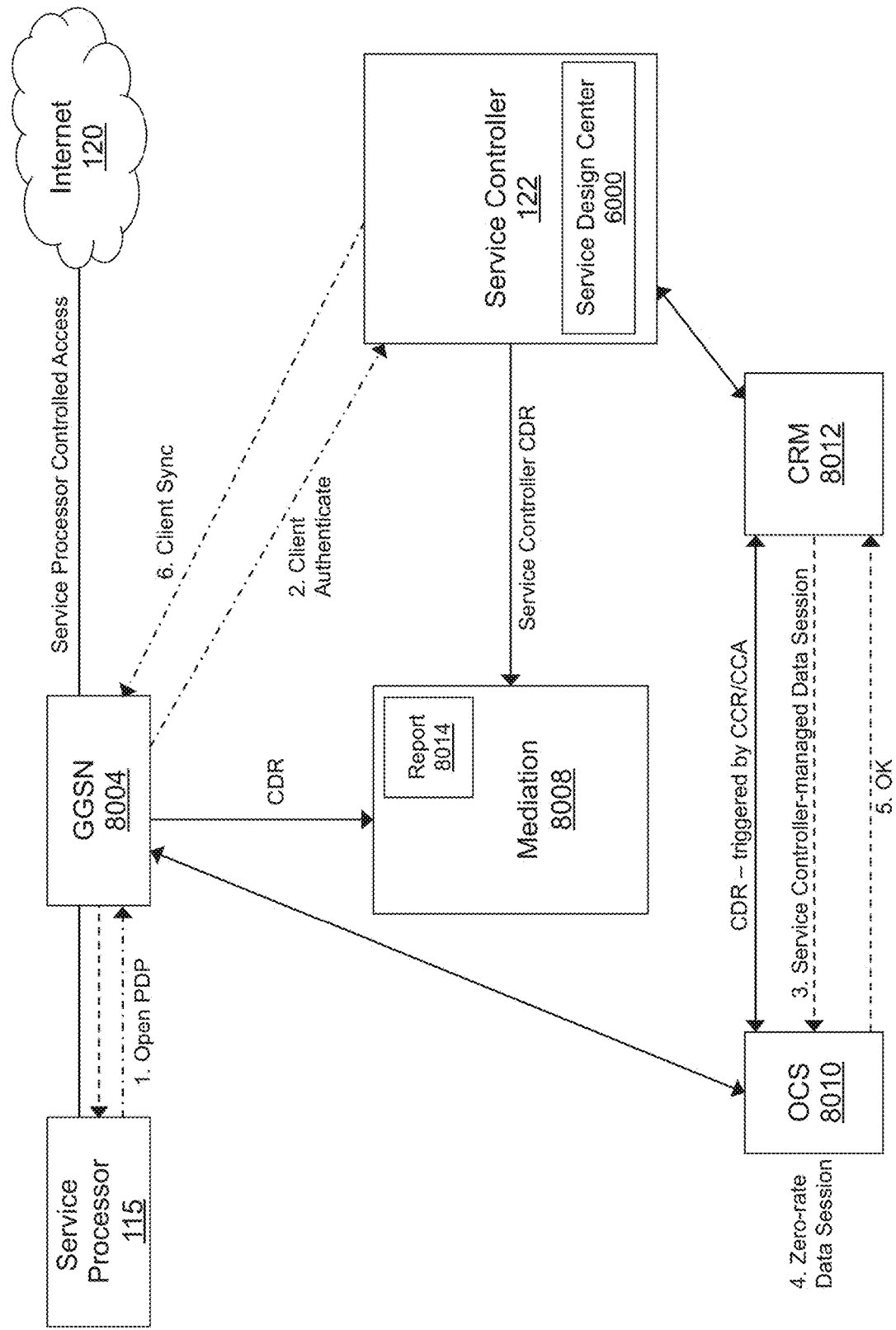
FIG. 13 illustrates an example data session in which a service processor permits traffic to flow between the device and the service controller, while other traffic is blocked in accordance with one embodiment.

In the non-dedicated APN implementation, several exemplary embodiments are presented:
  Interconnection between Service Controller 122 and OCS 8010
  Interconnection between Service Controller 122 and PCRF 8006
  Interconnection between Service Controller 122 and GGSN 8004 via a Diameter Proxy/Router
  Interconnection between Service Controller 122 and GGSN 8004 based on subscriber profile setting Referring to FIG. 13, in one embodiment, at the start of the data session, the Service Processor 115 permits traffic to flow between the device and the Service Controller 122 (traffic is optionally zero-rated in one example scenario), while other traffic is blocked. In one embodiment, after the Service Processor 115 authenticates and synchronizes with the Service Controller 122, the Service Controller 122 communicates with the OCS 8010 to indicate that the subscriber is starting a Service Controller-managed data session. In one embodiment, the OCS zero-rates the charging of that session and sends back a confirmation to the Service Controller 122. In one embodiment, at this point, the Service Processor 115 enforces policy based on the active plans on the device.

In one embodiment, the Service Controller 122 receives its network usage updates from the OCS 8010 when the OCS 8010 receives a quota request (e.g., via the Diameter CCR/CCA exchange) from the GGSN 8004. The Service Controller 122 uses these reports as one of the elements for fraud detection (e.g., by comparing the network usage counts with the device-based usage counts).

Figure 14:
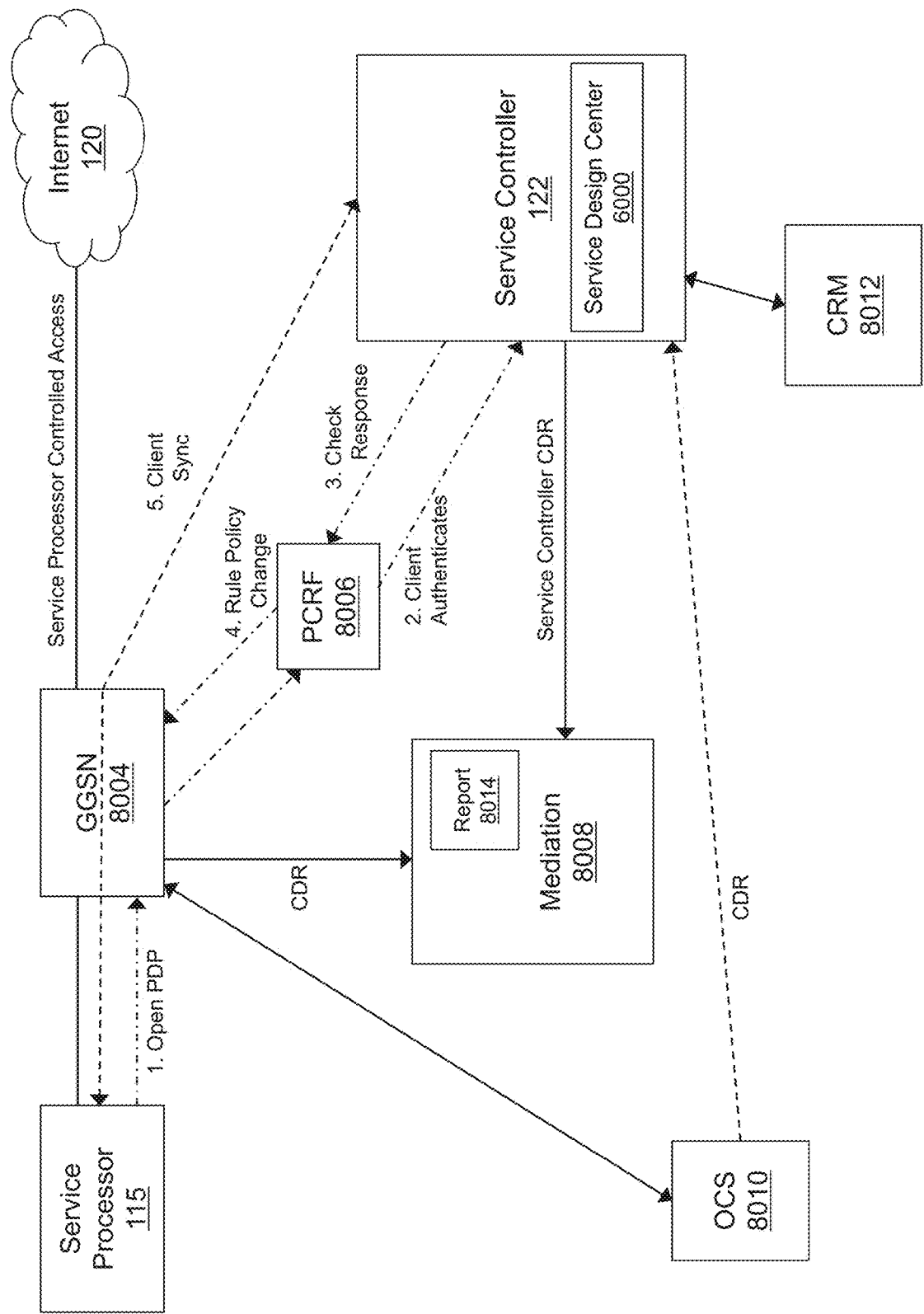
FIG. 14 depicts an example embodiment at the start of a data session, where a service processor permits traffic to flow between the device and the service controller while some or all other traffic is blocked.

Referring to FIG. 14, in one embodiment, at the start of the data session, the Service Processor 115 permits traffic to flow between the device and the Service Controller 122 (e.g., traffic is zero-rated), while some or all other traffic is blocked. In one embodiment, after the Service Processor 115 authenticates and synchronizes with the Service Controller 122, the Service Controller 122 communicates with the PCRF 8006 to indicate that the subscriber is starting a Service Controller-managed data session (via Rx).

In one embodiment, the PCRF updates (e.g., through Gx interface) the default Rulebase on the GGSN 8004 (e.g., "zero-rate" all traffic for this data session) and sends back a confirmation to the Service Controller 122.

In one embodiment, the Service Controller 122 receives its network usage updates from the OCS 8010 when the OCS 8010 receives a quota request (e.g., via the Diameter CCR/CCA exchange) from the GGSN 8004. In one embodiment, the Service Controller 122 uses these reports as one of the elements for fraud detection (e.g., by comparing the network usage counts with the device-based usage counts).

Figure 15:
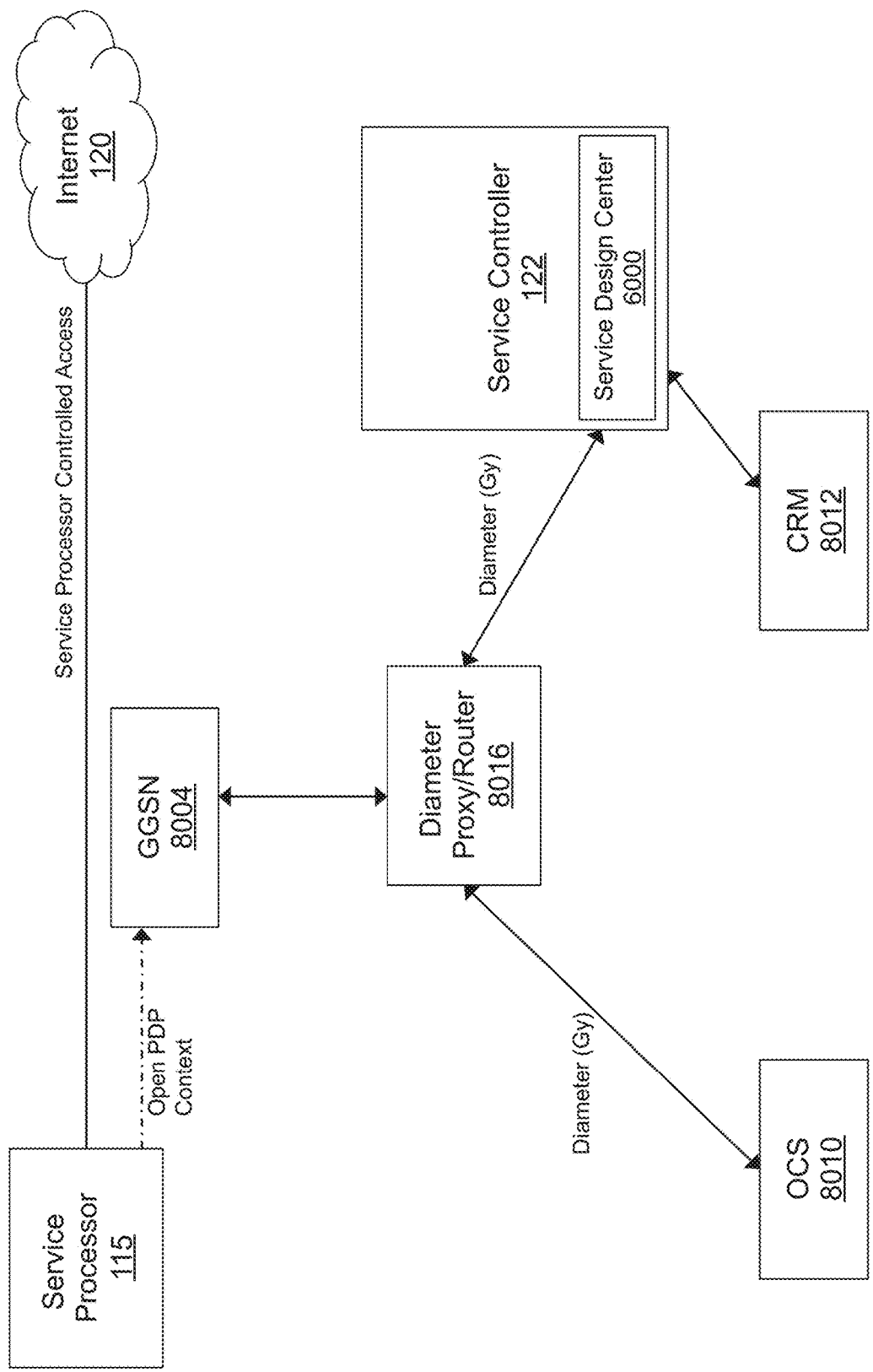
FIG. 15 illustrates an embodiment in which interconnection between a service controller and a GGSN is established via a Diameter proxy or router.
Figure 16A:
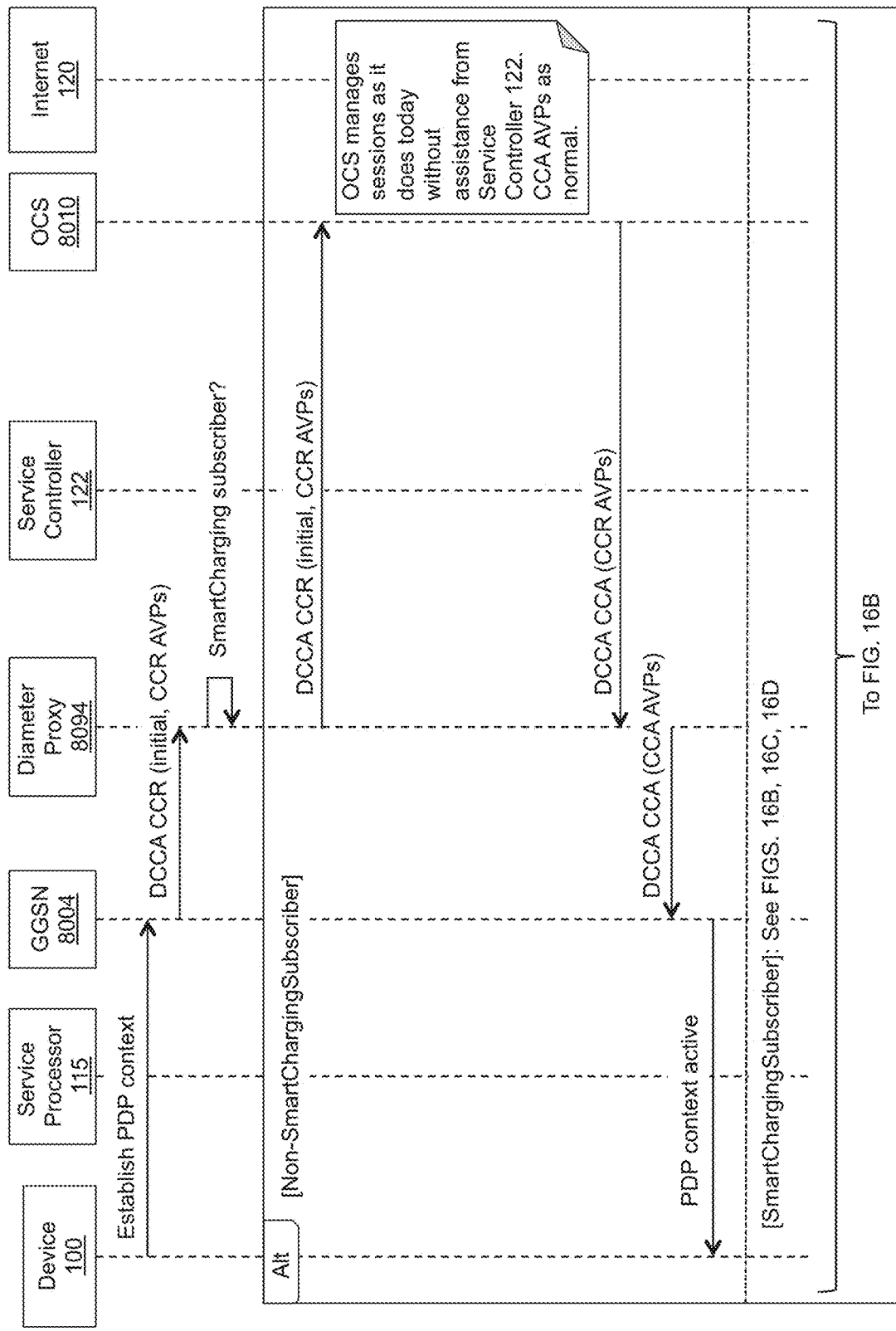
FIGS. 16A-16E illustrate the interaction between the GGSN and the service controller via the Diameter proxy in accordance with some embodiments.
Figure 16B:
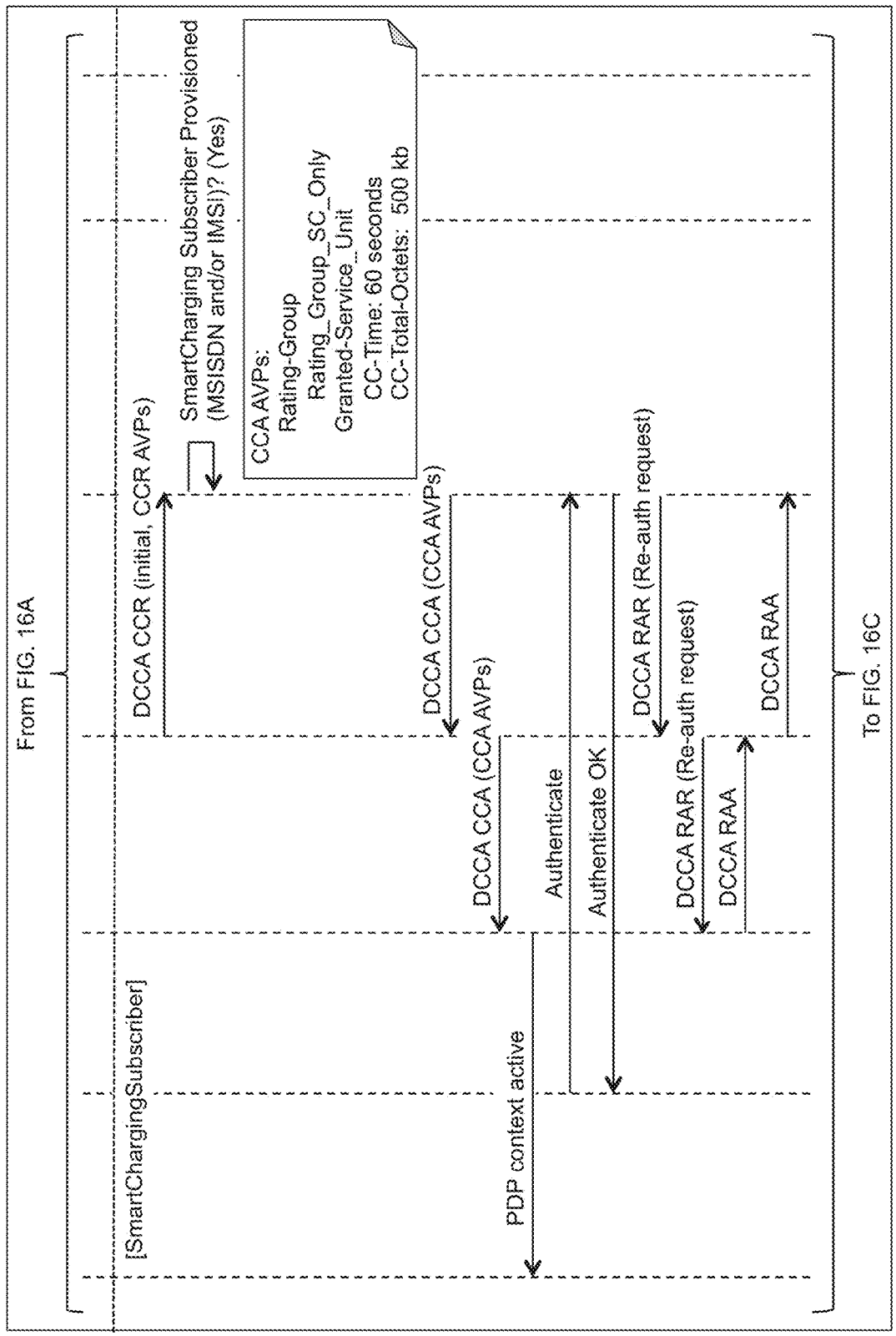
Figure 16C:
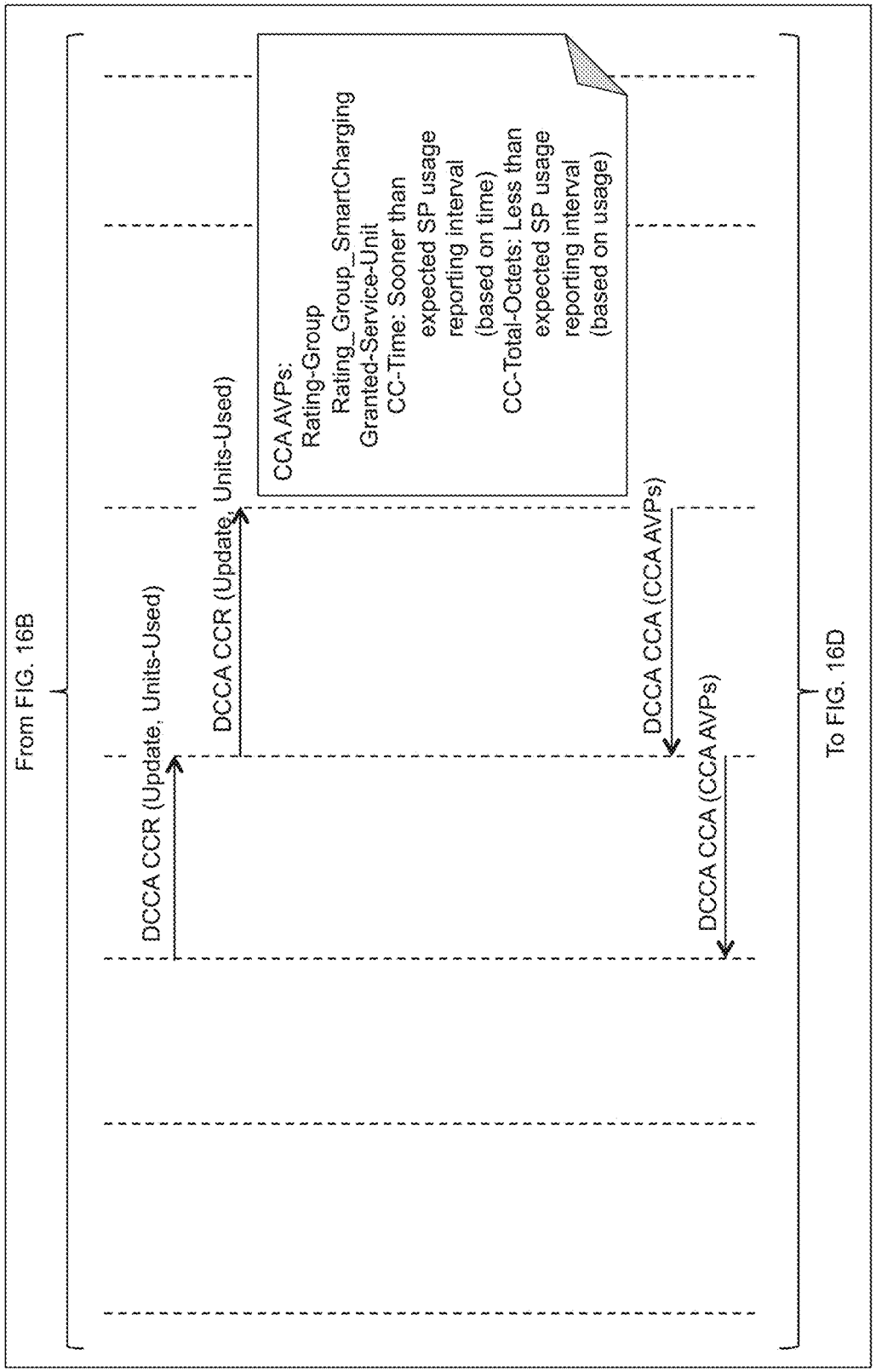
Figure 16D:
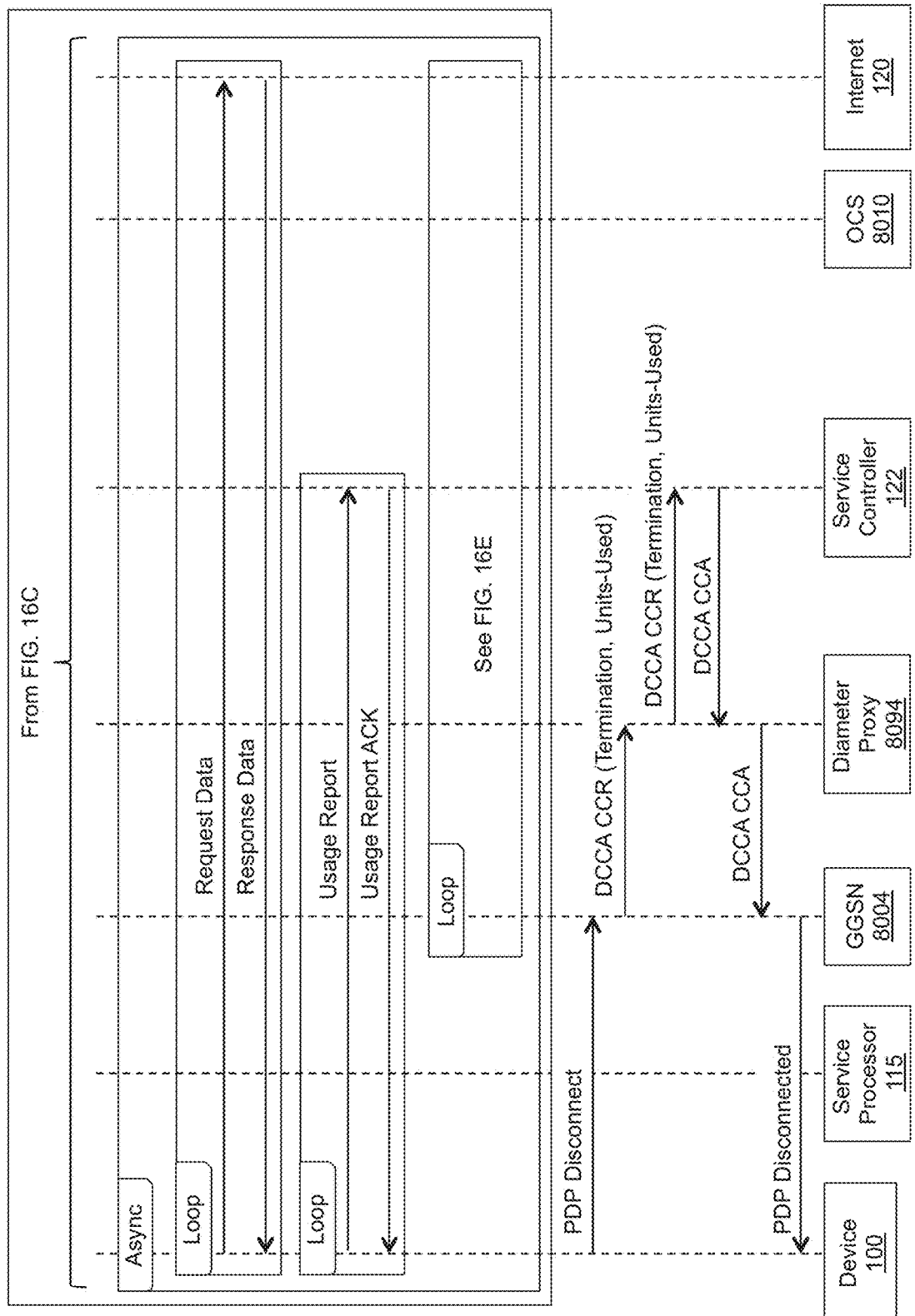
Figure 16E:
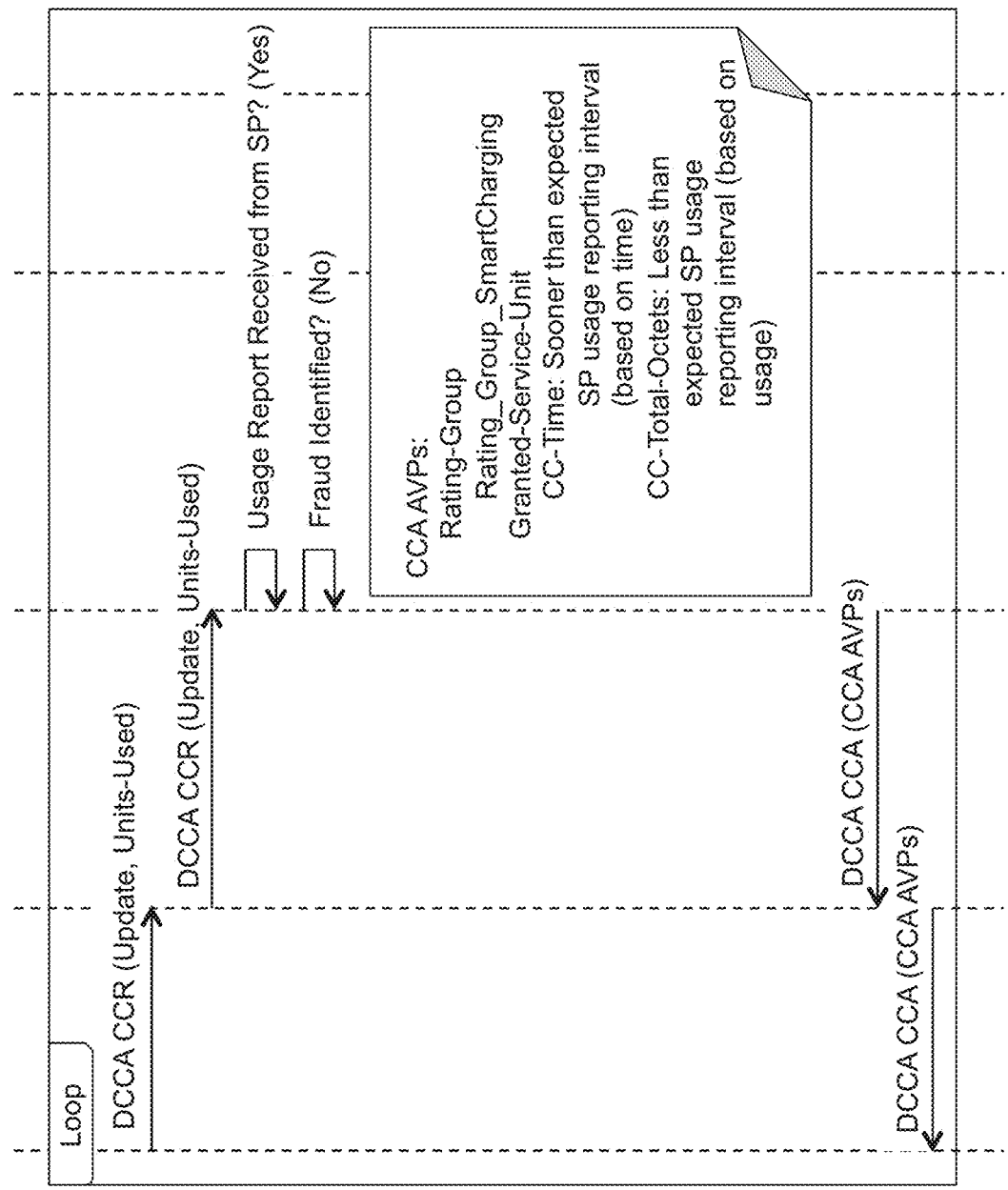

Referring to FIG. 15, in one embodiment, interconnection between the Service Controller 122 and GGSN 8004 via a Diameter proxy or router 8016 is similar to APN-specific embodiments using Gy. In one embodiment, one difference is that there is a Diameter proxy/router making a decision on where the data session is to be managed by the Service Controller 122 or the OCS 8010. In one embodiment, the Diameter proxy 8016 makes this decision by inspecting an identifier in the initial CCR message. In one embodiment, the Diameter proxy 8016 makes this decision by looking up the subscriber in a local database and inspecting a service permission or control attribute. In one embodiment, based on the result of the look-up, the Diameter proxy 8016 routes session control traffic to the Service Controller 122 or to the OCS 8010. In one embodiment, this look-up is done during the initial CCR, and the Diameter proxy 8016 remembers the routing for the duration of the data session.

In one embodiment, at the start of the data session, the GGSN 8004 receives the Create PDP context request coming from the device and uses the Gy interface to communicate with the Diameter proxy 8016. In one embodiment, the Diameter proxy 8016 determines if the data session is to be managed by the Service Controller 122 or the OCS 8010. In one embodiment, if the data session is to be managed by the Service Controller 122, the Diameter proxy 8016 forwards the initial CCR to the Service Controller 122 (providing IMSI and MSISDN) that is requesting traffic quota. In one embodiment, the Service Controller 122 verifies that the IMSI/MSISDN pair is provisioned in the Subscriber database on the Service Controller 122. In one embodiment, the Service Controller 122 either sends back a message to the GGSN 8004 (e.g., via the Diameter proxy) allowing limited access between the device and the Service Controller 122 (pair exists; "success case"), or a reject message (pair may not exist—PDP creation aborts).

The success case allows the creation of the PDP context so that the Service Processor 122 may communicate with the Service Controller 122 to authenticate, log in, synchronize with the Service Controller 122, and check for newly available plans. In one embodiment, after this completes successfully, the Service Controller 122 updates the GGSN 8004 with additional rating groups and quotas to enable the subscriber to start using data.

In one embodiment, if the Service Controller 122 does not receive traffic from the Service Processor 115 within the prescribed timeframe, the Service Controller 122 sends a message to the GGSN 8004 to tear down the PDP context (which terminates the data session).

In one embodiment, the Service Controller 122 receives its network usage updates via the Diameter CCR/CCA exchange. In one embodiment, the Service Controller 122 may control the frequency of the updates based on the time/usage quota granted in the CCA response. In one embodiment, the Service Controller 122 uses these reports as one of the elements for fraud detection (e.g., by comparing the network usage counts with the device-based usage counts).

FIGS. 16A-16E illustrate in more detail the interaction between the GGSN 8004 and the Service Controller 122 via the Diameter proxy 8094 (success case with no fraud detected) in accordance with some embodiments.

Figure 17:
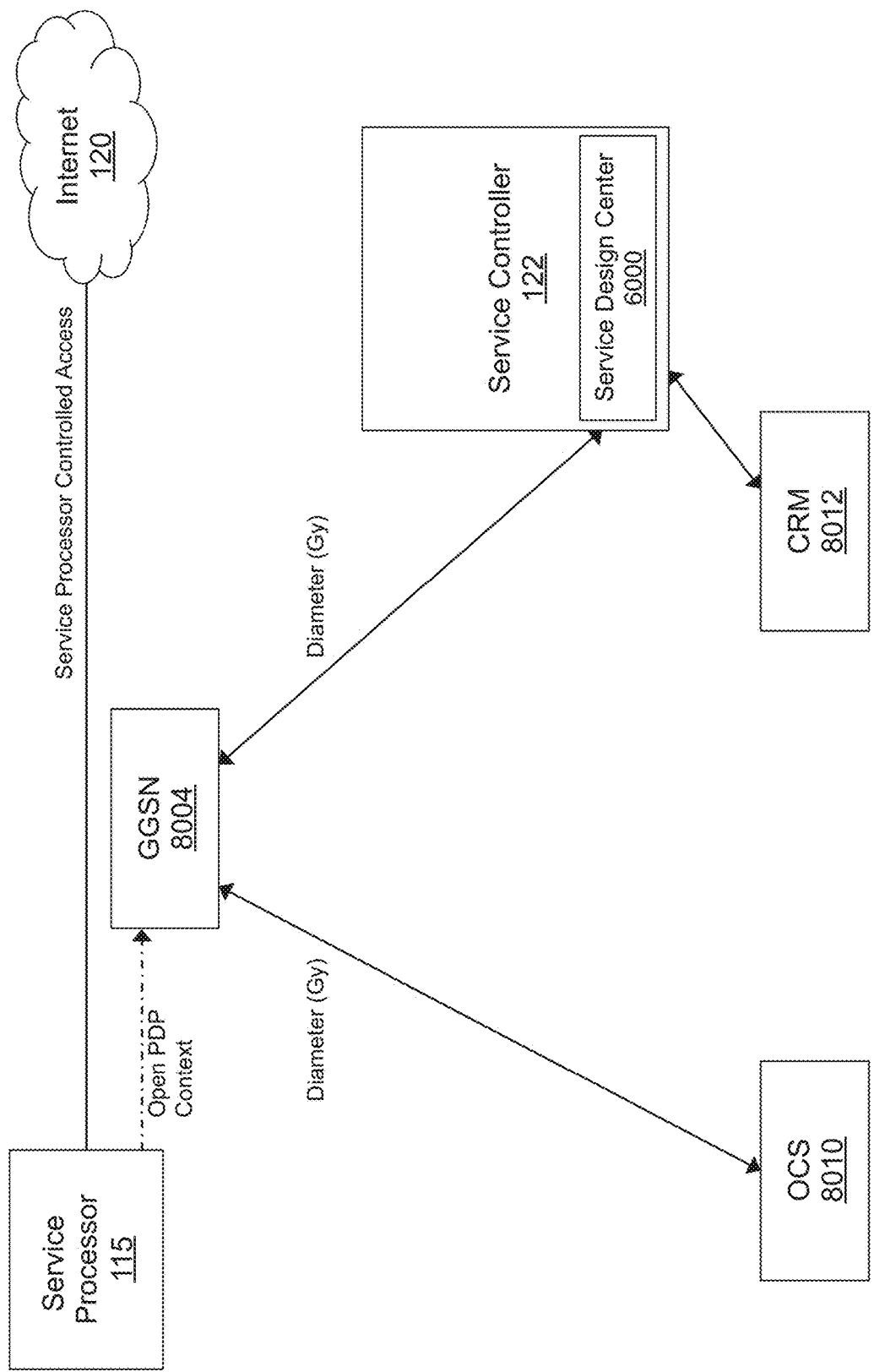
FIG. 17 illustrates an example embodiment in which interconnection between the service controller and GGSN based on a subscriber profile setting is similar to a dedicated APN embodiment using Gy.

Referring to FIG. 17, in one embodiment, the interconnection between the Service Controller 122 and GGSN 8004 based on a subscriber profile setting is similar to a dedicated APN embodiment using Gy. In one embodiment, one difference is that rather than the GGSN 8004 relying on APN to determine routing, the GGSN 8004 relies on a setting in the Subscriber Profile (received from the SGSN, HLR/HSS, AAA database, etc.) that indicates to the GGSN 8004 to which Gy interface it should route the control traffic (e.g., Service Controller or OCS). In one embodiment, the GGSN 8004 makes this decision based on the prescribed setting in the subscriber profile (e.g., base rating group, charging characteristics, charging profile, etc.). Based on the result of the look-up, the GGSN 8004 either routes session control traffic to the Service Controller 122 or to the OCS 8010. In one embodiment, this lookup is done during the PDP context establishment and the GGSN remembers the routing for the duration of the data session.

Evolved Packet Core (EPC) Environment

Figure 18:
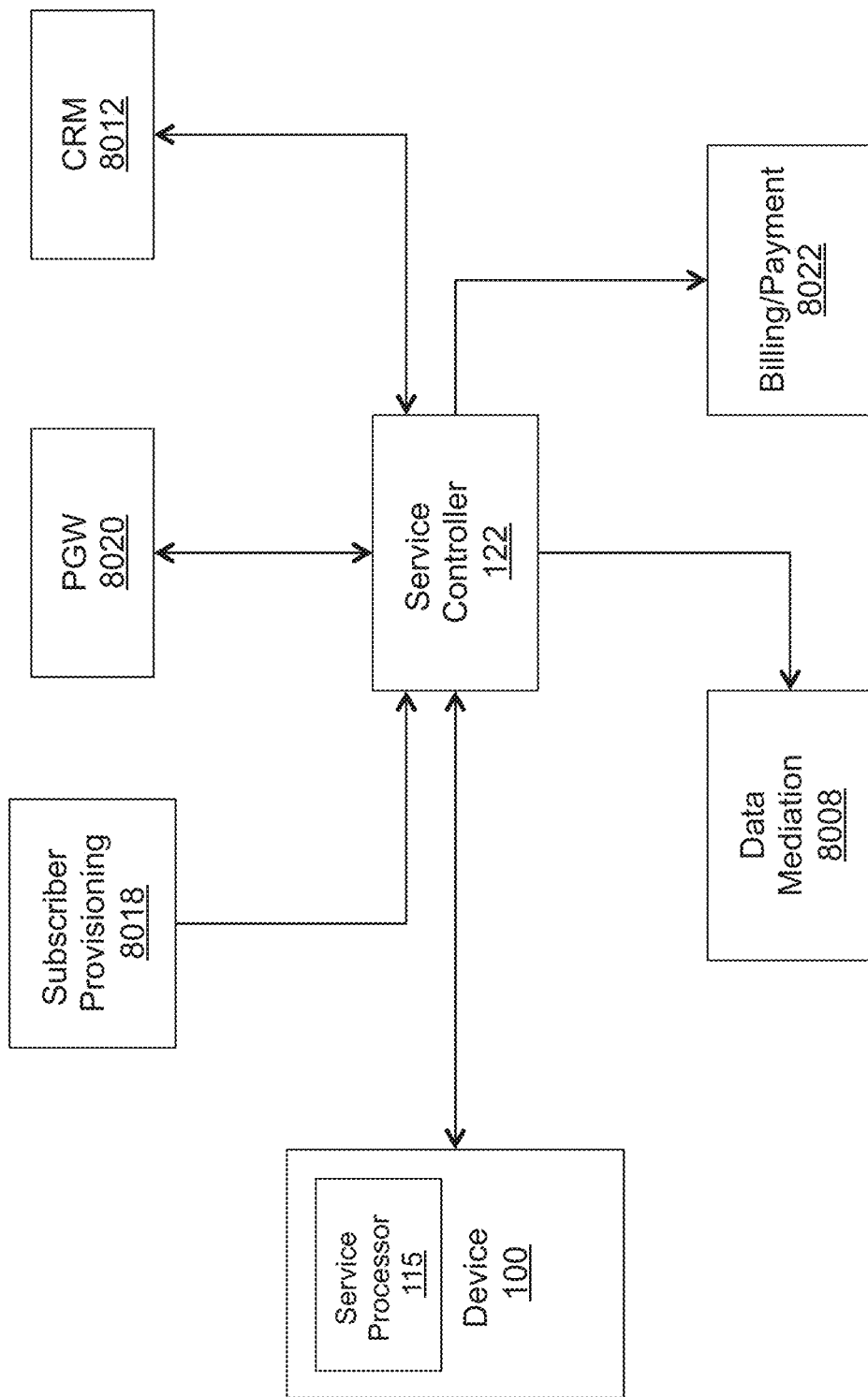
FIG. 18 depicts an example embodiment in which the service controller interworks with a packet gateway (PGW).

FIG. 18 depicts an embodiment in which the Service Controller 122 interworks with the Packet Gateway (PGW) 8020 of an Evolved Packet Core (EPC) 3GPP data network. In one embodiment, the Service Controller 122 also interworks with an online charging system (OCS). In one embodiment, the integration is similar to a 3GPP GPRS data core network. In some embodiments, the same APN options exist as in the 3GPP GPRS data core network, and the data flows are similar. In one embodiment, one difference is the substitution of the PGW 8020 for the GGSN.

In one embodiment in which the APN is non-dedicated and the Service Controller 122 is interworking with the PGW 8020, the PGW 8020 sends the data session start, stop, and interim usage reports. In one embodiment, the interface between the PGW 8020 and Service Controller 122 is Gy (Diameter DCCA).

In one embodiment, at the start of the data session, the Service Processor 115 permits traffic to flow between the device and the Service Controller 122 (e.g., traffic is zero-rated), and other traffic is blocked. In one embodiment, after the Service Processor 115 authenticates and synchronizes with the Service Controller 122, the Service Controller 122 communicates to the PGW 8020 indicating that the subscriber is starting an Service Controller-managed data session and instructs the PGW to zero-rate all of the traffic. In one embodiment the Service Processor 122 enforces policy based on the active plans on the device.

In one embodiment, the Service Controller 122 receives its network usage updates from the PGW 8020 when the Service Controller 122 receives a quota request (via the Diameter CCR/CCA exchange) from the PGW 8020. In one embodiment, the Service Controller 122 uses these reports as one of the elements for fraud detection (by comparing the network usage counts with the device-based usage counts).

"Thin" Client Integration

In one embodiment, it may be beneficial to implement a "Thin" Client. A "Thin" Client contains a subset of a "Full" Client's functionality. A Thin Client may be useful where there is a proliferation of older phones or operating systems, or to provide some or all of the capabilities described herein on platforms associated with an uncooperative OEM.

In one embodiment, the implementation of the Thin Client has different integration points within the network because the Thin Client is not managing usage policy.

This section describes two embodiments of the Thin Client:

Device-based usage counting and notifications
Plan purchase

To reduce the impact of the thin client on the network, in one embodiment, Thin Client integrations occur with the OCS. In one embodiment, the Service Controller 122 supports variations of this implementation based on the Operator's specific network configuration and capabilities.

"Thin" Client Usage Counting and Notifications

Figure 19:
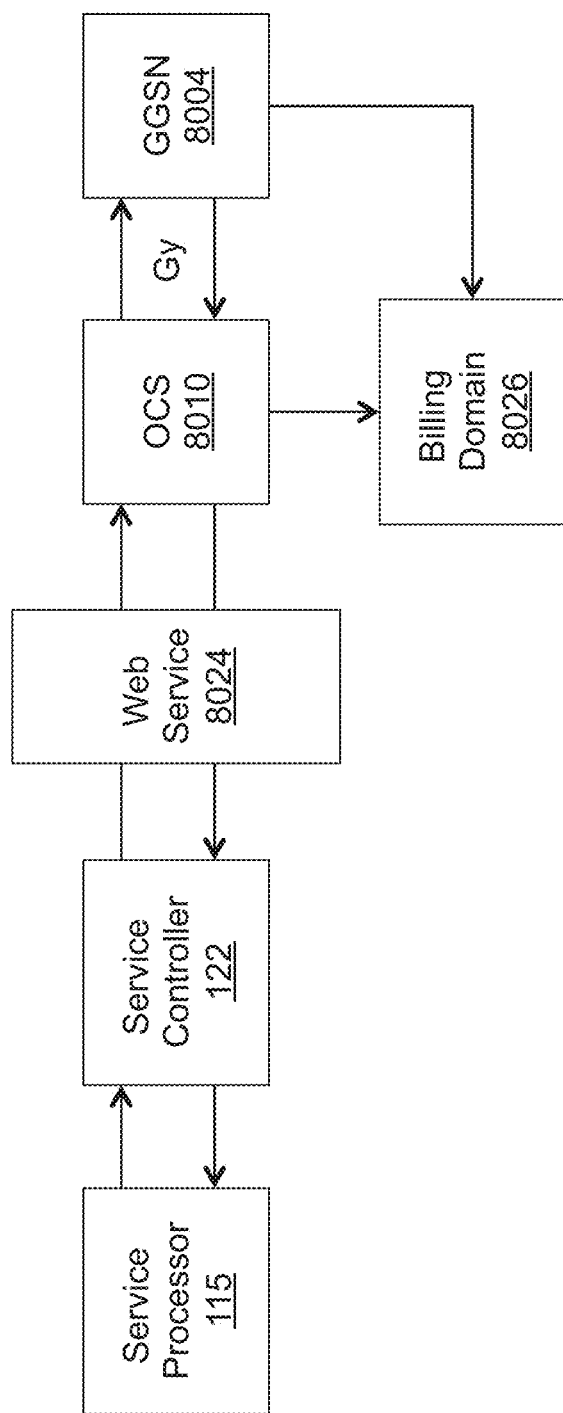
FIG. 19 illustrates an example embodiment of the service controller implemented into an operator's network to support the ability of the service processor to count usage and notify based on usage counts.

FIG. 19 illustrates an example embodiment of the Service Controller 122 implemented into an Operator's network to support the ability of the Service Processor to count usage and notify based on usage counts.

In one embodiment, at the start of the data session, the OCS 8010 messages the Service Controller 122 that the data session is starting, and indicates the total usage consumption within the plan cycle, plan usage limit, and the expiration date/time of the cycle. In one embodiment, when the Service Processor 115 detects the start of the data session, it connects to the Service Controller 122 to retrieve current usage, plan limits, expiration date/time and any notifications associated with the service plan. In one embodiment, when the GGSN 8004 is allocated usage quota from the OCS 8010 via the Gy CCR/CCA interface, the OCS 8010 messages the Service Controller 122 with the usage update within the plan. In one embodiment, the amount of data allocated to the GGSN 8004 by the OCS 8010 determines the accuracy of the OCS 8010 usage count (until a stop message is received from the GGSN).

In one embodiment, periodically, based on configuration, the Service Processor 115 messages the Service Controller 122 with its current usage counts, and the Service Controller 122, if necessary, trues up the device counts.

In one embodiment, when the usage within the plan reaches the notification levels (e.g., 80%, 100%, OK to go into overage?, etc.), the Service Processor 115 presents the associated notification to the subscriber through a user interface. In one embodiment, the Service Processor 115 captures the user response to the notification and sends information about the user response to the Service Controller 122. In one embodiment, the Service Controller 122 stores the user's notification responses. In one embodiment, the Service Controller 122 sends information about the user's notification responses to the OCS 8010.

In one embodiment, when the data session terminates, the OCS 8010 messages the Service Controller 122 with the final usage count within the session.

In one embodiment, the "true," billable usage count is held on either the OCS 8010 or GGSN 8004. In one embodiment, the element holding the "true," billable usage count uses the existing mechanism to feed CDRs into the billing domain.

"Thin" Client Plan Purchase

Figure 20:
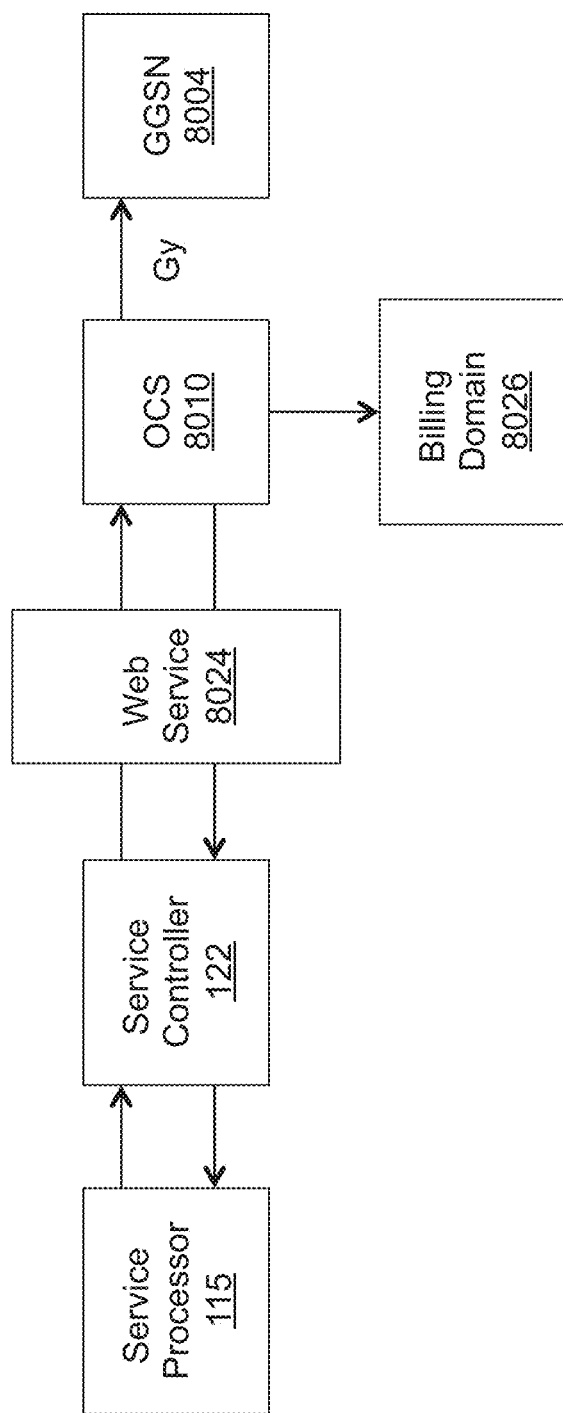
FIG. 20 illustrates an example embodiment in which the service controller is implemented to support the ability to purchase service plans from the device via the service processor.

FIG. 20 illustrates an embodiment in which the Service Controller 122 is implemented in an Operator's network to support the ability to purchase service plans from the device via the Service Processor 115. This embodiment builds on the prior Thin Client embodiment and supports its functionality as well.

In one embodiment, the Service Controller 122 contains a catalog of the plan details including notifications, counting policy (e.g., network type, APN, roaming, etc.), plan size (e.g., MBs), cycle, etc. To effectively support bundling and compatibility, In one embodiment, the Service Controller 122 messages the OCS 8010 to receive the applicable plan set for the subscriber as well as the cost of that plan set (e.g., with any discounts built in to support bundling of services).

In one embodiment, the Service Processor 115 allows the subscriber to purchase service plans (e.g., data plans, voice plans, texting plans, bundles, etc.) through the device. In one embodiment, after the user has selected a service plan through the UI, the Service Processor 115 communicates the selection to the Service Controller 122. In one embodiment, the Service Controller 122 messages the plan selection (e.g., sends information about the plan selection) to the OCS 8010 through the web service 8024 Service Provisioning Interface application programming interface (API).

In one embodiment, after the purchase has successfully completed, the OCS 8010 messages the Service Controller 122, and the Service Controller 122 messages the selected plans information (e.g., limits, cycle, notifications, etc.) to the Service Processor 115. In one embodiment, the Service Processor 115 manages the counting, notifications, and true-up as discussed in the context of other embodiments disclosed herein.

Figure 21:
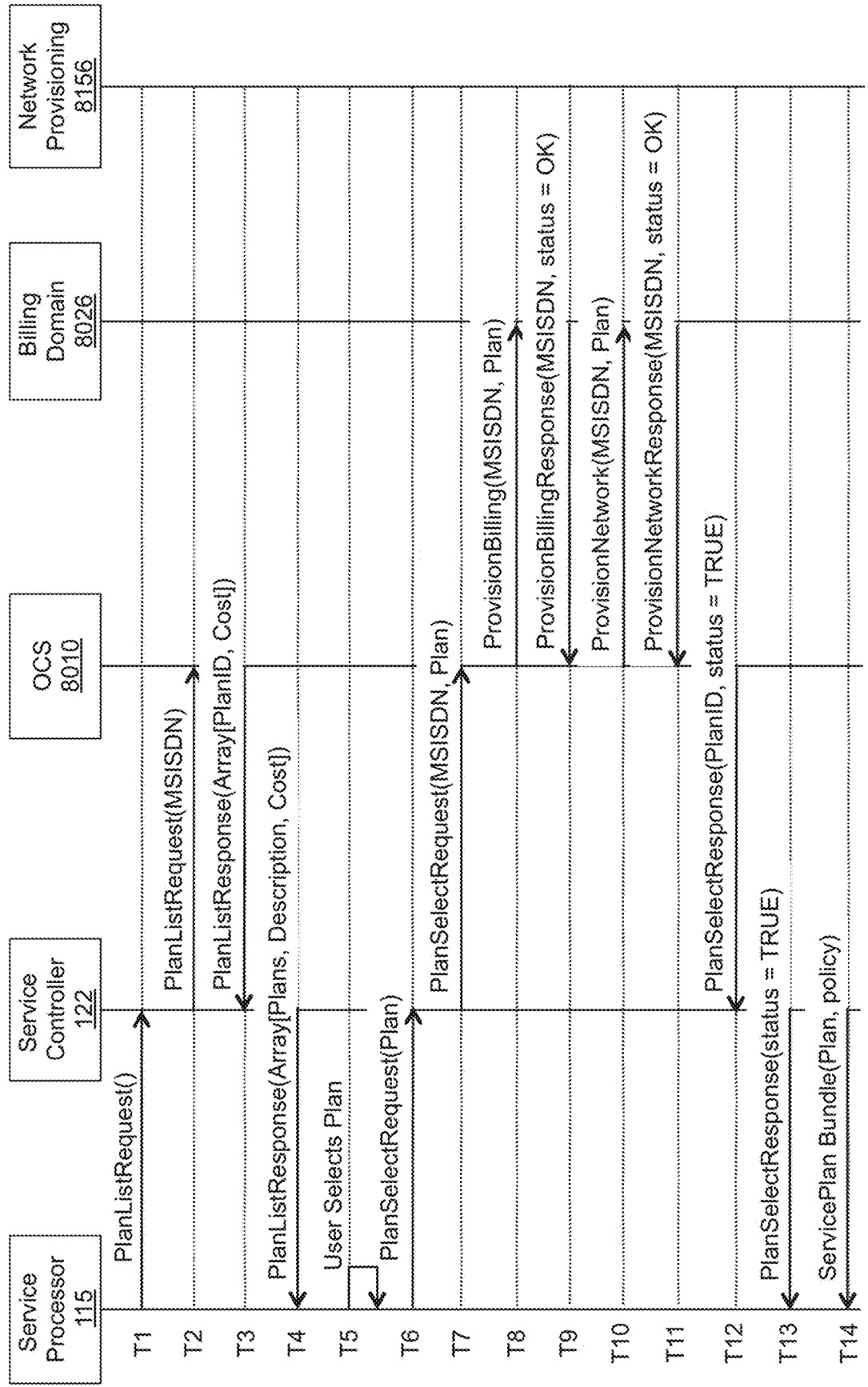
FIG. 21 illustrates an example workflow in accordance with some embodiments.

FIG. 21 illustrates the workflow in accordance with some embodiments.

Integration Embodiments with 3GPP2 Networks

Figure 22:
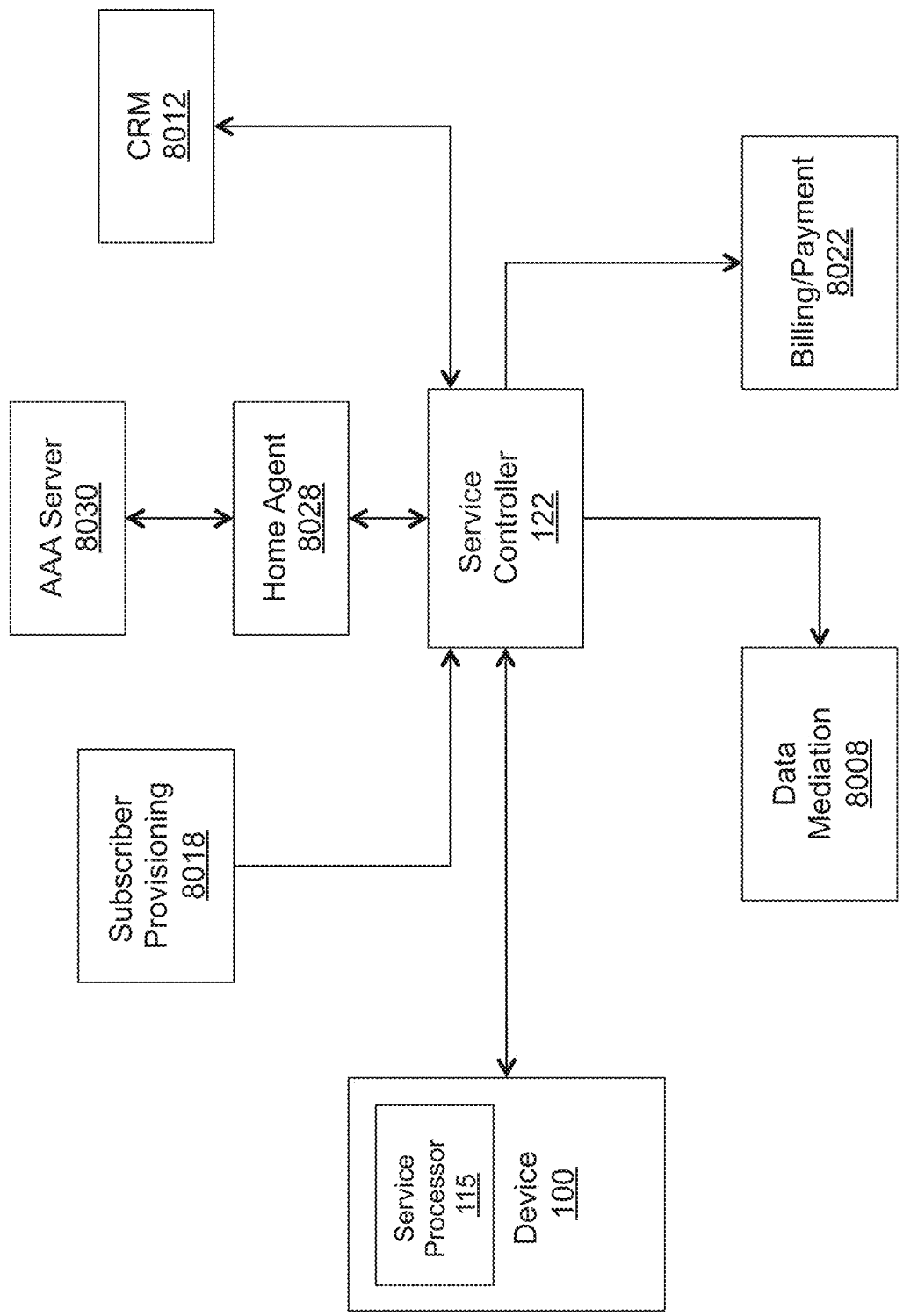
FIG. 22 depicts an example embodiment in which the service controller interworks with the home agent of a 3GPP2 Mobile IP data network.
Figure 23A:
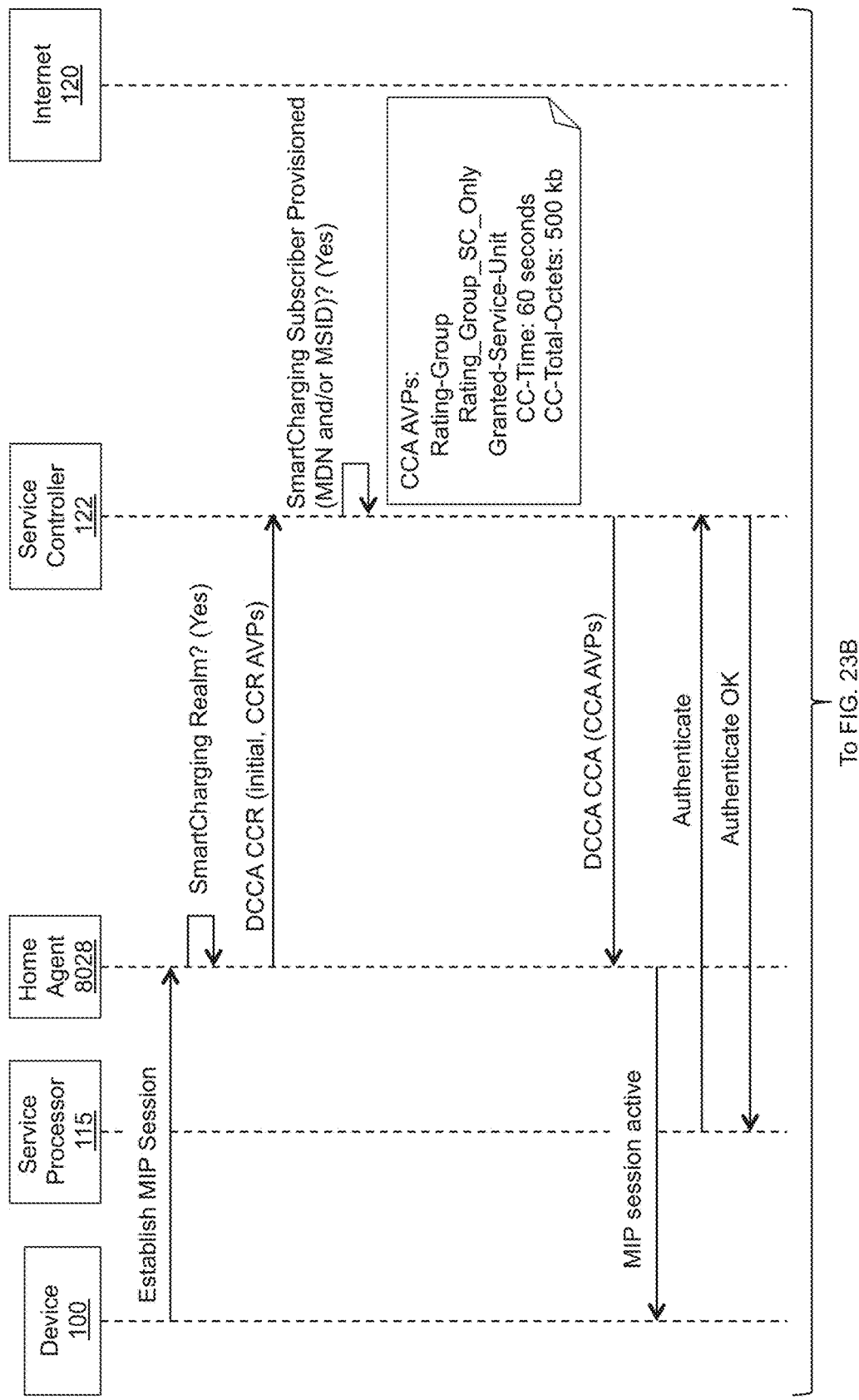
FIGS. 23A-23D illustrate the interaction between a home agent and a service controller in accordance with one or more embodiments.
Figure 23B:
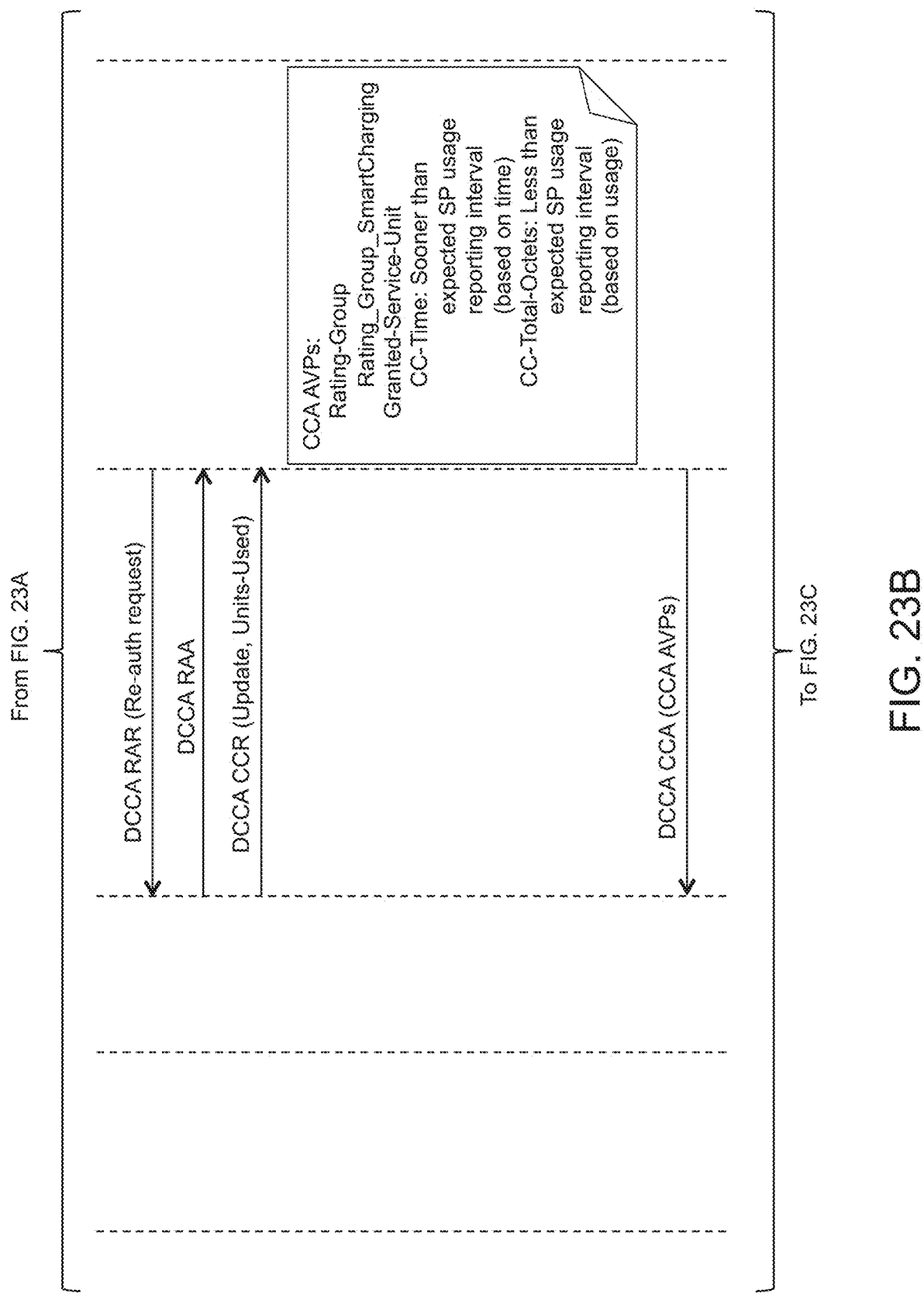
Figure 23C:
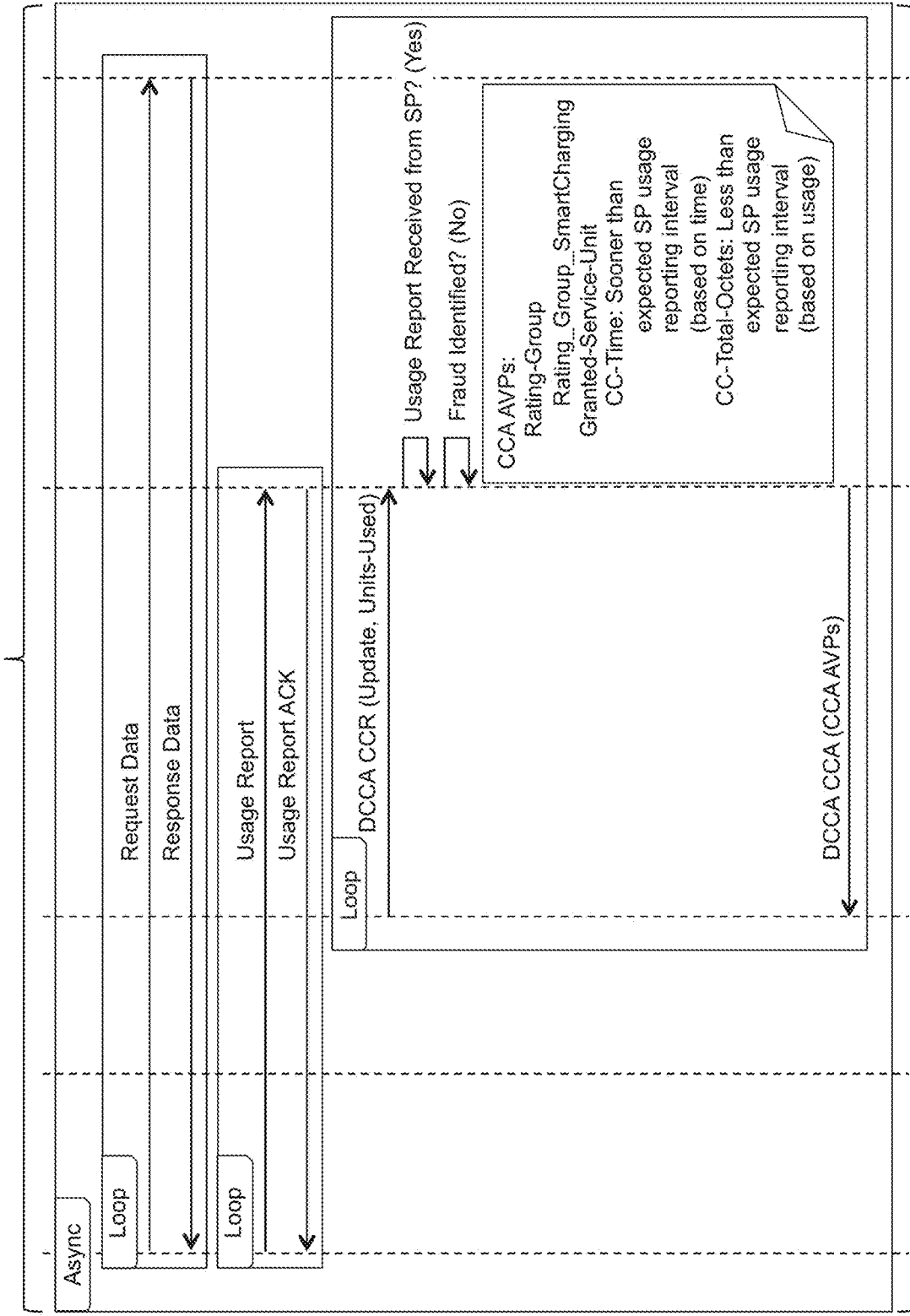
Figure 23D:
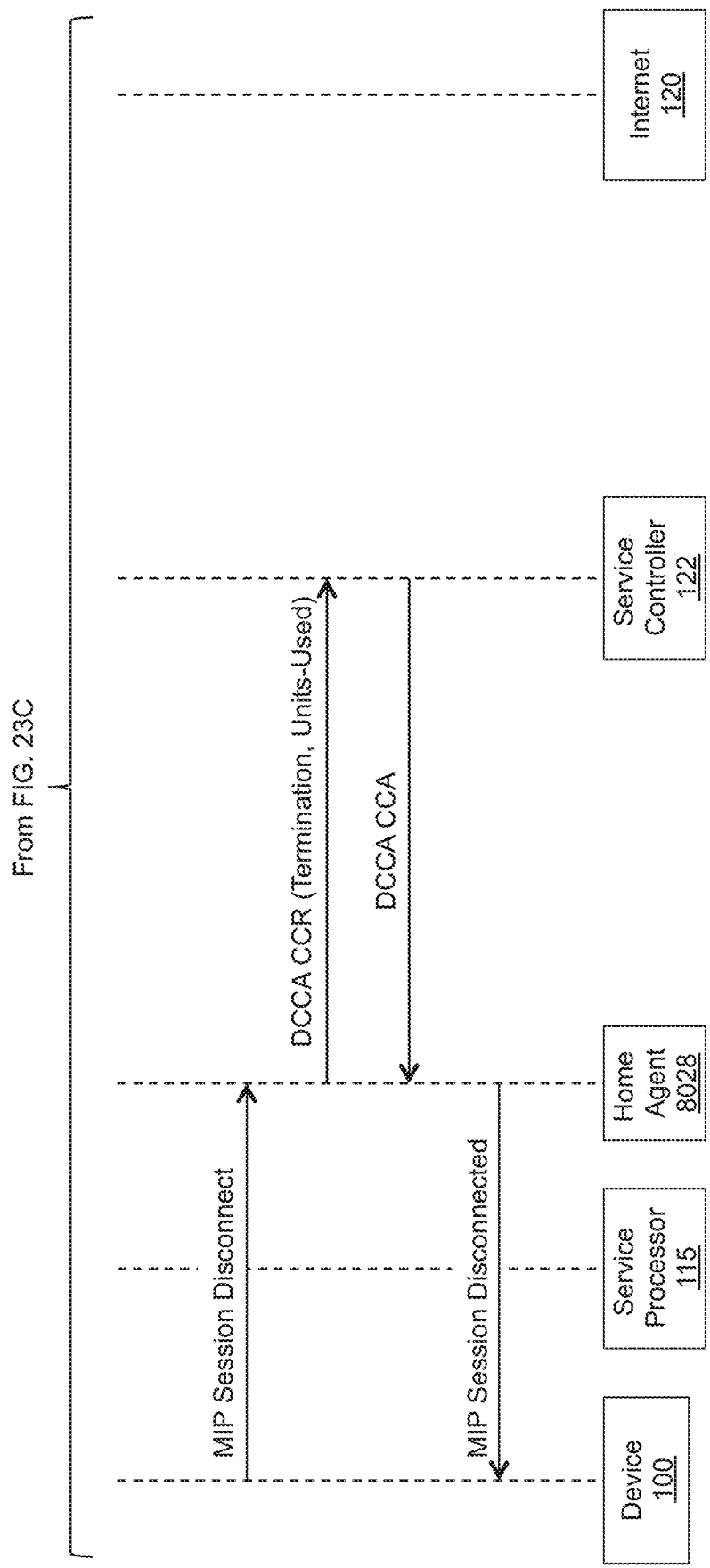
Figure 24A:
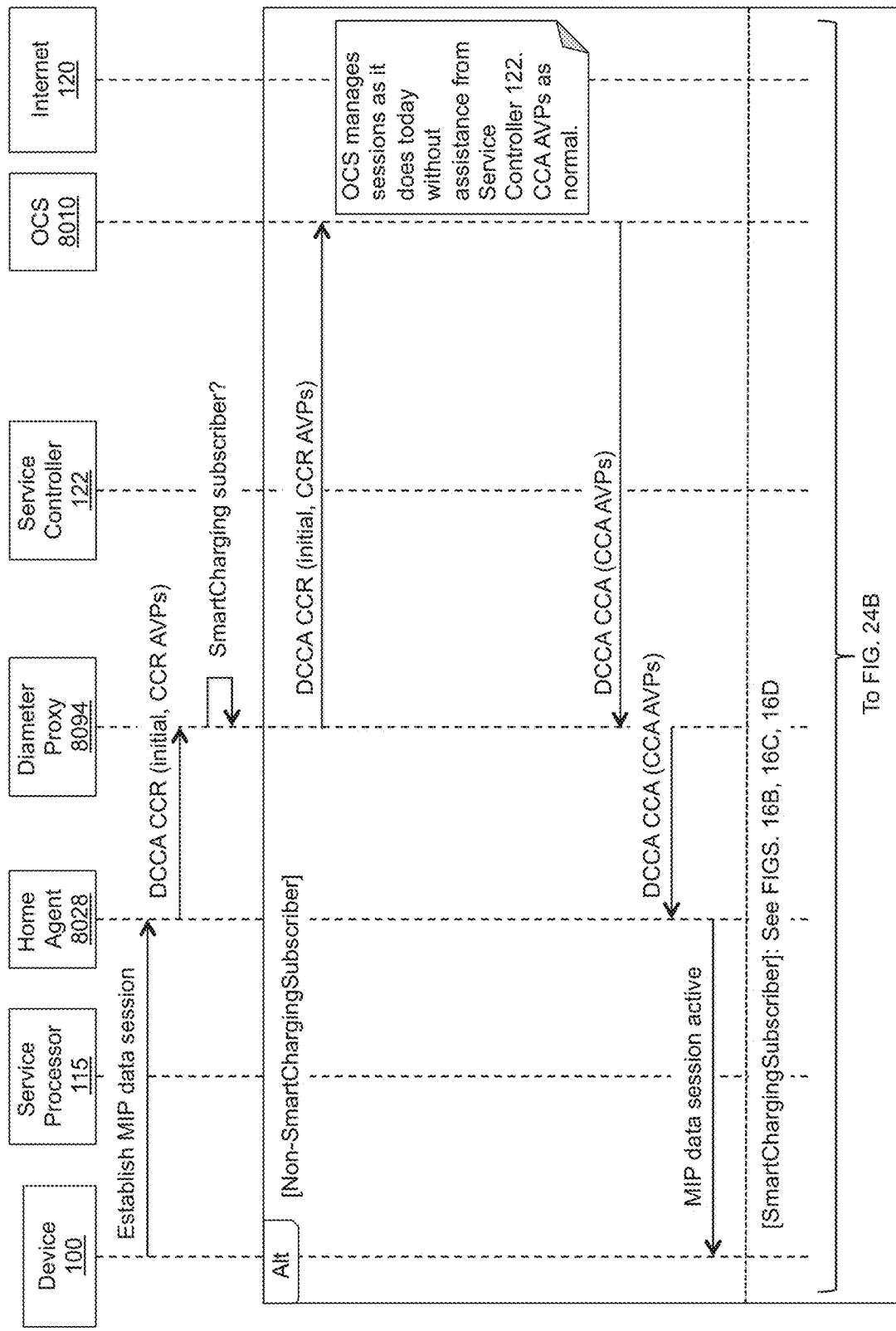
Figure 24B:
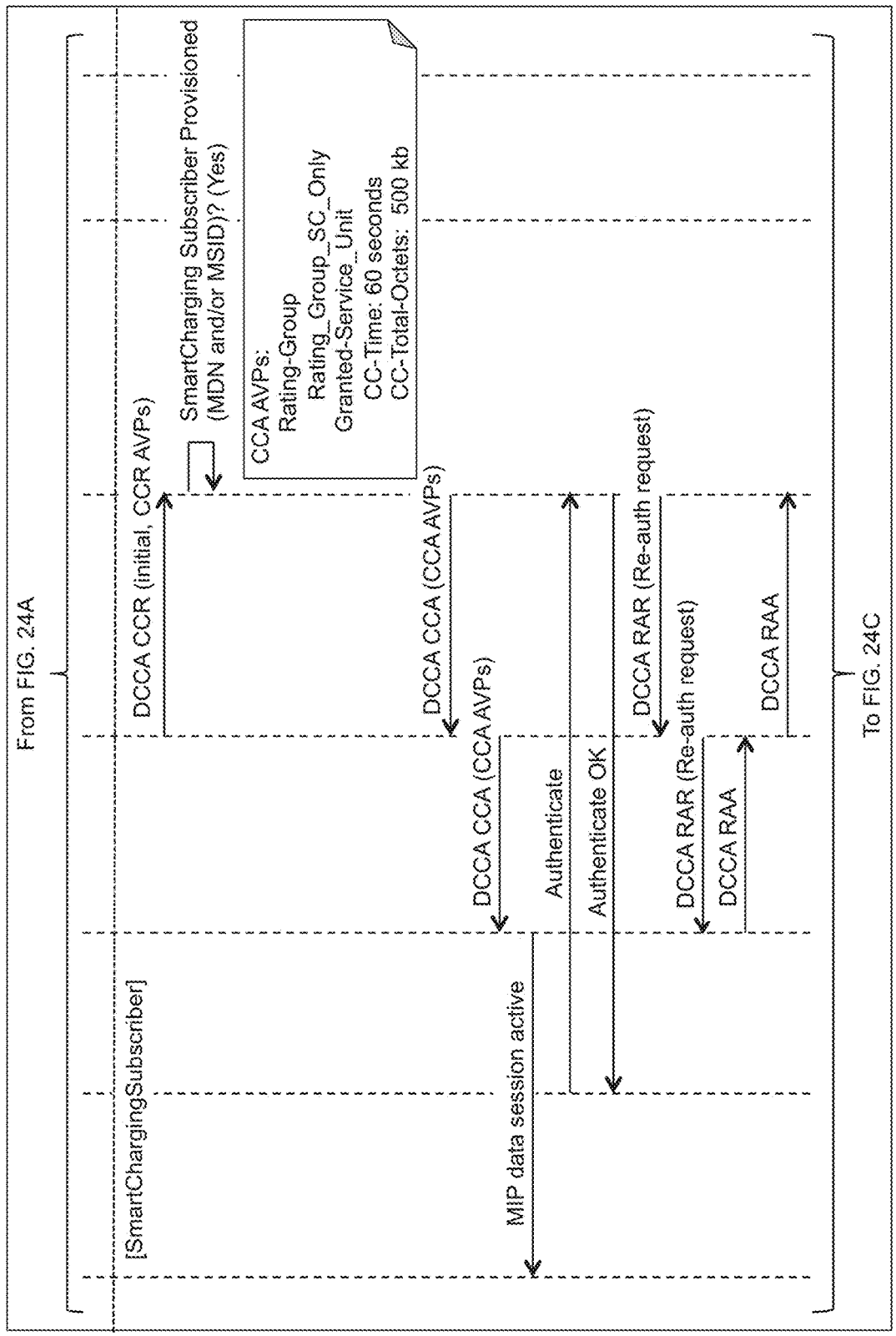
Figure 24C:
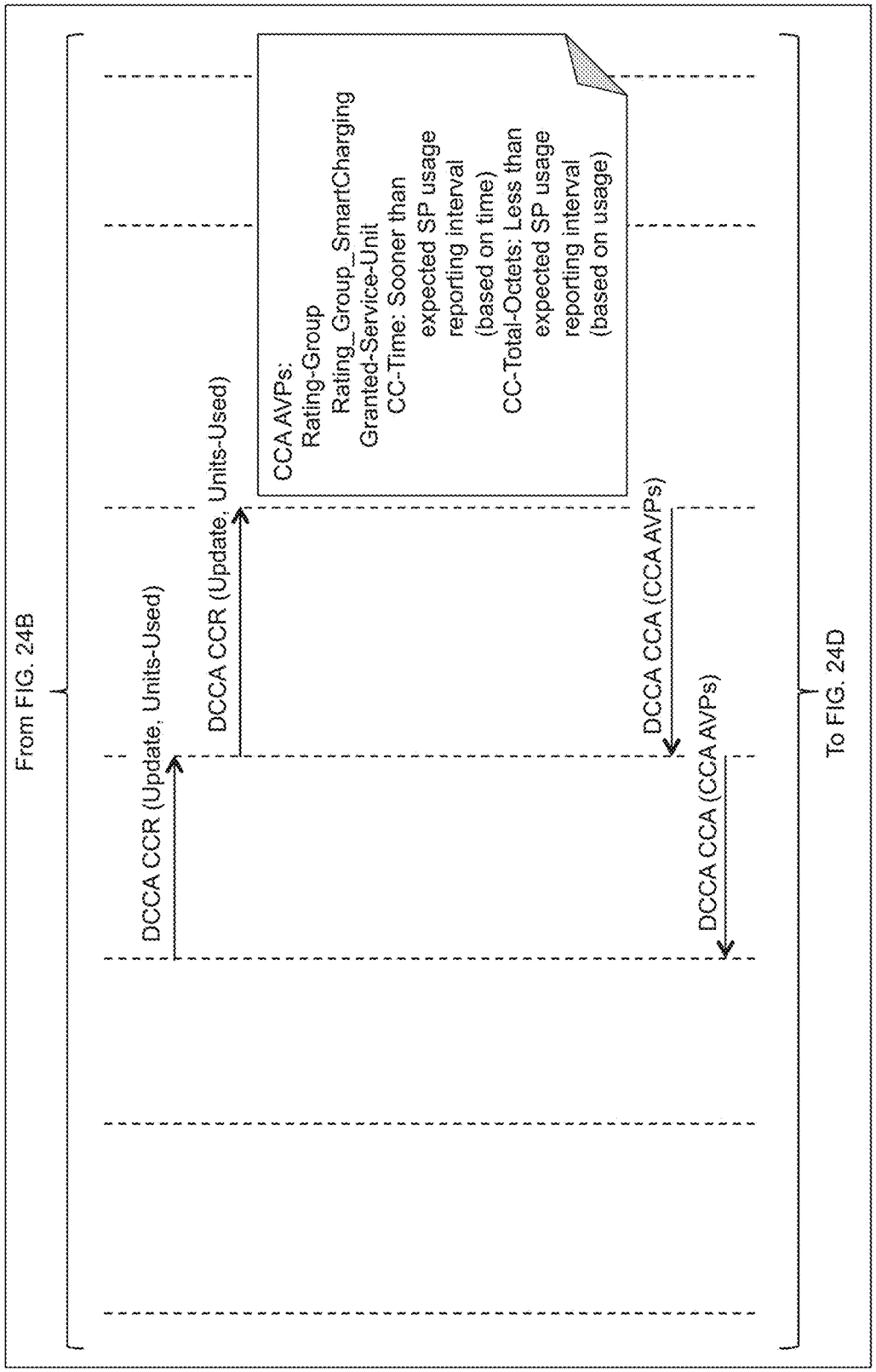
Figure 24D:
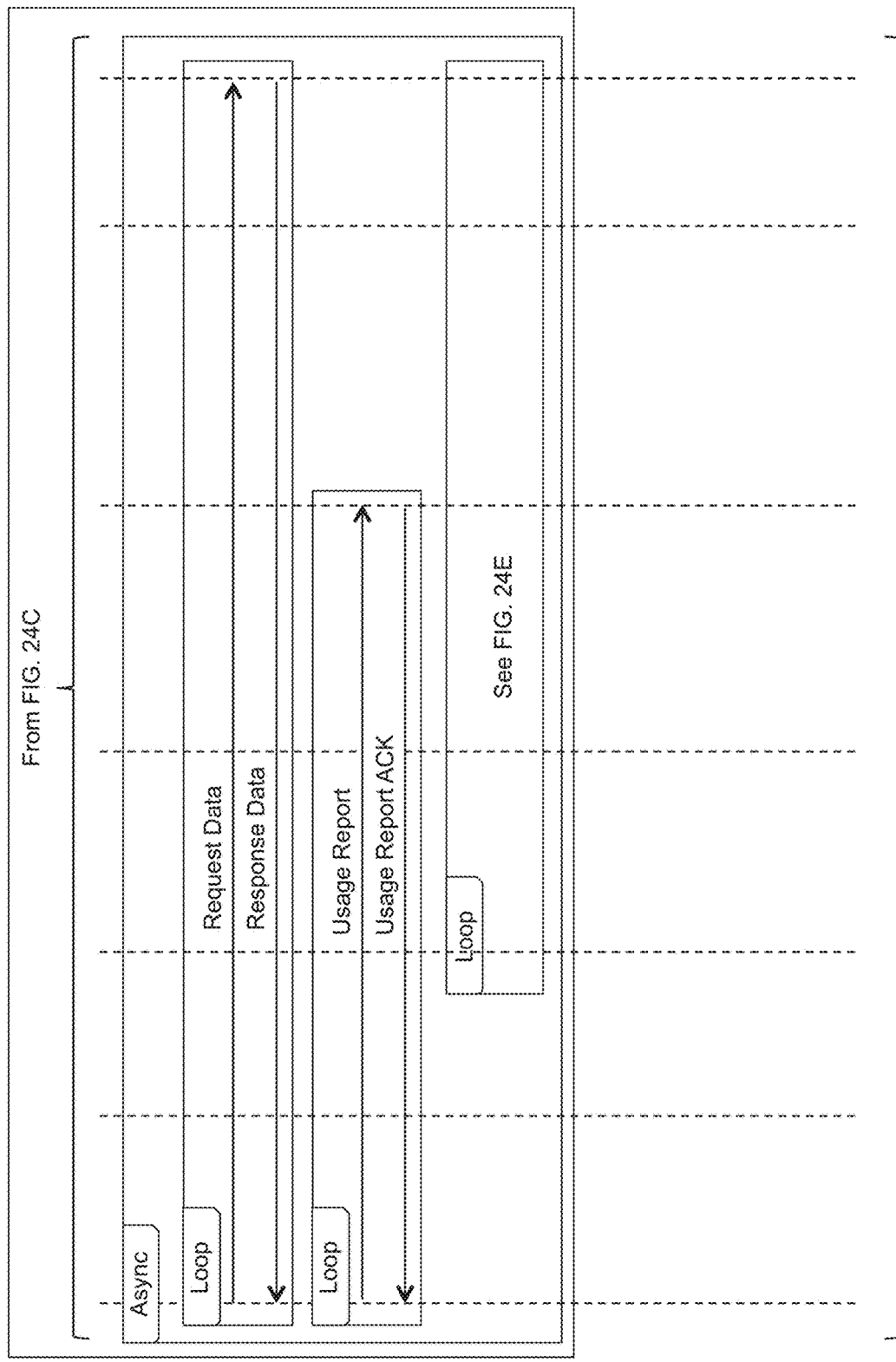
Figure 24E:
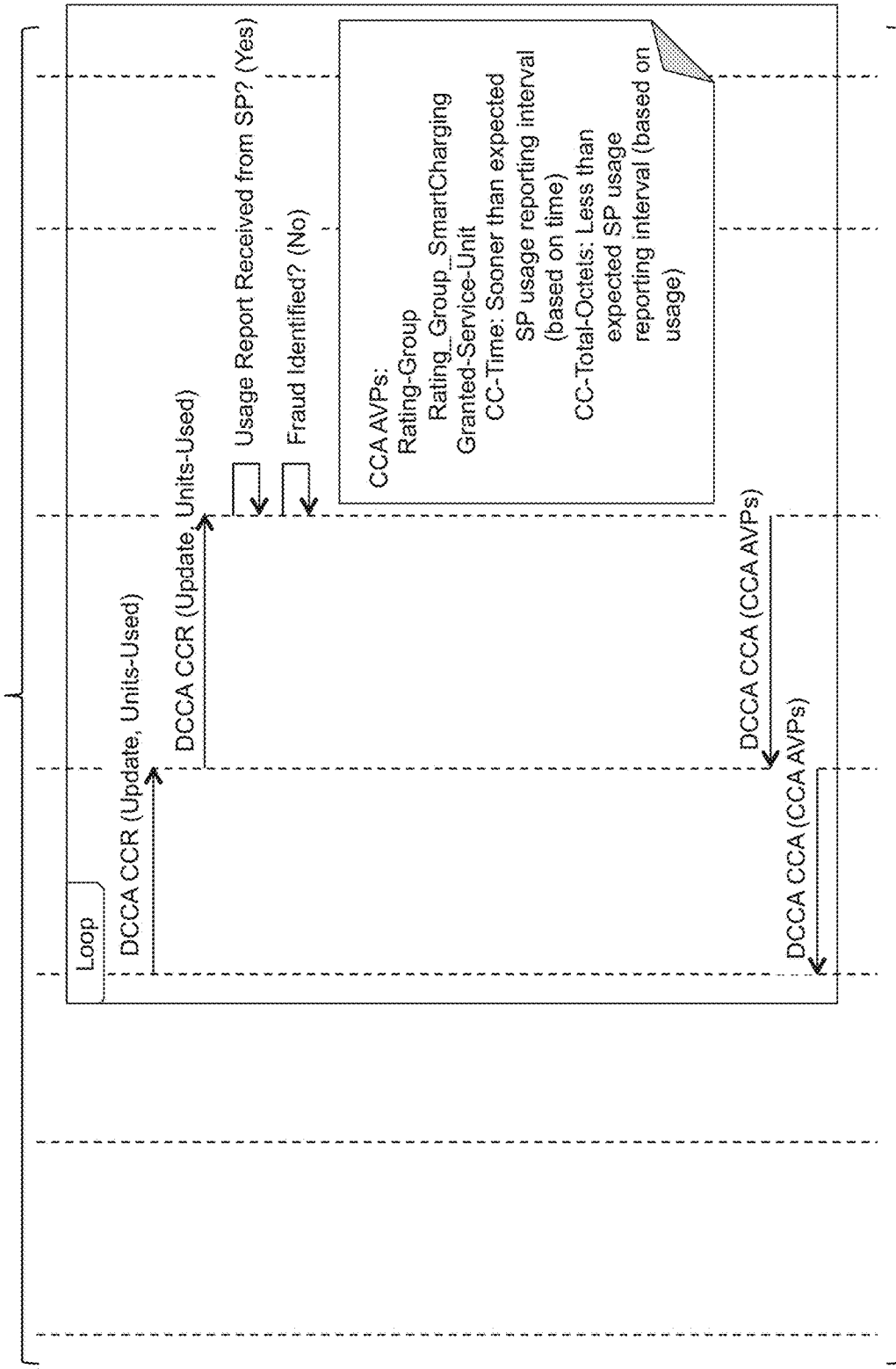

FIG. 22 depicts an embodiment in which the Service Controller 122 interworks with the Home Agent 8028 of a 3GPP2 Mobile IP data network. In one embodiment, the Service Controller 122 also interworks with an online charging system. In some such embodiments, the integration is similar to the integration in a non-dedicated APN environment in a 3GPP network.

In some Mobile IP embodiments in which the Service Controller 122 is interworking with the Home Agent 8028, the Home Agent 8028 is responsible for sending the data session start, stop, and interim usage reports.

In one embodiment, at the start of the data session, the Service Processor 115 permits traffic to flow between the device and the Service Controller 122 (e.g., traffic is zero-rated). In one embodiment, other traffic is blocked. In one embodiment, after the Service Processor 115 authenticates and synchronizes with the Service Controller 122, the Service Controller 122 communicates to the Home Agent 8028 indicating that the subscriber is starting a Service Controller-managed data session. In one embodiment, the Home Agent 8028 forwards this notification to the AAA Server 8030. In one embodiment, at this point, the Service Processor 115 enforces policy based on the active plans on the device.

In one embodiment, the Service Controller 122 receives its network usage updates from the Home Agent 8028 when the data session starts and stops, and throughout the session via interim updates. In one embodiment, the Service Controller 122 receives these updates via the AAA Server 8030. In one embodiment, the Service Controller 122 uses these reports for fraud detection (e.g., by comparing the network usage counts with the device-based usage counts).

In one embodiment, the Home Agent 8028 supports Diameter Gy or equivalent, where the Service Controller 122 integration is similar to the 3GPP implementation. In one implementation, rather than using APNs for isolation (if desired), the Home Agent 8028 uses Mobile IP realm instead. As would be appreciated by a person having ordinary skill in the art, Mobile IP realm achieves the same requirement as APN and is effectively equivalent from a management perspective.

FIGS. 23A-23D illustrate in more detail the interaction between the Home Agent 8028 and the Service Controller 122 (success case with no fraud detected) in accordance with one or more embodiments. FIGS. 24A-24F illustrate in more detail the interaction between the Home Agent 8028 and the Service Controller 122 via the Diameter proxy/router (success case with no fraud detected) in accordance with some embodiments.

Integration Embodiments with a Diameter Front End

In some environments, it is more practical to deploy the Service Controller 122 platform in a cloud environment and provide a virtualized environment that is transparent to the core network. However, because of signaling timing and scalability concerns, it may be preferable to keep the Service Controller 122 out of the call signaling path.

To accomplish this goal, in one embodiment there is an end-point signaling entity on the network signaling plane. This endpoint is responsible for interacting on the signaling plane with the network in real-time and interacting with the Service Controller 122 in near-real-time. Additionally, this endpoint allows the Service Controller 122 to be virtualized in the cloud and provide an extremely efficient, scalable and fault-tolerant service for a fraction of the cost to deploy dedicated hardware across multiple GGSN or Home Agent sites.

In one embodiment, such as the exemplary embodiment shown in FIGS. 24A-24F, there is a local "Diameter Front End" 8032 that is local to the core network and is responsible for signaling with the local GGSN/HA. In one embodiment, the Diameter Front End (DFE) 8032 has a session cache and locally manages the Diameter Credit Control (DCC) session and interacts with the Service Controller cloud 8036 in near-real-time. In one embodiment, the interactions between the DFE 8032 and the Service Controller cloud 8036 are used to keep the Service Controller 122 up-to-date on data session start/stop and data session usage information. In one embodiment, the Service Controller 122 informs the local DFE 8032 about quota authorization and rating group changes. In one embodiment, the DFE 8032 uses the information provided by the Service Controller cloud 8036 to interact with the core network and to manage and control the subscriber data session appropriately.

In one embodiment, such as where it is desirable to be APN or Mobile IP Realm agnostic, the DFE 8032 also functions as a Diameter proxy/router. In one embodiment, requests for subscribers that are not utilizing the capabilities of the Service Controller cloud 8036 are proxied to the local OCS 8010.

Figure 25:
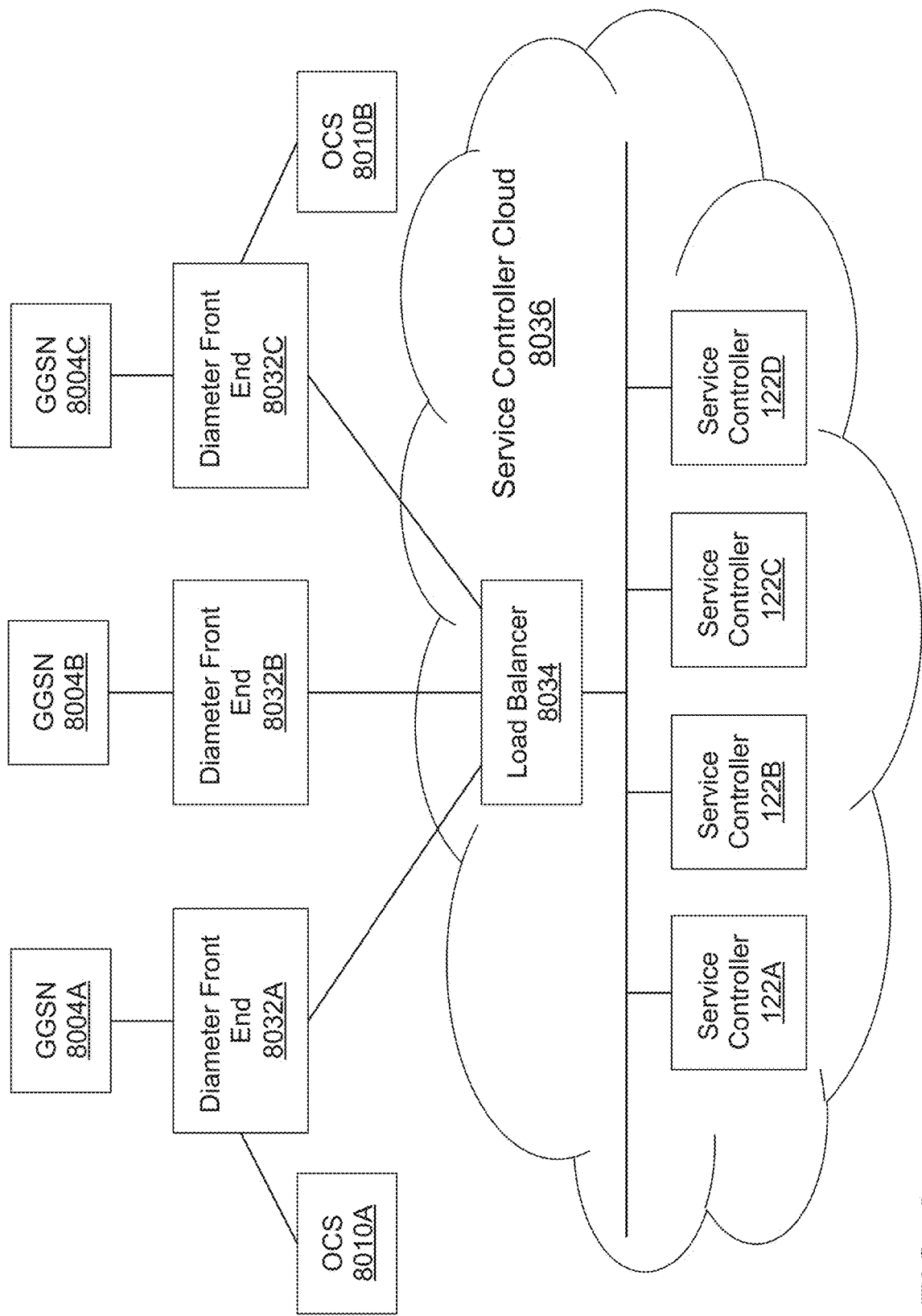
FIG. 25 illustrates a network architecture with network elements implemented to communicate with a virtualized service controller in accordance with some embodiments.
Figure 26A:
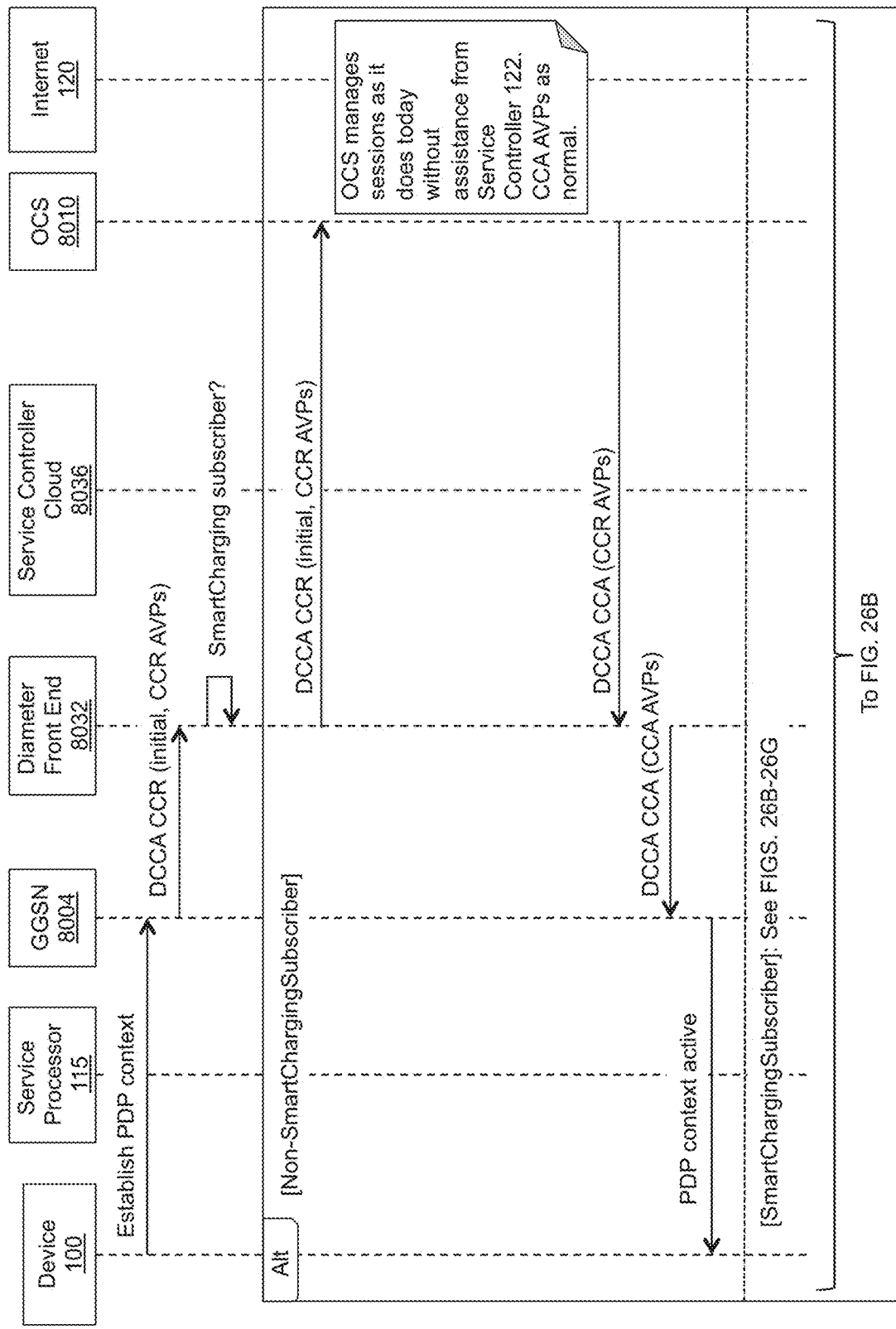
FIGS. 26A-26H illustrate in more detail the interaction between a GGSN and the service controller in accordance with some embodiments.
Figure 26B:
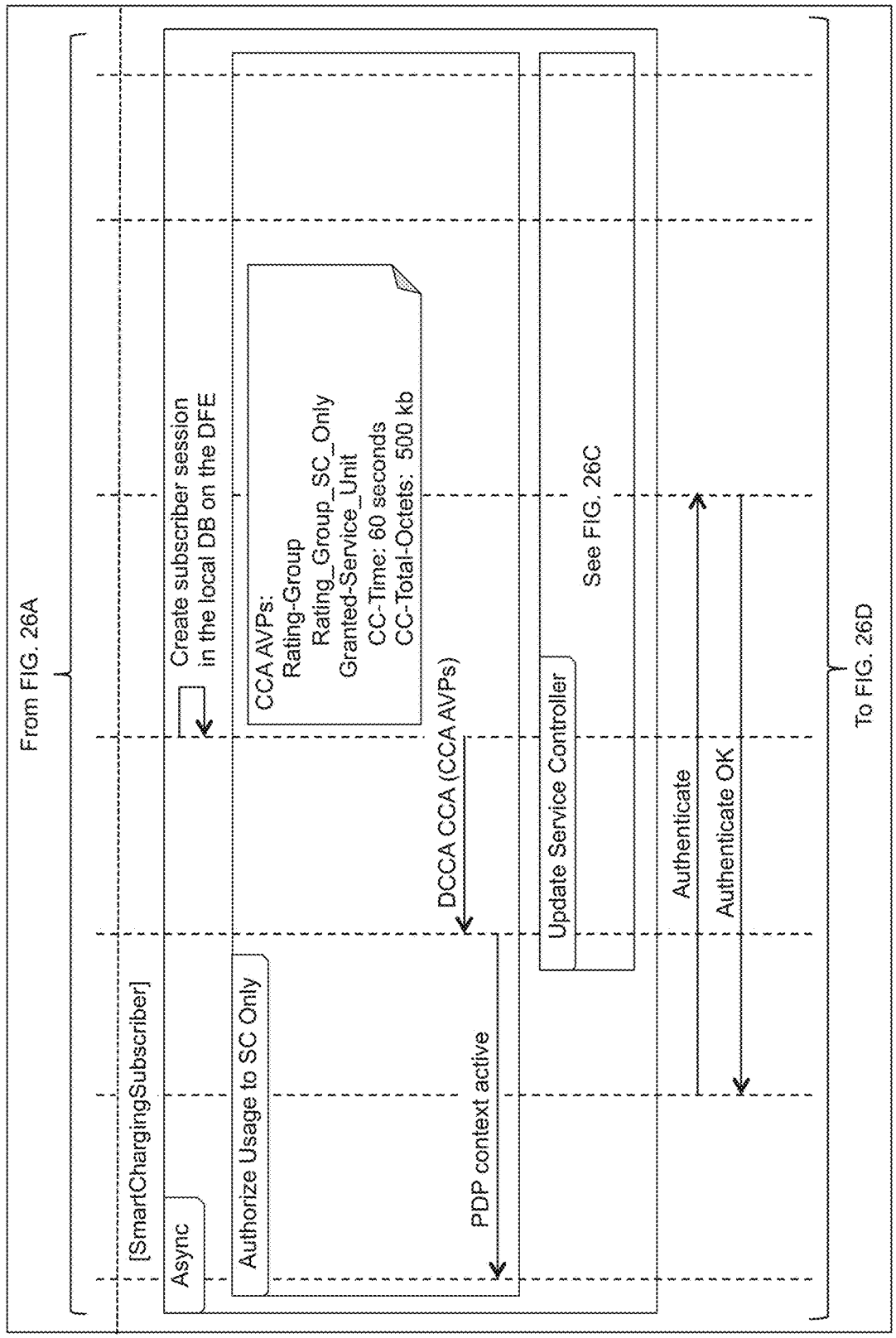
Figure 26C:
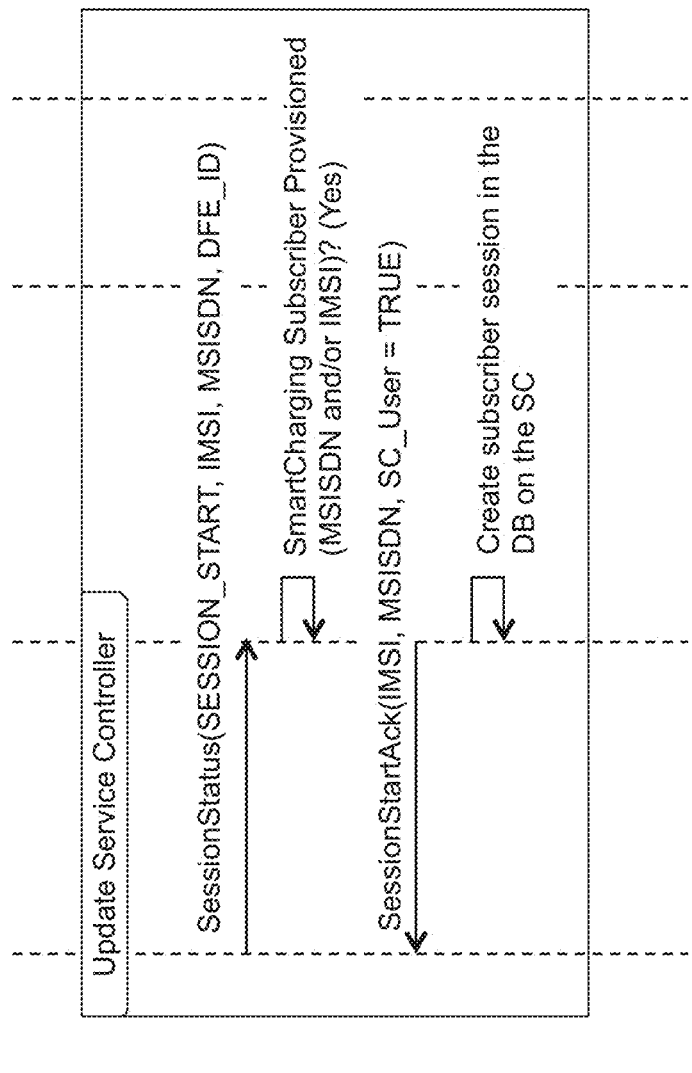
Figure 26D:
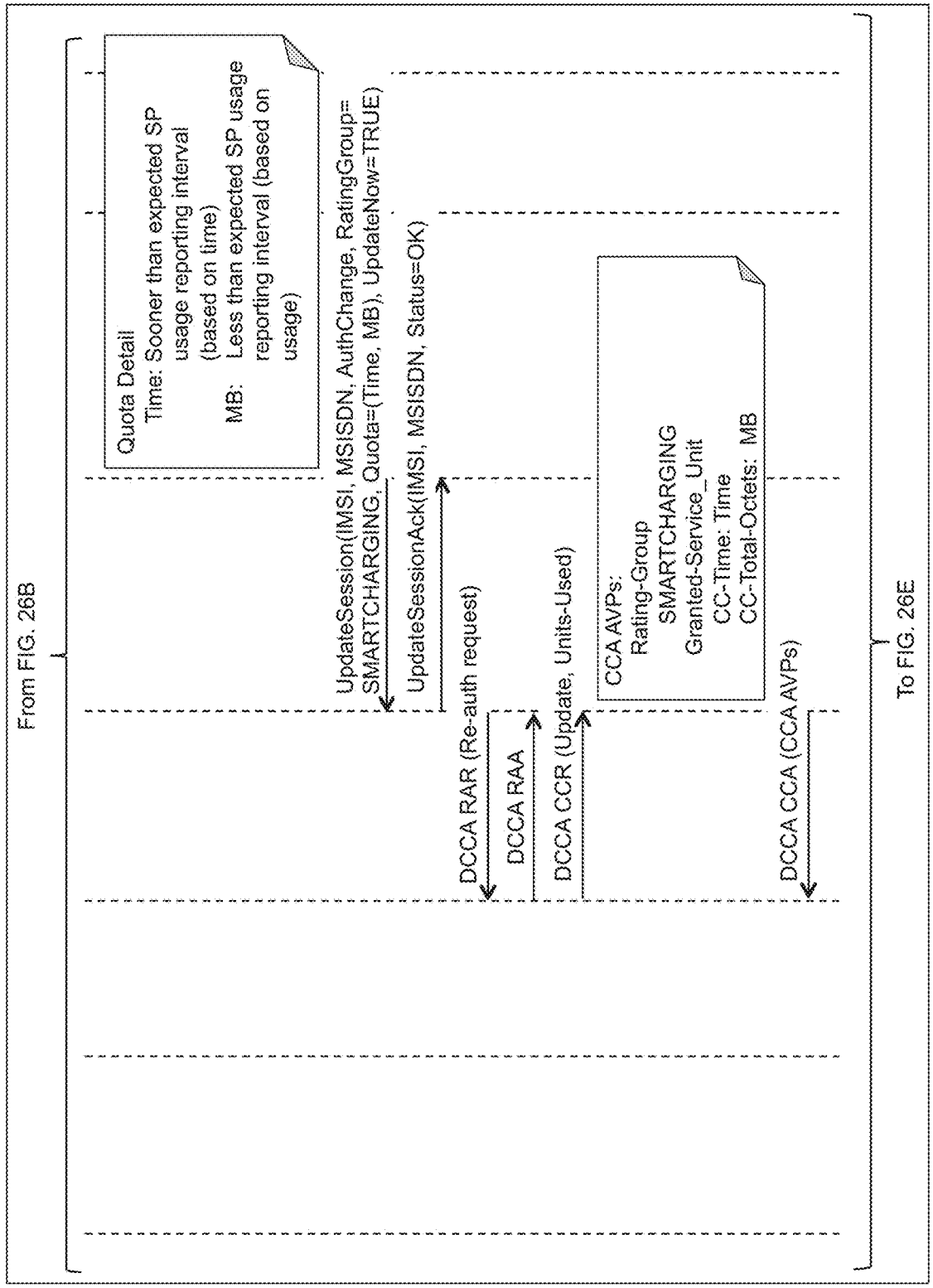
Figure 26E:
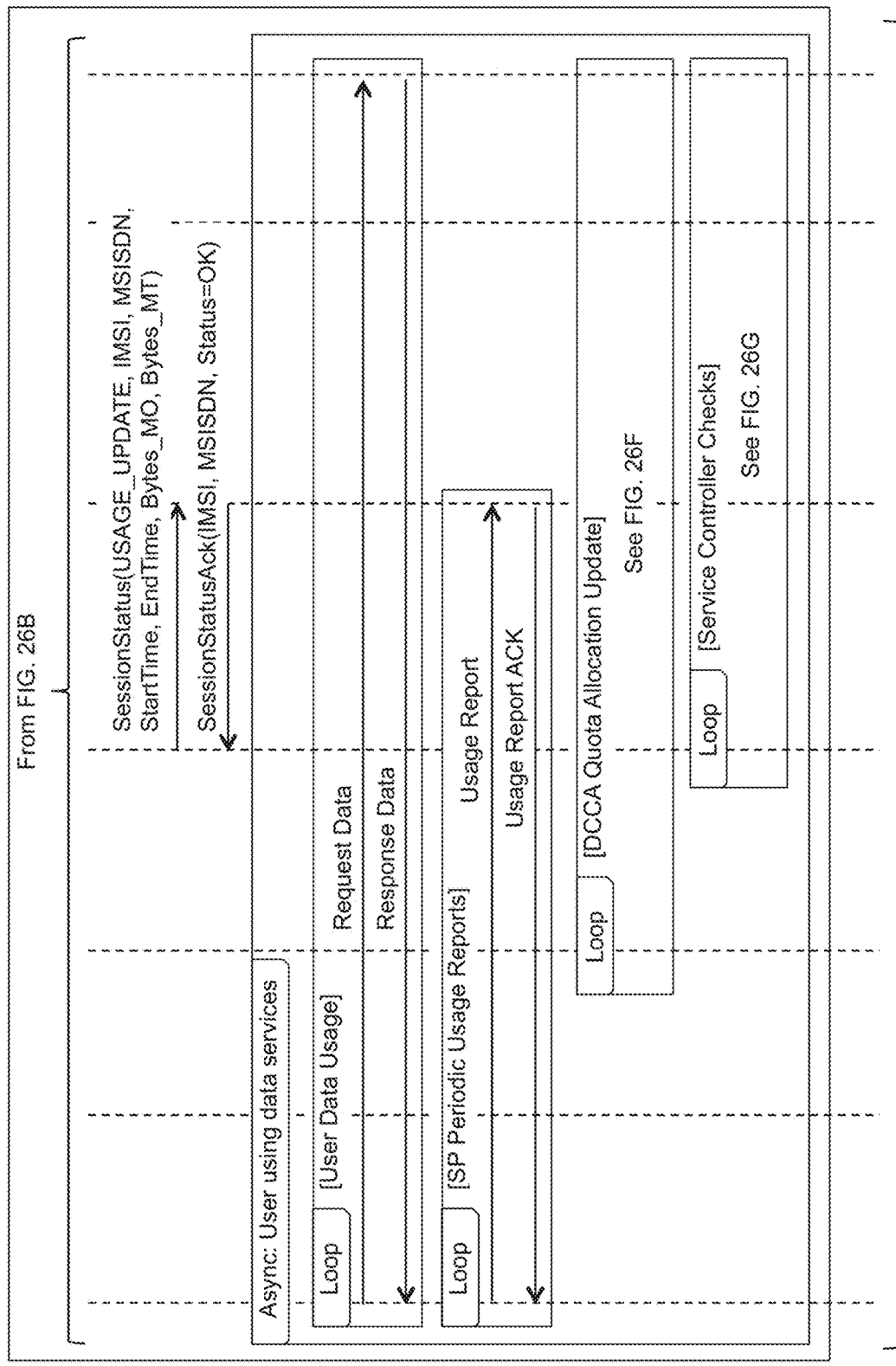
Figure 26F:
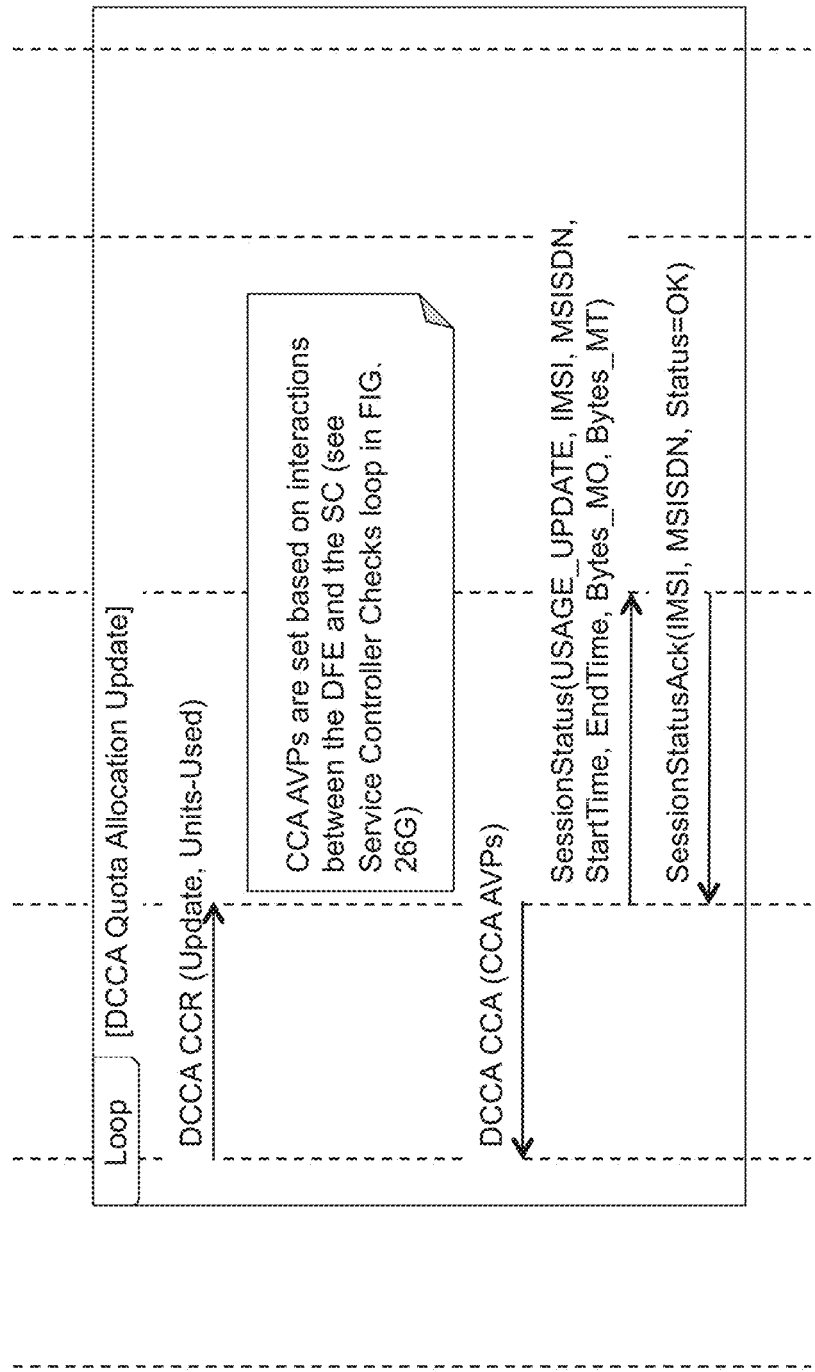
Figure 26G:
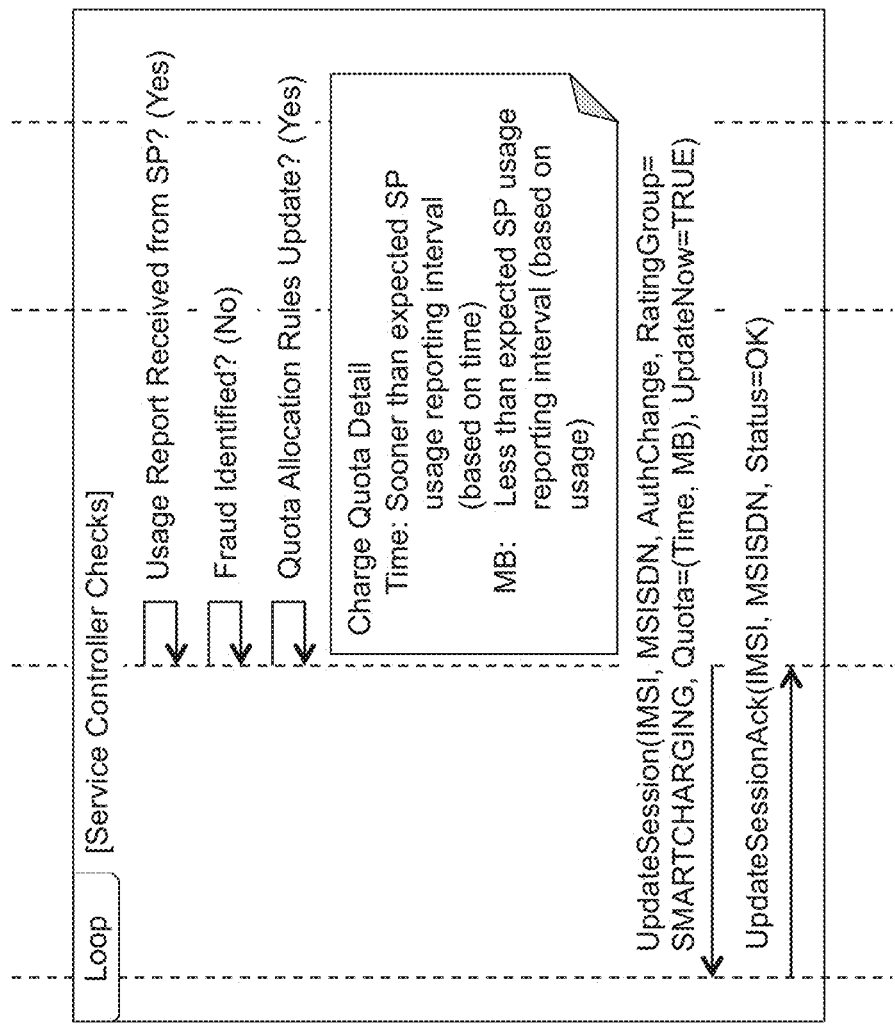
Figure 26H:
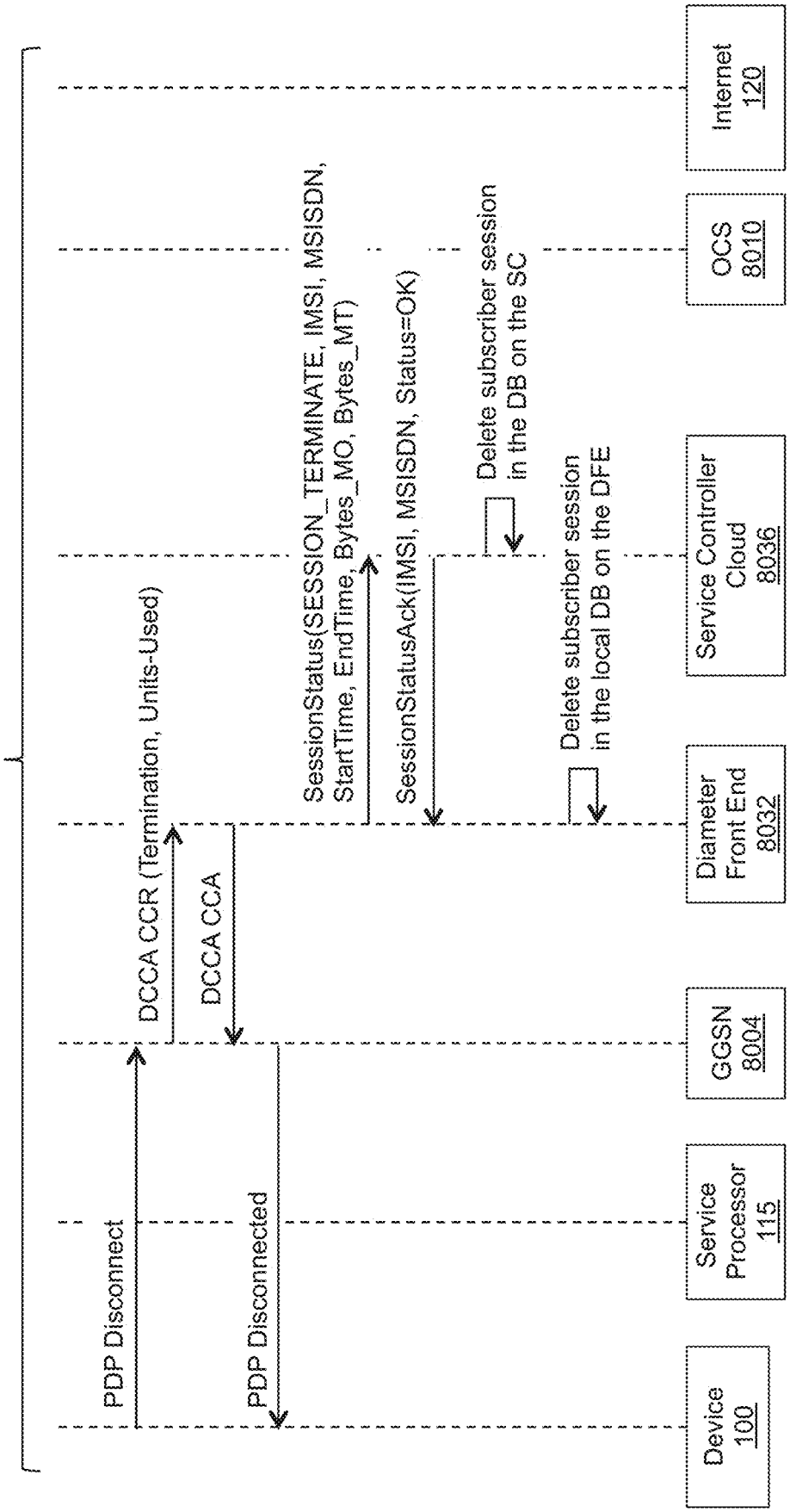

FIG. 25 illustrates a network architecture with a DFE 8032 implemented between the GGSN 8004 and the Service Controller cloud 8036 in accordance with some embodiments. In this embodiment, the DFE 8032 is also acting as a Diameter proxy/router to route subscribers that are not utilizing the services of the Service Controller cloud 8036 to a locally attached OCS 8010. As would be appreciated by a person having ordinary skill in view of the disclosures herein, in a 3GPP2 environment, the GGSN 8004 would be replaced by an HA.

FIGS. 26A-26H illustrate in more detail the interaction between the GGSN 8004 and the Service Controller cloud 8036 via the DFE 8032 (success case with no fraud detected) in accordance with some embodiments.

Multi-Tenanted Deployment

In environments where a single mobile Operator supports multiple local networks, it is possible to deploy a single Service Controller 122 in a centralized data center and provide connectivity and service to the individual local operating networks.

In one embodiment, the Service Controller 122 hardware is shared, and the local data is logically or physically separated by operating network entity. In one embodiment, an operating network has its own private connections between the network and the Service Controller 122. In one embodiment, the CRM 8012 platform is shared across one or more of the local networks. In one embodiment, the CRM 8012 platform is specific to the local operating network.

Figure 27:
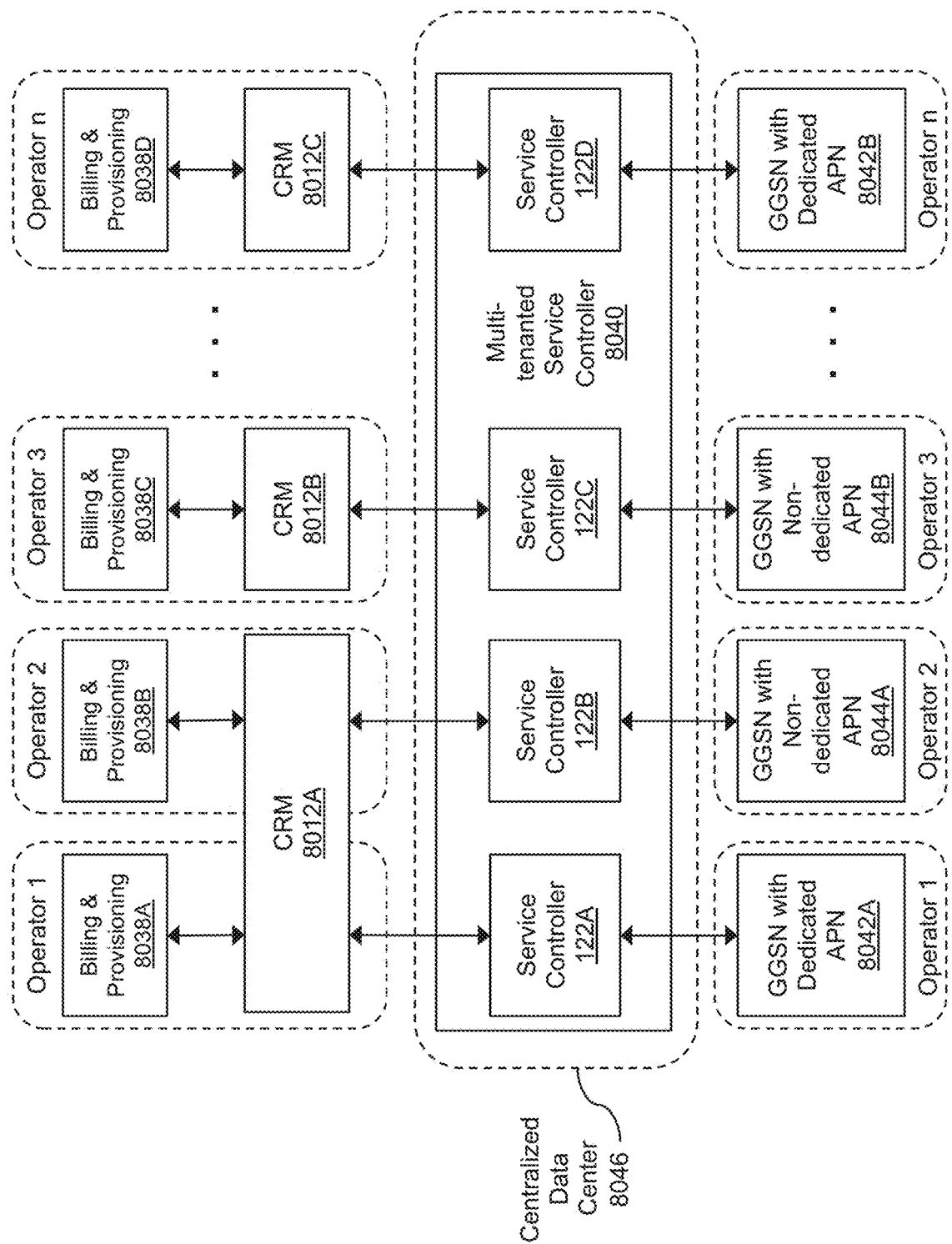
FIG. 27 depicts an exemplary embodiment of the service controller in a multi-tenanted deployment in accordance with one embodiment.

FIG. 27 depicts an exemplary embodiment of the Service Controller 122 in a multi-tenanted deployment with a combination of shared and individual CRM platforms as well as a combination of dedicated and non-dedicated APN environments.

Gy Proxy to Virtualize OCS

Figure 28:
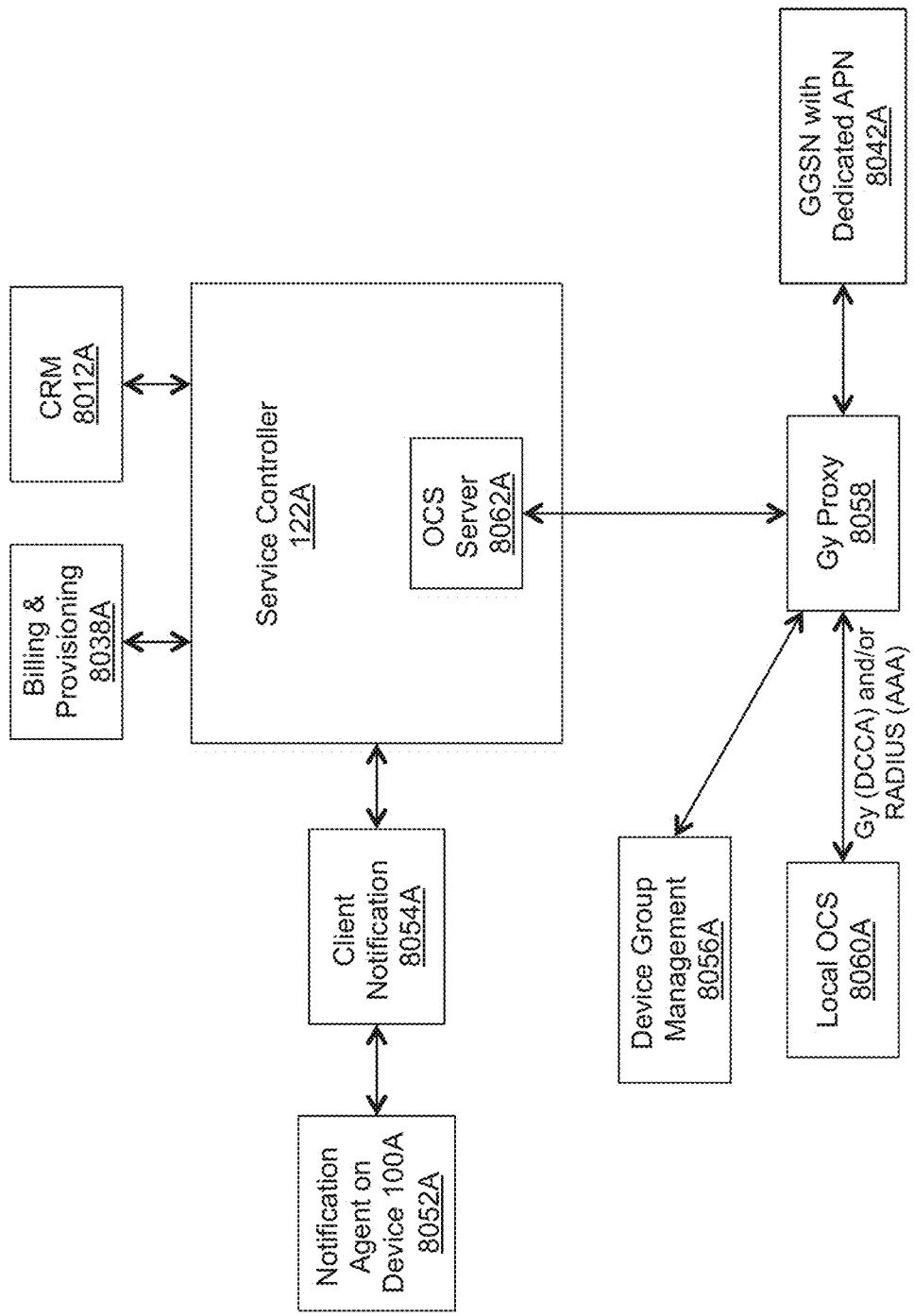
FIG. 28 illustrates a network with a proxy interface between the GGSN and a local OCS and the service controller OCS function in accordance with some embodiments.

In some environments, it is desirable to manage different subscribers across different OCS instances. In one embodiment, it is preferred that the OCS signaling routing be transparent to the core network elements (e.g., HLR, SGSN, GGSN) and also independent of which GGSN the subscriber data session is associated with. In one embodiment, a Diameter Gy proxy/router makes the decision regarding which OCS instance should service the subscriber in real-time. FIG. 28 illustrates a network with a Gy proxy 8058 between the GGSN 8042 and the Local OCS 8060 and the Service Controller OCS 8062 function in accordance with some embodiments.

In one embodiment, the Gy proxy makes the routing determination/decision by inspecting an AVP (e.g., rating group, service-information, or other) in the initial CCR message for a subscriber from the GGSN 8042, looking up the subscriber in a local database (e.g., Device Group Database). In one embodiment, the Gy proxy makes the routing determination/decision by inspecting a service permission or control attribute. In one embodiment, based on the result of the subscriber look-up, the Gy proxy routes the subscriber's session control traffic to the appropriate OCS instance.

The exemplary embodiment shown in FIG. 28 also provides a mechanism to provide different subscribers with different sets of service capabilities without having to hard-code routing rules in the GGSN 8042A. Additionally, in embodiments where the network operator desires to migrate subscribers from one OCS vendor to a different OCS vendor, the Gy proxy may be leveraged to make the migration transparent to the core network. In one embodiment, this is achieved by setting a subscriber (or data session) attribute (as discussed above) that the Gy proxy may inspect. In one embodiment, as the operator migrates subscribers from one OCS platform to the other, it sets the appropriate attribute and the Gy proxy routes the signaling traffic accordingly. In one embodiment, once the migration is complete, the proxy is changed to ignore the setting and route all subscribers to the new OCS platform and then reset/remove the attribute setting.

In one embodiment, there are more than two routing options (e.g., Service Controller 122A and local OCS 8060A). In one embodiment, the routing options also include one or more specific local OCS instances or one or more Service Controller 122A instances.

In one embodiment having Service Controller controlled subscribers, the OCS function resides within the Service Controller 122A. In one embodiment, the Service Controller 122A exposes a Gy Credit Control Server interface to the network. In one embodiment, the Service Controller 122A interacts with the network in the same manner as an OCS does. Additionally, In one embodiment the Service Controller 122A may leverage the capabilities of the Gy interface to receive timely interim data session usage reports by setting the quota time/usage allocations to closely mirror expected device usage reporting windows. See section "Interconnection Between Service Controller and GGSN via a Diameter Proxy/Router" for an exemplary call flow of an embodiment with a Service Controller 122A and GGSN 8042A inter-working via the Gy protocol (alternative protocols e.g. Radius, may be used in lieu of Diameter where Diameter is not supported/desired). In one embodiment, if the Service Controller 122A detects fraud, it may use Gy interface to instruct the GGSN 8042A to terminate a subscriber session, limit the subscriber to a walled garden, change the rating group to charge the subscriber on a bulk rate, or take any other appropriate fraud-mitigation or fraud-response action.

Figure 29:
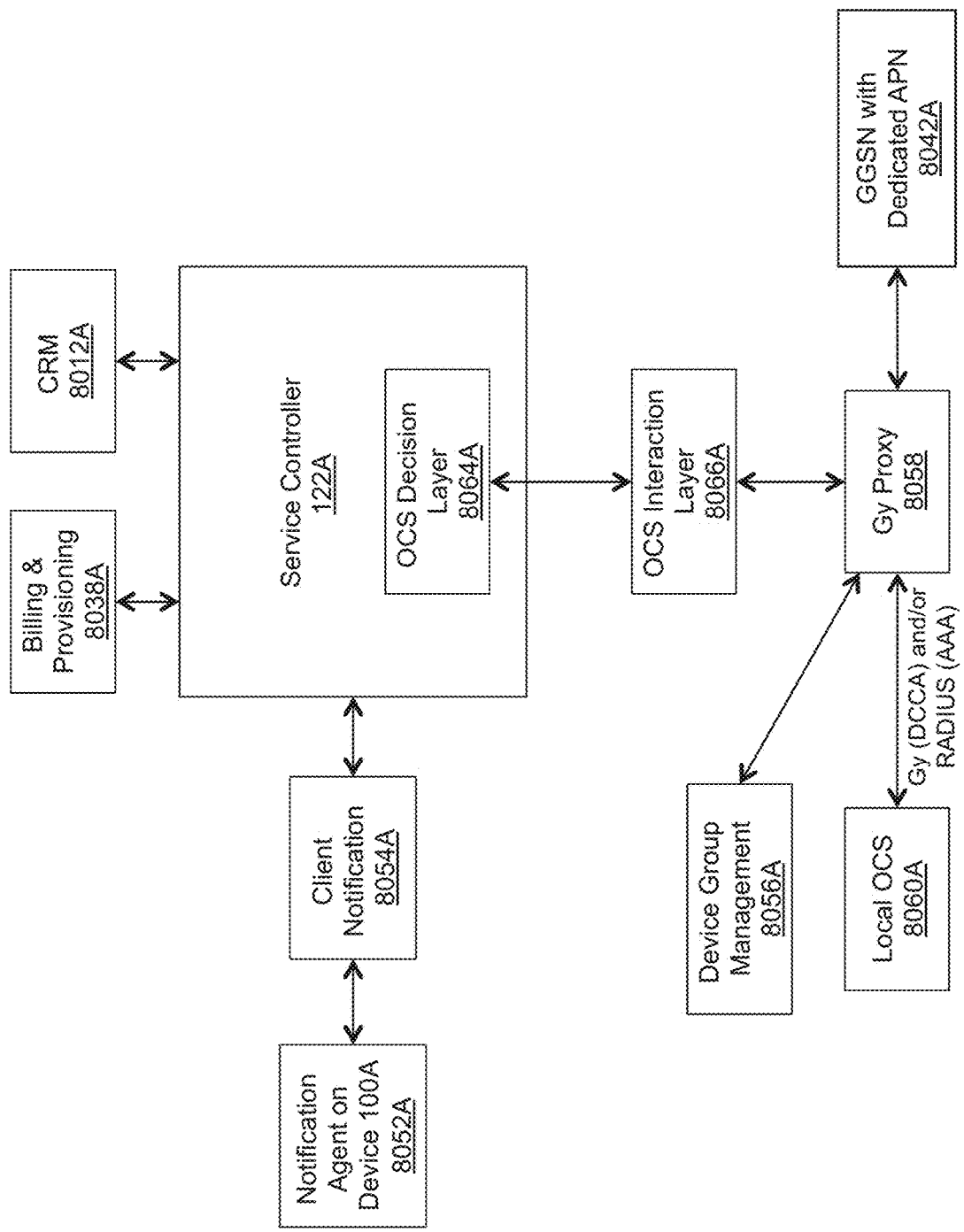
FIG. 29 illustrates an OCS interaction layer in accordance with one embodiment.

Referring to FIG. 29, in larger environments, it is sometimes more practical to separate the core session-service processing from the real-time signaling interface. As shown, in one embodiment, there is an OCS interaction layer 8066A behind the Gy proxy server. In one embodiment, this function is incorporated within the Gy proxy server. In one embodiment, the OCS interaction layer 8066A provides macro level functionality on the signaling plane (via Gy or other suitable protocol) in real-time and provides micro level signaling in near-real-time. In the near-real-time environment, the OCS interaction layer 8066A may implement a web-services over TCP/IP protocol (or other protocol that easily lends itself to a load balanced environment) between the OCS interaction layer 8066A and the OCS 8010A. In one embodiment, the OCS interaction layer 8066A is responsible for managing the session state with the GGSN 8042A (on the front-end) and using the near-real-time interface with the OCS 8010A to make quota and/or policy adjustments that may be updated in the GGSN 8042A immediately (e.g., via RAR/RAA initiated by the OCS interaction layer 8066A) or deferred until the next quota update is received (e.g., CCR/CCA interchange initiated by the GGSN).

One advantage of the exemplary embodiment shown in FIG. 29 is that since the near-real-time interface between the OCS interaction layer 8066A and the OCS 8010A may be implemented using a protocol (or suite of protocols) that lends itself to load balancing and stateless processing, the OCS function may be easily (and more cost effectively) load balanced and scaled across multiple OCS instances and even across multiple geo-locations without degrading the real-time signaling response times.

In some environments in which there are either multiple GGSN vendors and/or the GGSN capabilities are non-homogenous, it is desirable for the operator to maintain a consistent policy set definition and implementation at the OCS and GGSNs (e.g., neither the OCS nor the GGSN should not have to implement different policy based on the vendor and/or capabilities of the other component). To meet this objective, in one embodiment, such as the exemplary embodiment shown in FIG. 30, a GGSN Adapter layer 8068A is introduced. In one embodiment, the GGSN Adapter layer 8068A converts a single OCS<→GGSN policy set into a policy set that is supported by both ends. In one embodiment, this enables the network operator to define a single policy set and then have the adapter layer 8068A translate it to support the various endpoints (e.g., GGSNs and OCSs). In one embodiment, the GGSN Adapter layer 8068A is incorporated into the Gy proxy 8058. In one embodiment, the GGSN Adapter layer 8068A is incorporated into the OCS interaction layer 8066A. In one embodiment, the GGSN Adapter layer 8068A is incorporated into the Service Controller 122A.

Figure 30:
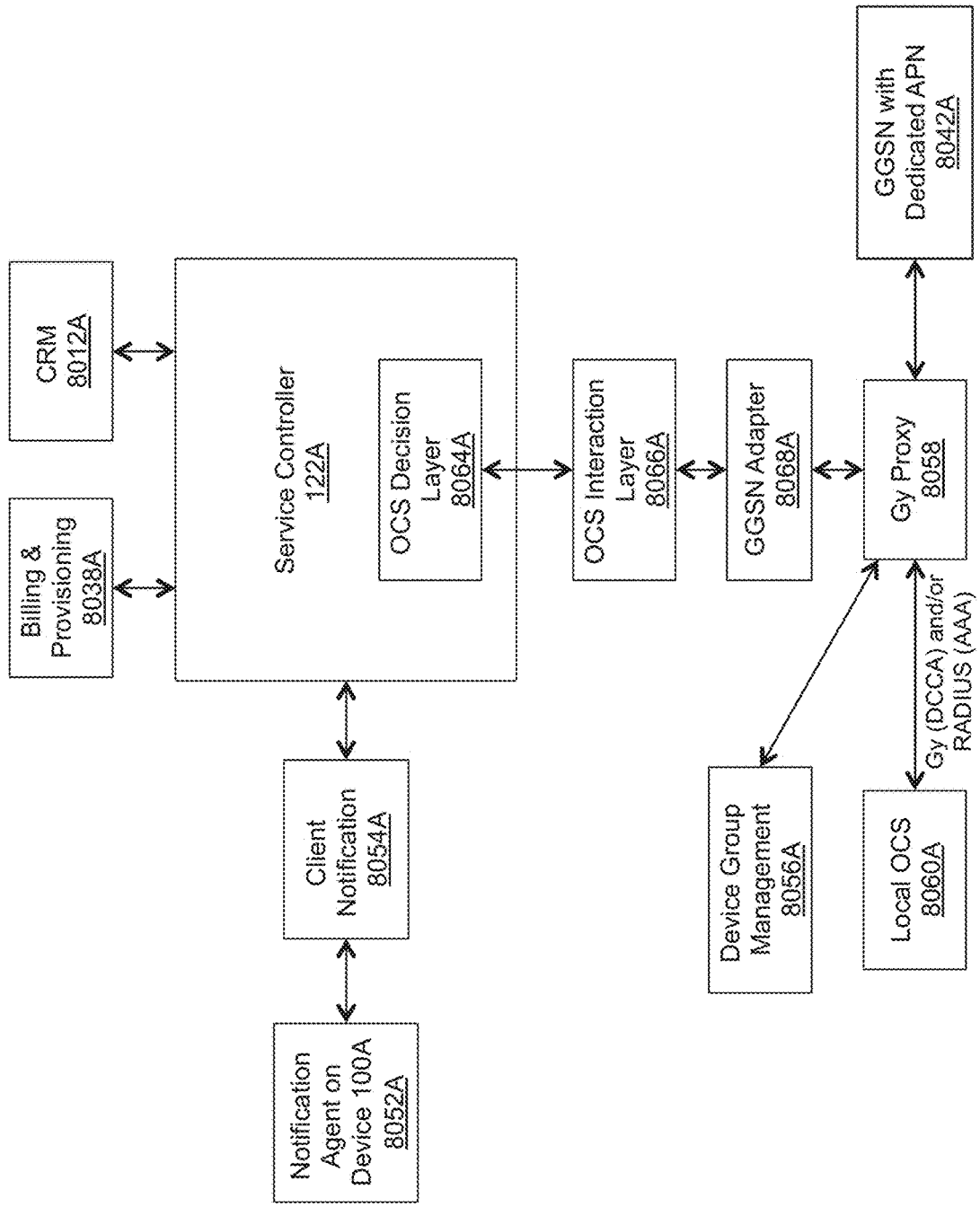
FIG. 30 illustrates a GGSN adapter layer in accordance with one embodiment.

In a multi-vendor GGSN environment, this exemplary embodiment of FIG. 30 allows the network operator to define a single policy set for all OCSs and then let the GGSN Adapter layer 8068A interact and communicate that policy with the GGSN 8042A in a manner that is supported by the GGSN.

In a multi-vendor OCS environment, the exemplary embodiment of FIG. 30 allows the network operator to define a single policy set implementation in the GGSN 8042A and the GGSN Adapter layer 8068A interacts with the OCS 8060A in a manner that is supported by the OCS 8060A.

Figure 31:
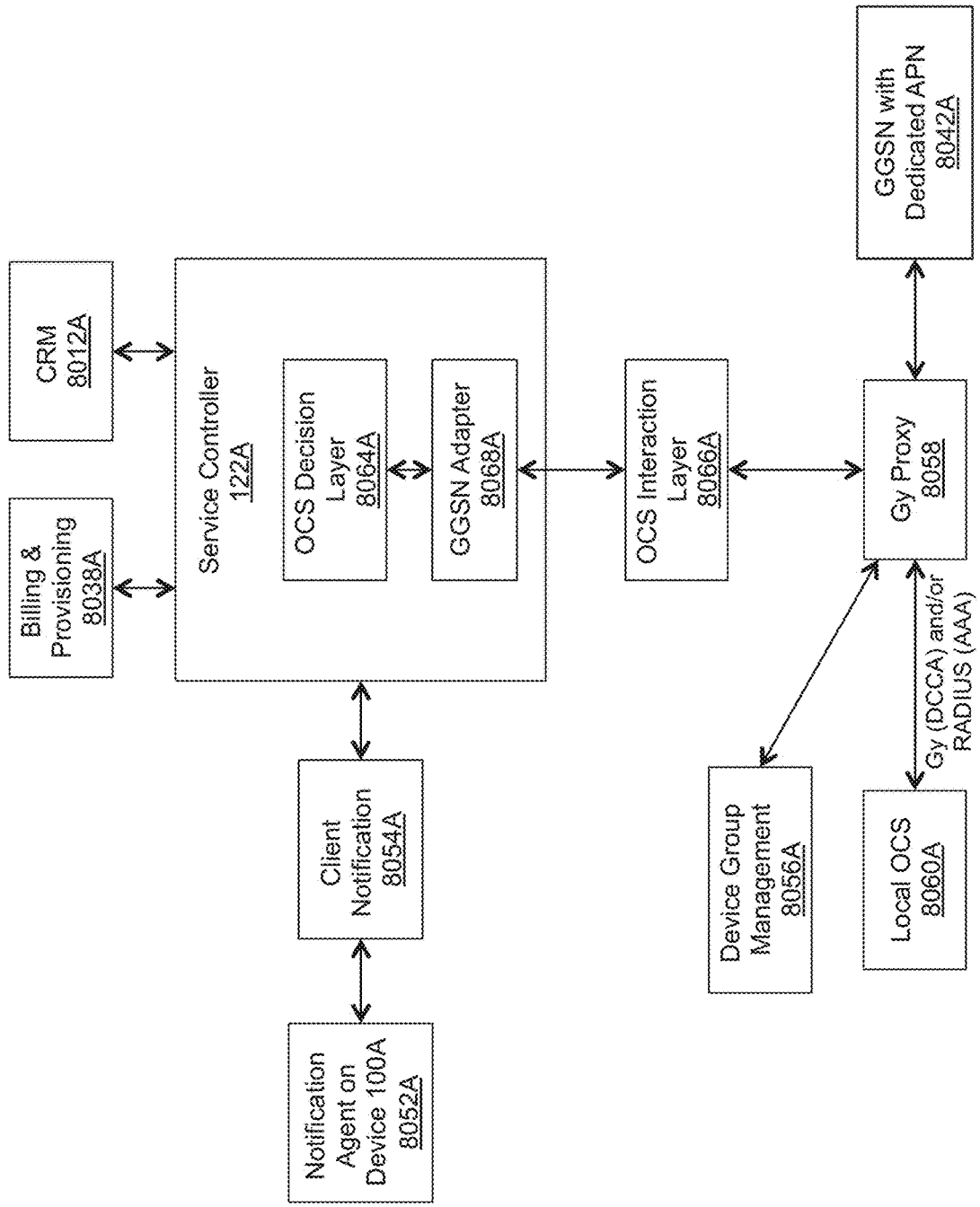
FIG. 31 illustrates that the GGSN adapter layer may reside in front of or behind the OCS interaction layer in accordance with one embodiment.

Referring to FIG. 31, the GGSN Adapter layer 8068A may reside in front of or behind the OCS Interaction layer 8066A. In one embodiment, these two components physically reside in the Gy proxy 8058. In one embodiment, these two components physically reside in the Service Controller 122A. In one embodiment, these two components are separate entities. In one embodiment, these two components are combined into a single function that is either stand-alone or integrated into the Gy proxy 8058 or the Service Controller 122A.

In one embodiment, the entire OCS functionality is moved to a cloud-based architecture. These embodiments provide a high level of scalability and redundancy while reducing overall operational costs associated with physical OCS servers. In one embodiment of a cloud-based architecture, the OCS Interaction layer 8066A is hosted in the operator network.

In one embodiment, the OCS Interaction layer 8066A, acting as a Gy server end-point, performs the real-time Gy signaling locally with the GGSN 8042A as described above, manages the Gy subscriber session (and session state) with the GGSN 8042A, and ensures that signaling SLAs are not impacted by moving the core OCS functionality into the cloud. In one embodiment, the near-real-time interaction with the Service Controller 122 over the web services interface is handled by the Service Controller Cloud 8036. In one embodiment, the session statefulness (e.g., quota allocations, quota leases, enabled services, etc.) of the session is persisted in a cloud server database that is replicated across the cloud so that any Service Controller 122A node may process any request from any OCS Interaction layer 8066A.

In one embodiment, by leveraging the combination of maintaining macro state in the cloud and using a protocol set (e.g., web services over TCP/IP) that lends itself to load balancing and resilience, any request may be serviced through any OCS instance in the cloud. In one embodiment, a high level of fault-tolerance is provided without duplicating dedicated OCS nodes and direct connectivity between GGSN locations (e.g., N+K redundancy vs. N+1 redundancy at a GGSN location). Additionally, in one embodiment, signaling SLAs are adhered to regardless of transport delays the processing complexity being performed by the OCS in the cloud.

In one embodiment, there is no need to implement redundant Gy signaling between the GGSN and the individual OCSs, nor is there a need to perform special routing to map a subscriber to a specific instance of an OCS since any Service Controller node may service the subscriber.

Figure 32:
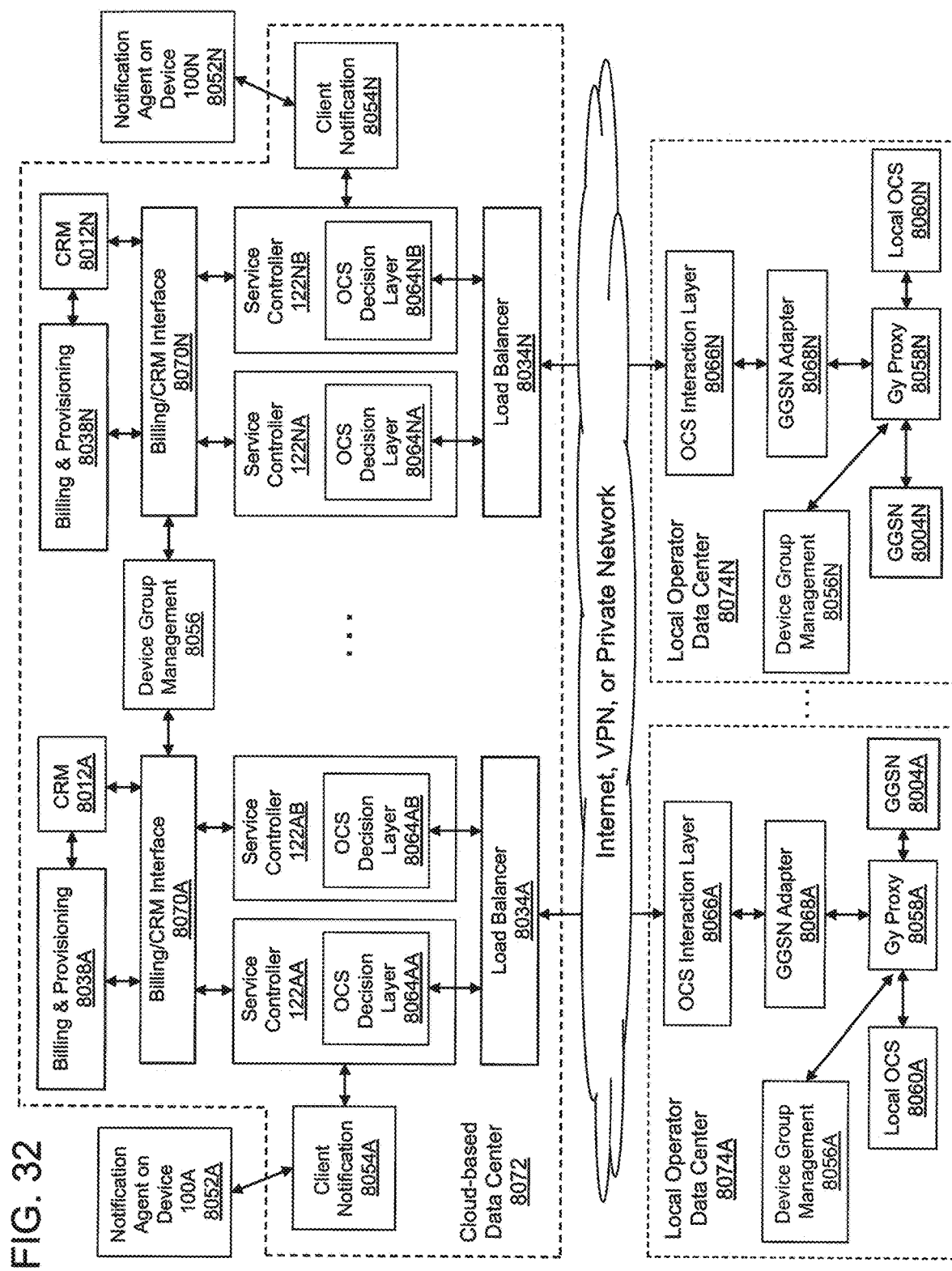
FIG. 32 illustrates a cloud-based OCS with a proxy interface, OCS service gateway, and GGSN adapters in a dedicated operating environment in accordance with one embodiment.

In one embodiment, since the architecture of the cloud is now transparent to the local GGSN/core signaling network elements, the cloud architecture and deployment environment is designed to support multiple operators in a variety of ways. In a basic configuration, such as the exemplary embodiment shown in FIG. 32, the cloud is set up so that a network operator has a dedicated entry point (e.g., load balancer/front-end server (e.g., Apache Instance)) and dedicated operating environment. In some such embodiments, the capabilities and benefits of the cloud are leveraged by the network operator, but a network operator has a dedicated operating environment. In one embodiment, the service provider also benefits by minimizing the number of physical location supporting the cloud infrastructure and building capacity at a physical cloud location.

Figure 33:
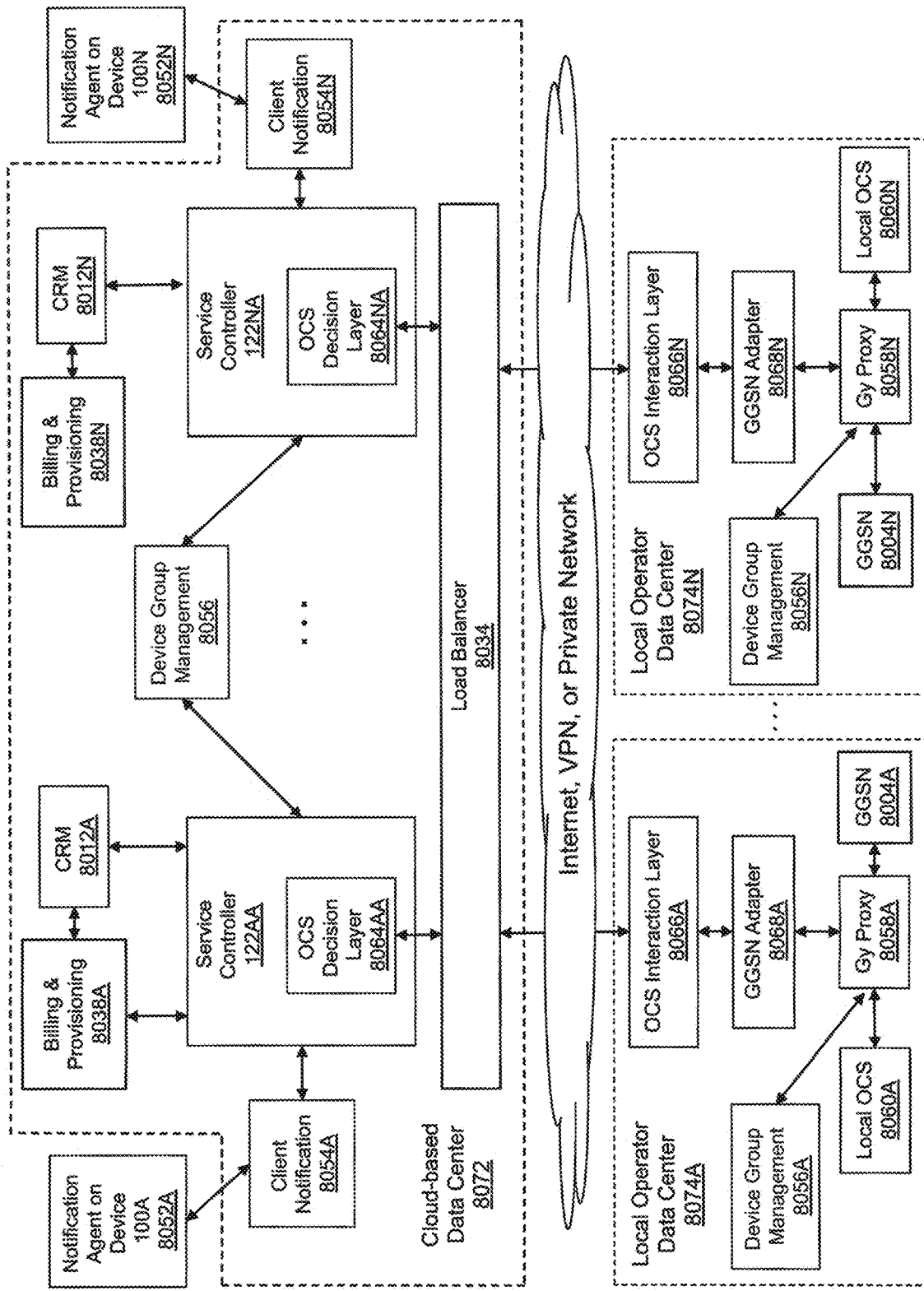
FIG. 33 illustrates a cloud-based OCS where the cloud is deployed in a shared-access architecture in accordance with one embodiment.

In one embodiment, such as the exemplary embodiment shown in FIG. 33, the cloud is deployed in a shared-access architecture. In some such embodiments, all network operators share the same entry point (e.g., load balancer) and then the entry point is responsible for routing traffic to the appropriate service controller instance. The load balancer may make the routing decision in a variety of ways, including inspecting information in the traffic packet (e.g., host name, header tag, information in the request/response message, etc.). One benefit of this architecture is that it allows the service provider to manage the ingress/egress points as a single entity, thereby reducing cost and complexity associated with operating the service.

In one embodiment, such as the exemplary embodiment shown in FIG. 33, the entry point is shared, but a network operator has a dedicated Service Controller instance. In one embodiment, a modification enables a "share everything" architecture. In one embodiment, one or more resources of the cloud are shared by all network operators, and software is used to manage access and control at the database layer. One advantage of "share everything" architecture is that it enables all of the network operators to have "capacity on demand" without the service provider dedicating extra cloud resources specifically for that network operator. The "share everything" environment may be a cost effective implementation for the network operators and service operator.

In one embodiment, such as the exemplary embodiment shown in FIG. 33, a single network operator (MNO) hosts multiple mobile virtual network operators (MVNOs). In one embodiment, because the core network is shared by the MNO as well as the MVNOs, it is practical to assume that access to the cloud may all originate from the same network signaling elements (e.g., GGSNs, HAs, etc.). In some such embodiments, a multi-tenant Service Controller 122 enables the MVNOs to leverage and implement their own OCS capabilities and policies without requiring the host MNO to implement the MVNO-specific rating/policy on its OCS (thereby reducing the requirement for the MNO to potentially have to augment its OCS infrastructure to support its MVNOs).

In some multi-tenant Service Controller embodiments, the MVNOs and the MNO share physical resources by leveraging software to control/limit access to an entity's own data. In some multi-tenant Service Controller embodiments, the MVNOs and the MNO leverage separate physical components for an operating entity (e.g., separate databases, application servers, etc.).

As would be understood by a person having ordinary of skill in the art in view of the disclosures herein, there are many variations on the cloud-based architecture and implementation, and the embodiments presented herein are exemplary and not intended to be limiting.

An evolving component of OCS policy is end-user notification. It may be important to keep the end-user informed about his or her service plan and policy (e.g., usage thresholds, service plan cap, roaming costs and cost estimates, etc.). In one embodiment, because the OCS is managing these aspects of the service plan, the network system detects notification conditions and sends notifications of these conditions to the end-user device. In one embodiment, the Service Controller 122 is configured with the conditions of when to send notification messages to the end-user (e.g., 75% of plan used, 100% of plan used, roaming alert, roaming costs, etc.), and the OCS is aware of the rules. In one embodiment, because the OCS is managing the session and quota allocations, the OCS maps the notification rules to the session management rules and generates triggers to the notification agent on the Service Controller 122. In one embodiment, the Service Controller 122 generates the notification for the end-user and interacts with the Notification Delivery server to have the notifications delivered to the end-user in real-time (or near-real-time).

In one embodiment, the notification manager provides timely notifications to the end-user when service is being blocked (e.g., user has reached 100% plan limit, user is attempting to access a service that is not included in the end-user's service plan, etc.).

In one embodiment, the notification message enables an instant-purchase opportunity on the device when a notification is shown (e.g., at 100% of plan, offer service add-ons to enable the user to keep using services; when the user attempts to access a service that is not included in his plan, provide an offer to purchase the service capability; when the user starts roaming, offer a roaming bundle/add-on; warn of high-data-usage application and offer a lower cost plan alternative, etc.). This solution provides a revenue-generating opportunity for the network operator and a better experience for the end-user.

Figure 34:
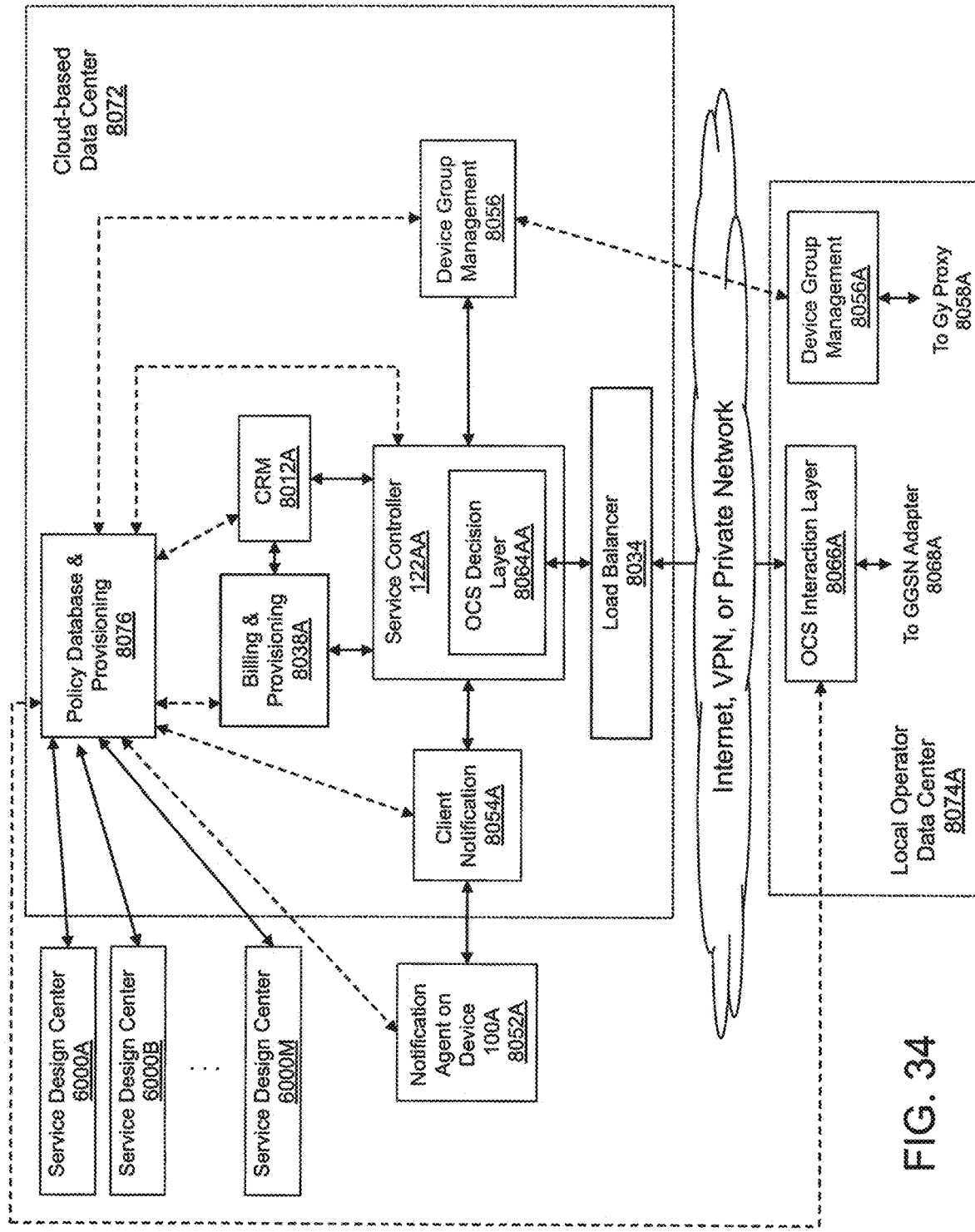
FIG. 34 illustrates an exemplary embodiment of a virtual OCS implementation in which there is a service design center (SDC) for creating and managing rules and policies.

FIG. 34 illustrates an exemplary embodiment of a virtual OCS implementation in which there is a Service Design Center (SDC) 6000A for creating and managing rules and policies. The SDC 6000A enables the operating entities (e.g., MNO, MVNO, wireless service partner, etc.) to create and manage their own policies. In one embodiment, the SDC 6000A allows the operating entity to assign devices (and/or subscribers) to device groups to provide differentiated offers and controls based on desired segmentation (e.g., device type, device OEM, subscriber demographic, retail channel partner, etc.).

In one embodiment, the device group management function 8056 in the SDC 6000A is leveraged to segment Service Controller managed devices vs. non-Service Controller managed devices. In one embodiment, segmentation uses a device group management database that is queried by the local Gy proxy/router agent. In one embodiment, segmentation uses APN routing rules in the GGSN 8004. In one embodiment, segmentation uses Mobile IP realm-based routing in the GGSN 8004. In one embodiment, segmentation uses subscriber service profile attribute inspection at the Gy proxy/router 8058A. In one embodiment, segmentation allows a wireless service provider to split the session handling based on roaming state (e.g., enable cloud OCS for non-roaming embodiments and legacy OCS for roaming and vice versa, etc.), or other types of service state information (e.g., WiFi vs. cellular network, 3G vs. 4G network, etc.).

In one embodiment, because the OCS implementation is virtualized in the cloud, a wireless service provider creates its own services independently of the host MNO. In one embodiment, because of the policy management is handled in the cloud, the wireless service provider enters its own policies without engaging the MNO to program the policy and rating rules into a physical OCS platform. In one embodiment, because the wireless service provider's policies are managed independently from the MNO (and other wireless service providers), there are reduced concerns about policy conflicts among the wireless service providers or about assigning a policy to the wrong wireless service provider.

In one embodiment, after the wireless service provider creates a policy set, the service provider beta tests the policy by associating it with devices within a beta test device group. In one embodiment, the beta test group enables the wireless service provider to deploy a policy set in a controlled manner, test the policy set, update it, and re-test in a real-time manner. In one embodiment, once the policy set is working in the manner that the wireless service provider desires, the wireless service provider publishes the policy set to a broader range of devices by enabling the policy set in a device group.

In one embodiment, such as for local breakout environments, the virtualized cloud service interacts with the roaming network in the same manner as it would if the subscriber were on its home network. In one embodiment, by leveraging the cloud-based solution, the home operator provides a seamless set of capabilities across all network conditions with minimal integration requirements and complexity with the roaming operator since policy is managed by the cloud and not by a physical server in the roaming partner network.

In one embodiment, by leveraging the capabilities of the cloud solution, almost any entity is easily enabled to provide branded wireless services to their customers or partners. In one embodiment, since the service creation environment is built in the cloud, the MNO only needs to provide access to the entity that wants to sell wireless service. In one embodiment, because the host MNO may not need to implement specific service plan and policy configuration on its own network, the MNO may turn up new MVNOs quickly without requiring a lot of man-power to support them. In one embodiment, by using the SDC, the MNO creates a sub-portal for the MVNO on the SDC. From there, the MVNO may create service offers, branding, policy, and notifications and then map the service offerings to its device groups. The host MNO may not need to be involved in the process.

In one embodiment, the cloud configuration also supports the ability to transition devices from one MNO to another MNO without having to modify network configuration at either MNO. In one embodiment, there is a "global" MNO, and devices are initially assigned to a device group that is managed by the global MNO. Upon initial device activation, the end-user selects his preferred local MNO (or MVNO, service partner, etc.). In one embodiment, at this point the subscriber is automatically provisioned on the selected network, and the device is moved to a device group that is managed by the selected wireless service provider. In one embodiment, the end user then is offered a set of service plans associated with the wireless service provider, and the user enrolls for service with that wireless service provider. In one embodiment, as part of the process, the branding on the device is updated to reflect the branding of the selected wireless service provider. In one embodiment, this branding may reside locally on the device. In one embodiment, it may be automatically downloaded to the device over the air.

As discussed previously, one of the challenges of moving OCS capability to a cloud environment is conforming to the signaling SLAs mandated by the various standards bodies (and any signaling SLAs that the network operator may impose). In one embodiment, to ensure that the signaling SLAs are adhered to, and may be managed effectively, the capabilities of the cloud are split into two layers—micro control and macro control. In one embodiment, micro control is implemented at the OCS interaction layer 8066, which signals with the network elements via Diameter (or other suitable protocol) in real-time, and then the OCS interaction layer interacts with the OCS decision layer in the cloud in near-real-time. In one embodiment, the OCS interaction layer 8066 makes adjustments in real-time policy based on feedback received from the OCS decision layer in the cloud. In one embodiment, to accomplish this, the OCS interaction layer 8066 updates the OCS decision layer in the cloud when the GGSN 8004 (or HA) request additional quotes (e.g., CCR/CCA exchange). In one embodiment, in real-time the OCS interaction layer 8066 returns a quota allocation back to the GGSN 8004 so the session may continue. In one embodiment, if the OCS decision layer 8064 determines that an adjustment of policy is required, it sends a message to the OCS interaction layer 8066 and may flag the policy change to be immediate, deferred until next quota update request, or deferred until some point in the future based on time or usage. In one embodiment, in the case of an immediate policy change, the OCS interaction layer 8066 may issue a reauthorization (e.g., Diameter RAR/RAA or RADIUS Change of Authorization (CoA) request to the GGSN (or HA) 8004. In one embodiment, this message causes the GGSN 8004 to update the current quota to the OCS interaction layer 8066 and then enables the OCS interaction layer 8066 to provide new policy to the GGSN 8004. The new policy could be a complete change in rating groups or rule bases (e.g., subscriber added/removed/changed plans) or could be a modification to the quota refresh limits (e.g., subscriber reaching a specific plan threshold utilization (50%, 75%, 100%, 110%, etc.)).

Moving the near-real-time signaling to the cloud (via the OCS decision layer) enables the operator to de-couple elements of policy from the real-time systems and provide enhanced capabilities (e.g., notifications, QoS, etc.) that may be managed in near-real-time and distributed in a cloud architecture, thus lowering equipment costs and network complexity by not requiring the real-time systems to manage both real-time signaling (vs. SLA requirements) as well as ancillary policy decisions (e.g., QoS, notifications, capabilities, etc.).

In one embodiment, because all of the policy is managed via software in the cloud, the operator (or any other service provider providing service on the operator's network (e.g., MVNO, etc.)) may easily make policy changes and test them without impacting the general subscriber base or another service provider partner's subscribers. This enables the operator to adapt and roll out new policy in a more timely and efficient process.

Figure 35:
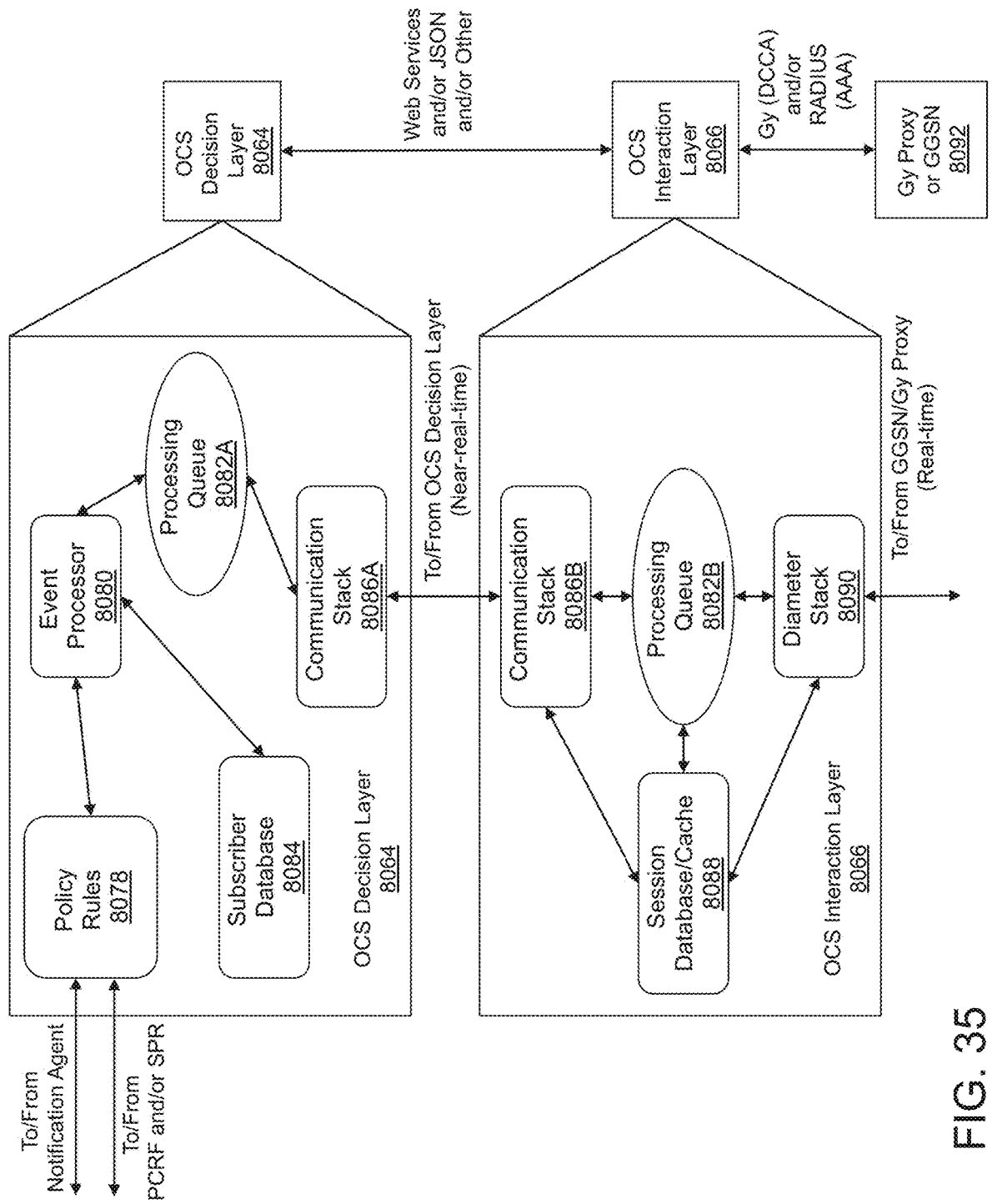
FIG. 35 illustrates a detailed implementation of the OCS interaction layer and the OCS decision layer in accordance with some embodiments.

FIG. 35 illustrates a detailed implementation of the OCS Interaction Layer 8066 and the OCS Decision Layer 8064 in accordance with some embodiments. In FIG. 35, the OCS Interaction Layer 8066, which is usually a light-weight application, responds to credit control requests received from the GGSN in real-time. In one embodiment, the OCS Interaction Layer 8066 leverages a fast in-memory Session DB/Cache and minimal business logic and rules to ensure that it may respond quickly to GGSN credit control requests.

In one embodiment, the OCS Interaction Layer 8066 communicates with the OCS Decision Layer 8064 in near real-time to update it with the latest credit-control information received from the GGSN 8092. In one embodiment, the interface between the OCS Decision Layer 8064 and OCS Interaction Layer 8066 is based on a web services, JSON, WSDL, or another type of protocol that lends itself easily to transaction based processing and load balancing. Since Policy Rules 8078 and Subscriber DB 8084 may reside outside of the specific instance of an OCS Decision Layer Node 8064, it permits any OCS Decision Layer Node 8064 to process any message from any OCS Interaction Layer Node 8066. This architecture makes scalability on OCS Decision Layer 8064, where the heavier processing is required, easy to achieve in a lower cost model than directly coupling the complete OCS to a GGSN.

In one embodiment, the OCS Decision Layer 8064 is responsible for one or more of: processing the credit control related updates from the OCS Interaction Layer 8066, checking the events, updating usage and checking subscriber state against the policy rules associated with subscriber. In one embodiment, based on the outcome of the update processing, if required, the OCS Decision Layer 8064 makes a policy adjustment and updates the subscriber policy to the OCS Interaction Layer 8066. In one embodiment, the OCS Decision Layer 8064 sets a priority (or equivalent indicator or flag in the policy) to the OCS Interaction Layer 8066 to indicate whether the policy update should take place immediately or wait until the next policy event for the subscriber is received from the GGSN.

In one embodiment, the OCS Decision Layer 8064 interworks with other policy elements (e.g., PCRF, Notification element, etc.) to inform the policy management element of an update in a rating group (e.g., usage amount at a particular limit (e.g., 50% of plan, 100% of plan, attempted usage of a service for which the user has not subscribed to (e.g., streaming service without a streaming plan, etc.). In one embodiment, the event triggers a notification to the subscriber, wherein the notification is presented through the device. In one embodiment, this notification includes an offer to purchase a service plan that enables the blocked or restricted activity. In one embodiment, the event triggers a QoS or rate limit policy to be installed and enforced (e.g., rate limit to 128 Kbps when usage reaches 100% of plan limit, etc.).

In one embodiment, to minimize the amount of data leakage between the time that the OCS Interaction Layer 8066 gives an updated quota response to the GGSN 8092 and when the OCS Decision Layer 8064 actually processes the update, the OCS Interaction Layer 8066 interworks with the GGSN 8092 to instruct it to request additional quota prior to the current usage allotment completely expiring in the GGSN (e.g., buffer data—Set a policy to allow 10 MB of data usage, but request additional quota when there is 0.5 MB of usage allowance remaining in the quota allocation).

In some such embodiments, if the OCS Decision Layer 8064 responds to the OCS Interaction Layer 8066 with a policy adjustment prior to the user using the "buffer" data, then the user would have not exceeded the limits of his plan.

In one embodiment, these micro quotas enable "plan lease." In plan lease, when the user purchases a service the OCS automatically provides a small amount of service quota for the service being purchased while the billing transaction is being processed. This enables the user to start using the service immediately rather than wait for the billing transaction to complete, which may take enough time that a waiting user might become frustrated. In one embodiment, when the billing transaction completes, if it is successful, the payment processing system notifies the OCS Decision Layer 8064 about the outcome of the payment processing request. In one embodiment, if the payment processing was successful, the OCS Decision Layer 8064 provides a "normal" quota allocation for that service and notifies/updates the OCS Interaction Layer 8066 to enable it to provide the end user with continued access to the service. In one embodiment, if the payment processing was unsuccessful, the OCS Decision Layer 8064 sends a message to a notification element or agent to notify the end user that the payment processing failed and, optionally, allow the end user to enter new payment information (e.g., new credit/debit card information, new top-up number, etc.). In some such embodiments, the OCS Decision Layer 8064 would notify/update the OCS Interaction Layer 8066 to disallow continued service for that subscriber on this particular service plan. In one embodiment, based on instructions from the OCS Decision Layer 8064, the OCS Interaction Layer 8066 disallows continued service immediately. In one embodiment, the OCS Interaction Layer 8066 allows the existing micro-quota grant to expire and then does not grant additional quota (e.g., this would allow the service to continue to operate for the end user while he entered new payment information).

In one embodiment, plan lease enables a "grace period" when a service plan expires. In one embodiment, when the plan expires (based on time or usage), a notification is sent to the end user to prompt the user to purchase additional service. In one embodiment, while the end user is purchasing additional service, the network allows access to the service (e.g., this allows streaming services or downloads to continue without interruption, etc.) though the use of the plan lease. In one embodiment, if the user's purchase is successful, the time/usage that was consumed during the purchase process is included in the new purchased service plan limits. In one embodiment, when the user's purchase is successful the time/usage that was consumed during the purchase process is excluded from the new purchased service plan limits.

In one embodiment, the policy sets and allowances vary based on network state (e.g., roaming, time of day, level of network congestion). In some such embodiments, the OCS Decision Layer 8064 interworks with other network elements to receive information about congestion level, roaming state, etc., to modify and manage subscriber policy to achieve the overall policy goals. In one embodiment, the policy goals are related to usage limits or spending amounts. In one embodiment, the policy goals are to manage overall user experience (e.g., rate limit streaming services when the network is congested, etc.).

Many of the embodiments disclosed herein may be easily extended to support multiple rating groups per subscriber. In one embodiment, rating groups are tied to different service plans that are currently active for the subscriber (e.g., Sponsored services, general browsing services, VoIP services, etc.). In one embodiment, a rating group is assigned its own quota and access rules. In one embodiment with GGSN/PCEF, a service plan is associated with an access rule definition and priority. In one embodiment, where required, the access associated with a service plan is associated with a QoS level (e.g., higher priority for VoIP, etc.). In one embodiment, within a rating group, the policies associated for handling overage, etc., may be managed independently of the other active services (e.g., overage on a download service may be allowed where overage on an open access or sponsored service may not). Moving all of this business logic into the OCS Decision Layer 8064 ensures that the overall signaling time between the OCS and the GGSN is not degraded. Moreover, as the business logic surrounding the handling of usage polices becomes even more complex, it provides a more robust environment that scales at lower costs. Because the OCS Decision Layer 8064 may also be distributed in the cloud, it enables the network operator to scale the OCS Decision Layer 8064 to accommodate the peak loads of the entire network, not on a site by site basis.

In one embodiment, the operator establishes rating groups in the GGSN that are associated with specific network end-points (e.g., web sites, domains, IP addresses, ports, etc.) or classifications of service (e.g., streaming audio/video, VoIP, peer-to-peer, etc.), and the OCS Interaction Layer 8066 is configured to deny user quota when user access is matched to one of these the rating groups and the GGSN attempts to request a quota allocation for that rating group. In one embodiment, the OCS Interaction (or OCS Decision) Layer is further configured to interwork with a Notification agent or network element to display a notification to the end user about the usage being blocked. In one embodiment, the notification may include an offer to purchase service to support the attempted activity. In other embodiments, it may alert the user to non-supported usage. In one embodiment, the OCS Interaction Layer 8066 is configured to allow access on the rating group, but still triggers a notification to the end user when the quota allocation is requested by the GGSN. In one embodiment, the policy associated with the rating group rate-limits the service associated with the rating group, and the notification to the end user indicates that the service is being rate-limited, and the device presents the end user with the option to purchase a service plan that provides a different (e.g., non-rate limited) service to the activity.

In one embodiment, the modification of policy within a rating group is controlled by setting the priority search order of the traffic inspection rules and their corresponding rating group (e.g., streaming access is categorized and associated with two different rating groups (one rating group for rate-limited services and one rating group for non-rate-limited services)) in the GGSN; however, only one rating group is active at any given time for a specific subscriber. In one embodiment, the determination of which rating groups to associate with a subscriber is controlled via the interworking of the PCRF, SPR, OCS and the GGSN/PCEF. For example, when a subscriber purchases a service, that service is associated with the subscriber record in the SPR and OCS. When the subscriber initiates a data session, the PCRF queries the SPR for the subscriber services and then sends down the appropriate policy IDs to enforce at the GGSN/PCEF. When the user attempts to use the service, the GGSN queries the OCS for quota allocation for the rating group associated with the service. If the subscriber is not subscribed to the service and the operator wants to differentially treat (e.g., rate-limit, block, etc.) and/or notify the end user, the PCRF sends the policy ID associated with the differentially treated service to the GGSN/PCEF. When the end user attempts to use the service, he gets the differentially-treated behavior instead. In one embodiment, the rules in the OCS Decision Layer 8064, at the time of quota request to use the differentially-treated service, are configured to send a notification to the end user to notify him that the service is being differentially treated (e.g., rate-limited, blocked, etc.) and then provide an option to purchase the different (e.g., non-restricted) service.

In one embodiment, such as the exemplary embodiment shown in FIG. 35, the OCS Interaction Layer 8066 is directly connected to the GGSN and communicates with the GGSN 8092 via Diameter Gy directly. In one embodiment, such as the exemplary embodiment shown in FIG. 36, the OCS Interaction Layer 8066 is connected to one or more GGSNs 8004A through N via a Diameter Proxy 8094. In some such embodiments, the Operator scales OCS Interaction Layer 8066 servers that are associated with a set of GGSNs without having to either modify the GGSN configuration or map specific users to specific instances of an OCS Interaction Layer server. This configuration allows the operator to implement and scale a site in an "n+1" (e.g., one backup OCS Interaction Layer server for the site) rather an "n+k" (e.g., an OCS Interaction Layer server has a hot/warm/load-balanced stand-by node). One benefit is that the cost to scale in an n+1 configuration may be less than scaling in an n+k configuration, and it allows the OCS Interaction Layer servers to be in an operational mode, rather than keeping one or more of them in a stand-by mode.

Figure 36:
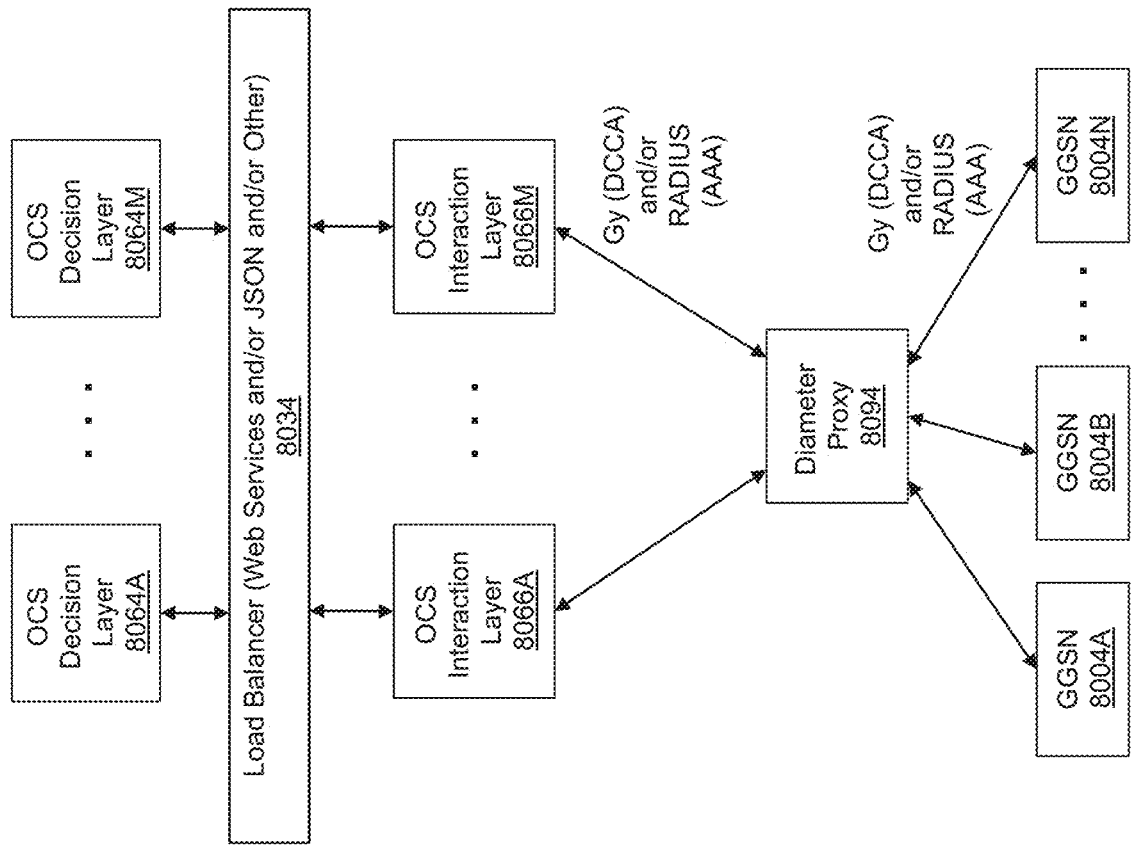
FIG. 36 illustrates a detailed implementation of the OCS interaction layer connected to GGSN via a proxy in accordance with some embodiments.

In one embodiment, such as the exemplary embodiment shown in FIG. 36, a tier may scale independently of the others, and capacity may be added at a tier on an as-needed basis. Furthermore, since the OCS Decision Layer 8064 may be centralized (e.g., in a cloud-type deployment), multiple physical sites may connect to one or more consolidated OCS Decision Layer servers in the cloud. This further enables to Operator to consolidate other OSS/BSS systems that interconnect with the OCS Decision Layer 8064 (e.g., notification elements or agents, PCRF, SPR, etc.) since the business logic implemented by the OCS is now also consolidated, rather than distributed across multiple physical GGSN sites. Since signaling time between the OCS Interaction Layer and the OCS Decision Layer 8064 may not be particularly time sensitive (e.g., seconds vs. milliseconds), connectivity between the OCS Interaction Layer 8066 and the OCS Decision Layer 8064 may be implemented with standard internet connectivity (e.g., VPN, site-to-site tunnels, etc.) and may not expect more complex interconnects such as MPLS or dedicated connectivity (e.g., dedicated T1/T3 circuits, etc.) further allowing the operator to save costs on networking deployment and infrastructure.

Figure 37:
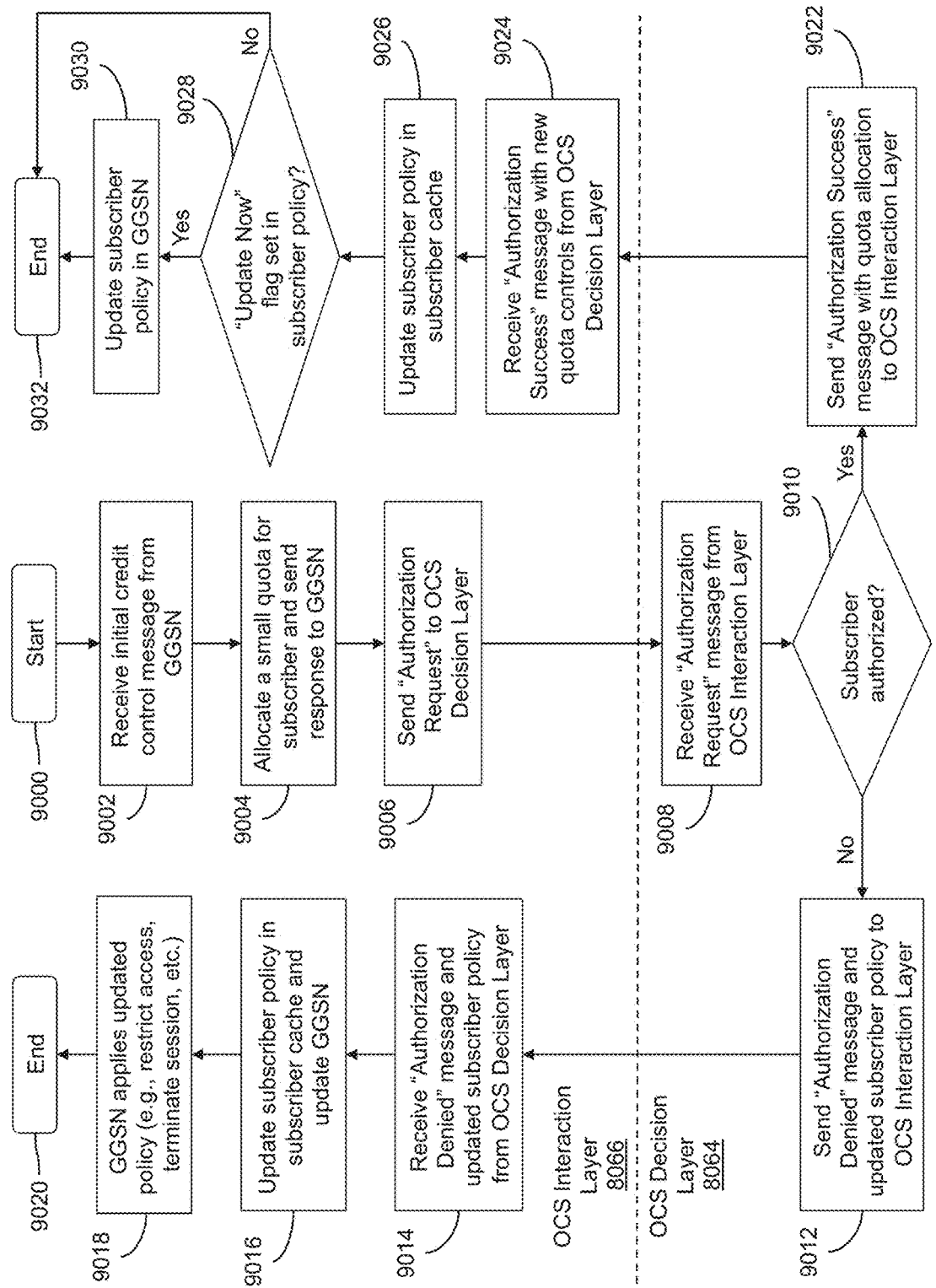
FIG. 37 is an example flow diagram that describes the interaction of the OCS interaction layer with the OCS decision layer on the initial credit control request for a subscriber in accordance with some embodiments.

FIG. 37 is an example flow diagram that describes the interaction of the OCS Interaction Layer 8066 with the OCS Decision Layer 8064 on the initial credit control request (e.g., the first credit control request that includes a request for usage quota allocation) for a subscriber in accordance with some embodiments. In the flow chart, the process starts in box 9000. In 9002, the OCS Interaction Layer 8066 receives an initial credit control request, from the GGSN, for example. The credit control request may comprise a request for quota allocation for a subscriber. The OCS Interaction Layer 8066 allocates a small quota (e.g., a small amount of usage bytes (e.g. 1 MB) or a small amount of time (e.g., 15 seconds), or a combination of the parameters) for the subscriber and responds, in box 9004, to the credit control request from the GGSN with the default initial quota limits. In this phase, the OCS Interaction Layer 8066 may also create an entry in the Session DB/Cache. In box 9006, the OCS Interaction Layer 8066 then sends an "authorization request" message to the OCS Decision Layer 8064. This message may be sent in the background since the quota allocation request has already been serviced (in box 9004).

In box 9008, the OCS Decision Layer 8064 receives the quota allocation request or an authorization request message from the OCS Interaction Layer 8066 and, in box 9010, validates whether the subscriber is authorized for service. The authorization validation may include one or more of the following determinations: whether the subscriber is provisioned on the system, whether the subscriber has credit in his account (e.g., money, usage, etc.), which services the subscriber is allowed to access (e.g., based on subscribed plans, free vs. paid vs. sponsored services, etc.), and others. If the subscriber is not authorized for service, the OCS Decision Layer 8064, in box 9012, sends an "authorization denied" message to the OCS Interaction layer 8066 that includes modified policy instructions. In one embodiment, these policy instructions deny all service to the subscriber. In one embodiment, these policy instructions limit access to a top-up application or web site. In one embodiment, these policy instructions may limit access to content other than free or sponsored content. In one embodiment, the policy instructions also include quota limits for restricted services. In box 9014, the OCS Interaction Layer 8066 receives the message from the OCS Decision Layer 8064. In box 9016, the OCS Interaction Layer 8066 updates the subscriber policy locally in the subscriber cache and then interworks with the GGSN to update the subscriber policy rules.

Alternatively, in box 9010, the OCS Decision Layer 8064 may determine that the subscriber is authorized for service and responds to the OCS Interaction layer 8066, in box 9022, with an "authorization success" message and an updated policy set/quota allocation. In one embodiment, the OCS Decision Layer 8064 may provide for the policy to be updated in the GGSN (e.g., the new policy is different from the initial policy by something other than just quota, etc.) and may set a flag (e.g., an identifier) in the "authorization success" message or policy set to instruct the OCS Interaction Layer 8066 to update the GGSN rather than wait for the next credit control message to be received from the GGSN for this subscriber. In box 9024, the OCS Interaction Layer 8066 receives the "authorization success" message from the OCS Decision Layer 8064. In box 9026, the OCS Decision Layer 8064 updates the subscriber profile in the subscriber cache. In box 9028, the OCS Interaction Layer 8066 checks to see if the "update now" flag is set in the policy (or the "authorization success" message) to determine if it should update the subscriber policy in the GGSN. If the flag is set, in box 9030, the OCS Interaction Layer 8066 interworks with the GGSN to update the subscriber policy immediately and the flow completes. If the "update now" flag is not set, the subscriber policy in GGSN is not updated, and the flow is completed.

Figure 38:
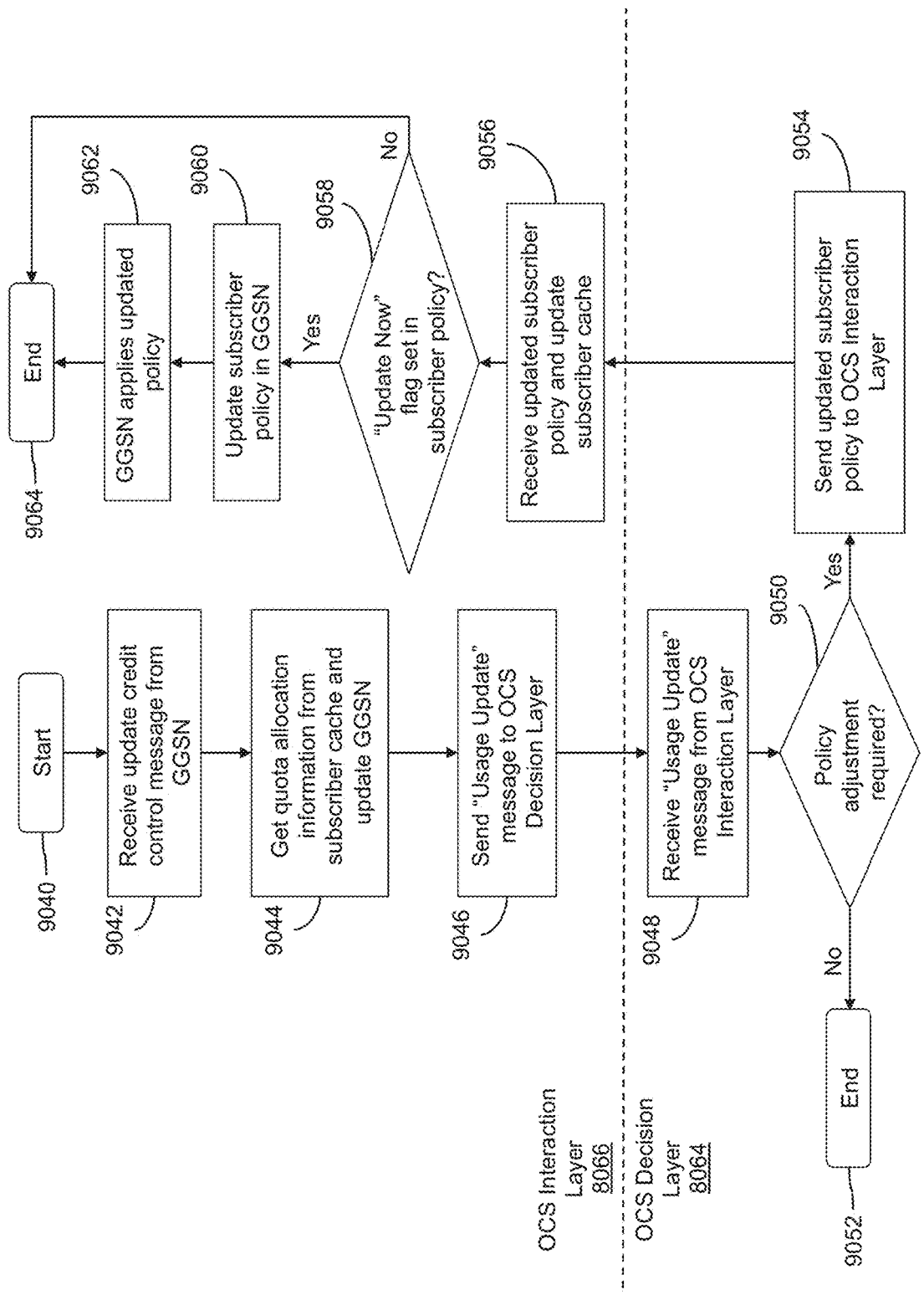
FIG. 38 is an example flow diagram that describes the interaction of the OCS interaction layer with the OCS decision layer on credit control update for a subscriber in accordance with some embodiments.

FIG. 38 is an example flow diagram that describes the interaction of the OCS Interaction Layer 8066 with the OCS Decision Layer 8064 on credit control update request (e.g., credit control requests that indicate usage based on a prior quota allocation and a request for additional usage quota allocation) for a subscriber in accordance with some embodiments. In the flow chart, the process starts in box 9040. At 9042, the OCS Interaction Layer 8066 receives, from the GGSN, an update credit control request comprising a request for quota allocation (and optionally a usage measurement against the prior usage quota allocation) for a subscriber. In box 9044, the OCS Interaction Layer 8066 queries the Subscriber Cache to get an updated policy (including new usage allocation quotas and potentially other policy adjustments) and interwork with the GGSN to update the subscriber's policy. In box 9046, the OCS Interaction Layer 8066 sends a "Usage Update" message to the OCS Decision Layer 8064 that comprises the usage update information received in the credit control update message received from the GGSN. In one embodiment, this message is sent in the background since the credit control update request has already been fulfilled (in box 9044).

In box 9048, the OCS Decision Layer 8064 receives the "usage update" message from the OCS Interaction Layer 8066 and, in box 9050, checks to see if there are any policy adjustments needed for the subscriber. The policy adjustment checks may include checks such as: subscriber has hit a policy limit, the usage network state has changed (e.g., subscriber is now roaming, network is congested, etc.), usage within a policy has met a subscriber-defined condition (e.g., 100 MB of streaming, block access while roaming, etc.), etc. If no policy adjustment is required, the flow ends at 9052. However, if a policy adjustment is required or desirable, the OCS Decision Layer 8064 constructs an updated policy set, box 9054, and forwards an "update subscriber policy" message to the OCS Interaction Layer 8066. Additionally, in box 9054, the OCS Decision Layer 8064 may set an "update now" flag in the "update subscriber policy" message which instructs the OCS Interaction Layer 8066 to update the subscriber policy on the GGSN instead of waiting for the next credit control update event to be received from the GGSN. In box 9056, the OCS Interaction Layer 8066 receives the message from the OCS Decision Layer 8064 and updates its subscriber cache. In box 9058, the OCS Interaction Layer 8066 checks the "update now" flag (e.g., identifier) in "update subscriber policy" message to determine if the new policy needs to be updated in the GGSN. If the "update now" flag is not set in the "update subscriber policy" message, the flow completes at 9064 without the updated policy being applied. However, if the "update now" flag is set in the "update subscriber policy" message, the OCS Interaction Layer 8066 interworks with the GGSN to update the subscriber policy rules as described in box 9062 and then the flow completes.

Figure 39:
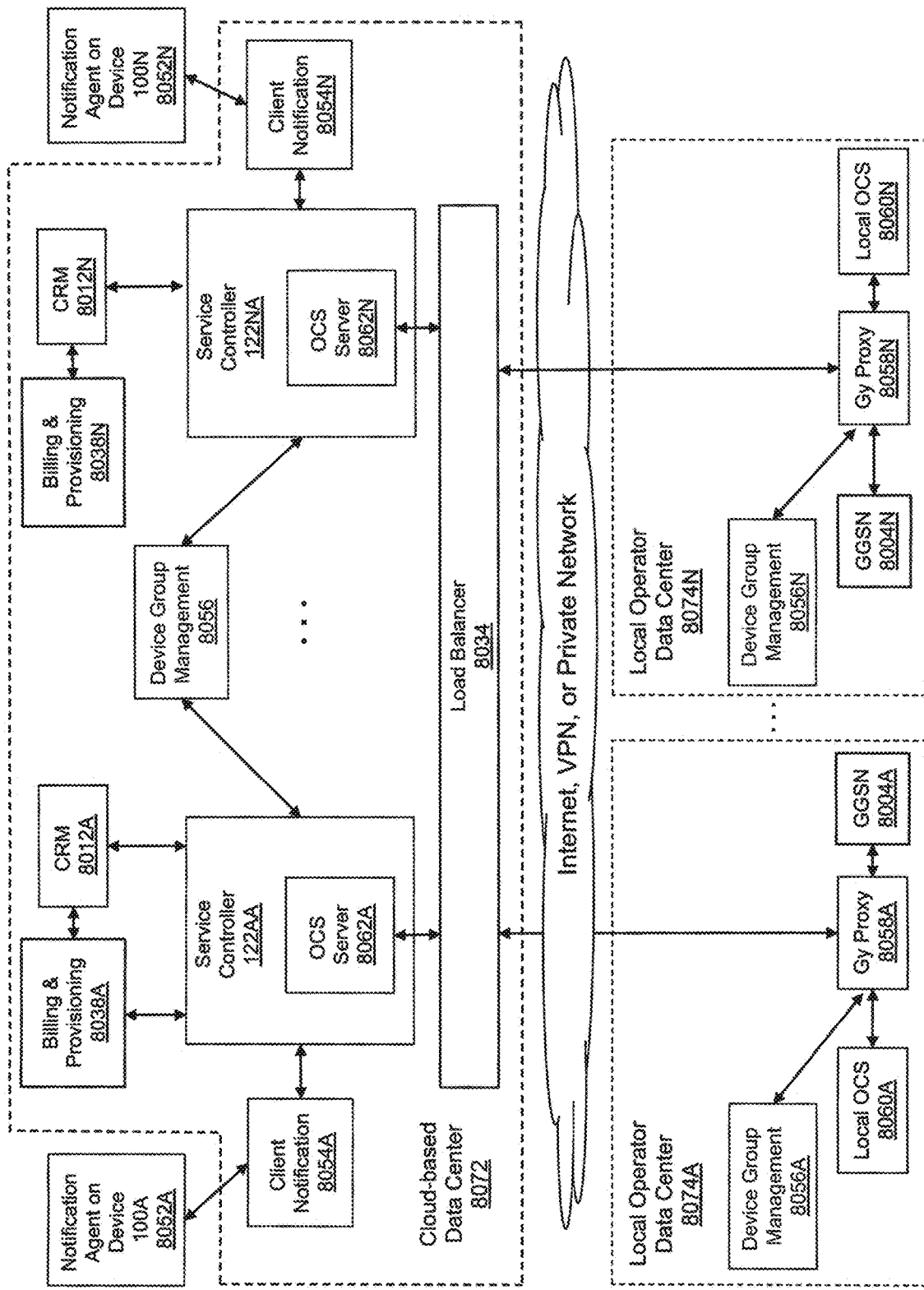
FIG. 39 illustrates moving OCS functionality into a cloud architecture in accordance with some embodiments.

In one embodiment, such as the exemplary embodiment shown in FIG. 39, it is desirable to move all of the OCS functionality into a cloud architecture. The cloud architecture enables the operator to centralize and scale its infrastructure on a network-wide as-needed basis. Also, this configuration provides support for supporting "total network peak load" vs. implementing site- or regional-specific "peak load" scaling. By leveraging the cloud architecture, scaling requirements may be lower and much more predictable since scaling is occurring across a larger deployment and not smaller site or regional deployments. As discuss previously, in some embodiment the Gy proxy 8058A contains one or more instances of the OCS Interaction Layer 8066A. In other configurations, the Gy proxy 8058A contains no instances of the OCS Interaction Layer 8066A, and signaling between the Gy proxy 8058A and the OCS Server 8062A in the cloud is via Diameter.

In one embodiment, such as the exemplary embodiment shown in FIG. 39, support is provided for MVNOs or VSPs. In some such embodiments, a MVNO or VSP has a set of device or subscriber groups that are managed via a Service Controller 122AA. The Service Controller 122AA application is virtualized in the cloud, and the access to a MVNO or VSP service offers, subscribers, devices, subscriber groups, and device groups is restricted to the respective MVNO or VSP. In one embodiment, the database is a shared database, and access is managed via permissions or data isolation. In one embodiment, the physical instance of the Service Controller 122AA is shared across the different MVNOs or VSPs (e.g., dedicated Service Controller instances for a MVNO). In one embodiment, the physical instance of the Service Controller 122AA is not shared across the different MVNOs or VSPs. In one embodiment, a MVNO or VSP creates service plans and policies on the Service Controller 122AA that apply to its own subscribers and do not affect other MVNOs' or VSPs' service plans, subscribers or devices. In one embodiment, the Service Controller 122AA converts the high-level plan characteristics described by the Service Controller 122AA operator into low-level policy instructions that are consumable by the network elements (e.g., PCRF, OCS, GGSN, PGW, etc.). In one embodiment, such as multi-vendor embodiments, the policy conversion layer also converts the policy into instructions that are compatible with the vendor-specific platforms (e.g., different policy instructions for different vendor OCS implementations, etc.).

In one embodiment, the Operator utilizes the Gy Proxy 8058A to migrate subscribers off of legacy OCS services to a cloud-based OCS service with notifications and billing. In one embodiment, the Gy proxy 8058A is set up with a database that contains rules for choosing whether to route a user's session to the legacy or local OCS 8060A server or to the cloud-based OCS services data center 8072. In one embodiment, the subscribers are initially on the legacy OCS server and, based on particular rules set up by the Operator in the Gy proxy 8058A, the subscribers are routed to the appropriate OCS server for service. In one embodiment, the rules may be based on subscriber credential (e.g., NAI, APN, MDN, MSISDN, MEID, IMEI, IMSI, IP Address, etc.). In one embodiment, the rules are based on service plans that the subscriber has subscribed to or capabilities of the subscriber's device. In one embodiment, the routing is based on the service provider associated with the subscriber. In one embodiment, the routing is based on geo-location of the subscriber or the location of network where the subscriber traffic is routed through (e.g., physical GGSN site, etc.).

In one embodiment in which the subscriber is managed by the cloud-based OCS service, there may be enhanced capabilities that are available to the subscriber that are not available on the legacy OCS 8060A systems. These capabilities may include one or more of: enhanced notifications, unique service plans (e.g., sponsored services, application based services, simultaneous multiple service plans, etc.), enhanced billing services, device assisted services, or other types of services that are either not supported by the legacy systems or are services that are not practical to implement and offer via the legacy systems.

In one embodiment, the Operator migrates subscribers from the legacy systems to the cloud-based systems for economic reasons (e.g., cloud-based services provide the operator with a lower cost per subscriber to operate and manage, lower capital expenditures (CapX) for hardware infrastructure (e.g., GGSN platforms may be virtualized at lower costs), and lower operational expenditure (OpX) as developing and managing synchronization between multiple data centers and GGSN hardware components would not be needed due to virtualization, etc.).

In some configurations, it is desirable to allow a MVNO or VSP to operate its own OCS server even though the network is shared. In one embodiment, the GGSN 8004 is connected to multiple OCS servers 8062 and routes the service requests to the appropriate OCS server 8062 based on subscriber credentials (e.g., NAI, IMSI, MEID, IMEI, MDN, MSID, MAC Address, TCP/IP address, APN, etc.). In one embodiment, the GGSN 8004 is also configured to map subscriber credentials to a specific MVNO or VSP and then use the policy rules associated with that particular MVNO or VSP to manage the subscriber.

In one embodiment, the subscriber credential maps to a default rulebase in the GGSN 8004. In one embodiment, a separate network element provides the mapping for the GGSN 8004 (e.g., AAA server, HLR, SGSN, SGW, HSS, etc.).

In one embodiment, the GGSN 8004 may not perform the subscriber mapping. In some such embodiments, a Diameter Proxy (DP)/Diameter Routing Agent (DRA)/Diameter Service Router (DSR) 8094 is used to perform the appropriate routing to the correct OCS server 8062. In one embodiment, when the DP 8094 detects a request for quota for a subscriber, the DP 8094 performs the mapping between the subscriber credential and the appropriate OCS server 8062. This method may be advantageous to the MNO since adding new MVNOs or VSPs minimizes the impact to the core GGSN platform.

Figure 40:
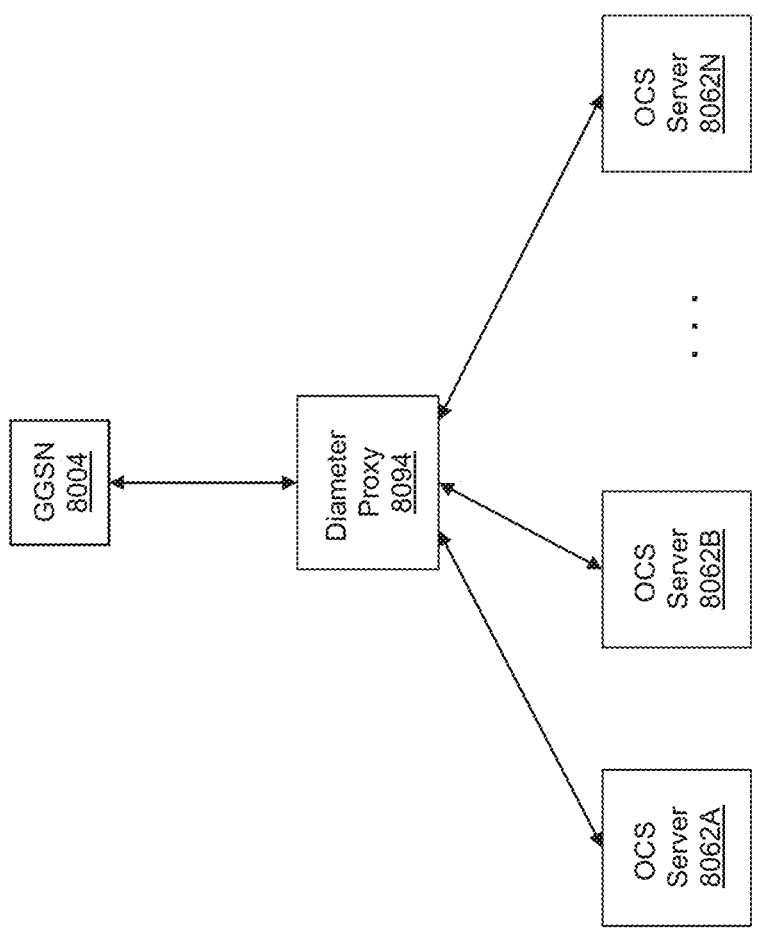
FIG. 40 illustrates an MVNO or VSP with an independent OCS server instance in accordance with some embodiments.

In one embodiment, such as the exemplary embodiment shown in FIG. 40, an MVNO or VSP has its own OCS server instance, and the rules and policies defined by one MVNO or VSP cannot impact another MVNO's or VSP's subscribers. In some such embodiments, a host mobile network operator (MNO) may manage and control its MVNOs and VSPs independently and may shut down any of them independently of the others if a specific MVNO or VSPs policy or subscribers are having an adverse impact on the overall network performance.

In one embodiment, the OCS server 8062 is physically collocated with the GGSN 8004. In one embodiment, the OCS server 8062 is in the cloud. In one embodiment in which the OCS server 8062 is in the cloud, an OCS Interaction Layer 8066 is collocated with the GGSN 8004, and the OCS Decision Layer 8064 is in the cloud. In one embodiment, the OCS Interaction Layer 8066 is a part of the DP 8094, and the OCS Decision Layer 8064 is in the cloud.

In one embodiment in which the OCS (or part of the OCS) is in the cloud, the MNO may provide a MVNO or VSP an instance of a Service Design Center 360 through which the MVNO or VSP may create its own services, provision its subscribers and devices and manage its device groups. In one embodiment, the high level plan and device and subscriber management rules defined by the MVNO or VSP operator on the Service Design Center are translated to low-level policy instructions and configuration instructions that are understood by the appropriate network elements (e.g., GGSN, PCRF, OCS, HLR, HSS, etc.). In one embodiment, though the Service Design Center, the MNO further controls the capabilities of the MVNO or VSP SDC operator.

Figure 41:
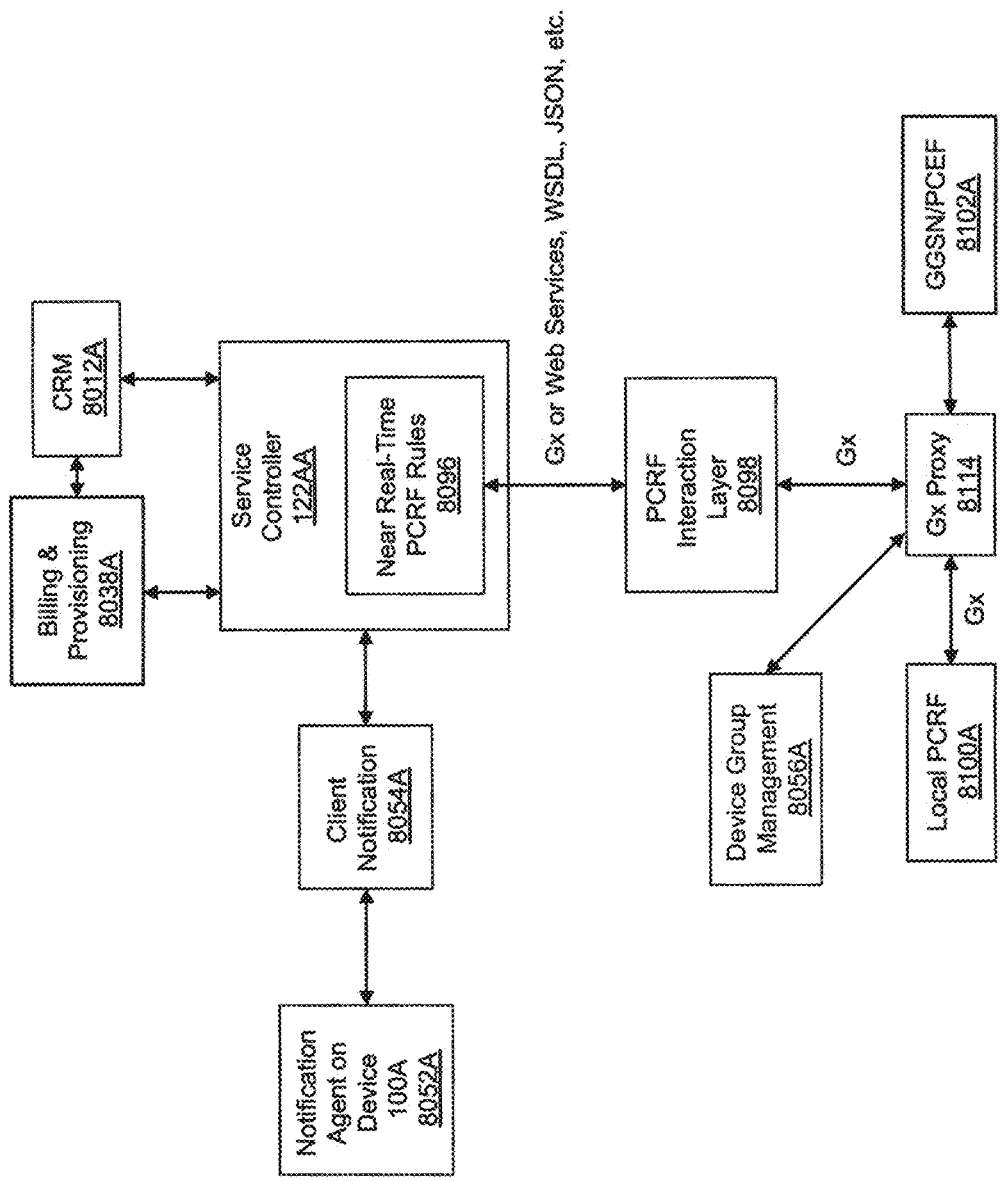
FIG. 41 illustrates a local service controller server in accordance with some embodiments.

In one embodiment, such as the exemplary embodiment shown in FIG. 41, it is advantageous to move PCRF and policy control services to a cloud environment. In one embodiment, a local PCRF Interaction Layer 8100 interworks with the GGSN/PCEF 8102 in real-time and interworks with the cloud PCRF function 8098 in near real-time. In one embodiment, the PCEF function 8102 is contained within the GGSN 8004. In one embodiment, the PCEF function 8102 exists in a deep packet inspection (DPI) element. In one embodiment, the PCEF function 8102 exists in a combination of elements, including a TDF element.

In one embodiment, the Gx proxy 8114 uses rules to determine whether to route the Gx signaling between the PCEF 8102 and either the local PCRF 8100 or to the cloud-based PCRF via the PCRF Interaction Layer 8098. In one embodiment, the rules are based on subscriber credential (e.g., NAI, APN, MDN, MSISDN, MEID, IMEI, IMSI, IP Address, etc.). In one embodiment, the rules are based on service plans or service types that the subscriber has subscribed to or capabilities of the subscriber's device. In one embodiment, the routing is based on the service provider associated with the subscriber. In one embodiment, the routing is based on geo-location of the subscriber or the location of network where the subscriber traffic is routed through (e.g., physical GGSN or PCEF site, etc.). In one embodiment, when the PCEF 8102 interworks with the PCRF Interaction Layer 8098, the PCRF Interaction Layer 8098 stores a portion (or all) of the policy associated the particular subscriber. In one embodiment, on data session start up, the PCEF 8102 requests policy for the subscriber from the PCRF. In one embodiment, the PCRF Interaction Layer 8098 in turn queries the cloud PCRF layer for the subscriber's policy. In one embodiment, when the cloud PCRF Layer returns the policy set for the subscriber, the PCRF Interaction Layer 8098 replies to the PCEF 8102 with a base set of policies for the subscriber. In one embodiment, as the subscriber uses services associated with his service plans, the PCRF Interaction Layer 8098 interworks with the PCEF 8102 to receive usage updates (via the Gx Monitor capabilities or other—e.g., usage within a service plan, notification that a monitored network destination (e.g., amazon.com, cnn.com, corporate intranet, etc., or traffic type has been requested (e.g., streaming audio, streaming video, VoIP, peer-to-peer, video conference, etc.). In one embodiment, the PCRF Interaction Layer 8098 responds immediately to the PCEF 8102 to acknowledge the message and the interwork with the Cloud PCRF Layer 8100 in near real-time to communicate the policy event and receive further policy instructions. In one embodiment, when the PCRF Interaction Layer 8098 receives policy update instructions from the Cloud PCRF Layer, it signals the PCEF 8102 to update the subscriber's policy.

In one embodiment, the Cloud PCRF Layer interworks with a notification element or agent 8052 to provide service-level notifications to the subscriber (e.g., plan usage limits (e.g., 50%, 100%, etc.), access to non-supported or unauthorized services, network destinations, usage of sponsored services, rate limited activities, change in network state (e.g., roaming to non-roaming, non-roaming to roaming, offload to operator WiFi services, etc.), time-of-day services, etc.) and optionally, where applicable, offer services or service plans to enable the user to continue using service or purchase service to access an previously non-allowed service type.

In one embodiment, the Cloud PCRF Layer interworks with an OCS to receive service usage updates or requests for subscriber policy modification based on subscriber activity or service plan purchases. In one embodiment, based on subscriber usage, attempted usage, network state changes, new service plan purchases, etc., the OCS signals the Cloud PCRF layer to request a change in the subscriber's policy. In one embodiment, the Cloud PCRF layer receives this information and then updates the PCRF Interaction Layer 8098 to notify PCEF 8102 that there is a new policy set for the subscriber.

In one embodiment, because the Cloud PCRF Layer is interworking with the other elements of the Operator network, the Operator may choose to consolidate all of the operational and business support processes and logic and policy management processes in a centralized fashion, rather than deploying/collocating them at a physical PCEF location. This provides the Operator with a more robust platform that scales as the requirements across the entire network scale, rather than scaling a physical location to meet the on-peak demand (and redundancy) requirements of that particular location. Additionally, it reduces the requirements of the PCRF Interaction nodes because the PCRF Interaction nodes are only managing the subscriber policy and not executing all of the other supporting processes and policy modifications based on business and operational support logic. Ultimately, this may lower the cost and complexity to deploy additional PCRF Interaction Layer 8098 capacity.

In one embodiment, a Service Provider user uses the SDC to define a policy set within a service plan that encompasses PCRF functions. In one embodiment, these functions include one or more of: classification rules and priority, service plan behavior based on network state (e.g., home vs. roaming, congestion level, type of service (e.g., interactive vs. streaming), etc.), monitor and notify events when a particular classification match occurs (e.g., plan doesn't support access to domain "xyz", monitor for attempted access and notify the end user when that condition occurs, etc.) or when a classification did not occur and the access was blocked (e.g., access was not classified to any service component (including monitor and notify). In one embodiment, within these policies, the SDC user may define actions to take, such as, for example, one or more of: allow access, block access, rate limit access, apply QoS rules, notify the end user (e.g., access not allowed, better plan available, service is restricted, etc.), upsell the user (e.g., provide purchase offer to the end user to enable them to purchase a service plan that supports the access, etc.). In one embodiment, the near-real-time PCRF function is responsible for handling the business logic associated with handling events based on external events from other service provider systems or triggers from the PCEF (via the PCRF Interaction Layer) 8102, and it may scale independently of the PCRF Interaction Layer 8098 where signaling times must meet particular SLAs. In one embodiment, this implementation enables to service provider to scale more effectively, efficiently and at a lower total cost since the near-real-time PCRF layer is managed via the cloud. Additionally, this configuration enables the service provider to easily adapt subscriber access policy based on the combination of service plan policy and changes in network state or usage against plan allowances (or any combination of these).

Figure 42:
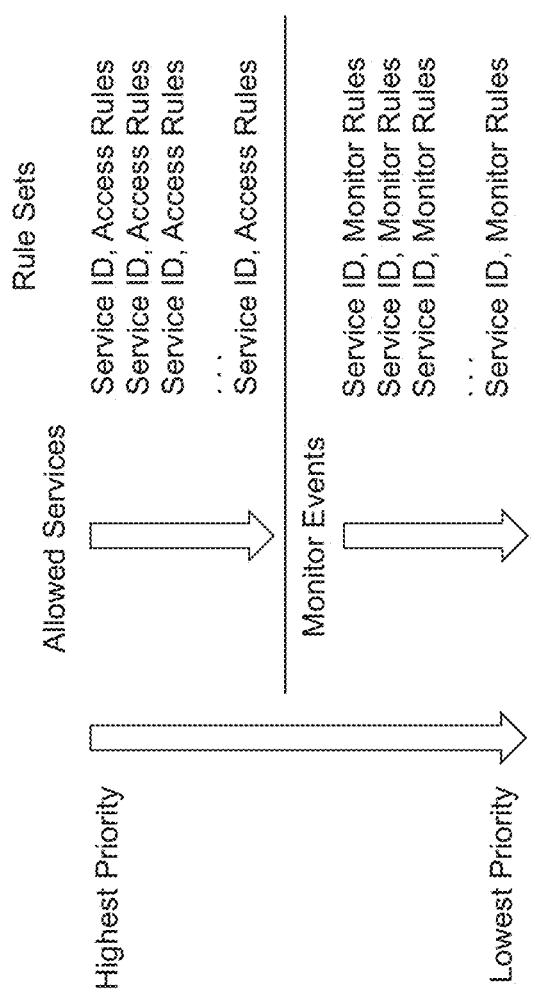
FIG. 42 illustrates an adaptive filter policy set in accordance with some embodiments.

FIG. 42 illustrates an adaptive filter policy set in accordance with some embodiments. In one embodiment, Service Plans are assigned to one or more Service IDs from the "Allowed Services" List and zero or more Service IDs from the "Monitored Events" List. In one embodiment, a "Access Rules" and "Monitor Rules" Rule Set defines one or more classification checks (e.g., traffic to/from a particular domain, IP address or port, streaming audio, streaming video, etc.) to be performed on the data passing through the PCEF element (e.g., GGSN, DPI, TDF, etc.) and the action to take when a classification match occurs (allow, block, rate limit, block and notify, allow and notify, apply QoS policy, etc.). In one embodiment, in the PCEF element(s), the Allowed Services and Monitored Events are prioritized based on the service providers desired classification search order. In one embodiment, the All of the Allowed Services have higher priority than Monitored Events (as illustrated in FIG. 42).

In one embodiment, based on subscribed service plans, the subscriber is provisioned with the appropriate "Allowed Service" and "Monitor Events" Service IDs. In one embodiment, when the subscriber data session starts (or anytime the subscriber's service plan changes), the PCRF enables the rules associated with the subscriber's subscribed plans in the PCEF (usually by the Gx and/or Sd interface, depending on the PCEF elements involved).

In one embodiment, when data traffic passes through the PCEF element, the PCEF element attempts to classify the traffic by comparing the traffic against the enabled "Allowed Services" and "Monitor Events" in the priority order that has been set up. If a classification match occurs, the action associated with the classification rule is taken.

In one embodiment, the action associated with a classification match causes the enablement or disablement of one or more other Service IDs. For example, In one embodiment, when a plan reaches 100% usage limit, the PCRF enables a Service ID that rate limits streaming content).

Figure 43:
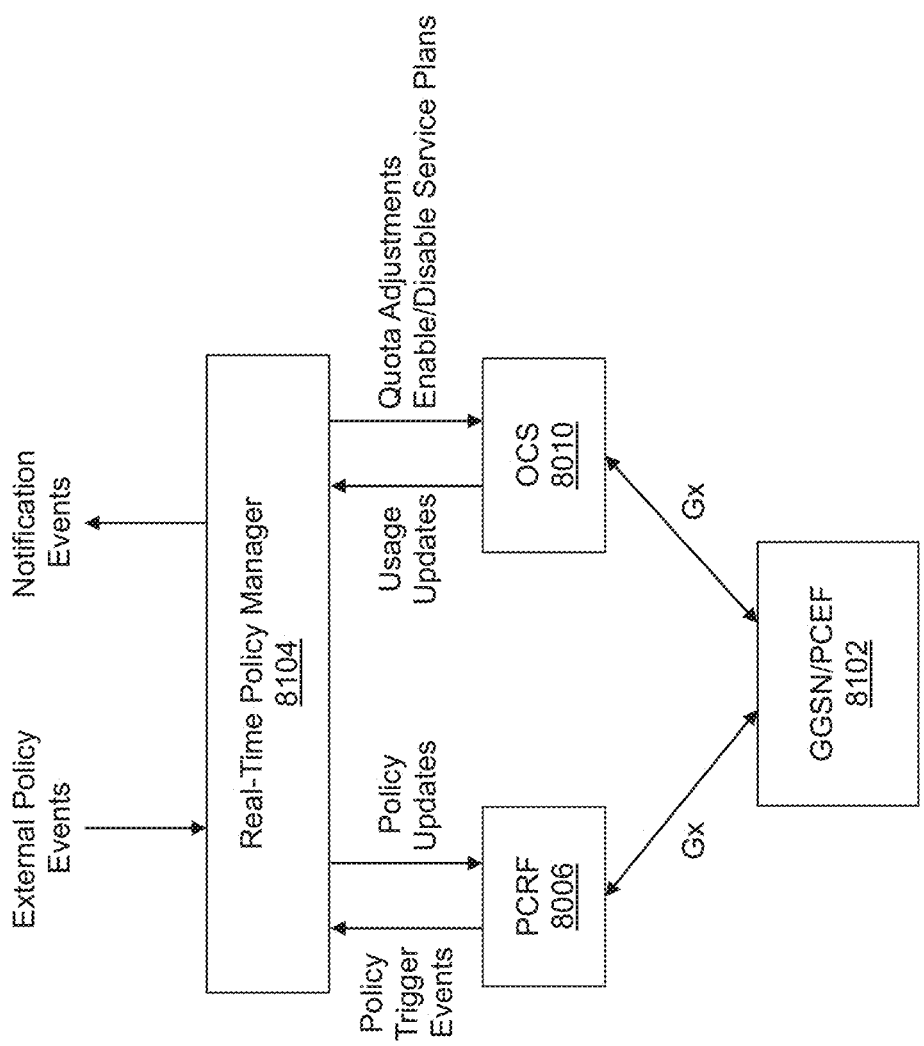
FIG. 43 illustrates a configuration where a real-time policy manager receives information from PCRF and OCS to modify subscriber policy, subscriber plans and quotas in real-time in accordance with some embodiments.

FIG. 43 depicts a configuration where a real-time Policy Manager 8104 receives information from PCRF 8006 and OCS 8010 as well as external sources to modify subscriber policy, subscriber plans and quotas in real-time in accordance with some embodiments. One benefit of the configuration shown in FIG. 43 is that it allows an operator to implement real-time coordinated policies between the PCEF 8102 and OCS 8010 while leveraging the existing network infrastructure.

Another benefit of this architecture is that as Service Operators move toward online billing and shared data plans, the business logic for managing access and adapting policy based on usage may be handled by the Real-time Policy Manager rather than attempting to distribute the same logic across both the PCRF, OCS and direct intercommunication between the OCS and PCRF. For example, in traditional post-pay, billing and usage measurement for data services is usually handled by an offline charging function that processes CDRs (IPDRs) from the GGSN, SGSN or other element. In a scenario where unlimited data access is the norm, delays in processing and reporting this usage are not critical since there is no worry about usage overages. As the operators move towards data usage caps, however, postpay data subscriber usage may have to be monitored in real-time.

In one embodiment, rather than provision the OCS 8010 and PCRF 8006 with all of the postpay plan quota and rules, the OCS 8010 treats all postpay subscribers as though they are on an "unlimited" plan and provides usage information up to the Real-time Policy Management Layer 8104. In one embodiment, when the Real-time Policy Management Layer 8104 detects that the user is over his plan usage amount (e.g., 5 GB), it sends updated policy instructions to the OCS 8010 (e.g., block further access, etc.), the PCRF 8006 (e.g., rate limit data access, block particular data types, etc.) or both (e.g., move the subscriber to a different rating group (OCS) and restrict access for particular data types (PCRF), etc.). Since the business logic is handled in the Real-time Policy Management Layer 8104, the PCRF 8006 and OCS 8010 systems are not required to handle the additional business logic so they do not need to scale based on the complexity of the business logic; instead, they scale linearly with the subscriber base. Scaling at the Real-time Policy Management Layer is based on number of subscribers and complexity of business logic, but the cost to scale this layer may be less than the cost of scaling OCS and PCRF systems. Additionally, since the interface between the PCRF/OCS and the Real-time Policy Management Layer may be load-balanced and may be in near-real-time, the Real-time Policy Management Layer may exist in the cloud and the scaling of this layer is a function of the overall subscriber base, rather than a function of average subscribers within a particular region of the network, which further reduces cost and scaling complexity.

In one embodiment, the PCRF 8006 and OCS 8010 manage the low-level policy and provide updates to the Real-time Policy Manager 8104. In one embodiment, the Policy Manager 8104 is responsible for inspecting the updates and then providing any policy updates back to the PCRF 8006 and OCS 8010. In one embodiment, the External Policy Events are incorporated into the configuration. In one embodiment, these external policy events originate from a service sponsor to provide extended service quota based on usage/purchase activity on the sponsor's site or application. In one embodiment, these external policy events originate from other operator systems to provide network state information (e.g., congestion level, etc.) to inform the PCRF to update subscriber policy to limit or restrict particular services (e.g., network congestion is high, rate limit streaming services to 256 kbps, etc.).

In one embodiment, service plan usage updates originating at the OCS 8010 are used to modify service policy on that plan when particular plan thresholds are reached (e.g., block or rate limit high bandwidth services when the subscriber's plan utilization hits 100%, send a usage notification to the end user when service plan usage hits 75% of service plan allowance, send a plan expiration notification to the end user when his plan expires, etc.).

In one embodiment, external policy events are injected to define, turn on, or turn off usage analytics to be measured. For example, a service operator may want to count the number of accesses (or amount of traffic) to a specific set of web site to determine the popularity of the web site for the purpose of determining whether or not it should offer a targeted service plan that includes access to that particular site. To support this, the Operator injects a policy event that tells the PCRF 8006 (or TDF) to count instances of access to a list of one or more websites (or domains) and count the traffic generated by these accesses and report results via the Notification Event interface after a particular time period or periodically (e.g., every 2 hours, every 100 accesses, every 50 MB, etc.). The output is then analyzed by the service provider to evaluate the economics and/or popularity of such a plan, if it were offered.

Figure 44:
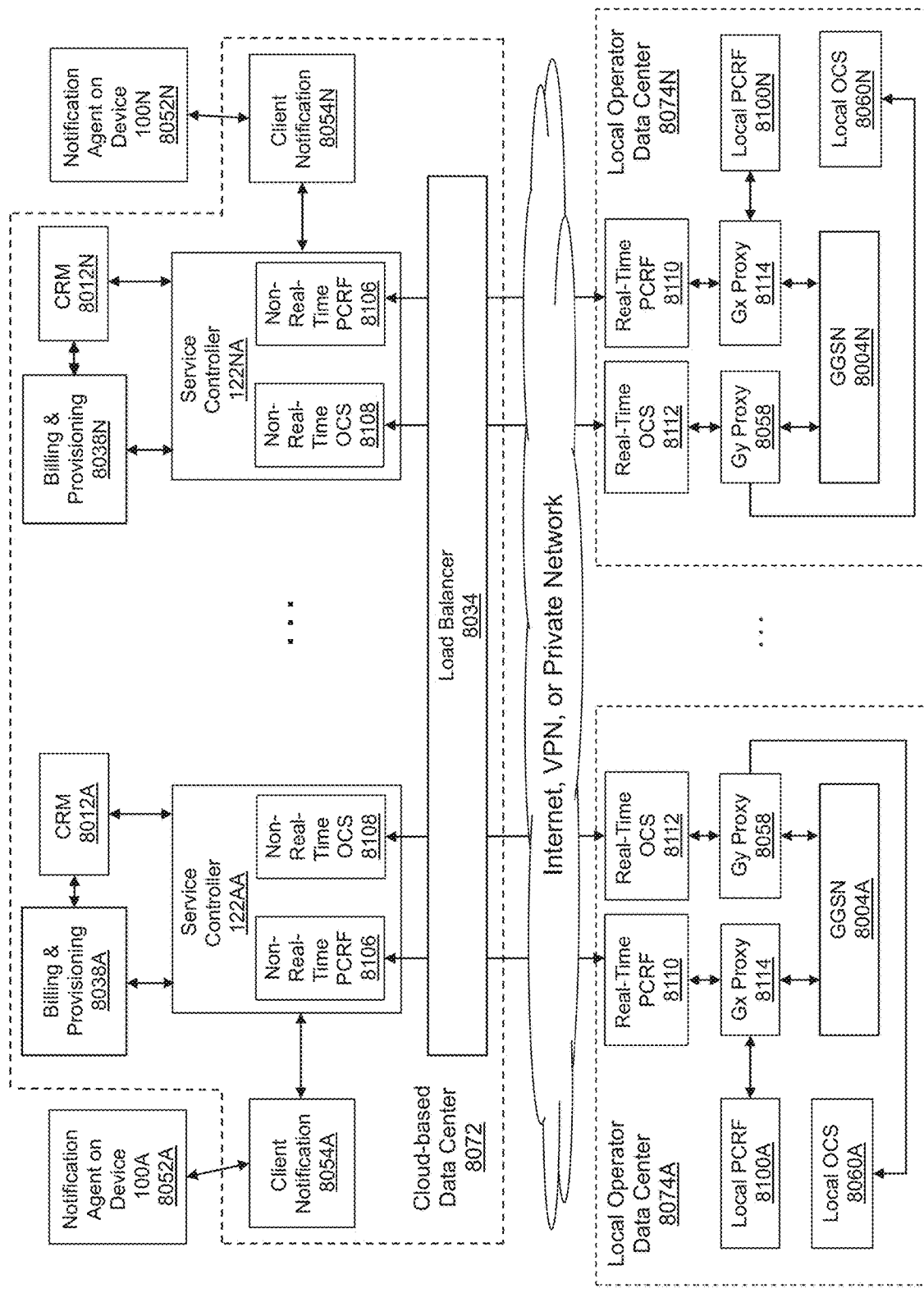
FIG. 44 illustrates both the OCS and PCRF functionality migrated to the cloud in accordance with some embodiments.

FIG. 44 illustrates both the OCS and PCRF functionality migrated to the cloud in accordance with some embodiments. In one embodiment, the MNO operator, MVNO, or VSP operator 8074 creates subscriber plans and services via a Graphical User Interface (GUI) on the Service Controller 122 (e.g., a Service Design Center (SDC)). In one embodiment, the Service Controller 122 converts the high-level "plain text" service plan access policies, notification triggers, notifications, and usage allowances into low-level policy instructions that may be processed and interpreted by the policy management elements in the network and/or on the device. In one embodiment, the policy instructions are dynamically created and provisioned to the elements based on element capabilities. For example, In one embodiment the OCS infrastructure is provisioned with service plan name, pricing, and usage limits, and the PCRF infrastructure is provisioned with plan policies (e.g., which types of traffic are supported (e.g., streaming vs. non-streaming, etc.), service usage notification thresholds (e.g., 50%, 70%, 100%, 110%, etc.), service plan QoS settings (e.g., QoS on particular data types or destinations, QoS based on network state (e.g., roaming, non-roaming, etc.), QoS based on time-of-day, QoS settings based on network congestion levels, etc.), and triggers to monitor to deliver other notifications to the end user (e.g., monitor for attempted video streaming and trigger when access is attempted). In one embodiment, the OCS infrastructure, rather than the PCRF infrastructure, is provisioned to monitor service usage notification thresholds and to generate a trigger to a notification element or agent to deliver a notification to the end user device UI.

In one embodiment, the non-real-time OCS and PCRF Layers (8106 and 8108) update the subscriber policy based on usage patterns within a service plan (e.g., continue to allow access (or increase usage quota limits) to a sponsored service based on purchase frequency with the sponsor, etc.). In one embodiment, the non-real-time OCS and PCRF layers (8106 and 8108) update the subscriber policy based on network state, network congestion level, service usage levels, etc.

In one embodiment, the OCS infrastructure is provisioned to monitor usage thresholds and trigger based on usage within the service plan, and the PCRF is provisioned to monitor and generate a notification trigger based on particular finer-grained data access or attempted data access events (e.g., streaming audio, streaming video, VoIP, peer-to-peer, particular network destinations (e.g., amazon.com, facebook.com, etc.).

In some configurations, the PCRF infrastructure is provisioned to monitor particular data activities and track and associate the usage patterns with the subscriber. In one embodiment, this information is further utilized to generate service plan offers that reflect the subscriber's usage patterns (e.g., data types, applications, network destinations, time-of-day usage patterns, home vs. roaming usage, etc.). In one embodiment, when the subscriber is presented with service plan offers, the offers are based on an analysis of usage patterns (e.g., a subscriber spends a lot of time on social networking sites so he is offered a social networking service plan that includes access to social network sites or allows usage by social networking applications, etc.). In one embodiment, it is useful to combine Gx and Gy policy to provide differentiated control, notification, or analytics.

Service Design Environment with Converged Policy Management and Provisioning

Figure 45:
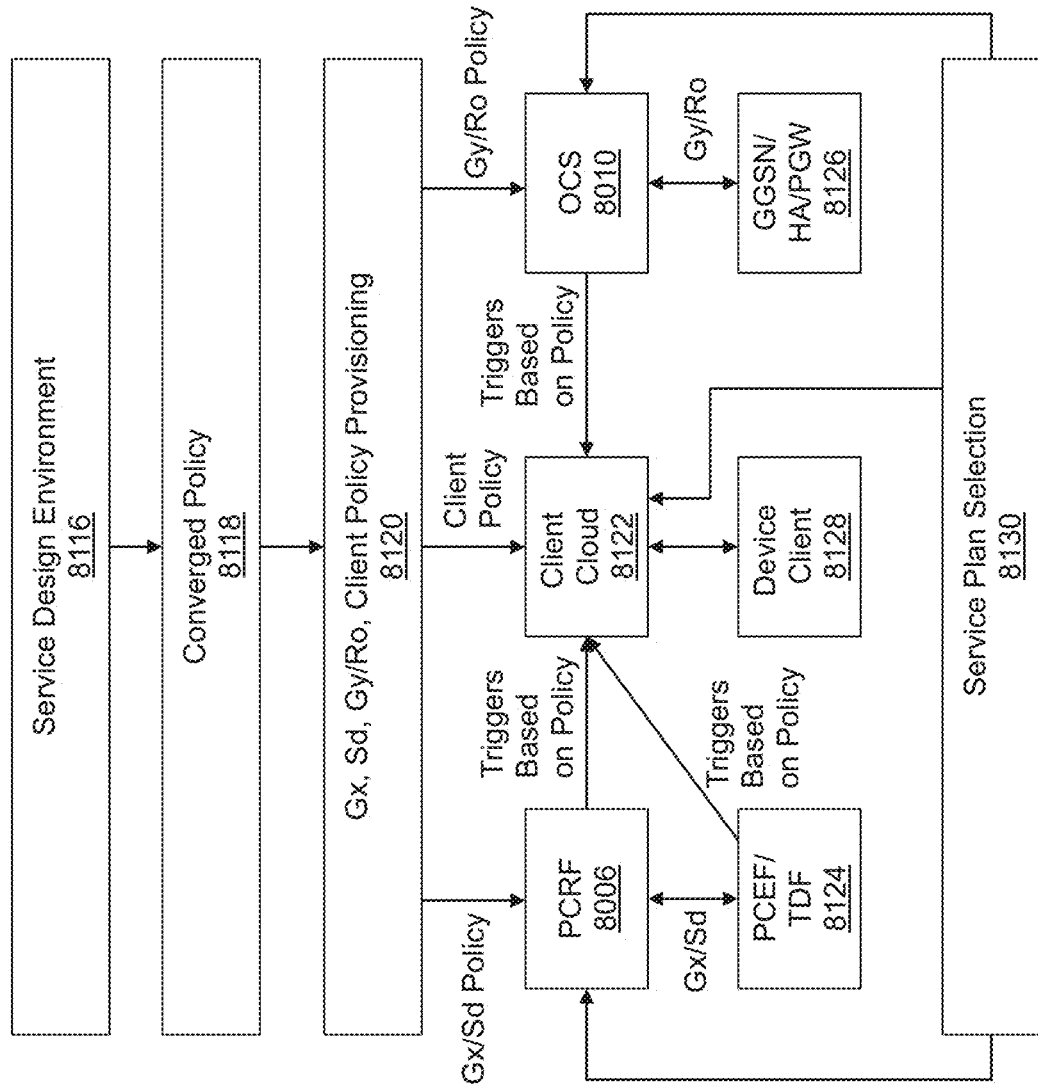
FIG. 45 is an example illustration of a SDC user creating a service plan in the service design environment, in accordance with one embodiment.

In one embodiment, such as the exemplary embodiment shown in FIG. 45, the SDC user creates a service plan in the Service Design Environment 8116 that contains multiple service components. A service component defines one or more sub-activities of the service plan that expect differentiated treatment (e.g., allow full speed non-streaming access, but rate limit streaming services to 256 kbps; allow open internet access, but trigger a notification when the end user attempts to use a service where the operator also has a more cost effective plan, etc.). For example, the user may be notified when he uses Facebook that there is a social networking plan, etc. In one embodiment, the SDC user creates a service plan with an open access component with a set number of MBs associated with it. Then, the SDC user creates one or more additional service components that define the differentiated process rules and classifications. In one embodiment, the Converged Policy Layer 8118 translates the service plan properties into policy provisioning instructions that are applicable to the associated elements. In one embodiment, the Policy Provisioning Layer 8120 provisions the plan limits on the OCS and the classifications and differentiated policies (e.g., rate limit streaming, notify on access to facebook.com, etc.) on the PCRF 8006 and, potentially provisions a notification element or agent and associates the policies with the service plan identifier. When a subscriber purchases the service plan and then initiates a data session, the charging, control, and notification policies are enabled for that subscriber on the appropriate elements.

In one embodiment, a service plan includes different characteristics based on network state or other factors (e.g., home vs. roaming network, congestion level, time-of-day, etc.). In one embodiment, the service plan configured by the SDC user also includes service components that specify notification, control, access, and quota policies based on the network state or other factor (e.g., when on a roaming network, block streaming services and notify the user that streaming services are not available when the he is roaming). In one embodiment, the user notifications are configured to initially block and then expect user permission to continue the specific service (e.g., streaming is initially blocked when roaming, but the user may override the control with an acknowledgement). In one embodiment, the permission to continue may be permanent. In one embodiment, the permission to continue is for a specified period of time (e.g., 1 hour, 1 day, etc.) or for a specified event (e.g., one video or one video conference call, etc.). In one embodiment, the permission to continue is for a specified amount of usage (e.g., 1 MB, 10 MB, etc.). In one embodiment, where the user provides permission to override a control, the response also includes an account-level PIN code/password to authenticate the user.

In one embodiment in which user override is available, it is advantageous to combine converged policy layer with a real-time policy manager (as illustrated, for example, in the embodiment of FIG. 43), where the user override and the parameters associated with the override (e.g., service/service type to allow, period of allowance (e.g., time, MB, event allowance, etc.) are provided as part of the External Policy Event. In one embodiment, the real-time policy manager receives the information via the External Policy Event interface and then updates the user policy accordingly. In one embodiment, the policy affects PCRF/PCEF only (e.g., allow a previously disallowed service (e.g., streaming while roaming, etc.), OCS only (e.g., enable quota for a specific rating group for a differentiated treated service, etc.), or it affects both PCRF/PCEF and OCS (e.g., allow 100 MB of streaming services while roaming, etc.).

In one embodiment, the Service Design Environment 8116, Converged Policy 8118, and Policy Provisioning Layers 8120 exist in the cloud, and the Policy Provisioning Layer 8120 is connected to the elements that are to be provisioned (e.g., PCRF, OCS, notification element, etc.) via a private network, VPN over public internet, or other interconnection method. Using this approach, the operator may consolidate all of the service creation and provisioning environment in one place. Additionally, it enables the operator to easily support VSPs and MVNOs from a shared platform where a service provider has its own virtual Service Creation Environment and may manage its own service plans, policies, devices and subscribers without impacting other the service providers' data.

FIG. 45 illustrates a Service Design Environment with a Converged Policy Management Layer 8118 that translates policy definition created at the Service Design Environment layer 8116 into element-based policy instructions for the policy enforcement points (e.g., OCS, PCEF, TDF, Client Cloud, Device Client, etc.) in the network and/or device in accordance with some embodiments. In FIG. 45, a mobile service provider user (e.g., employee of a mobile network operator, MVNO, service provider partner, etc.) uses a graphical-based UI application to create and manage service plans. At this layer, the Service Design Environment 8116 allows the user to define service plans in a manner that may not include specific network policy instructions. For example, the Service Design user may define a basic service plan in the following manner—a monthly 50 MB Facebook Application Access plan that provides notifications to the end-user when the plan usage is at 50%, 75% and 100%. At 100% do not allow overage and offer the end-user the ability to purchase additional service.

In one embodiment, the Converged Policy layer 8118 converts the "plain-text plan design" into low level network policy instructions. These instructions are then decomposed into the appropriate policy types (e.g., Gy/Ro, Gx, Sd, etc.) based on what a specific policy element is attempting to manage as well as network element capabilities. In one embodiment, where there are multiple vendors of the same policy element (e.g., OCS, PCRF, PCEF, etc.), the Policy Provisioning layer 8120 creates policies specific to a vendor's policy element. This enables the Service Design user to create plans and have the vendor-specific policies managed automatically for him. For example, the plan limit (e.g., 50 MB and 1 month) is provisioned into the OCS as attributes of the specific service plan, the allowed destinations (e.g., facebook.com website) are provisioned into the PCRF/PCEF/TDF as an access allow rule associated with the service plan, the application policy (e.g., allow the Facebook application to access the network) is provisioned to a device enforcement policy agent, the notification policy is provisioned on the Client Cloud 8122 (e.g., when a subscriber of the Facebook plan uses 50% of the plan, deliver a 50% notification message to the Device Client 8128).

Once the policies have been decomposed into their network policy components, the appropriate network elements are provisioned with the policies and the policies are associated with the service plan. When the end-user purchases the service plan, the appropriate network elements are provisioned to enable/associate the service plan policies with the end-user's account/device and to enforce them on behalf of the end-user.

In one embodiment, the service provider user designs and publishes service plans without knowledge or understanding of the necessary network policies required to implement the control and enforcement of the service plan on the network. Additionally, the Service Design Environment 8116 provides a single-point of entry for the service plan attributes, control, and notification rules and then enables a seamless mechanism to publish the service plan and make it available for purchase by end-users.

In one embodiment in which the service provider is not the wireless network operator (e.g., an MVNO, channel partner, etc.), the service provider creates and manages its own service offers without having to work directly with the host network operator to implement the service plan policies on the network control/enforcement elements.

In one embodiment, the network policy management/enforcement elements are configured to notify the Client Cloud 8122 when a policy event has occurred (e.g., plan utilization, non-supported activity attempt, etc.). In one embodiment, the Client Cloud 8122 uses the notification trigger received from the network policy element to generate an indication to the Device Client 8128 that a policy event has occurred and for the device to take action on that event (e.g., end-user tries to perform an access that his service plan may not support, client cloud 8122 informs the device client 8128 and the device notifies the end user about the blocked access and offers the end user a service plan that supports the attempted access). Examples of event indication include an index into a policy notification/action table, an entire notification including text and actions to take, etc.

In one embodiment in which portions of the network access policy are managed by the device, the Device Client 8128 notifies the Client Cloud 8122 when a device-managed policy event occurs (e.g., a user plan has expired, the user purchased a new service plan, the response the user selected to a displayed notification, etc.). In one embodiment, the Device Client 8128 reports that the policy event has occurred and Client Cloud 8122 then provides further indication of how the Device Client 8128 should react to the event (e.g., block access, display an event notification, display a service plan purchase notification, etc.).

In one embodiment, the enforcement policy is managed by both the device and the network. In one embodiment, the Device Client 8128 and the network policy management elements are updated through the Client Cloud 8122. For example, an end-user has a 10 MB Facebook application-based plan. The Device Client 8128 is managing access to the network (e.g., only the subscribed applications may communicate with the network). When a plan usage reaches the usage limit, the network element that is tracking usage limits (e.g., OCS) notifies the Client Cloud 8122 that the usage on particular plan has reached 100%. The Client Cloud 8122 then notifies the Device Client 8128 that the plan has reached 100% and the Device Client 8128 displays a notification that the application plan has reached 100% and then blocks further access to the network by the application(s).

In one embodiment in which the policy enforcement elements are not located in the cloud, any or all of the Service Design Environment 8116, Converged Policy 8118, and Policy Provisioning 8128 elements may reside in the cloud, and the provisioning occurs over network links to the various network elements. In one embodiment, the links are over private network connections. In one embodiment, the links are over a VPN on the public Internet.

Figure 46:
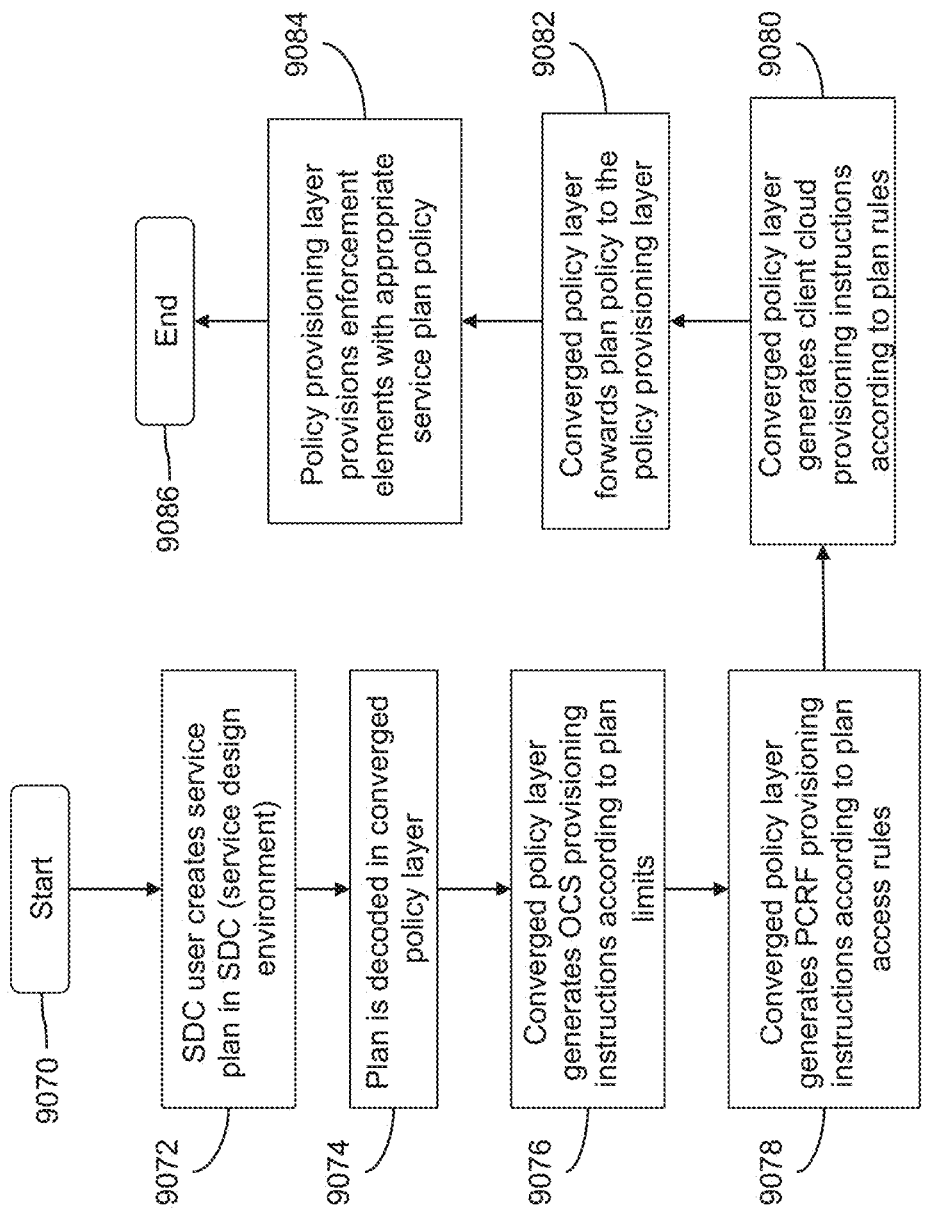
FIG. 46 illustrates an example process for programming and provisioning policy management elements in a network based on the output of a converged policy management layer in accordance with some embodiments.

FIG. 46 describes a process for programming and provisioning policy management elements in the network (e.g., PCRF, OCF, etc.) based on the output of a converged policy management layer in accordance with some embodiments. In step 9072, an SDC user creates a service plan in the SDC. In one embodiment, the service plan defines, in high level "plain English," all of the aspects of the service plan (e.g., plan name, plan usage limits, plan access policies, plan notification policies, service components, etc.). Once the plan has been created, the plan is decoded, in step 9074, by the Converged Policy Layer 8118. The Converged Policy Layer 8118 decodes and separates the policy elements of the service plan into appropriate policy groupings (e.g., access quotas, access rules (including variations based on network state, network congestion, time-of-day rules, etc.). In step 9076, the Converged Policy Layer 8118 then generates the appropriate provisioning commands to provision the OCS with the plan quotas, rating groups, charging elements, etc. In step 9078, the Converged Policy Layer 8118 generates the appropriate provisioning commands to provision the PCRF 8006 with the plan access rules and monitor triggers (e.g., monitor for access to facebook.com and generate an event trigger, etc.). In step 9080, the Converged Policy Layer 8118 generates the appropriate provisioning commands to provision the Client Cloud 8122 with the appropriate Plan policies that are to be managed on the device (e.g., notification alerts based on monitored trigger events, usage based events (e.g., 50% of plan limit), network state changes that affect policy, policy to be managed on the device, etc.). In step 9082, the Converged Policy Layer 8118 forwards the complete service plan policy description to the Policy Provisioning Layer 8120 for provisioning to the policy management and enforcement elements. In step 9084, the Policy Provisioning Layer 8120 interacts with one of the policy management enforcement elements (e.g., PCRF, OCS, Client Cloud, etc.) to provision them with the plan policy elements that are applicable to that specific element. In one embodiment (e.g., multi-vendor elements, etc.), the Policy Provisioning Layer 8120 may adapt/modify the service plan policy for that element to accommodate differences in policy management capabilities implemented (or licensed) on that particular element (e.g., in a multi-vendor element type environment, not all elements of the same element type may support all of the same features. In this case, the service plan policy would need to be modified to accommodate the capabilities of that specific element). After all of the elements have been provisioned, in step 9086, the process completes.

In one embodiment, the policy management and enforcement elements are virtualized and the policy that is provisioned to them includes both high-level and low-level policy instructions (e.g., policy to be enforced at the OCS Decision Layer 8064 and policy to be enforced at the OCS Interaction Layer 8066 (as described in prior figures and drawings)). In a hybrid environment where there both virtual and physical instances of a policy enforcement or policy management element exist, the policy set is adapted to support both implementations (e.g., a policy set for physical elements and a policy set for virtual elements). In one embodiment, the Converged Policy Layer 8118 produces both policy sets. In one embodiment, the Policy Provisioning Layer 8120 adapts a single policy set received from the Converged Policy Layer 8118 into the local and cloud-based component policies (e.g., OCS Interaction Layer 8066 and OCS Decision Layer 8064 policies).

Simplified Policy Architecture

Figure 47:
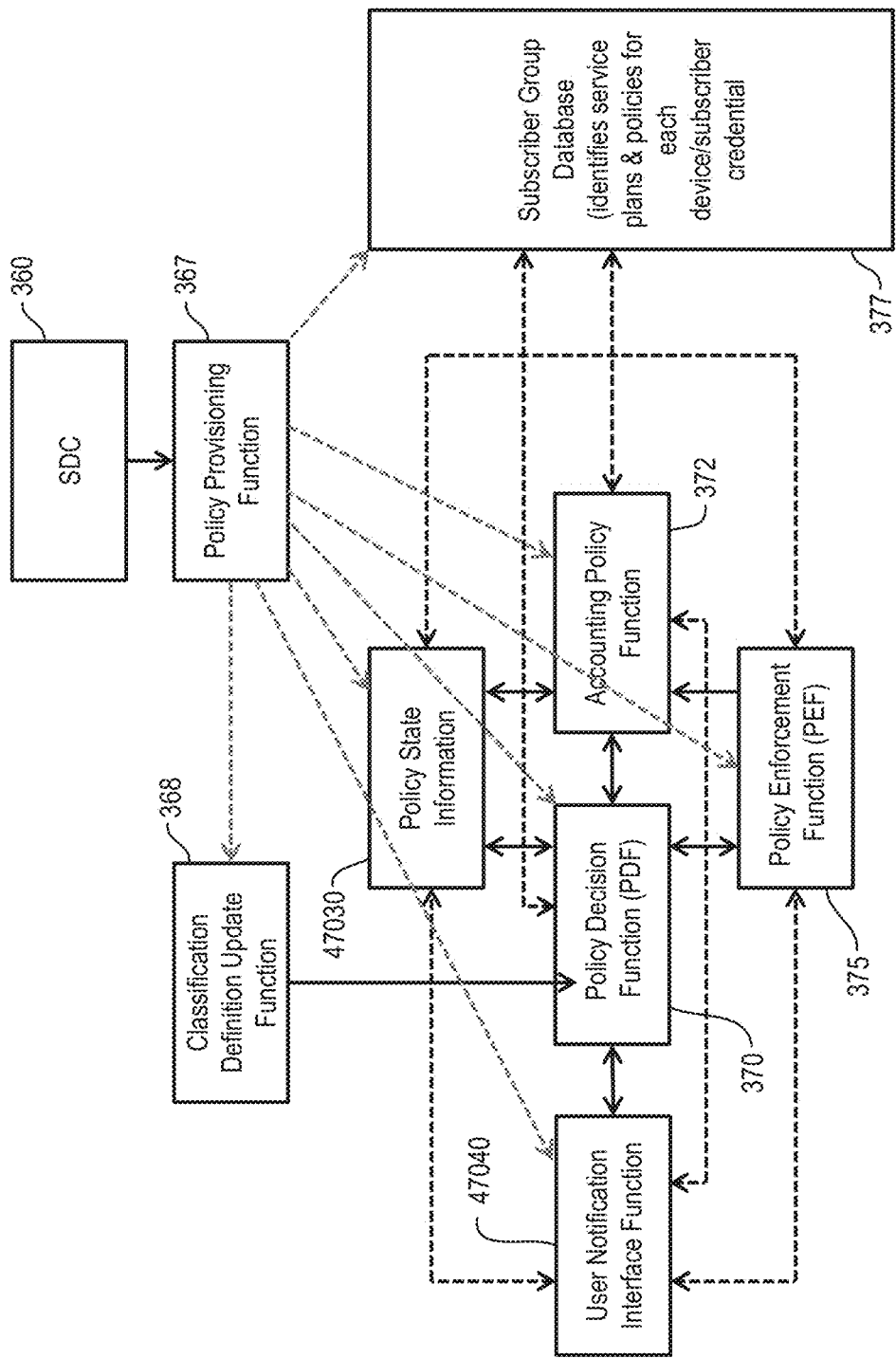
FIG. 47 illustrates an improved system for providing definition and enforcement of service plan policy in accordance with one embodiment.

The policy system diagram in FIG. 47 illustrates an improved system for providing definition and enforcement of service plan policy. Several key features of the system are disclosed herein. The consistent joint (integrated) policy definition and enforcement framework provided by the present disclosure is important for providing enhanced policy enforcement capability, lower complexity, reduced network cost, reduced latency in user service notifications, and real time interaction between service plan policy options and user preferences to enhance the user experience and increase the opportunities to effectively market and sell new types of services and service plans or bundles.

A key advantage of the improved policy system is the capability to jointly define and enforce service control policy (or policies), service accounting policy (or policies), and service notification policy (or policies). Definition (or design) of joint service policy is accomplished in the service design center disclosed herein and in some of the documents incorporated by reference herein. In one embodiment, joint definition of service policy comprises using a common user interface and policy object creation or definition environment as a unified policy creation and management platform for two or more of the three key service network policy types: control, accounting, and notification. In one embodiment, this unified policy creation and management platform provides for a common environment to define service activity filters (i.e., definitions for a classification of service) and the policies that are associated with the filters to enforce a desired set of service plan policies. In one embodiment, the filter and associated policy definitions from the SDC are converted into provisioning instructions for the policy functions shown in FIG. 47.

The Policy Enforcement Function (PEF) 375 in FIG. 47 is configured to enforce the real time policies associated with a filter. The PEF 375 identifies communication flows, associates a flow with a device credential or subscriber credential, and performs a filter match search on the flows with filter and policy instruction definitions that are assigned to that device or subscriber by the policy decision function (PDF) 370. The filters define service activity classifications, and the policies associated with a filter are implemented when the PEF 375 executes a policy enforcement instruction on communication activities that match the filter parameters. Example filter classifications include, but are not limited to: voice, data, text, a classification of data (e.g., streaming traffic, voice-over-Internet protocol (VOIP), video, audio, downloads, peer-to-peer communication, communication associated with a website, communication associated with an application or application server, communication associated with a particular network end point, communication associated with a particular logical channel or data path, communication associated with an access point name (APN), communication associated with a virtual private network (VPN), communication associated with a proxy server, communication associated with a partner network connection. Example policy enforcement instructions include communication or traffic control instructions, communication accounting instructions, and notification trigger instructions.

In one embodiment, example control instructions include, but are not limited to: block, allow, throttle, cap, delay, prioritize, cap and re-match, cap and no-match, hold and wait for user response, cap and wait for user response, increase priority, decrease priority. In one embodiment, example accounting instructions include, but are not limited to: allocate accounting to a service accounting bucket identifier, allocate accounting to a user service accounting bucket, stop allocating accounting to a user plan service accounting bucket, allocate accounting to a service sponsor accounting bucket, stop allocating accounting to a service sponsor accounting bucket, allocate to a carrier accounting bucket. In one embodiment, example notification trigger instructions include, but are not limited to: identify a particular notification trigger event and provide an event identifier and device or subscriber credential associated with the trigger event. The notification trigger events are fed to the Device Interface Function (DIF), where the notification trigger identifier is used to determine the proper notification to deliver to the device associated with the device (or subscriber) credential.

Policy instructions are provided to the PEF 375 by the PDF 370 in the form of policy instruction sets (each set having one or more instructions), with a device credential or subscriber credential being assigned to a policy instruction set. In one embodiment, policy instruction sets comprise one or more filters (or components) and one or more associated policy enforcement instructions. The PDF 370 operates in near-real-time to update the filter definitions and/or the policy instruction sets. The PDF performs such updates primarily when changes occur in the policy state that is reported to the PDF by the Policy State Function (PSF) 369. The PSF 369 detects changes in policy state that have a bearing on the service plan policy. Example policy states include, but are not limited to, one or more of: a state of service use (e.g., an amount of use, amount of use below a service limit, amount of use above a service limit, a rate of service use, etc.), a period of time, foreground or background access, a type of network (e.g., home cellular, roaming cellular, mobile operator, 2G, 3G, 4G, WiFi), a network busy state or network performance state, one or more available QoS states, a geography. In one embodiment, policy state becomes a modifier or index to assist the PDA to determine which policy should be applied to a given filter. In one embodiment, the policy state is at least bifurcated (e.g., below service limit, above service limit) or further divided so that the policy state may be used as an integer indexing system to select the correct policy set for the given policy state. Such embodiments simplify the logic in the PDF and PEF because the policy decision logic is reduced from other approaches, and the manner in which the policy varies as a function of policy state may be easily configured within the service design center (SDC).

The PEF 375 monitors service use and passes an accounting of service use to the Accounting Policy Function (APF) 372. In one embodiment the PEF 375 monitors and accounts for communication use for a filter (or component) and passes a measure of the service (or component) use to the APF 372 along with a filter (or component) identifier. In one embodiment, the PEF 375 aggregates the use for multiple filters (or components) into a service accounting bucket and passes a measure of the service accounting bucket use to the APF 372 along with a bucket identifier. The APF 372 passes service use records to the Service Billing Function (SBF), where the use records are rated and converted into bills (or other accounting records that do not necessarily demand a payment) for users, service partners, and/or service partners.

In one embodiment, a plurality of devices form a device (or subscriber) group database 377, and the DIF 371 establishes a communication channel with an application, agent, or SMS function on one of the devices in the device (or subscriber) group to assist in delivering the notifications. In one embodiment, the communication channel is a secure channel (i.e., secured by an encryption protocol). In one embodiment, the communication channel may also accept user responses to notifications (e.g., service offer responses, acknowledgement responses, service choice/preference responses, etc.).

In one embodiment, the DIF 371 establishes a secure communication channel with an application or agent on at least one of the devices in the device (or subscriber) group to assist in delivering the notifications. In one embodiment, the secure channel may also be established to accept user responses to notifications (e.g., service offer responses, acknowledgement responses, service choice/preference responses, etc.). In one embodiment, the DIF 371 communicates with the application or agent on one of the devices in the device (or subscriber) group using a pre-defined application programming interface (API) protocol established to make the communication of notifications, offers, and user responses more efficient and useful for device users. In one embodiment, the DIF 371 is configured to obtain assistance in implementing one or more of the notification policy, control policy, or accounting policy from the application or agent on one of the devices in the device (or subscriber) group as described herein. In one embodiment, the DIF 371 accepts user responses to notifications and service plan offers and relays them to the service policy management function (SPMF) and/or billing function. In one embodiment, the DIF 371 performs an activation server function to activate a device to use a new service plan. In one embodiment, this activation is assisted by a sponsored service (or connection) to allow the device restricted access to the DIF 371 (i.e., access to the DIF but not to other destinations or end points), and the sponsored service is implemented in the PDF 370 and PEF 375. In one embodiment, the types of notifications delivered by the DIF 371 include, but are not limited to: a notification associated with an amount of service used, a notification associated with a percentage of service limit used, a notification associated with a service limit reached, a notification associated with a service overage, a notification associated with an overage indication with request for acknowledgement, a notification associated with a service condition wherein a service plan purchase or upgrade is required, a notification of a roaming condition, a notification of a roaming condition that may expect a response, provide a service offer, provide a service offer and request a response, provide a message or offer associated with a marketing interceptor trigger. In one embodiment, the DIF 371 communicates the notification response (e.g., response to service plan offers) to the SPMF 378.

The SPMF 378 manages the active service plan for at least one of the one or more devices in the device (subscriber) group. For a device, the communication policy is determined by the service policy configuration maintained by the SPMF 378. When the service plan is changed or an aspect of the service plan is modified, the SPMF 378 instructs the PDF 370 to implement the new service plan policy or policies, and the PDF 370 in turn instructs the PEF 375 to implement the appropriate real time policy implementation instructions to realize the service plan policy or policies.

The Classification Definition Update Function (CDUF) 368 provides updates to classification definitions to perform associative classification. As described in several of the applications incorporated herein by reference, associative classification provides for changing filter definitions as additional filter parameters are determined to be necessary due to the changing nature of some websites and other Internet destinations.

As will be appreciated in view of the disclosures herein, the functions illustrated in FIG. 47 and described in the context thereof may be implemented by elements in the network system, by elements in an end-user's device, or by a combination of elements in the network system and elements in an end-user's device. In particular, the simplified policy architecture may in general be implemented largely with a device service processor (e.g., PEF=policy enforcement agent (PEA) or policy implementation agent (PIA); PDF=policy decision agent (PDA) or policy control agent (PCA)), with network elements (PEF=a simplified PCEF or GGSN; PDF=an enhanced OCS or PCRF), or with a combination of network elements and device agents. For example, the functions could be implemented entirely by one or more network-based elements, or entirely by one or more device agents on the end-user device, or by a combination of one or more network-based elements and one or more device agents. In one embodiment, the functions are implemented by a network-based service controller, or by a device-based service processor, or by both a network-based service controller and a device-based service processor.

It should be appreciated that although the various functions have been given names, and have been illustrated and described herein as being independent functions, it will be appreciated that other names may also be used for these functions, and that an implementation may implement the functions differently than shown or described herein. In particular, a single element (whether network-based or device-based) may perform more than one of the functions, or more than one element may perform a single function. The figures and descriptions presented herein are exemplary and are not meant to be limiting.

As a particular example, the policy decision function could be implemented by, for example, a policy rules element in the network system, or by a policy control agent on the device, or by a combination of a policy rules element in the network system and a policy control agent on the device. Likewise, the policy enforcement function could be implemented, for example, by a policy enforcement element in the network system, or by a policy enforcement agent, a policy implementation agent, and/or a modem firewall on the device, or by a combination of a policy enforcement element in the network system and one or more agents or elements on the device. As another example, the service policy management function could be implemented, for example, by a Service Controller 122 or a policy management server in the network system, or by one or more device agents on the device, or by a combination of a Service Controller 122 or a policy management server in the network system and one or more agents on the device. As another example, the accounting policy function could be implemented, for example, by a charging element and/or accounting/billing server/system in the network system, or by a billing agent and/or a service monitoring agent on the device, or by a combination of a charging element and/or accounting/billing server/system in the network system and a billing agent and/or a service monitoring agent on the device. Likewise, the device interface function could be implemented, for example, by a Service Controller 122 in the network system, or by a user interface agent on the device, or by a combination of a Service Controller 122 in the network system and a user interface agent on the device.

Figure 48:
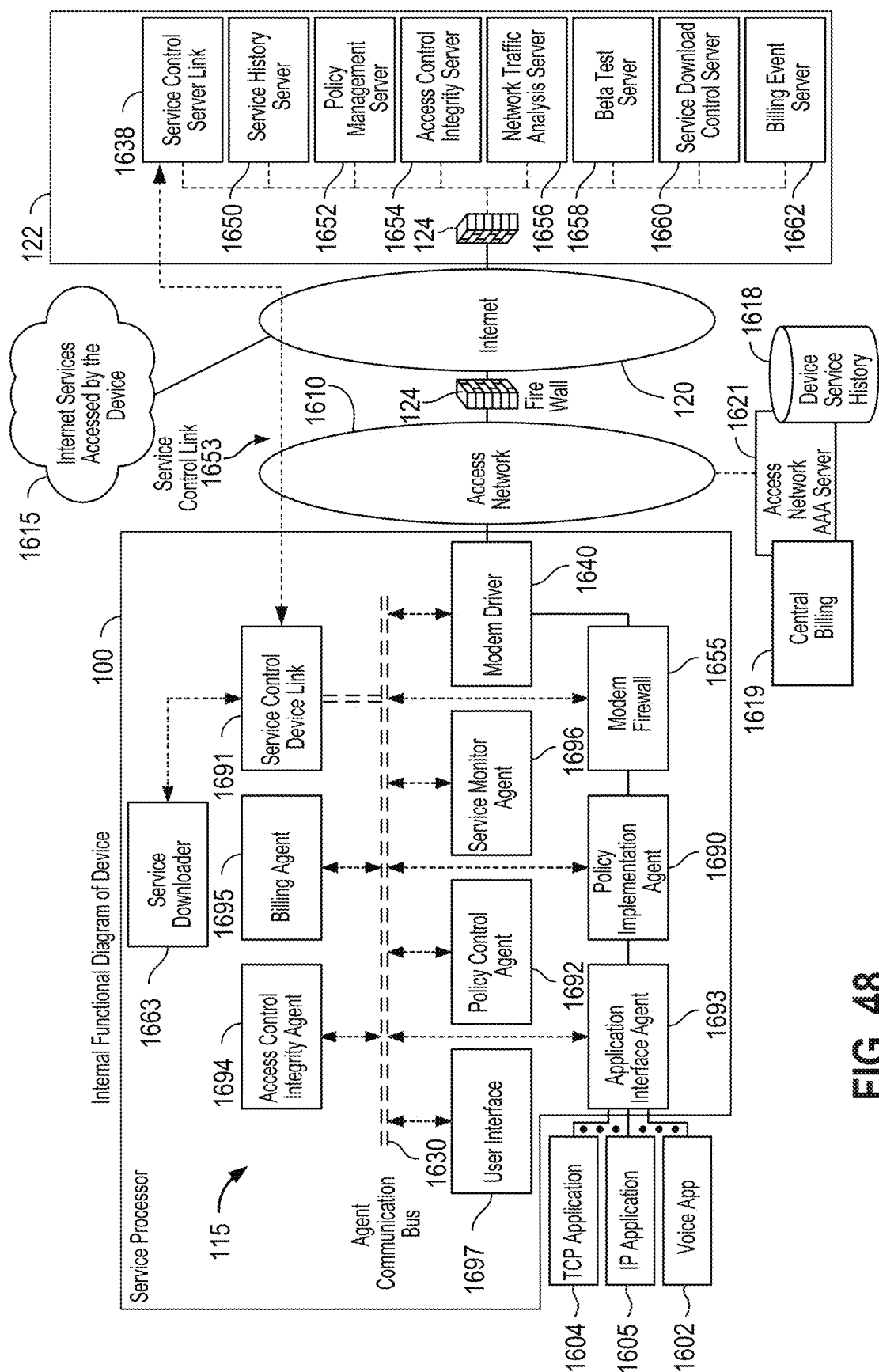
FIG. 48 is a functional diagram illustrating a device based service processor and a service controller in accordance with some embodiments.

FIG. 48 illustrates an exemplary embodiment of device agents and network elements that may implement policies in accordance with the disclosures herein. FIG. 48 is a functional diagram illustrating a device based service processor 115 and a service controller 122 in accordance with some embodiments. For example, this provides relatively full-featured device-based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As previously discussed, it is understood that the division in functionality between one device agent and another is based on, for example, design choices, networking environments, devices and/or services/applications, and various different combinations may be used in various different implementations. For example, the functional lines may be re-drawn in any way that the product designers see fit. As shown, this includes certain divisions and functional breakouts for device agents as an illustrative implementation, although other, potentially more complex, embodiments may include different divisions and functional breakouts for device agent functionality specifications, for example, in order to manage development specification and testing complexity and workflow. In addition, the placement of the agents that operate, interact with or monitor the data path may be moved or re-ordered in various embodiments. For example, one or more of the policy implementation or service monitoring functions may be placed on one of the access modems located below the modem driver and modem bus in the communication stack as illustrated in certain figures and described herein. It is noted that not all the functions illustrated in FIG. 48 are necessary for many designs, so a product/service designer may choose to implement those functions believed to be most advantageous or sufficient for the desired purposes and/or environment.

In the embodiment of FIG. 48, the policy enforcement function may be implemented by policy implementation agent 1690, by application interface agent 1693, by modem firewall 1655, or by a combination of these. The policy decision function may be implemented by policy control agent 1692. The accounting policy function may be implemented by one or both of service monitor agent 1696 and billing agent 1695. The device interface function may be implemented by user interface 1697. The service plan management function may be implemented by one or more of the servers of service controller 122.

Figure 49:
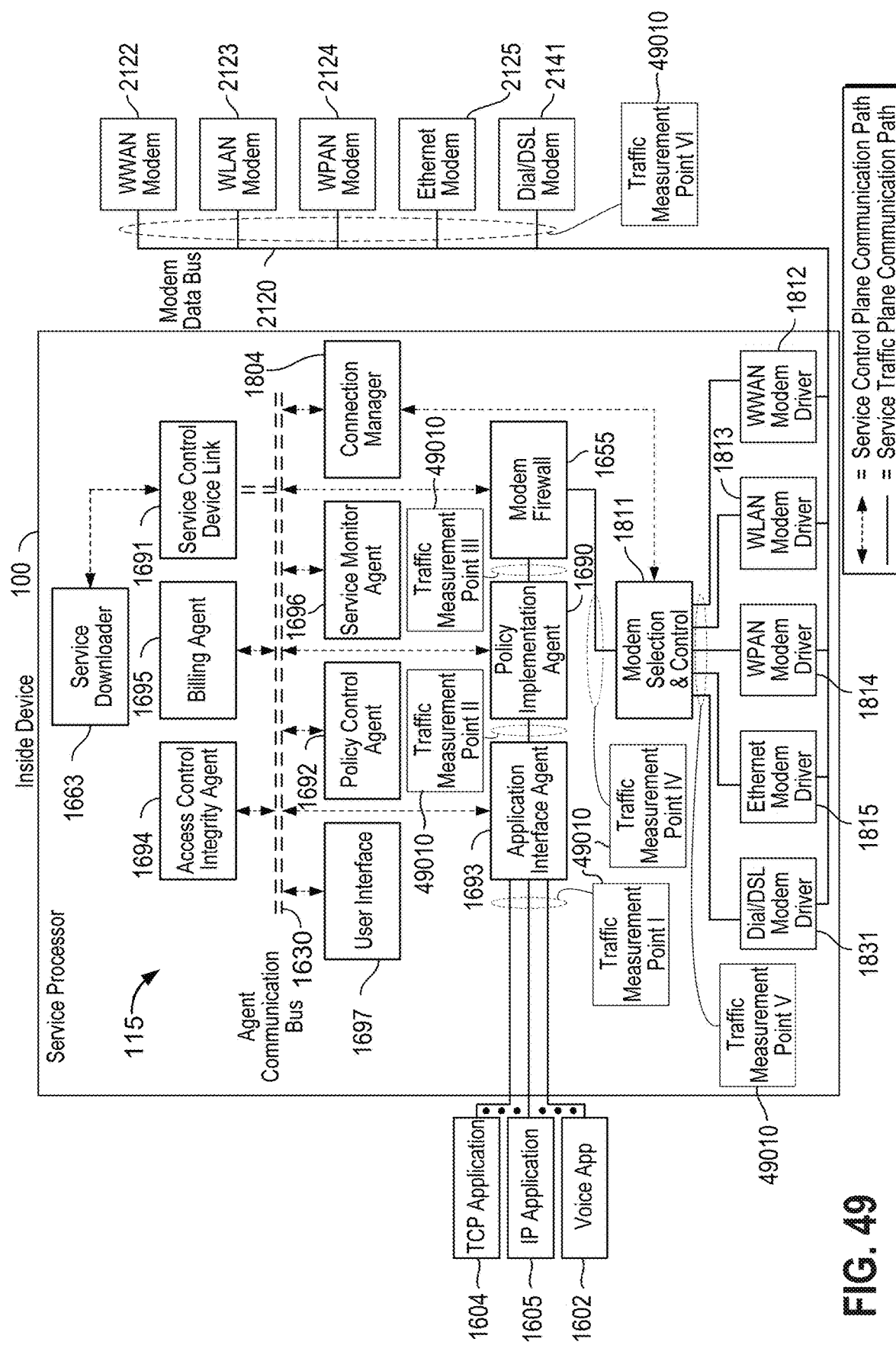
FIG. 49 is another functional diagram illustrating the service processor and the service controller in accordance with some embodiments.

FIG. 49 illustrates an exemplary embodiment showing where communication flows might be monitored and/or controlled (e.g., traffic measurement points I, II, III, IV, V, VI 49010). The service measurement points I through VI represent various service measurement points at which service monitor agent 1696 (or another agent or combination of agents) may perform service monitoring activities. FIG. 49 illustrates the various modem drivers and modems 2122 through 2125 and 2141. In one embodiment, the modems, which include WWAN modem 2122, WLAN modem 2123, WPAN modem 2124, Ethernet modem 2125, and Dial/DSL modem 2141, which are in communication with the modem bus 2120, connect the device to one or more networks. As shown, the traffic measurement points 49010 labeled I through VI represent various service measurement points for service monitor agent 1696 and/or other agents to perform various service monitoring activities. At least one of these measurement points may have a useful purpose in various embodiments described herein. For example, one of the traffic measurement points that is employed in a given design may be used by a monitoring agent to track application layer traffic through the communication stack to assist policy implementation functions, such as the policy implementation agent 1690, or, In one embodiment, the modem firewall agent 1655 or the application interface agent 1693, in making a determination regarding the traffic parameters or type once the traffic is farther down in the communication stack where it is sometimes difficult or impossible to make a complete determination of traffic parameters. It should be noted that an instantiation may not need to implement any or all of the measurement points illustrated in FIG. 49 to have an effective implementation, but various embodiments benefit from these and/or similar measurement points. It should also be noted that the exact measurement points may be moved to different locations in the traffic processing stack, just as the various embodiments described herein may have the agents affecting policy implementation moved to different points in the traffic processing stack while still maintaining effective operation.

As shown in FIG. 49, measurement point I occurs at the application interface agent 1693 interface to the applications. At this measurement point, the application traffic may be monitored before it is framed, packetized or encrypted by the lower layers of the networking stack. For example, this allows inspection, characterization, tagging (literal or virtual) and, in one embodiment, shaping or control of services or traffic. At this measurement point, traffic may be more readily associated with applications, URLs or IP addresses, content type, service type, and other higher level parameters. For example, at this level email traffic and downloads, web browser applications and end points, media file transfers, application traffic demand, URL traffic demand and other such service monitoring parameters are more readily observed (e.g., accessible in the clear without the need for deep packet inspection and/or decryption), recorded and possibly shaped or controlled. It is also possible to monitor upstream traffic demand at this point and compare it to the other measurement points to determine if the traffic policies in place are meeting overall traffic control policy objectives or to determine if traffic policy implementation is operating properly. For example, the downstream delivered traffic may be optimally observed at this measurement point.

As shown in FIG. 49, traffic measurement points II and III are situated on the upstream and downstream sides of policy implementation agent 1690. These two locations allow potential tracking of upstream and downstream traffic through the stack portions associated with the policy implementation agent 1690. These two locations also provide for potential cross-checking of how the policy implementation agent 1690 is impacting the demand and delivery of traffic. In a similar manner, measurement point III in connection with measurement point IV provide an opportunity for packet tracing through the stack components associated with the modem firewall 1655 and provide for the opportunity to observe the demand and delivery sides of the modem firewall 1655. Traffic measurement point V provides the potential for observing the traffic at the modem bus drivers for at least one of the modems.

Figure 50:
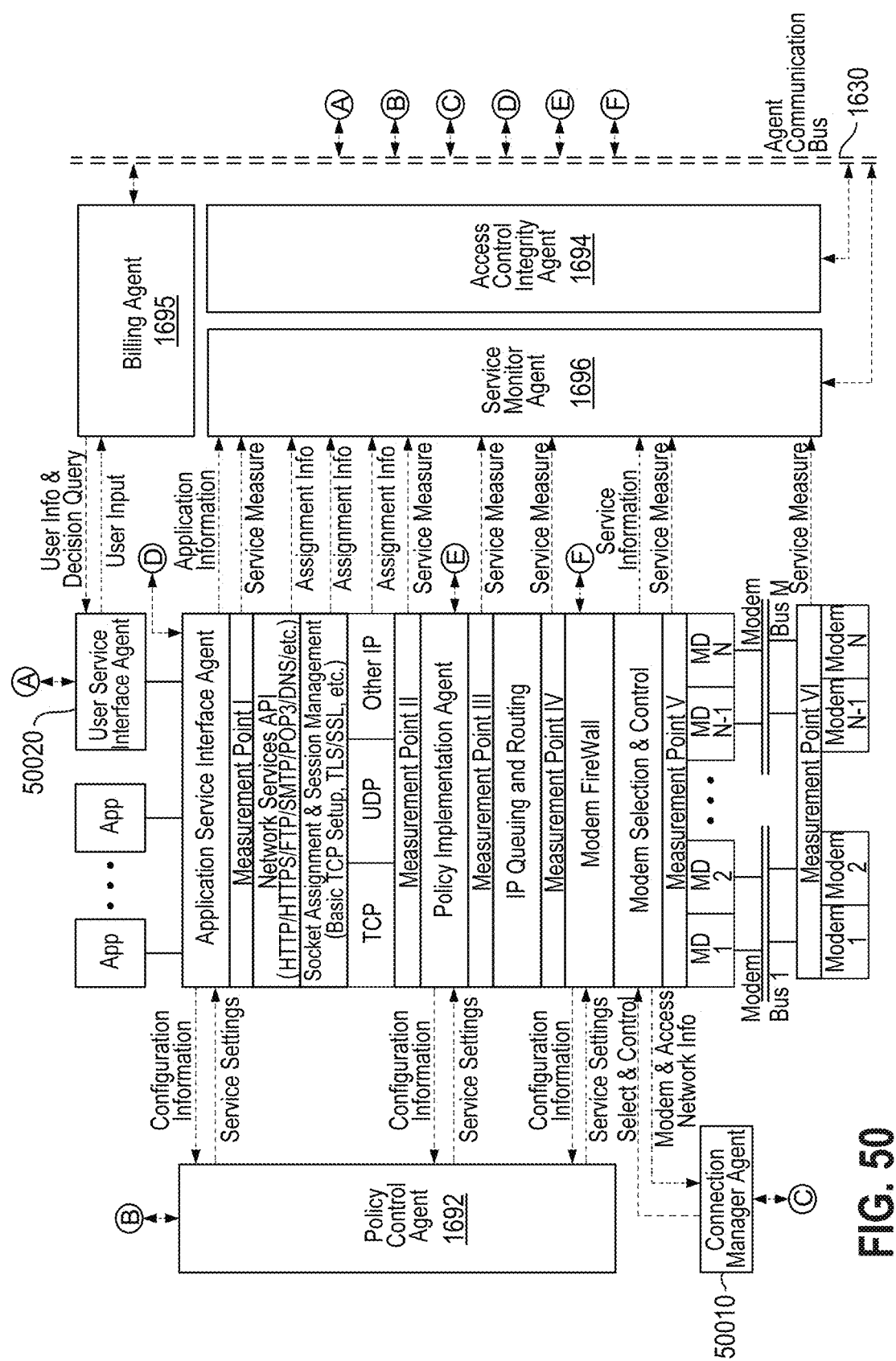
FIG. 50 is a functional diagram illustrating a device communications stack that allows for implementing verifiable traffic shaping policy, access control policy and/or service monitoring policy in accordance with some embodiments.

As shown in FIG. 49, traffic measurement point VI provides, in one embodiment, the ultimate measure of access traffic, for example, the traffic that actually transacts over the access network through the modem. As shown, measurement point VI is at the modem side of the internal or external communications bus 1630, and it will be appreciated that, In one embodiment, this measurement point may be further down the modem stack closer to the MAC or physical layer (e.g., at the designer's discretion). An advantage of having a measurement point deep in the modem is, for example, that if the software or hardware that implements the measurement and reporting is well secured against compromise, then this measure may be almost as strong from a verification perspective as the measure that comes from the network (e.g., from the network elements). Accordingly, this makes it possible to compare this measure against the other measures to determine if there is a traffic path that is leaking past the other measurement point or one or more policy implementation points FIG. 50 is a block diagram illustrating a device communications stack that allows for implementing verifiable traffic shaping policy, access control policy and/or service monitoring policy in accordance with some embodiments. As shown, several service agents take part in data path operations to achieve various data path improvements, and, for example, several other service agents may manage the policy settings for the data path service, implement billing for the data path service, manage one or more modem selection and settings for access network connection, interface with the user and/or provide service policy implementation verification. Additionally, in one embodiment, several agents perform functions to assist in verifying that the service control or monitoring policies intended to be in place are properly implemented, the service control or monitoring policies are being properly adhered to, that the service processor or one or more service agents are operating properly, to prevent unintended errors in policy implementation or control, and/or to prevent tampering with the service policies or control. As shown, the service measurement points labeled I through VI represent various service measurement points for service monitor agent 1696 and/or other agents to perform various service monitoring activities. At least one of these measurement points may have a useful purpose in various embodiments described herein. For example, one of the traffic measurement points that is employed in a given design may be used by a monitoring agent to track application layer traffic through the communication stack to assist policy implementation functions, such as the policy implementation agent 1690, or in one embodiment the modem firewall agent 1655 or the application interface agent 1693, in making a determination regarding the traffic parameters or type once the traffic is farther down in the communication stack where it is sometimes difficult or impossible to make a complete determination of traffic parameters. For example, a detailed set of embodiments describing how the various measurement points may be used to help strengthen the verification of the service control implementation are described herein, including, for example, the embodiments described with respect to FIG. 48 and FIG. 49. The particular locations for the measurement points provided in these figures are intended as instructional examples, and other measurement points may be used for different embodiments, as may be apparent to one of ordinary skill in the art in view of the embodiments described herein. Generally, in one embodiment, one or more measurement points within the device may be used to assist in service control verification and/or device or service troubleshooting.

A 4G/3G/2G DPI/DPC enabled gateway 5610 may be provided with a conventional service gateway functions (e.g., routing, switching, protocol translation/tunneling, charging data function (CDF), charging gateway function (GCF), mobility management, and/or suspend/resume) combined with one or more of the following embodiments and integrated into one or a combination of the service gateways (e.g., RAN and/or transport gateways): DPI service monitor, service history server 1650, device usage 118, DPC policy implementation, policy management server 1652, user notification 5618, billing event server 1662, access control integrity server 1654, service control server link 1638, data plane I/O (e.g., used to represent the I/O port(s) for the gateway), and/or DPI/DPC gateway control plane link (e.g., used to represent the control plane network channel connecting the above elements to other network equipment and in communication with gateway control communication). The packet processing architecture shown in this figure calls for a multi-point to multi-point backplane bus scheme, but it may be apparent that other data path configurations are possible including serial. Further, the above-described configuration may also be applied to either the transport gateway and/or the RAN gateway. It is possible to maintain a secure storage on the 4G/3G/2G DPI/DPC gateway 420 or 410 that may expect secure credentials to get into so that user privacy is protected and service usage information or customer resource management (CRM) information is filtered according to user preferences prior to sending to another network function or network manager, and the same allowances may also be applied for emergency or government monitoring purposes. Network neutrality may also be maintained in this configuration by maintaining network neutrality in the service control algorithm and/or soliciting user input on how to control service usage just as discussed above for other network service control implementations or as discussed in the device based service control descriptions.

In one embodiment, a bill by account function, wherein different service usage categories are accounted—for separately, possibly to facilitate billing of multiple entities for service usage associated with a device, is implemented in the context of the 4G/3G/2G DPI/DPC gateway embodiment or other network based system embodiments described herein. For example, the bill by account information may be completely derived from the network box (e.g., 4G/3G/2G DPI/DPC gateway) without assistance from device based service monitoring or billing capabilities, or none may exist on the device. In this example, the DPI service monitor, in some cases in conjunction with service history server 1650, may operate in conjunction with bill by account policy settings stored in the billing event server 1662 so that service activities are divided into the account classifications defined by the service profile settings. The bill by account feeds may then be sent to the billing system or to an intermediate billing event aggregation server that collects this type of deep packet inspection generated information from one or 4G/3G/2G DPI/DPC gateway 5610 units to aggregate and format the information in a manner that may be used by the central billing system 123. In one embodiment, the bill by account information collected in a network box, such as the 4G/3G/2G DPI/DPC gateway 5610, is augmented, refined or otherwise added to by bill by account information collected on the device as described herein and any intermediate server that may be used to aggregate and format these bill by account feeds for the central billing system deals with both types of data, from the network and from the devices.

The simplified policy architecture described herein has several key advantages:

1. All the policy definitions required to commercialize new service offers are accomplished in a single service plan definition environment: the SDC 360.

2. All traffic monitoring and processing is accomplished in one real time policy function: the PEF.

3. The PEF is the policy function that processes the communication path (e.g., data path), and the simple nature of what the PEF does makes the simplified policy architecture highly scalable. All policies for control, accounting, and notification are based on simply matching filters with communication parameters and executing a finite set of real time policy implementation instructions on the communication flows that match the filter parameters. Changes at the PEF level of policy occur when the PDF modifies the filters or associated policy implementation instructions provided to the PEF. The filters and associated policy implementation instructions implemented by the PEF are termed "policy instruction sets." Because the PEF determines all of the communication events that trigger control, accounting, and notifications, the policy definition environment is simplified and joint policy design is possible. Unifying policy event detection in one function also makes it possible to have simultaneous real time coordination between two or more of the control, accounting, and notification events that are initiated by a policy event. Although the PEF comprises a simple architecture allowing it to perform an ordered search for filter matches and then implement the policy instruction corresponding to the filter that is matched, the SDC 360 policy object hierarchy, the Z-order protocol for determining multi-match policy, and the expansion of PEF command types provides for industry-leading policy sophistication at the time this document is being drafted.

4. Employing policy state as a qualifier or modifier of policy allows the decision logic in the PDF to be simplified. In one embodiment, the PDF in large part simply observes changes in policy state, and when the policy state reaches a pre-defined state the PDA is pre-configured to simply look up a new pre-configured policy instruction set and pass it to the PEF. The SDC 360 may be used to define all the policy state transitions where PEF policy is desired to be changed, and for a defined policy state a new PEF policy instruction set may be configured in the SDC 360 and provisioned into the PDF along with the information necessary to identify a policy state that corresponds to a policy instruction set.

5. Notifications may be triggered in real time off of the same policy events that cause changes in control policy and/or accounting policy. This provides for an elegant and effective real-time synchronization of user notifications about service use or changes in service status, making for a more comfortable and enjoyable user experience. Service usage reporting to the user may be done simply in real time. When a service plan upgrade or new service plan purchase may accomplish a service activity of interest to the user, the user's attempt to use the service activity may be detected instantly, and an offer may be presented through the user interface of the device with little delay. The immediacy of the detection and notification of the upgrade or new service plan purchase makes the service experience more interactive. This approach may be attractive for certain markets in which services are purchased in smaller increments, and the user population has tired of being charged for service overage, or running out of service, or preemptively purchasing more service than the user actually may expect in order to avoid overages or running out of service. With real-time purchase capability, users never need to worry about hassles or overages when they run out of service because they may use a service application or service processor agent to re-up their service plan or purchase a new service plan in real time.

6. Service control, accounting, and notification may be accomplished in real time at a granular level (e.g., per application, per network destination, per content type, etc.), depending on the traffic inspection and/or application awareness capabilities of the PEF.

7. The simplified and unified environment also makes it simpler to define sponsored services and to virtualize services across mobile operator networks as disclosed herein while implementing a highly capable billing platform capable of billing any number of entities for various classifications of the service use consumed by a given device (e.g., billing a first sponsor entity for a first classification of usage, billing a second sponsor entity for a second classification of usage, and billing the user for all service usage not within the first or second classification of usage).

Joint Policy Definition and Enforcement

The provisioning details and FIG. 47 illustrate the multi-match/user-interaction material grated network-service design environment that enables centralized, unified, coordinated development of access-control, service-accounting and service-notification policies, and automated translation of developed service policies into provisioning instructions for a diverse variety of network elements and/or end-user devices is disclosed in various embodiments. In a number of embodiments, for example, classification objects and policy events are defined and/or organized in multiple hierarchical levels ranging from base-level classification objects to complete catalogs of service plans. This hierarchical organization allows for the ascendant inheritance of object properties through the hierarchy (i.e., elements at higher levels of the hierarchy may inherit or take on one or more properties of elements at lower levels of the hierarchy) and normalizes the collection of design elements at a hierarchical level, enabling, for example, a single design element to be included in multiple design elements at higher hierarchical levels, thus streamlining service plan development and simplifying revision and testing. In further embodiments, the integrated design environment contemplates concurrent activation and implementation of "overlapping" service plans for a single end-user device. For example, an end-user device may be associated with or subscribed to more than one active service plan at a time, and, in such cases, more than one active service plan may allow for a particular device activity (e.g., access to a particular web site could be allowed by a service plan providing for unrestricted Internet access, and it could also be allowed by a second service plan that provides for access to the particular web site). The integrated design environment enables plan designers to define control and/or accounting priorities of those plans relative to other or even to delegate prioritization choices to subscribers or end-users (i.e., service consumers or parties associated with a service account, such as parents, device group managers (e.g., virtual service providers, mobile network operators (MNOs), mobile virtual network operators (MVNOs), etc.), enterprise information technology (IT) managers, administrators, etc.). The integrated design environment may also permit definition of "multi-match" classification and the triggering of multiple policy events per match to affect a richer set of end-user device features and performance than is possible with more conventional classification schemes. In yet further embodiments, the integrated design environment enables designers to define and control end-user discovery of available services, for example, through organization and featuring of plans and promotions on end-user devices, and definition of offers to be presented in response to detecting an attempted access for which a compatible plan is lacking. The integrated design environment may also facilitate definition and management of a broad variety of subscriber groups (and/or sets of end-user devices), and also permit "sandboxed" delegation of precisely defined subsets of service design and/or management responsibilities with respect to specified groups of subscribers or end-user devices. These and other features and advantages of the above-mentioned embodiments and others are disclosed in greater detail below.

Figure 51:
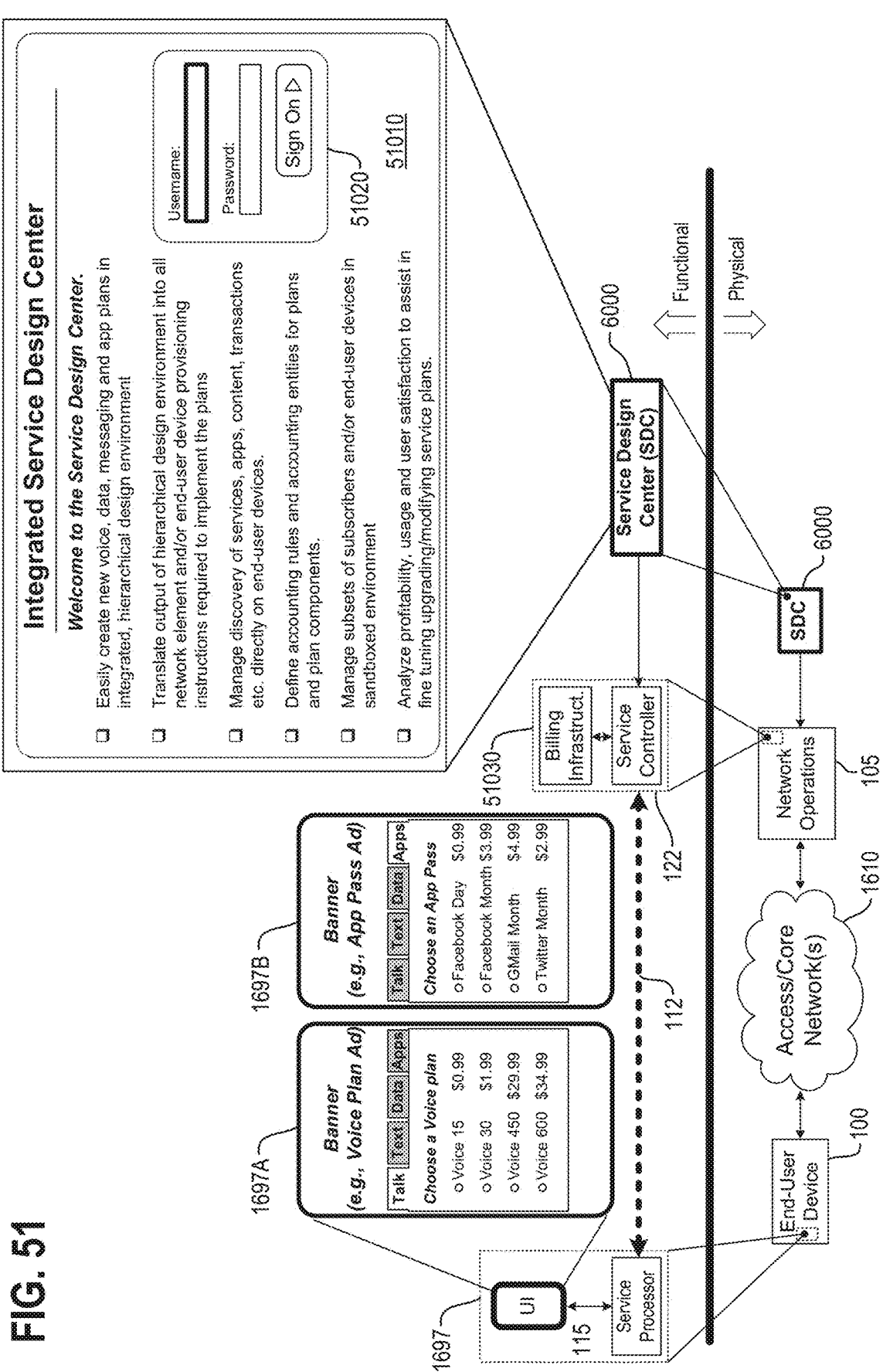
FIG. 51 illustrates an exemplary device-assisted network for which service plans are provisioned by an integrated service design center.

FIG. 51 illustrates an exemplary device-assisted network in which service plans applicable to an end-user device may be designed using, and provisioned using instructions generated by, an integrated service design center 360 according to embodiments disclosed herein. The view presented is split conceptually between physical and functional interconnections of an end-user device and network operation elements. In the physical view, the end-user device 100 and network operation elements 105 are interconnected via one or more networks (e.g., an access network and one or more core networks, shown collectively at 107, and which may include the Internet) to enable delivery of and accounting for usage of various network services according to one or more service plans designed using, and provisioned using instructions generated by, service design center 360. Functionally, a service processor 115, implemented in hardware, software, or a combination of hardware and software, within the end-user device and a service controller 122, implemented in hardware, software, or a combination of hardware and software, within one or more of the network operation elements communicate over a device service link 112 to enable and account for service usage (e.g., voice, data, messaging, etc.), and to enable on-demand purchasing of various service plan offerings via a user-interface (UI) of the end-user device itself. In the user-interface examples shown at 1697A and 1697B, for instance, the end-user device presents various voice, messaging, data and specialized application plans on user-selectable tabs, in a tab prompting the device user to choose from a list of available plans. Service processor 115 communicates the selection of a service plan and, In one embodiment, information about ongoing service usage within a selected plan to service controller 122, which coordinates with other network operation elements and/or elements within the access/core networks to configure the selected service plan and provide the requested service. In one embodiment, the Service Controller 122 obtains service usage information from the service processor and/or one or more network elements (e.g., base station, radio access network (RAN) gateway, transport gateway, mobile wireless center, home location register, AAA server, data store, etc.) and communicates service usage information to billing infrastructure elements as necessary to account for service usage.

In the embodiment of FIG. 51, service design center 360 provides an integrated, hierarchical environment that enables a service designer (e.g., a human operator) to perform a wide variety of tasks, including, for example:

design in detail some or all of the voice, data, messaging and specialized service plans offered on or available to a specified collection of end-user devices, where the specialized service plans may be used to define a wide variety of service plans, possibly time-limited, using any conceivable classification, such as a plan that offers voice and/or messaging service up to a specified usage limit (e.g., specified minutes of voice and/or number of texts), or a plan that offers access through a particular end-user device application ("app") (e.g., a plan that allows unlimited use of the Facebook app for a day), or a plan that offers access to a particular network destination (e.g., access to a particular web site for a specified period of time, etc.), or a plan that offers access to a particular type of content (e.g., streaming content, video content, audio content, etc.), or a plan that offers access to a particular category of services (e.g., access to social networking services through specified apps and web sites);

translate an output of the hierarchical design environment into network element and/or end-user device provisioning instructions necessary to provide and account for plan services under the available service plans;

manage end-user discovery of available services, applications, content, transactions and so forth, including managing the organization, display and promotion of available plans on end-user devices and managing presentation and acceptance of plan offers in response to detecting an attempted access for which no compatible plan has been purchased, or for which a less expensive or otherwise more user-appealing plan is available;

design accounting rules and configure information associated with accounting entities (e.g., AAA servers, online charging systems, offline charging systems, mediation platforms, home location registers, messaging gateways, etc.) (including third-party service sponsors) for end-user service plans and plan components;

design access rules and configure information associated with access control entities (including network elements (e.g., DPI systems, access gateways, AAA servers, online charging servers, messaging gateways, etc.))

manage subsets of subscribers and/or end-user devices (e.g., associated with an enterprise, device group, mobile virtual network operator, virtual service provider, carrier, etc.) with a pre-defined set of permissions according to designer credential established at login (i.e., as shown at 51020 within the exemplary service design center introduction display 51010); and/or analyze profitability, usage, user-satisfaction metrics, etc. to assist in fine-tuning and/or upgrading or modifying offered service plans.

These and various other features and advantages of embodiments of integrated network-service design are described in further detail below.

Figure 52:
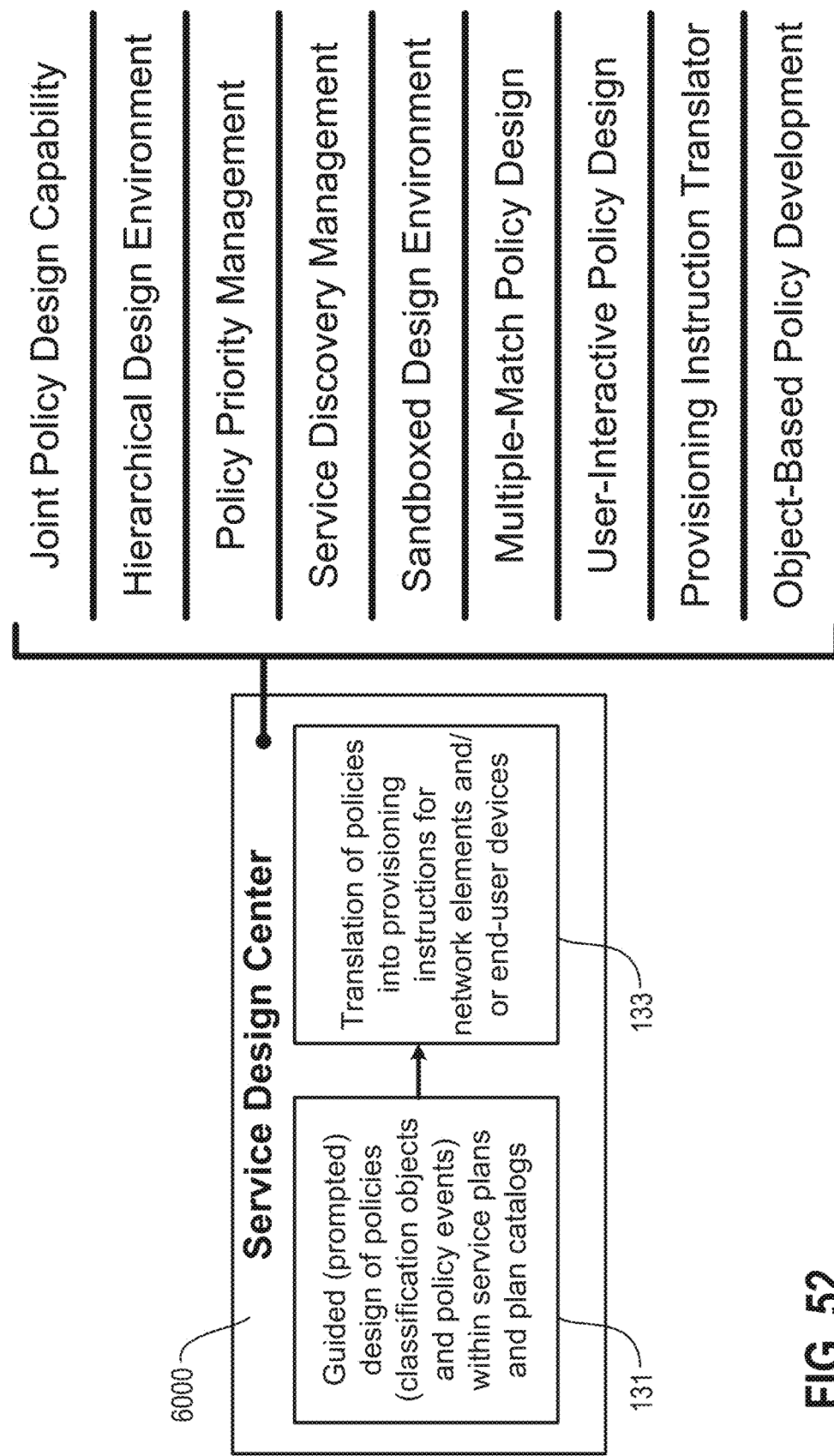
FIG. 52 illustrates an example embodiment of an integrated service design center, depicting high-level service design and provisioning operations together with a non-exhaustive list of design center capabilities and features.

FIG. 52 illustrates a conceptual embodiment of an integrated service design center 6000, depicting high-level service design and provisioning operations together with a non-exhaustive list of design center capabilities and features. As shown, service design center 6000 guides (or prompts) a service designer through the design of service polices within service plans and/or catalogs of service plans (131) and then translates the service policies defined for the designed service plans into provisioning instructions for network elements and/or end-user devices (133). In contrast to conventional approaches in which at least access-control and accounting policies are disaggregated and separately designed, integrated service design center 6000 enables those policies and complementary notification policies to be jointly designed in a centralized, hierarchical design environment. Further, integrated service design center 6000 provides a rich set of design tools that permit plan designers to set priorities for when service plans and/or plan components overlap (i.e., when a particular device activity is within or is covered by more than one service plan or plan component), manage and promote end-user discovery of available services or service plans, and define multiple-match classification sequences (e.g., what to do when a particular device activity fits within more than one classification) and user-interactive policy application (e.g., dynamically determining and/or modifying the policy to be applied in response to a filter-matching event based on user-input), all together with a provisioning instruction translator that generates, according to the service design output, the various provisioning instructions required to provide and account for planned services, and for various network elements (e.g., network equipment, the end-user device, etc.) to implement the policies applicable to such services. Moreover, as described in greater detail below and illustrated with respect to exemplary user-interface displays shown in FIG. 51, the service design center supports object-based service policy development, enabling a service designer to carry out service plan design through creation, organization, testing, revision and deployment of reusable policy objects at every hierarchical level of the plan design.

Joint Policy Design

Figure 53:
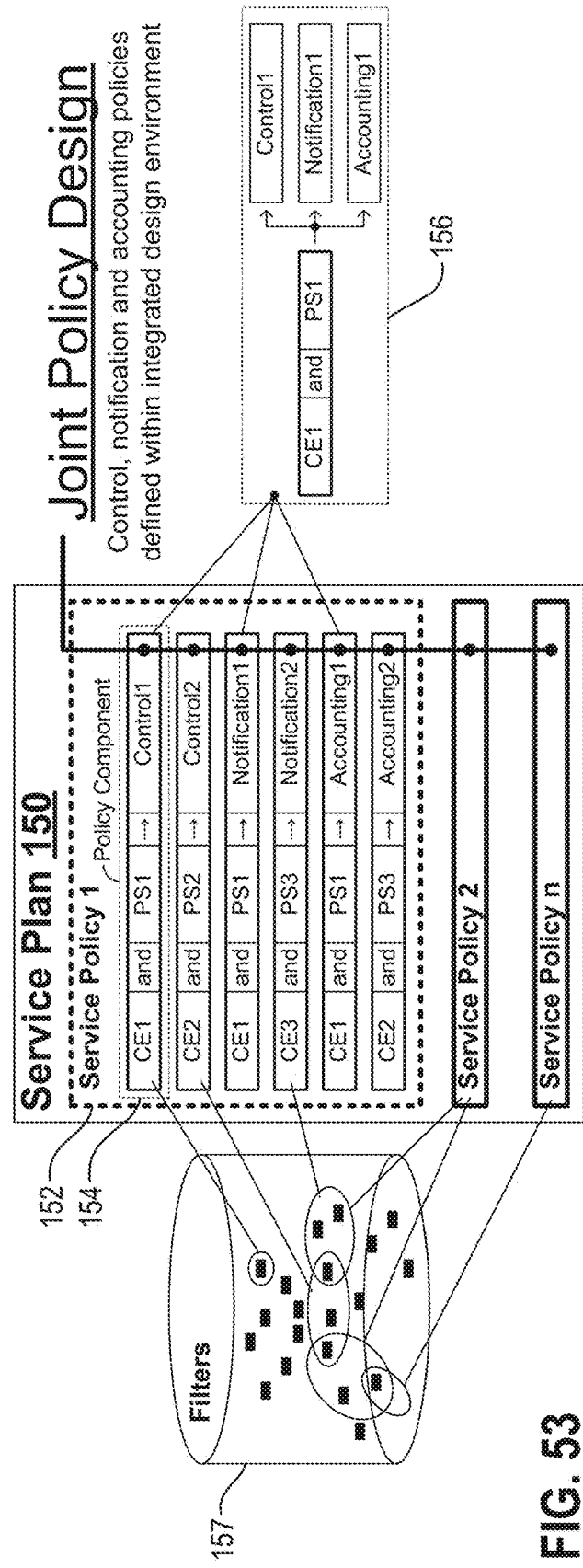
FIG. 53 illustrates an exemplary policy elements that may be defined and provisioned by the integrated service design center in accordance with one embodiment.

FIG. 53 illustrates exemplary policy elements that may be defined using and provisioned by the integrated service design center of FIG. 52. As shown, a policy may be defined as one or more actions carried out in response to (i.e., triggered by) detecting a classification event while or when in a policy state, with the action, classification event, and policy state may a be specified by a plan designer through interaction with the integrated service design center. In general, classification events are matches between designer specified classification objects and attempted or actual service access events. In a number of embodiments described below, service activity filters (or "filters") constitute base-level classification objects, with one or more filters forming constituents of a higher-level object referred to herein as a service policy component (or "component"). This hierarchical definition of classification objects, illustrated graphically at 140 in FIG. 53, provides a number of benefits, including object normalization (i.e., a single filter definition may be incorporated within multiple components, rather than requiring redundant filter definitions within respective components), property inheritance (properties defined with respect to filters are imputed to incorporating components) and hierarchical development (i.e., respective service designers or groups of designers may be tasked with lower-level filter design and higher-level component design) to name a few. The integrated service design center thus allows personnel with differing skills and knowledge to participate in service plan design/configuration. For example, an engineer could use the integrated service design center to design filters and/or components for use in service plans without having any knowledge of the service plans that subscribers are likely to want. For instance, the engineer could design a filter to identify network access attempts associated with the Facebook app on an end-user device without knowing how that filter might be incorporated into a service plan or how that filter might be used to define a new service. Conversely, a marketing individual with knowledge of network services subscribers are likely to want, but lacking know-how to implement underlying filters and or other more technical design objects, may nonetheless design marketable services or service plans by leveraging the filters and/or components designed by the engineer. For example, the marketing individual could design a "Facebook app for a day" service using the Facebook app filter designed by the engineer. The integrated service design center thus facilitates collaborative definition and deployment of service plans and services by allowing service design activities to be partitioned at different levels of the design hierarchy and engaged by individuals most knowledgeable or otherwise best suited for the design activity at hand.

Still referring to FIG. 53, policy state refers to a temporal condition such as a network state, classification-scanning state, service usage state and/or transition with respect to network, classification-scanning or service-usage states that, if in effect at the time of the classification event, may trigger the policy action, which, as shown, may be either an access-control action, an accounting action, or a notification action. Thus, the policy state may be viewed, from a Boolean perspective, as a qualifier to be logically ANDed with the classification event (i.e., match detection with respect to classification object) to trigger the policy action. As explained below, the policy state associated with a given classification object may be set to an "always true" state (e.g., "any network state" and "any service usage state") so that any match with respect to the classification object may trigger execution of the corresponding policy action. For example, if a sponsored text messaging service is available (e.g., a service sponsor has decided to offer some number of free text messages to a particular group of end-user devices), it might be desirable to provide a notification to every end-user device in the group of the availability of the sponsored text messaging service, regardless of whether those end-user devices are already able to send or receive text messages. Conversely, the classification event defined by a classification object may be set to an "always TRUE" condition (i.e., no access event or attempted-access event required) so that any match with respect to the policy state definition may trigger execution of the corresponding policy action. Examples include actions triggered in response to entering or leaving a roaming network, detecting availability of a known WiFi network for offloading, etc. In a number of embodiments described below, policy states and corresponding policy actions are defined conjunctively by a service designer as "policy events"—actions to be performed if an associated classification object is matched while/when one or more policy states are true.

FIG. 53 illustrates an exemplary joint policy design—a combination of access-control, notification, and accounting policies or any two of those three policy types—that may be defined and provisioned using the integrated service design center of FIG. 52. To be clear, while FIG. 53 illustrates all three of access-control, notification, and accounting policies, it should be understood that joint policy design may involve only two types of policies, such as access-control and notification, or access-control and accounting, or notification and accounting. Proceeding hierarchically from top to bottom (and graphically from outside in), a service plan 150 is defined to include one or more service policies 152, with a service policy including one or more service policy components 154 and a service policy component constituted by the policy elements described in reference to FIG. 53 (i.e., a classification event (CE), policy state (PS), and triggered action). For example, the top row specifies classification event "CE1," policy state "PS1," and triggered action "Control1"; the second row specifies classification event "CE2," policy state "PS2," and triggered action "Control2"; and so forth. The classification event within a service policy component results from a match with a component-level classification object constituted by one or more filters within, for example, a database of filter definitions 157. In the example shown, and in a number of embodiments discussed below, policy events (i.e., combined policy state and policy action definitions) are defined at the policy component level, but such definitions may generally be applied at any hierarchical level within the plan design.

As a matter of terminology, individual policy components are distinguished herein as access-control policies (or "control policies" for short), accounting policies, and notification policies according to the nature of their triggered actions. For example, the six exemplary policy components 154 within the first service policy instance (i.e., "Service Policy 1") include two control policy components (indicated by policy actions "Control1" and "Control2"), two notification policy components, and two accounting policy components (of course, the inclusion of the six exemplary policy components 154 within the first service policy instance is merely illustrative—more or fewer components may be included within a given service policy). Likewise, it is not necessary that the components include all three of control, notification, and accounting, or that the number of a type be equal. As described above and in further detail below, the hierarchical definition of filters and component-level classification objects enables filters within database 157 to be re-used within a given service policy 152, as in the definition of classification events CE2 and CE3, and also within different service policies. Also, the same classification event may be associated with two or more policy events within respective policy components as in the policy components that yield control, notification, and accounting actions (Control1, Notification1, Accounting1) in response to classification event CE1 during policy state PS1. Further, while a policy component is shown as triggering a single control action, a single policy component may be defined to include multiple actions in an alternative implementation or configuration. Thus, instead of requiring three separate policy component instantiations to effect the Control1, Notification1, and Accounting1 actions, a single policy component may be defined to trigger those three actions (or any combination of actions, including two or more actions of the same type) as shown at 156. In addition to enabling efficient, joint policy definition within an integrated design environment, this design flexibility permits the design of arbitrarily complex policy implementations, including policies that support multiple-match classification sequences and "interceptor" policies that detect attempted access to an unsubscribed service and interact with a user to offer and activate one or more access-compatible service plans.

The consistent joint (integrated) policy definition and enforcement framework enabled by the various SDC embodiments presented herein is tremendously advantageous in the design and provisioning of enhanced policy enforcement capability, lower complexity and reduced network cost, reduced latency in user service notifications, and real time interaction between service plan policy options and user preferences to enhance the user experience and increase the opportunities to effectively market and sell new types of services and service plans or bundles. As described above, joint policy definition and enforcement framework refers to the capability to define and deploy filters (or collections of filters) conditioned on policy state and associate the conditioned filters with any of three policy types: control, accounting and notification. For example, a service activity (e.g., access or attempted access) that yields a match with respect to a filter (or collection of filters) defined as a "data communication type" and conditioned on "service limit reached" (a policy state) may be associated with a joint policy actions comprising "cap" (a control action triggered by the policy-state-conditioned filter match and thus a control policy) and "send plan modification required notification" (a notification action triggered by the filter match and thus a notification policy). This "cap and notify" joint policy construct allows for simultaneous execution of real-time capping (when the service limit is reached) and real-time user notification that the limit has been reached. Because the notification action is triggered at the same instant as the cap was enforced (i.e., both actions are triggered by the same policy-state-conditioned filter matching event), and the notification trigger may cause the notification system to deliver a user interface message to be displayed on the device UI in fractions of a second to a few seconds, the device user experiences a notification explaining why the service has been stopped precisely when the user has requested service and thus while the user's attention is directed to execution of the requested service (i.e., coincident in time with the service being stopped). Further, the UI message may include or be accompanied by information of various options for resolving the service stoppage, including on-the-spot offers to activate one or more service plans that may enable the requested service. Thus, in contrast to a disaggregated policy design/implementation in which notice of plan-expiration may arrive minutes or hours after the relevant service request with no option for resolution beyond calling a "customer care" call center (i.e., an untimely notification of a problem with no clear or immediate avenue for correction—in essence, a nuisance), a joint or integrated policy defined using embodiments of the integrated service design center enables instantaneous notification of the plan exhaustion event together one or more options for immediate resolution and allowance of the requested service access, apprising the network-service consumer of a problem and offering one or more solutions (including offers to purchase/activate additional service plans) precisely when the consumer is most likely to make a purchase decision. From a system design perspective, by providing the capability to associate a filter match definition with multiple policy types (i.e., as in the above example of joint (or integrated) policy design) there is no longer a need to have separate communication service control and communication service notification systems because both functions are accomplished with the same system.

As another joint or integrated policy example, a filter match comprising "data communication type" (a filter or component) conditioned on "service limit reached" (a policy state) may be associated with a joint policy comprising "stop accounting to base service plan bucket" (a first accounting policy), "begin accounting to service overage bucket" (a second accounting policy), and "send service overage now in effect notification" (a notification trigger policy). As in the preceding cap and notify example, this exemplary "cap and match" joint policy provides real-time notification to make the end-user immediately aware of service plan status (i.e., capped in this example), thus allowing the end-user to potentially modify his/her service plan or usage behavior. As the cap and match example also demonstrates, the single, simplified joint policy enforcement system obviates the separate accounting and notification systems that plague conventional approaches.

As another joint policy example, three-way joint policy enforcement may be achieved through definition of a filter comprising "data communication type" (a "data" filter or collection of data filters) whose match is conditioned on a "service limit reached" policy state and triggers, as control, accounting and notification actions, a "restrict access to service activation destinations" (a control action, and thus a control policy), a "stop accounting to base service plan bucket" (an accounting action and accounting policy), and a "send new service plan or service plan upgrade required" notification (a notification action and therefore a notification policy). In this example the complexity of having separate accounting, control and notification systems that are difficult to program and provide poor notification response times is avoided and replaced with an elegant, simple, less expensive and easier to program joint policy system that provides real time user notification.

As mentioned briefly above, embodiments of the integrated service design center also enable design and deployment of interactive (or dynamic) service policies. Continuing with the data filter example presented above, a match with respect to a data filter conditioned (or qualified) by a "service limit reached" policy state may be associated with a joint user-interactive policy comprising "cap until user response received" (a user-interactive control policy), "stop accounting to base service plan bucket" (an accounting policy), and "send the service plan offer corresponding to the data limit reached condition" (a user-interactive notification trigger policy). Thus, the embodiments described herein provide not only for enhanced policy enforcement capability, lower complexity and reduced latency for a better user experience, but also real-time interaction between service plan policy options and user preferences, further enhancing the user experience and increase the opportunities to effectively market and sell new types of services and service plans or bundles.

As another example illustrating a joint policy design, a first data filter match conditioned by a "95% of service limit reached" policy state may trigger (or otherwise be associated with) a "send service limit about to be reached" notification (i.e., a notification policy), and a second data filter match conditioned by a "100% of service limit reached" may trigger a "cap" control action (i.e., a control policy). Thus, in this joint policy design example, the integrated service design center enables definition of a common (or shared) data-communication-type filter that is conditioned on two different policy states and, when matched in conjunction with the respective policy states, triggers distinct notification and control actions.

As another example illustrating a joint policy design, a first filter match comprising "Amazon" (a filter or a component) conditioned on "sponsored Amazon limit not reached" (a policy state) may be associated with "allow" (control policy) and "account to sponsored Amazon bucket" (an accounting policy), and a second filter match comprising "Amazon" (a filter or a component) conditioned on "sponsored Amazon limit reached" (a policy state) may be associated with "stop accounting to sponsored Amazon bucket" (an accounting policy), "send acknowledgement for 'Free Amazon service limit reached for this month, would you like to continue with Amazon charged to your data plan?' notification" (a user-interactive notification policy) and "cap until user response received" (a user-interactive control policy), "if user agrees, cap-match" [e.g. continue searching for a match] (a user-interactive policy to proceed down the Z-order to find another match), and "if user does not agree, cap-no match" (a user-interactive control policy). This is an example of a multi-match policy set where Amazon is first tested for the sponsored service filter until the sponsored service use bucket limit is reached, then a cap-match command is executed and, if there is another Amazon filter match before the "no capable plan" end filter is reached (e.g. a user data plan bucket that is not over its limit), then a second match may be found in the prioritization order.

As another example illustrating a joint policy design, at a first time a first filter match comprising "application update" (a filter or a component) conditioned on "application background status" (a first policy state) and "roaming network condition in effect" (a second policy state) may be associated with "block" (a control policy), and at a second time a second filter match comprising "application update" (a filter or a component) conditioned on "application foreground status" (a first policy state) and "roaming network condition in effect" (a second policy state) may be associated with "allow" (a control policy), and at a third time a filter match comprising "application update" (a filter or a component) conditioned on "application background status" (a first policy state) and "home network condition in effect" (a second policy state) may be associated with "allow". Thus, in this example a filter is conditioned on two policy state conditions (home/roaming network state and foreground/background application state), wherein in a background application update is allowed unless it is occurring on a roaming network, and a foreground application update is always allowed. This example simultaneously demonstrates two advantageous capabilities that may be achieved through joint policy design: the ability to modify control policy (or accounting or notification policies) as a function of network type and also the ability to modify control policy as a function of foreground versus background application status.

As another example illustrating joint policy design, a filter match comprising "no capable plan" (the final filter in the Z-order search) conditioned on "Vodafone Spain roaming network condition in effect" (a policy state) may be associated with "send the service plan offer corresponding to roaming on Vodafone Spain" (a notification policy), and "cap and wait for response" (a user-interactive control policy). Further, as a pure notification example, a filter match comprising "voice communication type" (a filter or component) conditioned on "80% of service limit reached" (a policy state) may be associated with "send 'you have 20% left on your talk plan' voice notification message" (a notification policy).

As a marketing interceptor example, a filter match comprising "no capable data plan" (the final filter in the Z-order search) with no condition may be associated with "send the free try before buy service offer" (a notification policy), and "cap and wait for response" (a user-interactive control policy).

As another marketing interceptor example embodiment, a filter match comprising "Facebook" (a filter or component) may be associated with "notify and continue" (a notification trigger policy) and "send Google+sponsored cellular service offer" (a notification policy). In this example the special command "notify and continue" is provided as an example of the expanded policy enforcement instruction set that may lead to additional policy capabilities—in this case simplified and powerful notification based on user activity with their device. The notify and continue command example provides for a notification trigger that results in a notification being sent to the device UI (in this case an offer for free Google+ access on cellular networks) with no impact on service plan control or accounting and without interfering with the service activity to match with a filter in the Z-order search. The "continue" in "notify and continue" refers to the process of allowing the Z-order search process to proceed to find a match under the service plan policies in effect.

As another example of joint policy design and implementation, a notification policy may specify that when an end-user device that is not associated with (subscribed to) a service plan that provides for text messaging attempts to send a text message, a notification is provided through a user interface of the end-user device. In this example, the policy state is that the end-user device is not associated with a service plan that provides for text messaging, the classification event is that the end-user device attempted to send a text message, and the action is to provide a notification through the user interface of the end-user device. As another example, a control policy may specify that when an end-user device that is not associated with (subscribed to) a service plan that provides for text messaging attempts to send a text message, the text message is blocked. In this example, the policy state is that the end-user device is not associated with a service plan that provides for text messaging, the classification event is that the end-user device attempted to send a text message, and the action is to block the attempted text message. The policy may specify more than one action. For example, continuing with the examples above, a policy may specify that when an end-user device that is not associated with (subscribed to) a service plan that provides for text messaging attempts to send a text message, the attempted text message is blocked, and a notification is provided through a user interface of the end-user device. In general, classification events are matches between designer-specified classification objects and attempted or actual service access events. For example, in the text message example provided above, the designer-specified classification object is an attempt to send a text message, and the attempted or actual service access event is that the end-user device attempted to send a text message.

Hierarchical Design Environment

Figure 54:
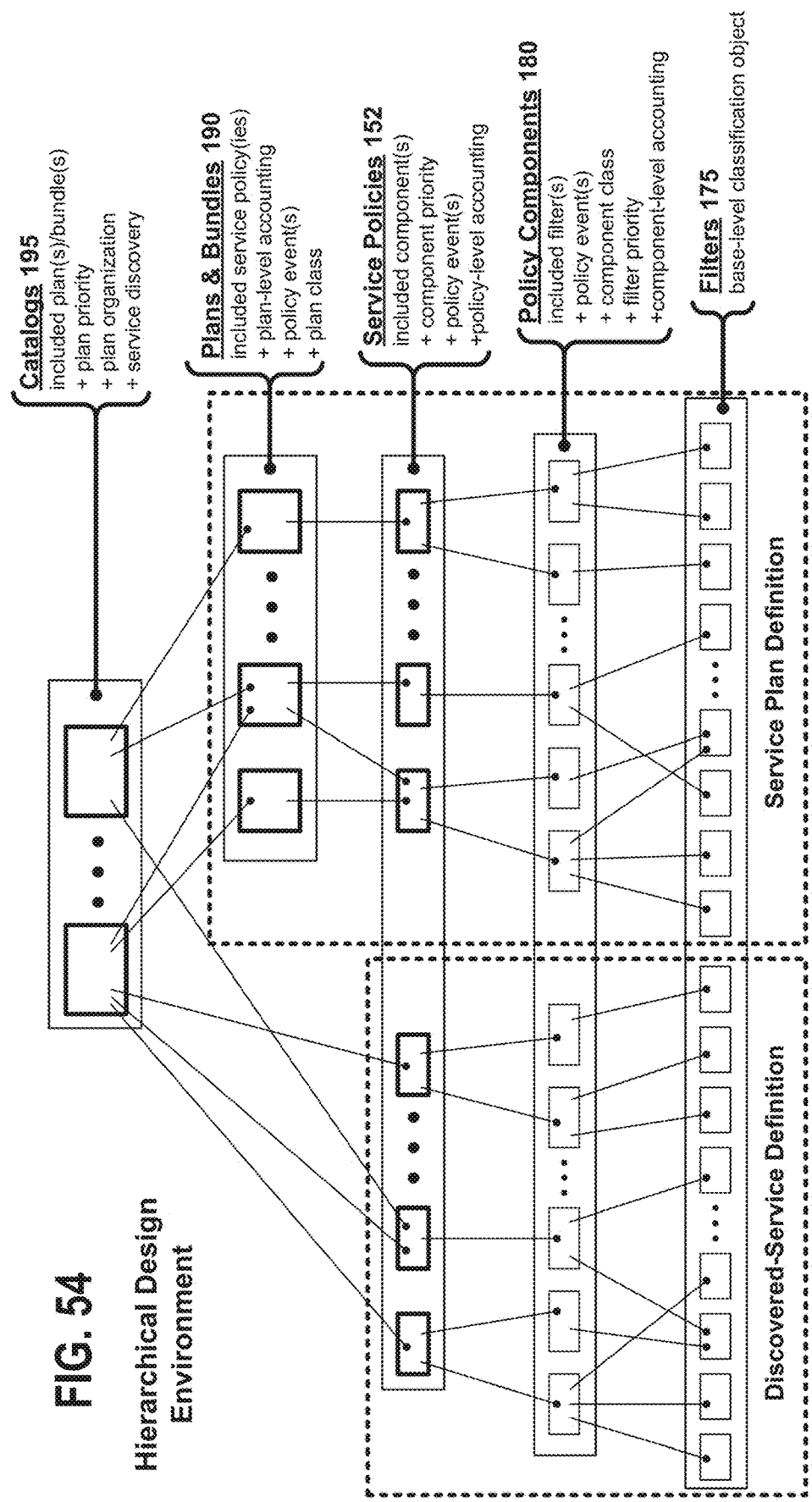
FIG. 54 illustrates a hierarchical design environment implemented in an integrated service design center in accordance with one embodiment.

FIG. 54 illustrates a hierarchical design environment implemented in a specific integrated service design center in accordance with an embodiment.

Proceeding from bottom up through the hierarchy, filters 175 form base-level classification objects to be incorporated into service policy components 180 at the next hierarchical level. As shown, a service policy component includes, in addition to the incorporated filter(s), one or more policy event definitions together with a component service class definition, filter priority specification and optional component-level accounting specification. As discussed in reference to FIG. 53 and in further detail below, a policy event definition specifies a policy state and triggered action (i.e., an access-control, notification or accounting action), thus establishing, in conjunction with the incorporated filter set, the policy elements presented semantically in FIG. 53. As shown in FIG. 54 (and described above), a service policy component 180 may include filters that are incorporated within other service policy components, enabling a single filter definition to serve as a classification object within multiple service policy components. The component service class definition is applied, in at least one embodiment, to prioritize between potentially conflicting applications of different service policies to a given service activity (e.g., when one service policy specifies to block the service activity, and another service policy specifies to allow the service activity), and the filter priority definition likewise prioritizes the classification sequence between individual filters of a service policy component (e.g., if a service activity fits two classifications, which classification wins). Policy priority management is discussed in greater detail below in reference to FIG. 55.

Proceeding to the next hierarchical design level shown in FIG. 54, service policies 152 are defined by inclusion of one or more service policy components, together with a component priority specification, an optional number of multi-component (or "service-policy-level") policy event definitions and policy-level accounting specifications. As an example, a service policy underlying a social networking plan may include separate service policy components for different types of social networking services—a Facebook service policy component that enables access to a Facebook app, for instance, and a Twitter service policy component that enables access to a Twitter app. one of those service policy components may themselves include any number of filters and policy event definitions as explained below. The component priority specification enables prioritization between same-class service policy components, and the multi-component policy event specification permits association of a single policy event with the classification objects within all incorporated service policy components—in effect, defining multiple service policies through a single, shared policy event specification. The examples described below in reference to FIGS. 56 and 57 demonstrate the value and power of intra-class prioritization with regard to plans, for instance, by enabling the service designer to prioritize an earlier-to-expire plan ahead of a later-expiring one. The ability to prioritize between same-class service policy components similarly empowers the service designer (or user, based on a preference setting) to reliably predict/control which service policy component may be applied first to enable a given service activity. For instance, the service designer may prioritize a more generic component beneath a more specific one (e.g., "Social Networking component" prioritized beneath a Facebook component) or prioritize between open access/no-streaming and open access/with—streaming plans.

The hierarchical design levels described thus far (i.e., filters, policy components and service policies) may be applied in either a service plan definition or in discovered-service constructs, such as the marketing interceptors (or "interceptor" policies) mentioned above, which may detect attempted accesses to an unsubscribed service and interact with a user to offer and activate one or more services. FIG. 54 reflects this division between plan definition and discovered-service definition as a separation of constituent design objects at and below the service policy level in the design hierarchy. Note that, though depicted (for convenience) as mutually exclusive within the service plan and discovered-service definitions, the various design objects at a hierarchical level (i.e., filters, policy components and/or service policies) may be shared between service plan and discovered-service definitions. More generally, some types of discovered-service constructs may be viewed as special configurations of service plans. For example, a marketing interceptor may be viewed as a plan with a disallow access-control policy and a notification policy, triggered by a particular policy state (e.g., classification scanning state=Disallow and NO Match is seen, as discussed below), that yields a message prompting the user of an end-user device to activate one or more optional service plans.

Continuing upward to the next hierarchical level within a service plan definition, service plans and service-plan bundles (the latter being referred to in shorthand herein as "bundles") are defined by incorporation of one or more service polices together with a specification of optional plan-level accounting policies, plan-level policy events and plan class. In one embodiment, plans and bundles are distinguished by quantity of incorporated service policies with service plans a incorporating a single service policy, and service-plan bundles a incorporating multiple service policies (i.e., establishing, in effect, a bundle of service policies). As discussed below, the multiple service policies within a bundle are generally billed as a collective service, but may be accounted for separately, for example, to enable costs of constituent service policies to be broken out for taxation, analytic or other purposes.

In a number of embodiments, plan-level accounting enables billing on recurring or non-recurring cycles of designer-specified duration, and thus complements any policy-based accounting actions (e.g., component-level, policy-level or plan-level accounting according to service usage in addition to or instead of accounting per temporal cycle). In one embodiment, for example, the service design center permits the specification of a minimum number of billing cycles to transpire (and/or a calendar date or other criteria) before plan cancellation is permitted, and also whether plan usage metrics are to be reset or usage limits varied (e.g., usage rollover) at the conclusion of a given accounting cycle. Other examples include proration rules, sharing rules, etc.

Plan-level policy event definition, like policy event definition at the service policy level, permits a single policy-event definition to be associated with the classification objects incorporated from lower hierarchical levels, thus enabling a conceptually and logistically efficient definition of numerous policies having a shared plan-level policy state and triggered action, but different classification events. Plan class specification enables prioritization between service plans according to, for example, the paying entity, nature of the service, and so forth. In one embodiment, for example, plans may be differentiated as either sponsored (i.e., a third party pays for or otherwise defrays the cost of service in part or whole) or subscriber-paid, with sponsored plans being prioritized ahead of subscriber-paid plans. By this arrangement, sponsored and subscriber-paid plans for otherwise identical services may coexist, with the plan prioritization ensuring usage of a sponsored plan before its subscriber-paid counterpart (or vice-versa). As another example, plans that enable service activation may be differentiated, as a class, from service-usage plans, with activation-class plans being prioritized ahead of their service-usage counterparts. Such prioritization may be used to ensure that a user service plan is not charged for data access required to activate a service plan (or for service plan management).

In the embodiment of FIG. 54, the top hierarchical design level is occupied by plan catalogs (or "catalogs"), one of which constitutes a complete collection of service plans and bundles to be published to a given end-user device group (i.e., one or more end-user devices) or subscriber group (i.e., one or more subscribers). Accordingly, a plan catalog is defined to include one more service plans and/or service-plan bundles instantiated in the hierarchical level below, together with an indication of relative priority between same-class plans and, optionally, a one or more plan organization specifications (e.g., add-on plans, base plans, default plans such as carrier plans and/or sponsored plans, etc.). As shown, a plan catalog also may also include one or more discovered-service objects (e.g., marketing interceptors expressed by service policy definitions within the discovered-service branch of the design hierarchy) and may define various service-discovery functions such as promotions or "upsells" of available plans or bundles (e.g., presented in banner ads, scheduled pop-ups, usage-driven notifications, etc.), organization and featuring of cataloged plans within the user-interface of an end-user device, and so forth. Thus, altogether, the plan catalog design, together with properties and features inherited from lower-level design objects, defines an overall experience intended for the user of an end-user device, from service offering to service execution, with complete expression of all applicable access-control, notification and accounting policies, merged with point-of-need promotion of available services, all according to design within the integrated service design center.

Still referring to the design hierarchy of FIG. 54, the following examples illustrate the manner in which plan-level accounting, policy-level accounting and component-level accounting may be applied in different service designs:

Component level accounting for Amazon access is sponsored by Amazon or carrier. Accordingly, a service designer may define all the filters that comprise Amazon access and create a component with these filters, defining an accounting policy to account to an Amazon charging code for access or attempted access during specified network states (i.e., specified in policy state definitions, which may include policy states in addition to or other than network states) such as, for example, access via home cellular network and WiFi network. The service designer may further assign accounting policy to not account to Amazon charging code and instead charge a user-paid plan for other network states (e.g., access via roaming network) and assign a high classification priority to the sponsored components to ensure that Amazon is charged for network states Amazon is supposed to be charged for before user plan usage is charged. Accordingly, by including such a service policy component within a user service plan, Amazon may be charged for access via home or WiFi networks before user is charged.

Component level accounting for Amazon access is sponsored by Amazon or carrier. A service designer may define all the filters that comprise Amazon access and create a component that includes these filters, assign control policy to allow and accounting policy to account to an Amazon charging code for some network states such as, for example, home cellular network and WiFi network. The service designer may then assign a control policy to disallow Amazon access for other network states (e.g., roaming network) and assign a high classification priority to make sure Amazon is charged for network states Amazon is supposed to be charged for before user plan usage is charged, place this component within a user service plan so that Amazon is charged before user bucket is charged for home or WiFi network states, by not allowing the component when roaming the multi-match Z-order filter match process may not show a match when roaming and the Z-order process may then search for another match such as a user paid roaming plan.

Component level accounting for Amazon access is sponsored by Amazon or carrier, define all the filters that comprise Amazon access and create a component with these filters, assign control policy to allow and accounting policy to account to Amazon charging code for some network states such as for example home cellular network and WiFi network, assign control policy to "not allow" Amazon and to "notify and expect acknowledgement" of roaming charges for Amazon for other network states such as roaming network, if user does not acknowledge charge then block Amazon and don't seek another filter match, if user does acknowledge charge then allow Amazon access to seek another match in the Z-order process, assign a high Z-order priority to make sure Amazon is charged for network states Amazon is supposed to be charged for before user plan usage is charged, place this component within a user service plan so that Amazon is charged before user bucket is charged for home or WiFi network states, by not allowing the component when roaming the multi-match Z-order filter match process may not show a match when roaming and the Z-order process may then search for another match such as a user paid roaming plan.

Roaming component is provided in service plan, define roaming filters into a component for all networks that are allowed in roaming plan, assign roaming accounting policy and control policy, place high in Z-order so that roaming is charged at a special rate before home user bucket is charged.

The foregoing instances of plan-level, policy-level and component-level accounting are provided for purposes of example only and to make clear that accounting actions may be specified at any level of the service design hierarchy where beneficial to do so, including at multiple hierarchical levels. Prioritization (and/or conflict resolution) between accounting actions defined at two or more hierarchical levels may be controlled by explicit or implied input from the SDC user (i.e., with such input forming part of the overall service design specification) and/or established by design or programmed configuration (e.g., as in a user preference setting) of the SDC 360 itself.

Policy Priority Management

Figure 55:
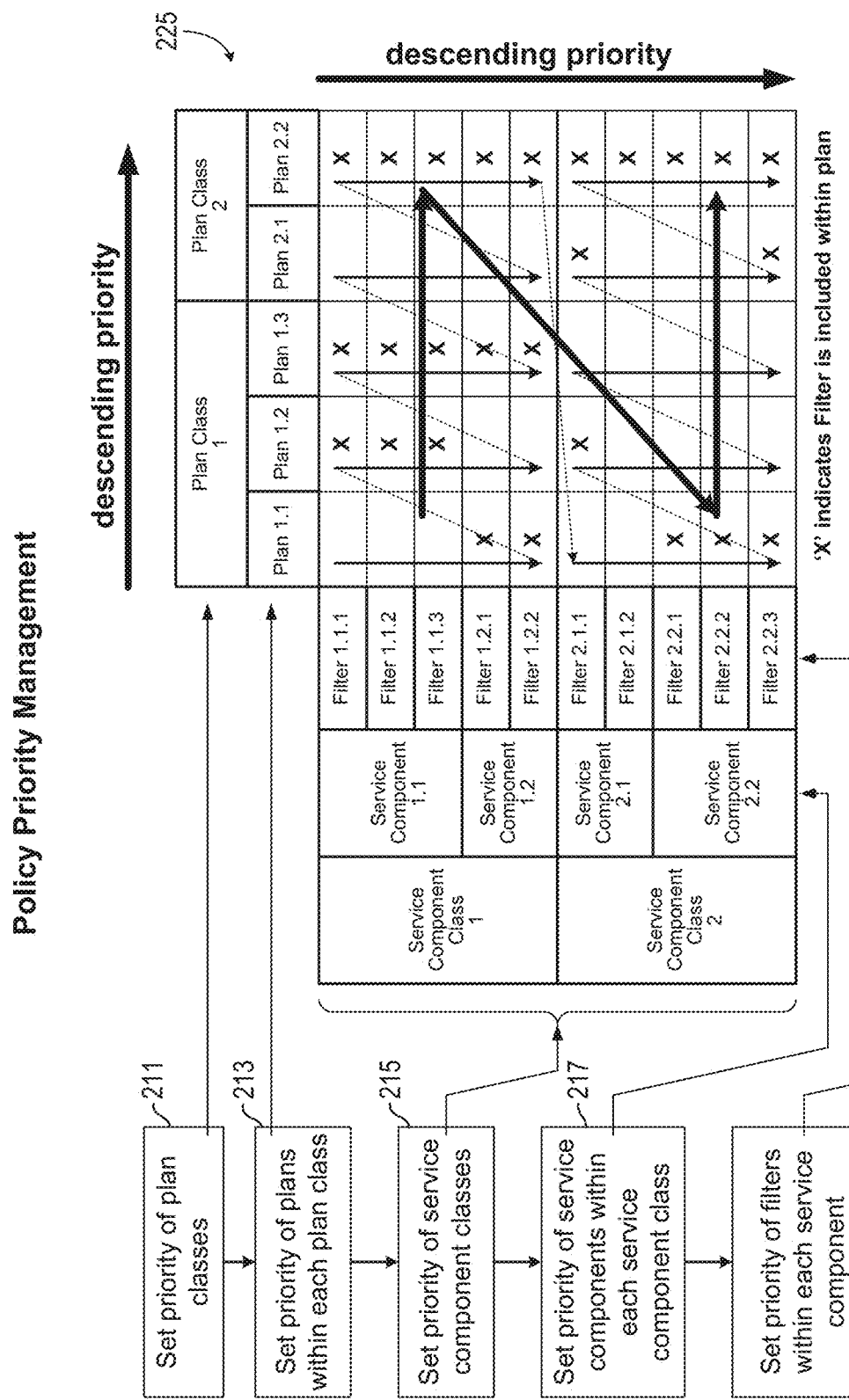
FIG. 55 illustrates an exemplary approach to managing policy priority within the integrated service design center to leverage design hierarchy in one embodiment.

FIG. 55 illustrates an exemplary approach to managing policy priority within the integrated service design center of FIG. 52 that leverages the design hierarchy of FIG. 54. It should be clear in light of the teachings herein that it is possible, using the service design center, to design and make available to end-user devices a wide variety of services and service plans. As a simple example, a designer could use the service design center to create not only "open-access" plans that allow unrestricted access, but also specialized service plans that enable access to social networking services. Assume that the designer creates three service plans: (1) an open-access plan that allows 50 MB of unrestricted Internet access, (2) a service plan that allows access only to Twitter, and (3) a social networking plan that allows access to both Facebook and Twitter. If an end-user device is subscribed to all three of these plans, and the device accesses Facebook, the service usage could be accounted either to the open-access plan or to the social networking plan. If the end-user device accesses Twitter, the service usage could be accounted to any one of the three plans. There is thus a need for rules or a methodology to establish the order in which the applicable service policies (e.g., one or more of accounting, control, and notification) are applied.

If a user or subscriber has paid for all service plans enabling the end-user device to access services, and none of the plans expires, then the order in which the plans are used up (i.e., the order in which service usage is accounted to the service plans) does not matter. But if a service plan is, for example, provided at no charge to a user or subscriber, and a particular service usage fits within that no-charge plan, then it may be desirable to account for the particular service usage within the no-charge plan instead of accounting for the service usage to a user-paid plan. Likewise, if a first service plan (whether user-paid or provided at no charge to the user) is nearing expiration (e.g., will cease to be available in three hours), and a second service plan under which a particular service usage could be accounted does not expire, it may be desirable to account for the particular service usage within the first service plan, if possible. By knowing variables such as whether a service plan is partially or entirely user-paid (or, conversely, whether a service plan is partially or entirely sponsored), whether a service plan expires, etc., a service designer may use the service design center to control whether, and in what order, service policies (e.g., accounting, control, and notification) are applied when an end-user device engages in various service activities (i.e., use of apps, access to Internet destinations, transactions, etc.). A policy enforcement engine (e.g., implemented by one or more agents within a network element and/or end-user device) may also apply the priority information to dynamically alter the priority order, for example, in view of fluctuating priority relationships that may result from the timing of plan purchases and/or automatically cycling (i.e., auto-renewing) plans. Also, while not specifically shown in FIG. 55, otherwise equivalent (or similar) plans may be prioritized based, for example, on service expiration (e.g., based on time remaining in a time-limited plan and/or usage remaining in a usage-capped plan). Thus, while FIG. 55 illustrates a relatively static priority organization, the relative priority between objects within the design hierarchy (e.g., plans, plan classes, service components, service component classes, and/or filters) may be changed dynamically in accordance with information provided within the service design center.

In the embodiment shown in FIG. 55, the relative priorities between different classes of plans are established at 211, with the priorities between plans within a class being set at 213. Examples of plan classes are carrier plans (e.g., plans that provide for carrier services, such as over-the-air updates), sponsored plans (e.g., plans that are subsidized, paid-for, or sponsored in some other manner by a third-party sponsor), and user plans (e.g., plans that are paid-for by the user or a subscriber). Similarly, the relative priorities between different classes of service policy components (also referred to herein as "service components," "policy components" and "components") is established at 215, and the priorities between service policy components within a component class is set at 217. The relative priorities between filters within a given service policy component may be established at 219. Note that the use of plan classes is optional and that specific plan class and component class names shown in FIG. 55 and further examples below are provided to assist the human service designer in managing priorities of the plans and components. Additional or alternative plan classes, component classes and names of such constructs may be used in alternative embodiments.

Although a top-down sequence of priority definition is shown in FIG. 55 (i.e., according to design hierarchy), the prioritization at different hierarchical levels may be set in any order, including a bottom up sequence in which filter priority is defined first, followed by service component priority and so forth. Moreover, the priority definition (i.e., assignment or setting of the relative priorities of two or more objects) at a given hierarchical level may be implied or predetermined within the service design center rather than explicitly set by the service designer. In one embodiment, for example, the priority between service component classes is predetermined within the service design center so that a designer's specification of component class for a given service component effects an implicit priority definition with respect to service components assigned to other component classes (e.g., a class having sponsored components may, by default, have a higher priority than a class having user-paid components). Similarly, the relative priorities of service plan classes may be predetermined within the service design center so that specification of plan class for a given plan or bundle effects an implicit priority definition with respect to service plans and bundles assigned to other plan classes. In another example, the priority of filters within a given service component may be implicitly defined by the order in which the designer incorporates the filters within the service component.

FIG. 55 also illustrates an implied priority between objects at different levels of the design hierarchy. More specifically, in the embodiment shown, all filters associated with the highest-priority component class are evaluated across the full range of plan class priorities before evaluating filters associated with the next-highest-priority component class. This hierarchical-level prioritization is demonstrated in FIG. 55 by a two dimensional "priority" grid 225 having service policy components and component classes arranged in order of descending priority along the vertical axis and service plans and plan classes arranged in order of descending priority along the horizontal axis. Individual cells within the priority grid are marked with an 'X' if the corresponding filter (and therefore the incorporating service policy component) is included within the corresponding service plan and left blank otherwise. As shown by the directional path overlaid on the grid, the filter evaluation order (or classification sequence) proceeds through all the filters associated with a given component class, service plan by service plan, before proceeding to the filters of the lower priority component class. With respect to a given component class, the filters associated with a service plan are evaluated according to component priority order and then according to the relative priorities of filters within a given component. In the case of service plan 1.3, for example, the filters associated with service component 1.1 (a service policy component within service component class 1) are evaluated before the filters associated with lower-priority service component 1.2, and individual filters incorporated by a service component are evaluated one after another according to their priority assignments (e.g., with respect to service component 1.2, filters are prioritized as Filter 1.1.1>Filter 1.1.2>Filter 1.1.3 and evaluated in that order). With regard to service plans, priority is resolved first at the plan class level and then by the relative priorities of plans within a given plan class. Thus, in the example shown, the filters associated with plans of class 1 are evaluated before the filters associated with plans of class 2, with the plans of a class being evaluated one after another according to their priority assignments (e.g., with respect to plan class 1, plans are prioritized as Plan 1.1>Plan 1.2>Plan 1.3 and evaluated in that order). Overall, in the priority grid layout of FIG. 55, the classification sequence follows a Z-shaped progression ("Z-order"), proceeding from left to right through the plans containing service policy components associated with the highest priority component class before retracing to the leftmost (highest-priority) plan and repeating the left-to-right progression with respect to the next-highest-priority component class.

FIG. 56 illustrates an example of a Z-ordered classification sequence with respect to the filters associated with two plan classes: sponsored and user-paid; and also two component classes: sponsored and open access. Of the four service plans shown in the priority grid, two are sponsored and two are user-paid. From an end-user's perspective, if a particular service activity of an end-user device (e.g., use of an app, access to a web site, etc.) fits both within a sponsored plan and a user-paid plan, it is desirable that the service activity be accounted to (e.g., charged to) the sponsored plan. In other words, if a particular service activity could be accounted to a sponsored plan instead of a user-paid plan, that particular service activity should be accounted to the sponsored plan. Thus, the sponsored plans should be prioritized ahead of user-paid plans. In one embodiment, sponsored plans are prioritized ahead of user-paid plans by default operation of the service design center. In one embodiment, the relative priorities of plans classes are explicitly set by a service designer. In the exemplary embodiment shown in FIG. 56, the two sponsored plans are prioritized ahead of the user-paid plans.

Although sponsored plans may be prioritized ahead of user-paid plans in a number of contexts, the converse may also be true. For example, under the concept of a "carrier backstop," a carrier or other service provider may wish to charge certain service activities required for service plans to work (e.g., domain name server functions) first to the end-user if the end-user has a supporting plan, and then to the service provider as a backstop. Accordingly, all the prioritizing arrangements described herein should be understood to be examples, with various alternative prioritizations being permitted by design or default.

Continuing with the prioritization examples, a particular service plan could have, for instance, sponsored and user-paid components. For example, the 30-day, 10 MB general access plan of FIG. 56 has both sponsored service components and open-access service components. If a particular service activity fits within a sponsored service component, it is desirable from a user's perspective that the service activity be accounted to the sponsored service component. Only when there is no sponsored service component available should the service activity be accounted to the open-access component. Similarly, sponsored service components are prioritized ahead of open-access service components, so that sponsored Facebook and Twitter components are prioritized ahead of an open access component. Like the plan priorities, the class priorities and the component priorities may be specified by the service designer or predetermined by default operation of the service design center.

The priorities of plans within a given plan class may be explicitly assigned by the service designer, or potentially by a user through a web site or through a user interface of the end-user device. In the example of FIG. 56, the designer has designated a "one-day sponsored Twitter plan" as being higher priority than a "three-day sponsored social networking plan" (although the opposite priority arrangement may have been specified). The one-day sponsored Twitter plan provides access to Twitter for a day at no cost to the user. As shown by FIG. 56, the one-day sponsored Twitter plan includes two Twitter-related filters: a Twitter app filter and a Twitter web access filter. As also shown by FIG. 56, the two Twitter filters are within the sponsored service component class. Because the one-day sponsored Twitter plan is a sponsored plan that provides only for limited access (i.e., to Twitter), the one-day sponsored Twitter plan may not include any other app/service-specific filters (e.g., none of the illustrated Facebook filters are included), nor does it include the all-pass filter that is an open-access service component and allows unrestricted service access.

On the other hand, the three-day sponsored social networking plan includes both of the Twitter-related filters (because access to Twitter is included in the three-day sponsored social networking plan), and it also includes three Facebook filters: a Facebook app filter, a Facebook messenger filter, and a Facebook web access filter. Because the three-day sponsored social networking plan provides only for social networking access, the plan may not include the all-pass filter. Note, however, that the end-user may wish to modify the default priorities based on purchase timing and/or re-prioritize based on service usage. Such end-user prioritization controls may be selectively granted as part of the overall user experience defined within the service design center.

In the example of FIG. 56, in which the sponsored Twitter plan expires after one day, it makes sense that the priority of the one-day Twitter plan would be higher than the priority of the three-day sponsored social networking plan (e.g., service usage fitting within the one-day Twitter plan would be accounted to the one-day Twitter plan before checking whether the service usage fits within the three-day sponsored social networking plan). If, in contrast, the sponsored Twitter plan expired after seven days, the designer, a user/subscriber, or the service design center by default might instead prioritize the three-day sponsored social networking plan over the seven-day sponsored Twitter plan, because the three-day sponsored social networking plan expires first.

Similarly, FIG. 56 shows a user-paid 30-day, 10 MB general access plan with bonus, which provides for general (i.e., unrestricted) access as well as a bonus that provides for sponsored (i.e., included as a bonus in the user-paid plan) access to particular social networking services/sites (i.e., Twitter and Facebook). Therefore, the 30-day, 10 MB general access plan with bonus includes the previously-described social networking filters (i.e., the three Facebook-related filters and the two Twitter-related filters) and the all-pass filter that allows general access. Meanwhile, the non-expiring 50 MB general access plan is entirely user-paid, with no sponsored components, and therefore it includes only the all-pass filter, which allows unrestricted access. In FIG. 56, the designer (or user/subscriber, or the service design center using default rules) has prioritized the (eventually expiring) 30-day, 10 megabyte (MB) general access plan with a bonus data allocation (e.g., a carrier or network-operator provided volume of network data service provided to incentivize the user's purchase) ahead of a non-expiring 50 MB general access plan. Like the priorities of same-class plans, the priorities of same-class components may be specified by the service designer or by default by the service design center. In the example of FIG. 56, the Facebook policy component is prioritized ahead of the Twitter component, though the designer or the service design center could have reversed this order. The priorities of filters incorporated within a policy component may likewise be specified by the service designer or by a default prioritization rule in the service design center. In the example of FIG. 56, a Facebook App filter has a higher priority (i.e., will be checked for a match before) a Facebook Messenger filter, which in turn has a higher priority (i.e., will be checked for a match before) a Facebook Web Access filter. Within the Twitter component, a Twitter App filter is prioritized over a Twitter Web Access filter.

Still referring to FIG. 56, the classification sequence proceeds with regard to sponsored service components, starting with the filters of the one-day sponsored Twitter plan (the sponsored Facebook component is not included in the one-day sponsored Twitter plan as indicated by the blank priority-grid cells with respect to the three Facebook filters) and then proceeding to the filters of the three-day sponsored social networking plan and then the 30-day 10 MB general access plan with bonus. Note that both of the sponsored components include filters within the three-day sponsored social networking plan (i.e., both the sponsored Facebook component and the sponsored Twitter component are constituents of that plan) and within the 3-day 10 MB General Access plan with bonus (i.e., the bonus in this example includes the sponsored Facebook and sponsored Twitter components). By contrast, the non-expiring 50 MB General Access plan contains no sponsored components and thus no filters from sponsored service components and therefore occupies no grid cells with respect to sponsored service components. Proceeding to the open-access component class, neither of the sponsored plans contains an open access component (hence the blank cells), while both the user-paid plans include an open access component (incorporating an all-pass filter) and thus yield the final two filter evaluations in the classification sequence.

Note a use of the Twitter app by an end-user device could potentially be accounted to any one of the four plans shown in FIG. 56: (1) the one-day sponsored Twitter plan, (2) the three-day sponsored social networking plan, (3) the 30-day, 10 MB access plan with bonus, or (4) the non-expiring 50 MB general access plan (because Twitter is within general access). Applying the filter priority sequence shown in FIG. 56, a Twitter access attempt in connection with a Twitter app may match the Twitter app filter. Because the first match is under the one-day sponsored Twitter plan, if the one-day sponsored Twitter plan is still active (i.e., the one day has not expired), the access attempt may consequently be allowed and accounted to the One-Day Sponsored Twitter plan without further filter evaluation (multiple-match classification represents another possibility and is discussed below). In addition, any defined notification policy associated with a match of the Twitter app filter under the one-day sponsored Twitter plan may be triggered. After the one-day Twitter sponsorship expires, a new priority management table may be used (i.e., a table like the one of FIG. 56, but without the first column under "Sponsored Plans"), or the control action associated with a match of the Twitter app filter in the one-day sponsored Twitter plan may be associated with a control action of "block but keep looking," which indicates that the access is not allowed under the one-day sponsored Twitter plan, but there may be another plan under which the access is allowed. It should also be noted that a match of the Twitter app filter within the one-day sponsored Twitter plan after expiration of the one-day sponsored Twitter plan, although blocked and therefore not accounted to the one-day sponsored Twitter plan, could trigger a notification policy action. For example, the fact that access was blocked could be reported to the user/subscriber or to a network element. A user/subscriber notification might inform the user that the one-day sponsored Twitter plan has expired and/or offer the user/subscriber another plan that would allow future accesses (e.g., a user-paid Twitter plan, a social networking plan, or a general access plan, to name just a few). The notification action could be based on other service plans already active for the device, such as those shown in FIG. 56. For example, because the device associated with the priority management table of FIG. 56 still has a sponsored social networking plan available, the notification might simply inform a user/subscriber that the sponsored Twitter plan has expired. But if the device did not have a plan that would provide for access to Twitter, the notification might provide service offers to the user/subscriber to enable Twitter access.

Continuing with the example of FIG. 56, the same Twitter access that would have been allowed under the one-day sponsored Twitter plan may, after expiration of the one-day sponsored Twitter plan, not be allowed in the classification sequence (i.e., will match the Twitter app filter of the one-day sponsored Twitter plan but may be blocked because the plan has expired, and may not match any of the other filters in the sequence) until reaching the Twitter App filter within the three-day sponsored social networking plan, where "allow," "charge plan," and notification policy actions may be triggered. Upon expiration of the Three-Day Sponsored Networking plan, the same attempted Twitter access may not be allowed (but might trigger one or more notification actions) until it reaches the Twitter App Filter incorporated within the 30-day 10 MB General Access Plan with Bonus, being allowed and accounted according to the policy definitions of that plan, starting, for example, with usage of the bonus data service allocation. After the bonus within the 30-Day, 10 MB General Access Plan is consumed, a Twitter access attempt may not be allowed within any of the sponsored service components (but may trigger one or more notification actions), but may be allowed after matching the all-pass filter of the 30-Day 10 MB General Access Plan with Bonus. Finally, after the 30-Day 10 MB General Access Plan has expired (along with all the sponsored service plans), the same Twitter access attempt may not be allowed (but may trigger one or more notification actions) until it matches the all-pass filter within the non-expiring 50 MB general access plan.

Although often it may be a service designer, through the service design center, who establishes the relative priorities of service plans, a subscriber or user may also be provided with the tools to set service plan priorities. For example, the subscriber/user may be given a "sandbox" (described) herein that allows the subscriber/user to modify the priorities of service plans. The subscriber/user may also, or alternatively, be able to establish service plan priorities through a user interface of the end-user device itself. For example, when a user selects (e.g., pays for, accepts, selects, etc.) a service plan from the end-user device, the user may be presented with an option to establish the priority of the service plan relative to other service plans associated with the device.

FIG. 57 illustrates another example of Z-ordered classification within a plan catalog having plan classes and component classes, service policy components and plans similar to those shown in FIG. 56, except that the non-expiring 50 MB General Access Plan has been replaced by a one-week 50 MB General Access Plan. Further, in the example shown, the service designer has prioritized the one-week 50 MB General Access Plan ahead of the 30-Day 10 MB General Access plan with Bonus. Because the one-week general access plan contains no sponsored policy components, any service access attempt falling within the scope of a sponsored service plan (including the sponsored components associated with the bonus data allocation within the 30-day general access plan) may match sponsored-component filters in the same sequence as in FIG. 56. By contrast, an attempted service access falling outside the scope of the sponsored components may now first match the open access filter within the one-week general access plan instead of the 30-day general access plan, thus ensuring that the shorter-lived one-week plan may be consumed ahead of the longer 30-day plan.

As the examples in FIGS. 56 and 57 demonstrate, the implied and explicit control over plan, component and filter priorities enables service usage requests within an environment of multiple applicable service plans to be accommodated and accounted for in a logical, systematic (e.g., deterministic or predictable) order, prescribed by the service designer. Moreover, it allows a rich and diverse set of notification actions to be triggered when, for example, an attempted service usage is not allowed within a particular service plan. From the reverse perspective, priority management within the service design center enables service consumers to activate a rich and diverse set of service plans with confidence that an intelligent, well designed usage and accounting priority may be applied to a service access falling within the scope of multiple active plans (i.e., no double usage-metering or accounting).

Multi-Match and User-Interactive Policy Capabilities

Multiple-Match Design Capability

As demonstrated in a number of examples above, the joint or integrated policy design constructs enabled by embodiments of the integrated service design center permit definition and provisioning of much more complex, user-responsive and interactive service policies than possible through conventional disaggregated design approaches. These include, for example without limitation:

- service policies that yield multiple triggered actions in response to detection of a classification event (i.e., filter match or component match) as in simultaneous cap and notification (control and notification actions);
- service policies that trigger user-interactive communication before proceeding with policy application as in the case of a marketing interceptor that yields cap and notification actions together with further presentation of a service plan offer on the user-interface of an end-user device (a further notification action or part of the original notification action) that prompts the end-user to activate a new sponsored or user-paid service plan before finalizing the response to the filter matching event;
- service policies that enable continued classification following a filter-matching event, thereby permitting triggered action(s) otherwise specified by the filter-matching event to be deferred, modified or overridden in view of one or more subsequent matching events, as in the cap and match examples provided above (i.e., cap reached, but continue classification scan before resolving to disallow service request) or as in the case of associative matching, where a sequence of (or other set of two or more) filter-matching events may determine/infer a status or characteristic with respect to a requested service (e.g., instance of a regular expression, or other activity necessarily or most-easily detectable through match with multiple filters); and/or
- service policies that enable triggered action, policy state or filter definitions (of the subject service policy itself and/or other interrelated service policies) to be modified dynamically, for example, in response to a filter-matching event and/or policy state.

The consistent joint (integrated) policy definition and enforcement framework provided by the present disclosure is very important for providing enhanced policy enforcement capability, lower complexity and reduced network cost, reduced latency in user service notifications, and real time interaction between service plan policy options and user preferences to enhance the user experience and increase the opportunities to effectively market and sell new types of services and service plans or bundles. Here, joint policy definition and enforcement framework refers to the capability to define or design filters (or components) conditioned on policy state and associate the filters with any of three policy types: control, accounting and notification. For example, a filter match comprising a filter match comprising "data communication type" (a filter or component) conditioned on "service limit reached" (a policy state) may be associated a joint policy comprising "cap" (a control policy) and "send plan modification required notification" (a notification trigger policy). This allows for simultaneous real time capping when the service limit is reached and real time user notification that the limit has been reached. Because the notification trigger occurred at the same instant as the cap was enforced, and the notification trigger may cause the notification system to deliver a user interface message to be displayed on the device UI in fractions of a second to a few seconds, the user experiences a notification explaining why the service has been stopped that is coincident in time with the service being stopped. With this type of joint (or integrated) policy capability to associated a filter match definition with multiple policy types there is no longer a need to have separate communication service control and communication service notification systems because both functions are accomplished with the same system. As another example, a filter match comprising "data communication type" (a filter or component) conditioned on "service limit reached" (a policy state) may be associated a joint policy comprising "stop accounting to base service plan bucket" (a first accounting policy), "begin accounting to service overage bucket" (a second accounting policy), and "send service overage now in effect notification" (a notification trigger policy). Similar to the above example, this example embodiment provides real time user notification so that the user is immediately aware of the status of their service allowing the user to potentially modify their service plan or their usage behavior. In this example the disclosure also provides the benefit that this single, simplified joint policy enforcement system removes the need for separate accounting and notification systems. An example embodiment for a three-way joint policy enforcement is a filter match comprising "data communication type" (a filter or component) conditioned on "service limit reached" (a policy state) that is associated with "restrict access to service activation destinations" (a control policy), "stop accounting to base service plan bucket" (an accounting policy), and "send new service plan or service plan upgrade required notification" (a notification policy). In this example the complexity of having separate accounting, control and notification systems that are difficult to program and provide poor notification response times is replaced with an elegant, simple, less expensive and easier to program joint policy system that provides real time user notification.

With the present disclosure, in one embodiment policy may also be interactive. Continuing with the same basic filter match example for illustration purposes, a filter match comprising "data communication type" (a filter or component) conditioned on "service limit reached" (a policy state) may be associated with a joint user-interactive policy comprising "cap until user response received" (a user-interactive control policy), "stop accounting to base service plan bucket" (an accounting policy), and "send the service plan offer corresponding to the data limit reached condition" (a user-interactive notification trigger policy). This example illustrates that not only does the present disclosure provide for enhanced policy enforcement capability, lower complexity and reduced latency for a better user experience, the disclosure also provides for a real time interaction between service plan policy options and user preferences, further enhancing the user experience and increase the opportunities to effectively market and sell new types of services and service plans or bundles.

As another example illustrating a joint policy design, a first filter match comprising "data communication type" (a filter or component) conditioned on "95% of service limit reached" (a policy state) may be associated with "send service limit about to be reached notification" (a notification trigger policy), and a second filter match comprising "data communication type" (a filter or component) conditioned on "100% of service limit reached" may be associated with "cap" (a control policy). In this example, a common filter is shared that defines a data communication type, and the common filter is conditioned on two different policy states.

As another example illustrating a joint policy design, a first filter match comprising "Amazon" (a filter or a component) conditioned on "sponsored Amazon limit not reached" (a policy state) may be associated with "allow" (control policy) and "account to sponsored Amazon bucket" (an accounting policy), and a second filter match comprising "Amazon" (a filter or a component) conditioned on "sponsored Amazon limit reached" (a policy state) may be associated with "stop accounting to sponsored Amazon bucket" (an accounting policy), "send acknowledgement for 'Free Amazon service limit reached for this month, would you like to continue with Amazon charged to your data plan?' notification" (a user-interactive notification policy) and "cap until user response received" (a user-interactive control policy), "if user agrees, cap-match" [e.g. continue searching for a match] (a user-interactive policy to proceed down the Z-order to find another match), and "if user does not agree, cap-no match" (a user-interactive control policy). This is a clear example of a multi-match policy set where Amazon is first tested for the sponsored service filter until the sponsored service use bucket limit is reached, then a cap-match command is executed and if there is another Amazon filter match before the "no-match" end filter is reached (e.g. a user data plan bucket that is not over its limit) then a second match may be found in the Z-order.

As another example illustrating a joint policy design, at a first time a first filter match comprising "application update" (a filter or a component) conditioned on "application background status" (a first policy state) and "roaming network condition in effect" (a second policy state) may be associated with "block" (a control policy), and at a second time a second filter match comprising "application update" (a filter or a component) conditioned on "application foreground status" (a first policy state) and "roaming network condition in effect" (a second policy state) may be associated with "allow" (a control policy), and at a third time a filter match comprising "application update" (a filter or a component) conditioned on "application background status" (a first policy state) and "home network condition in effect" (a second policy state) may be associated with "allow". This is a clear example of a filter conditioned on two policy state conditions (home/roaming network state and foreground/background application state), wherein in a background application update is allowed unless it is occurring on a roaming network, and a foreground application update is always allowed. This is an interesting example embodiment showing two advantageous capabilities at the same time, the first capability being the ability to modify control policy (or accounting or notification policies) as a function of network type and the second capability being the ability to modify control policy as a function of foreground vs. background application status.

As another example illustrating joint policy design, a filter match comprising "no-match" (the final filter in the Z-order search) conditioned on "Vodafone Spain roaming network condition in effect" (a policy state) may be associated with "send the service plan offer corresponding to roaming on Vodafone Spain" (a notification policy), and "cap and wait for response" (a user-interactive control policy).

As a pure notification example, a filter match comprising "voice communication type" (a filter or component) conditioned on "80% of service limit reached" (a policy state) may be associated with "send 'you have 20% left on your talk plan' voice notification message" (a notification policy).

As a marketing interceptor example, a filter match comprising "no-match" (the final filter in the Z-order search) with no condition may be associated with "send the free try before buy service offer" (a notification policy), and "cap and wait for response" (a user-interactive control policy).

As another marketing interceptor example embodiment, a filter match comprising "Facebook" (a filter or component) may be associated with "notify and continue" (a notification trigger policy) and "send Google+sponsored cellular service offer" (a notification policy). In this example the special command "notify and continue" is provided as an example of the expanded policy enforcement instruction set that may lead to additional policy capabilities—in this case simplified and powerful notification based on user activity with their device. The notify and continue command example provides for a notification trigger that results in a notification being sent to the device UI (in this case an offer for free Google+ access on cellular networks) with no impact on service plan control or accounting and without interfering with the service activity to match with a filter in the Z-order search. The "continue" in "notify and continue" refers to the process of allowing the Z-order search process to proceed to find a match under the service plan policies in effect.

As another marketing interceptor example embodiment for advertising a product or service, a filter match comprising "SiriusXM app" (a filter or component) may be associated with "notify and continue" (a notification trigger policy) and "send Pandora app and sponsored cellular service offer" (a notification policy). In this example the notification policy is based on detecting application activity that triggers a marketing interceptor offer.

Figure 58:
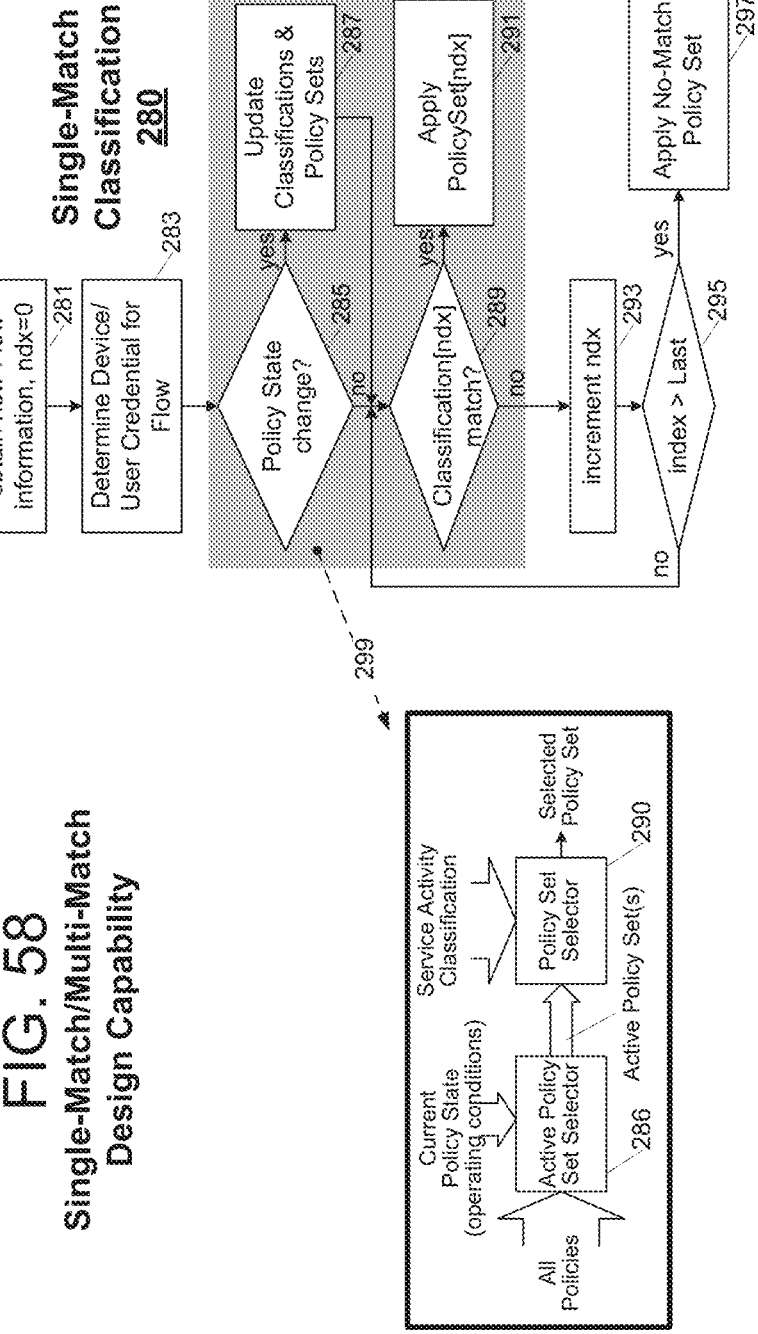
FIGS. 58 and 59 contrast exemplary single-match and multi-match classification sequences that may be designed within the service design center of FIG. 52.
Figure 59:
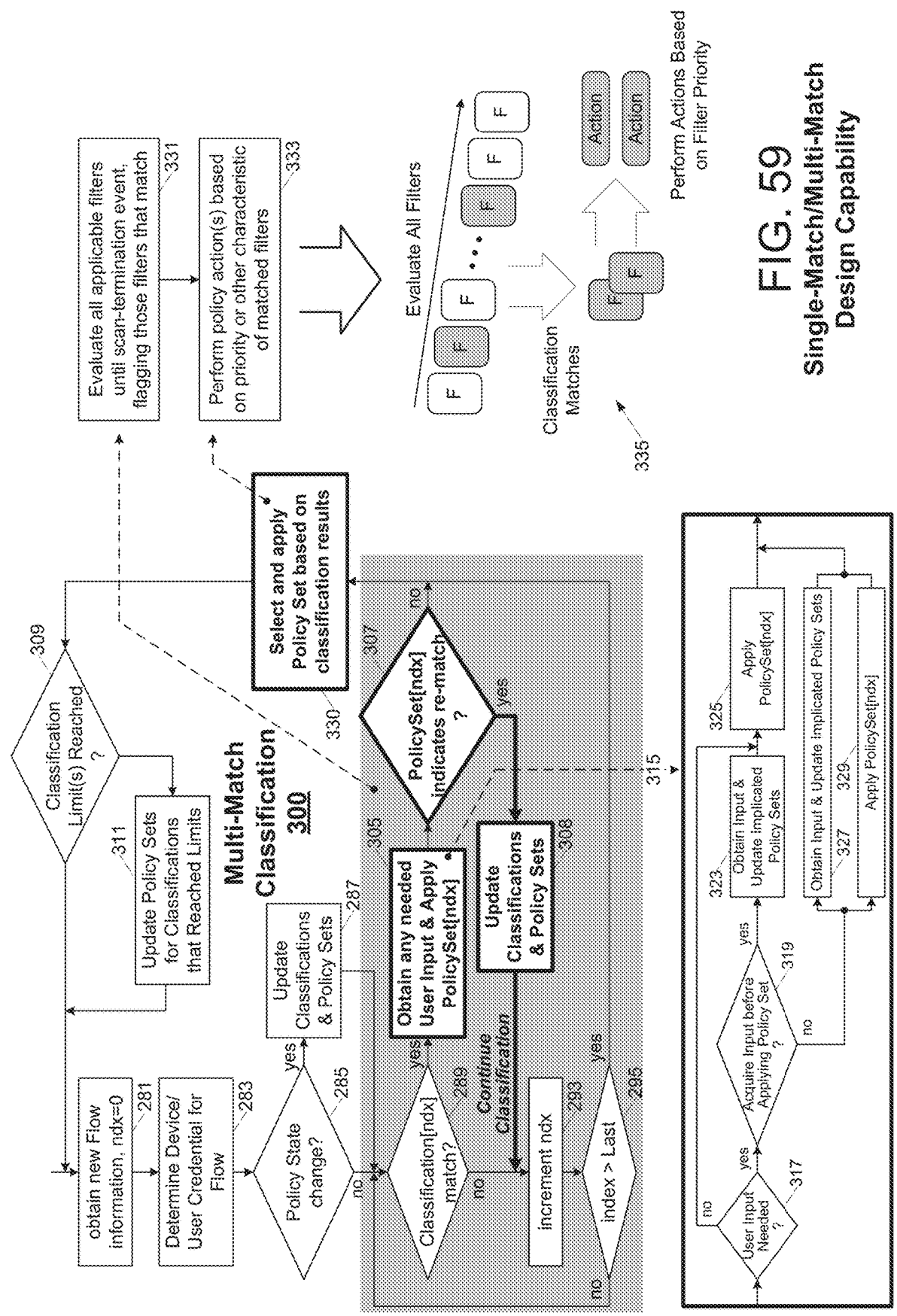

FIGS. 58 and 59 contrast exemplary single-match and multi-match classification sequences that may be designed within the service design center of FIG. 52 to help demonstrate design flexibility and user-interactivity that may be achieved using multi-match constructs. In the single-match classification sequence (280) shown in FIG. 58, new flow information is obtained at 281, and a loop index ("ndx") is initialized to zero. The new flow information may include, for example and without limitation, information from packet headers within a transmission control protocol (TCP) or user datagram protocol (UDP) flow (though information from headers, data, and/or footers of packets in other layers of an IP protocol stack or other protocol stack may also be used), information resulting from app execution (i.e., "app-based" classification), voice/text messaging information (e.g., filtering for dialed or typed strings or components thereof, sent/received user ID's such as phone numbers or other identifiers, teleservice ID, occurrence of predetermined message patterns (e.g., as in the case of regular expression searching) or other information in the text payload). At 283, an identifier or credential of the end-user device (or, as explained above, of its user) associated with the new flow is determined, thus enabling classification with respect to the specific service policies associated with that identifier or credential. At decision 285, policy states (e.g., network state, service usage state, classification scanning state, or other temporal condition) are evaluated to determine whether a policy state has changed since the last policy state evaluation and, if so, the applicable set of classification objects and policy sets is updated at 287 before beginning a filter evaluation loop at 289. As an example, if an end-user device transitions to a different network state (e.g., from not-roaming to roaming, from a 4G network to a WiFi network, to a particular network access point name (APN), etc.) or to a different service usage state (e.g., to a particular time of day or upon crossing a usage threshold in which a specified number of megabytes, minutes, seconds or percentage of plan usage is remaining or has been consumed, etc.), then the detection of that transition at 285 may trigger determination of an updated policy set 287. In one embodiment, shown for example at 299, an active policy set selector 286 applies the current policy state to identify, as an "active policy" subset of the full complement of defined policies, one or more policies that match the current policy state. As shown, the active policy set(s) are output to a policy set selector 290 which identifies "selected policy set(s)" in accordance with service activity classification and thus in connection with filter evaluation as discussed below. Note that active policy set selector 286 and policy set selector 290 (which may be logically combined or applied in reverse order in an alternative implementation) may be implemented by one or more programmed processors, hardware elements, or any combination thereof.

Continuing with the embodiment of FIG. 58, a filter evaluation loop is begun at 289 to evaluate filters or other classification objects one after another with respect to the new flow. More specifically, in a iteration of the filter evaluation loop, a filter corresponding to the loop index ("Classification[ndx]") is evaluated (289) with a filter "miss" (i.e., no match and thus a negative determination at 289) yielding a loop index increment at 293 and test against the final filter index at 295 before repeating the next loop iteration. If no filter match is detected in the last iteration of the filter evaluation loop (i.e., resulting in an affirmative determination at 295), a default "no-match" policy set is applied at 297 (note that the default no-match policy set may be implicitly or explicitly defined). By contrast, if a classification match is detected at 289, the policy set associated with the matched filter (i.e., PolicySet[ndx]) is applied at 291 to conclude the classification sequence for the current flow. Thus, as the "single-match" moniker implies, the classification sequence with respect to a given flow is terminated in response to the first filter match detected.

Referring now to FIG. 59, an exemplary multi-match classification sequence 300 begins with the same initialization (flow information obtention and index reset), device credential identification and policy state evaluation/conditional-update operations shown in the single-match classification sequence (i.e., 281, 283, 285 and 287). The filter evaluation loop is also similar as filters are iteratively evaluated for a match in decision 289, with the loop index being incremented and tested at 293 and 294. In contrast to the single-match approach, however, a classification match (affirmative determination at 289) results in the more user-interactive operation shown at 305, including obtaining any needed user input before or concurrently with applying some or all of the indexed policy set, thus enabling the indexed policy set to be modified in response to user input before being applied in connection with the service request. For example, in the embodiment shown in detail view 315, a classification match triggers a determination of whether user input is needed (decision 317), and, if needed, a determination of whether the user input is to be acquired before applying at least a portion of the match-indicated policy set (decision 319). If user input is to be acquired before policy-set application, the user input is obtained and applied to update policy sets implicated by the input (e.g., entire policy sets or portions of policy sets directly or indirectly selected in connection with criteria that includes at least the user input) at 323 before applying the match-indicated policy set at 325. By contrast, if the user input need not be acquired before policy-set application (negative determination at 319), the user input obtention/policy-set update at 327 may be carried out concurrently (i.e., at least partially overlapping in time) with the policy set application at 329. As a more specific example of the operations shown at 315, detection of streaming traffic (or an attempt to send/receive streaming traffic) while roaming may trigger a determination that end-user input is to be acquired before allowing the traffic. Accordingly, a notification regarding the potential expense of the streaming traffic may be presented on the UI of the end-user device and the end user, thus informed, may be prompted to click "OK" or "NO" with regard to the streaming operation. If the end user clicks "OK," the stream is allowed; if the end user clicks "NO," the stream is blocked. The "NO" input may be applied exclusively to the streaming flow at hand, or may be applied to any streaming flow detected thereafter while roaming.

Still referring to detail view 315, the sequential obtention of user input, policy-set update and policy-set application at 323 and 325 permits the applied policy set to be updated in whole or part in response to the user-input. Further, one or more policy states may be updated to reflect the matching event and thus establish a new classification scanning state to be considered as the classification sequence continues. As discussed in examples below, the ability to update policy sets based on user input enables service characteristics and selections to be changed on the fly (i.e., dynamically or on-demand), particularly in the context of a device-assisted service environment where the user-input may include a service activation directive (e.g., a service purchase or selection of a sponsored service) in response to a lack-of-compatible-plan notification. Similarly, the ability to establish a new classification scanning state provides a feedback mechanism within the classification sequence as a classification match may dynamically trigger a change in the policy state to be applied in conjunction with subsequent classification events. Also, in one embodiment, a classification event in a multi-match classification sequence may be flagged (or logged or otherwise recorded) so that, upon concluding the classification sequence, the overall set of matched filters may be considered in determining the actions to be performed. Thus, instead of (or in addition to) triggering actions in immediate response to a classification match (i.e., in the midst of a classification sequence), a determination of actions to be performed may be deferred until the classification sequence terminates to enable decision making in view of the complete set of classification events. This deferred-action construct is discussed in further detail below.

Continuing with multi-match classification sequence 300, attributes of the indexed policy set are evaluated at 307 to determine whether further classification ("re-match") is permitted. If so, then despite the classification event detection at 289 and policy set application at 305, the filter evaluation loop is continued by updating the classification and policy sets at 308 (i.e., to reflect any change in classification scanning state or other policy states effected by the policy set application at 305) and then incrementing the loop index at 293. If the loop index does not exceed the final index (negative determination at 295), the filter evaluation loop repeats starting at 289. Upon reaching the final loop index (affirmative determination at 295) or applying a policy set that denies further re-matching (negative determination at 307), the multi-match classification is concluded at 330 by selecting and applying a policy set based on the classification results. Before proceeding with a subsequent multi-match classification, classification limits may be evaluated at 309 to determine whether limits (e.g., usage limits) have been reached with respect to any policy sets and, if so, updating those policy sets accordingly at 311.

Reflecting on the filter evaluation loop and end-of-scan policy-set application effected within multi-match classification sequence 300, the ability to defer action (in whole or part) otherwise triggered by a classification event enables decision making in view of the classification sequence as a whole and thus a more informed and tailored set of triggered actions. The net effects of the filter evaluation loop and end-of-scan policy-set application are shown at 331 and 333, respectively. That is, the filter evaluation loop enables an evaluation of all applicable filters (i.e., those included within the scan by virtue of the credential evaluation at 283 and/or update operations at 287 and 308) until a scan-termination event is reached (i.e., all filters evaluated or matching a filter that does not permit re-matching), and the end-of-scan policy set application at 330 enables execution of policy actions in view of the full set of matched filters, if any. These operations are shown graphically at 335, with filters being evaluated in order (though parallel evaluation may also be possible) to yield a set of match filters (i.e., resulting from flagging/logging/recording the matching event and/or information corresponding to the matched filters), with some set of actions being performed based on priority or other characteristics of the matched filters. Note that if no classification events are detected in the filter evaluation loop, a backstop, no-match policy set may be applied at 330.

Figure 60:
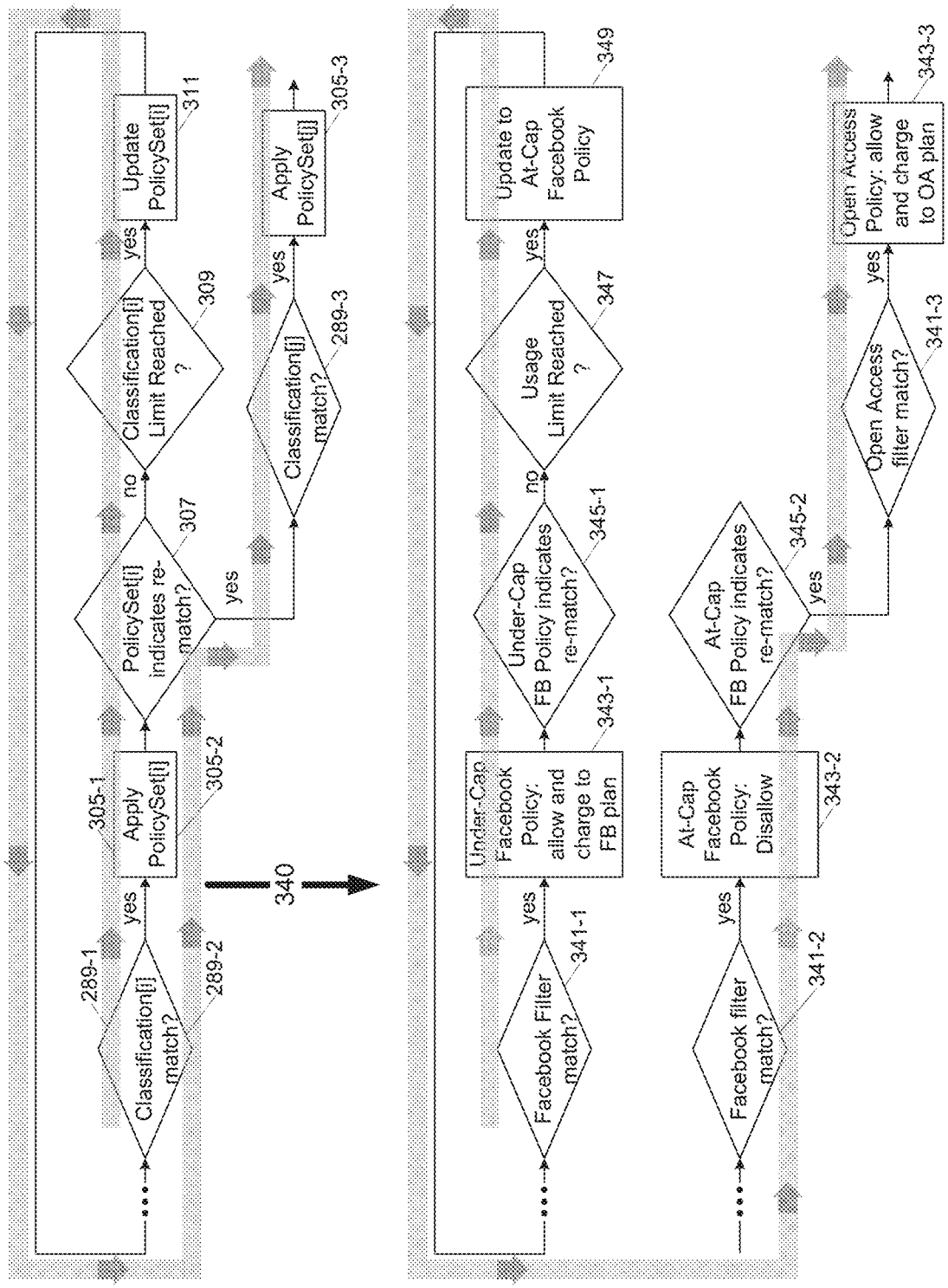
FIG. 60 illustrates an exemplary application of multi-match classification to enable re-matching after detecting a policy limit.

FIG. 60 illustrates an exemplary application of multi-match classification to enable re-matching after detecting a policy limit—a classification sequence referred to herein as "cap and re-match." Proceeding according to the multi-match classification sequence shown in FIG. 59, an under-limit classification match detected at 289-1 yields application of a policy set at 305-1 without re-match at 307. The evaluation at 309 determines that a classification limit has been reached, resulting in an update to the policy set (at 311) that yielded the classification match, and more specifically an update that reverses the re-match setting of the policy state to enable re-matching in subsequent policy-set application. In other words, re-match is not attempted while the service usage is under the classification limit, but when the service usage reaches the classification limit, re-match is attempted to determine whether the service usage may be allowed in connection with another extant filter. Thus, tracking the shaded sequence of operations shown in FIG. 60, after a second classification match at 289-2 (i.e., '-1', '-2', '-3' enumerating different executions of the same operation within the classification sequence) the updated policy set is applied at 305-2, and the newly established re-matching state of the policy set permits continuation of the filter evaluation sequence and, in the example shown, a secondary classification match at 289-3 and policy set application at 305-3.

FIG. 60 also illustrates a more specific example of the "cap and re-match" classification sequence at 340 with respect to a Facebook filter and initially under-cap (or below usage-limit) Facebook Policy Set. As shown, when a Facebook filter match is detected at 341-1, the under-cap Facebook policy set is applied at 343-1 to allow the service request and account for the service usage under a Facebook plan (e.g., a sponsored Facebook plan or user-paid Facebook plan). Because service usage has been allowed, the Facebook policy set permits no further re-matching (negative determination at 345-1). Assuming that a plan usage limit is reached after permitting the service usage at 343-1 (i.e., affirmative determination at 347) and that the Facebook policy set is updated to an At-Cap Facebook policy at 349, then a subsequent Facebook filter match at 341-2 (e.g., in connection with a new flow) may trigger application of the At-Cap Facebook policy at 343-2, disallowing the usage under that service plan in view of the policy cap. Because the At-Cap Facebook policy permits re-match at 345-2, however, the classification sequence continues with respect to the current Facebook service request and, in the example shown, yields another match with respect to an open-access filter at 343-3 and a permitted service usage and charge against open-access plan under the corresponding Open Access policy set at 343-3. This operation may be better understood in the context of FIG. 56. In the example shown there, a service request matched and allowed under the sponsored Facebook service policy within the 30-Day, 10 MB General Access Plan with Bonus (i.e., assuming the Three-Day Sponsored Social Networking Plan has already expired) may terminate the classification sequence. After allowance of a service request that consumes the last of the Bonus portion of that plan, the sponsored Facebook service policy may be updated to disallow further Facebook service requests, but to permit re-matching. Accordingly, a subsequent Facebook service request that matches a filter under the sponsored Facebook service policy may be disallowed but with re-matching (i.e., allowing continued classification), thus resulting in a match and allowance under the Open Access service policy of the same plan—overall, a multi-match classification sequence.

Still referring to FIG. 60, application of the At-Cap Facebook policy set may include notifying the end-user device user (i.e., the service requester) that the Facebook plan has been exhausted and prompting or inviting the user to activate a new plan. If the user declines to activate a new plan (e.g., pressing a "No Thanks" button instead of a plan selection button), the classification flow may be executed, ultimately matching the filter and applying the policy set for the open access plan as shown. By contrast, if the user activates a new plan, the Facebook policy set may be updated to reflect the new plan before being applied to allow the service request.

Figure 61:
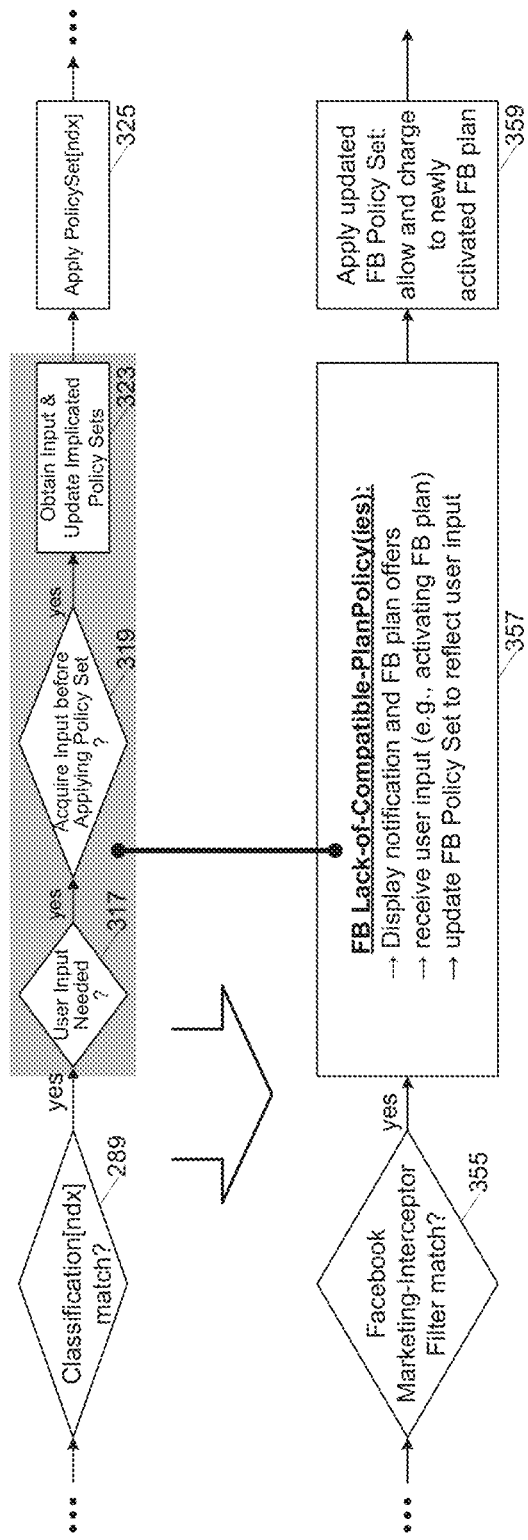
FIG. 61 illustrates a more specific example of the dynamic policy-set modification described in reference to FIG. 59.

FIG. 61 illustrates a more specific example of a dynamic policy-set modification described in reference to operation 323 of FIG. 59 with respect to a Facebook marketing interceptor, showing a sequence of specific operations in parallel with their more general counterparts excerpted from FIG. 59. As shown, when a filter associated with a Facebook marketing interceptor yields a match with respect to a service request at 355 (e.g., detected within network traffic or, in a device-assisted environment, by user input signaling the service request), one or more lack-of-compatible-plan (LCP) policies are executed at 357, in this example, to acquire and apply the user input before applying another policy set in response to the classification match. More specifically, in the example presented, application of the LCP policies yields the following actions:

- present a notification through the end-user device user interface indicating the lack of a compatible plan for the Facebook service request, the notification being accompanied by one or more offers for one or more request-compatible user-paid or sponsored Facebook plans (i.e., Facebook plan upsells);
- receive user input in response to the notification, such as detecting a button press indicating a request to activate a user-paid or sponsored Facebook plan, or a button press declining to activate a Facebook plan; and
- if the user-input indicates a Facebook plan activation, update one or more Facebook policy sets accordingly.

Note that the various notifications that may be presented in the multiple match context may be prioritized in a number of ways. For example, the SDC 360 user may explicitly specify multi-match notification priority or may specify algorithmic/heuristic criteria for prioritizing the notifications (e.g., weight-based prioritizing scheme, prioritizing in order of first or last re-match encountered, with notifications cascaded until the end-user purchase an access-enabling service, etc.).

Continuing the example shown in FIG. 61 and assuming that the user input indicates a Facebook plan activation, the updated Facebook policy sets are then applied at 359 to allow the requested Facebook access and charge the newly activated Facebook plan. If the end-user had instead declined to activate a Facebook plan, for example by pressing a "Later" button, the marketing interceptor policy set may permit a re-match, which may result in eventual application of the no-match policy set (e.g., a generic interceptor policy set).

Provisioning Instruction Translator

Figure 62:
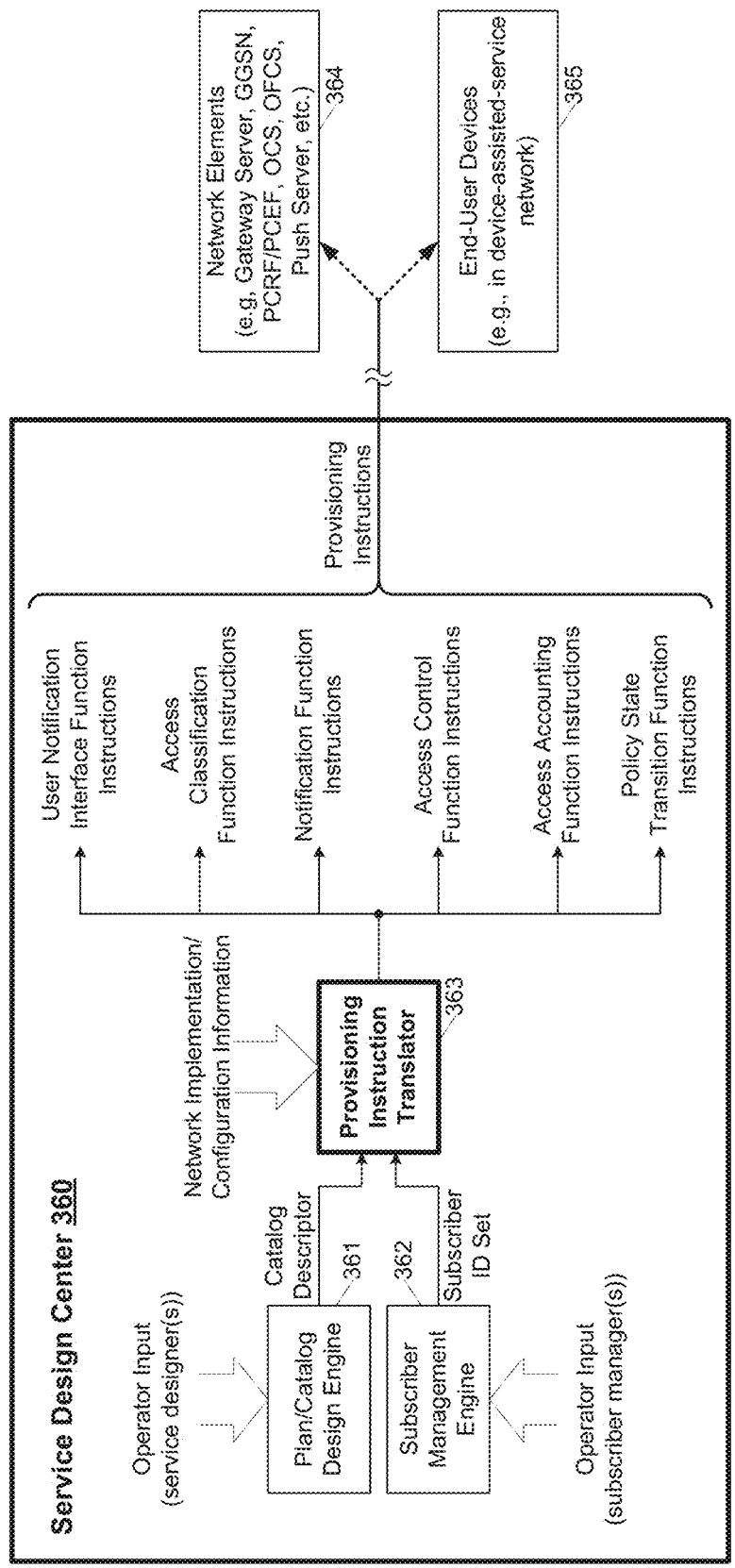
FIG. 62 illustrates an exemplary set of provisioning instruction outputs generated by a provisioning instruction translator within a service design center.

FIG. 62 illustrates an exemplary set of outputs generated by an integrated service design center 360, and more specifically by a provisioning instruction translator 363 within the service design center. As shown, a plan/catalog design engine 361 generates a catalog descriptor in response to input from one or more service designers (i.e., service design center user(s) or operator(s)) and outputs the catalog descriptor to provisioning instruction translator 363. In one embodiment, the catalog descriptor includes one or more object files and/or other data records that constitute a complete definition a service-plan catalog, including definitions of all incorporated service plans and/or plan bundles (including all properties associated with and objects incorporated within such plans/bundles) together with prioritization information, service discovery information and any other information provided by a user or automatically generated by the service design center in connection with the plan catalog.

A subscriber management engine 362 is provided to enable definition of one or more subscriber and/or end-user device groups (e.g., by device credential) based on input from one or more subscriber managers (i.e., service design center user(s) or operator(s), any of which may also be a service designer). An identified set of one or more of the user-defined subscriber groups (and/or end-user device groups) is associated with the catalog specified by the catalog descriptor and output from subscriber management engine 362 (i.e., as a set of subscriber identifiers/credentials and/or end-user device identifiers/credentials) to provisioning instruction translator 363. In one implementation, for example, the set of subscriber identifiers includes information that identifies various network elements associated with the identified subscribers and/or end-user devices to enable provisioning instruction translator 363 to identify the overall set of network elements (and/or end-user devices in a device-assisted service environment) for which provisioning instructions are to be generated.

In the embodiment of FIG. 62, provisioning instruction translator 363 receives network implementation and/or configuration information that, in combination with the subscriber ID set and catalog descriptor, enables determination of individual network elements and/or end-user devices for which provisioning instructions are to be generated. In the example shown, for instance, provisioning instruction translator 363 generates provisioning instructions for a user notification interface, access classification function, notification function, access control function, access accounting function and policy-state transition function. Instructions for more or fewer network element and/or end-user device functions may be generated in alternative embodiments, and the instructions for any of the functions shown may include multiple sets of instructions directed to different network elements and/or end-user devices that cooperatively perform control functions, accounting functions, notification functions or any other functions necessary or desirable in connection with network-delivered services. Accordingly, the collective set of provisioning instructions are output from provisioning instruction translator 363 (and thus from service design center 360) to various network elements 364 and/or to one or more end-user devices 365 to effectuate the plan catalog within selected end-user devices as designed and identified by the one or more service designers/subscriber managers. As shown, network elements may include a diverse set of appliances, servers, systems and so forth, as needed to render the planned services, and may include, for example and without limitation, any number of the following: gateway server, GGSN (gateway support node for general packet radio service), PCRF/PCEF/TDF (policy control rule function/policy control enforcement function/ Traffic Definition Function), Home Agent, HLR (Home Location Register), HSS (Home Subscriber Server), OCS (online charging system), OFCS (offline charging system), push notification server, base station controller, network switch, SMSC (SMS Center), MMSC (Multimedia Messaging Service Center) and so forth. Similarly, the end-user devices within a device-assisted-services, may include any type of device to which network-delivered services are to be rendered, including mobile phones (e.g., smart phones), tablet/laptop/desktop computers, specialized devices such as e-book readers or network-interactive navigation systems, intermediate networking devices, network-connected media players, machine-to-machine (M2M) appliances and so forth.

Simplified Policy Architecture

Figure 63:
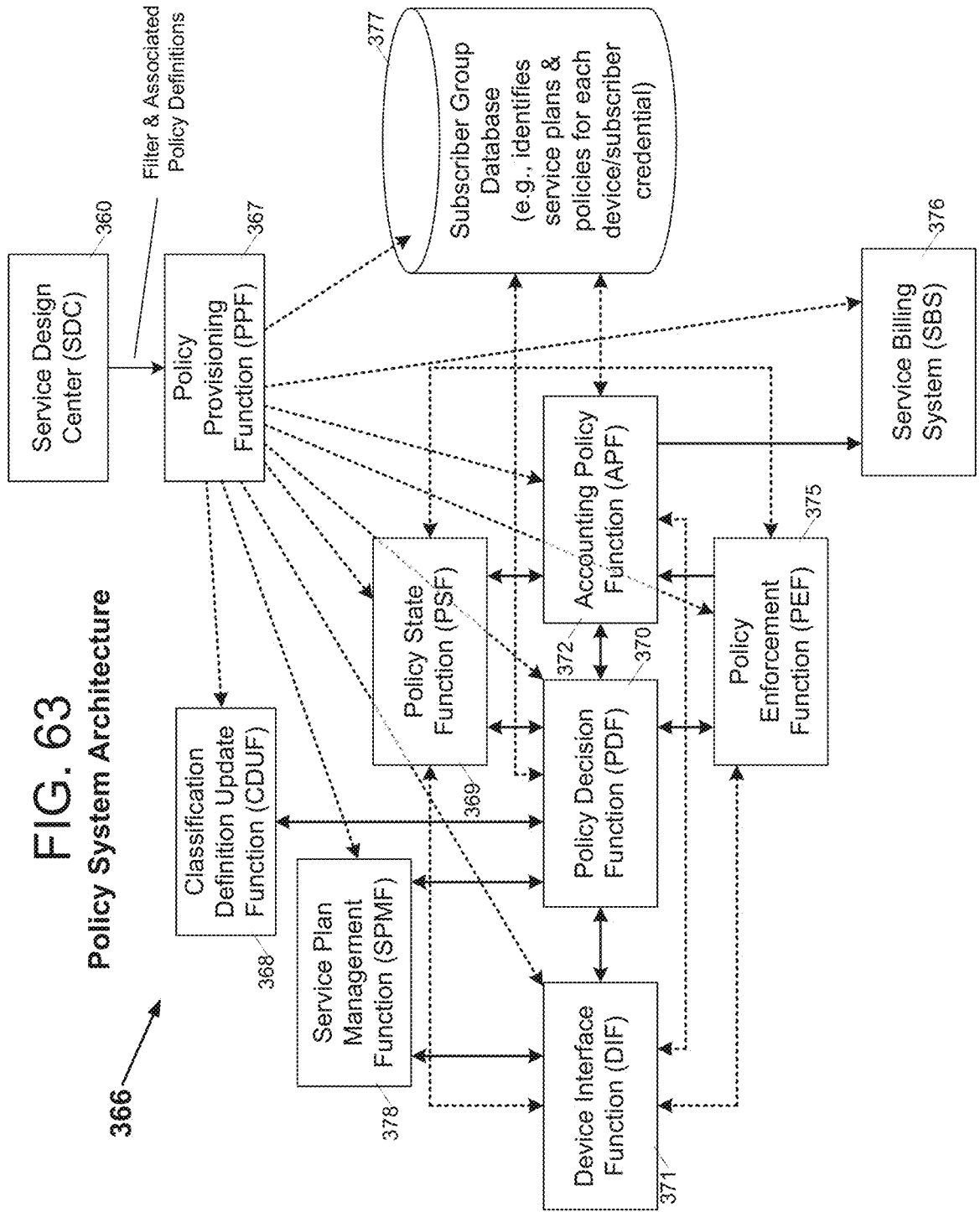
FIG. 63 illustrates an embodiment of a policy system architecture that may employ an integrated service design center according to various embodiments disclosed herein.

FIG. 63 illustrates an embodiment of a policy system architecture 366 that leverages a consistent and integrated (joint) policy definition and enforcement framework to provide significantly enhanced policy enforcement capability, lowered complexity and reduced network cost, reduced latency in user service notifications, and real time interaction between service plan policy options and user preferences to enhance the user experience and increase the opportunities to effectively market and sell new types of services and service plans or bundles.

A significant advantage of policy system architecture 366 is the capability to jointly define and enforce service control policy, service accounting policy and service notification policy. Definition (or design) of joint service policy is accomplished in service design center (SDC) 360, which may be implemented according to any of the various embodiments disclosed herein. In one embodiment, joint definition of service policy comprises using a common user interface and policy object creation or definition environment as a unified policy creation and management platform for two or more of the three key service network policy types: control, accounting and notification, thus providing a common or integrated environment that enables an SDC user to define service activity filters (definitions for a classification of service) and the policies that are associated with the filters to enforce a desired set of service plan policies. In the embodiment shown, the filter and associated policy definitions designed within SDC 360 may be supplied to a policy provisioning function 367 (e.g., including a provisioning instruction translator as discussed above) which serves in turn to convert those definitions into provisioning instructions for the various policy functions shown in FIG. 63.

The Policy Enforcement Function 375 (PEF) is configured to enforce the real-time policies associated with a filter identified/defined in the output of policy provisioning function 367. In a number of embodiments, PEF 375 identifies communication flows, associates a flow with a device credential or subscriber credential, and performs a filter match search on the flows with filter and policy instruction definitions that are assigned to that device or subscriber by Policy Decision Function 370 (PDF). The filters define service activity classifications and the policy or policies associated with a given filter are implemented when the PEF executes a policy enforcement instruction in response to communication activities determined to match the filter parameters. Examples of classifications performed using the filters include but are not limited to classification of voice, data, text, with classification of data including, for example and without limitation, identification (or detection) of streaming traffic, VOIP, video, audio, downloads, peer to peer, communication associated with a website, communication associated with an application or application server, communication associated with a particular network end point, communication associated with a particular logical channel or data path, communication associated with an Access Point Name (APN), communication associated with a Virtual Private Network (VPN), communication associated with a proxy server, communication associate with a partner network connection.

Examples of policy enforcement instructions or actions executed by PEF 375 include access control instructions (e.g., communication or traffic control instructions), accounting instructions, and notification instructions. Access control instructions may include, for example and without limitation, block, allow, throttle, cap, delay, prioritize, cap and re-match, cap and no-match, hold and wait for user response, cap and wait for user response, increase priority, decrease priority. Examples of accounting instructions include, but are not limited to, allocate accounting to a service accounting bucket identifier, allocate accounting to a user service accounting bucket, stop allocating accounting to a user plan service accounting bucket, allocate accounting to a service sponsor accounting bucket, stop allocating accounting to a service sponsor accounting bucket, allocate to a carrier accounting bucket. In one embodiment, a notification policy includes but is not limited to identify a particular notification trigger event and provide an event identifier and device or subscriber credential associated with the trigger event. The notification trigger events are fed to the Device Interface Function 371 (DIF) where the notification trigger identifier is used to determine the proper notification for delivery to the device associated with the device (or subscriber) credential.

Policy instructions are provided to PEF 375 by the Policy Decision Function 370 (PDF) in the form of policy instruction sets (e.g., comprising filters (or components) and associated policy enforcement instructions), with a device credential or subscriber credential being assigned to one or more policy instruction sets, for example, according to records within device group/subscriber group database 377. In a number of embodiments, PDF 370 operates in near real-time to update the filter definitions and/or the policy instruction sets delivered to the PEF. PDF 370 may perform such updates primarily when changes occur in the policy state reported to PDF 370 by the Policy State Function 369 (PSF) The PSF 369 detects changes in policy state that have a bearing on service plan policies. Examples of policy state include, without limitation, any one of or combination of: a state of service usage (e.g. specified usage amount, usage amount above or below a service limit or within or outside a set of limits, a rate of service usage); an elapsed amount of time, specified time or time interval such as a specific time of day or specified portion of a day (e.g., 7:00 am-5:00 am) or week (e.g., Monday-Friday); foreground or background access; a network state including type of network (e.g. mobile operator, 2G, 3G, 4G, WiFi), whether a home network or roaming network, using a specific APN or any APN; a network busy status or other condition; one or more available QoS states; a geography (e.g., a geographical location); a temporal event in connection with a network state such as transitioning into a network or transitioning out of a network; classification scanning states such as a classification indicating that the requested service activity is to be blocked for the end-user device, a classification that disallows the requested service but permits continued classification scanning, etc. In one embodiment, policy state becomes a modifier or index to assist PDF 370 in determining which policies are to be evaluated in connection with a given classification scan (and thus which filters are to be evaluated by PEF 375). For example, PDF 370 may apply the policy state or a value derived therefrom as an index to identify a subset of one or more policies to be evaluated in connection with a given flow (e.g., an active policy set as described in reference to FIGS. 58 and 59), thus streamlining the classification scan by limiting the set of filters to be evaluated to those associated with the indexed policy subset. As a more specific example, policy state values may be quantified into quintiles or other tuples (e.g. below service limit, above service limit) to enable efficient, integer-based indexing of an applicable policy subset. Such implementations tend to streamline implementation and operation within the PDF and PEF (e.g., reducing the policy decision logic relative to more compute-intensive techniques) and enable straightforward specification of precise, multi-faceted policy state definitions (and association of policy state with classification events within service policy definitions) within SDC 360.

Still referring to the architecture embodiment of FIG. 63, PEF 375 monitors service use and passes an accounting of service use to the Accounting Policy Function 372 (APF). In a number of embodiments, for example, the PEF monitors and accounts for service usage with respect to a filter (or component) and passes a measure of the service usage to APF 372 along with a filter (or component) identifier. In other embodiments (or configurations), PEF 375 aggregates the use for multiple filters (or components) into a service accounting "bucket" and passes a measure of the service accounting bucket use to APF 372 along with a bucket identifier. In either case (or configuration), the APF may pass service usage records to Service Billing System 376 (SBS) to be rated and converted into bills for end-users and/or service partners.

In a number of embodiments, DIF 371 establishes a communication channel (e.g., a secure channel) with an application, agent or SMS function on one of the end-user devices in a given device group (or subscriber group) to assist in delivering notifications to the end-user devices and, in some implementations, to receive end-user responses to such notifications from the end-user devices (e.g. service offer responses, acknowledgement responses, service choice/preference responses). For example, DIF 371 may communicate with the application or agent on one of the devices in the device (or subscriber) group using a pre-defined protocol (e.g., an application programming interface (API) protocol) established to make the communication of notifications, offers and user responses more efficient and useful for device users. In the case of a device-assisted network, DIF 371 may also be configured to request or instruct the application or agent on one of the devices in the device (or subscriber) group to assist in implementing or enforcing various notification policies, control policies and/or accounting policies. DIF 371 may accept user responses to notifications and service plan offers and relays them to Service Policy Management Function 378 (SPMF). DIF 371 may also perform an activation server function to activate a new service plan with respect to an end-user device or group of end-user devices. Such activations may be assisted by a sponsored service (e.g., implemented at least in part in PDF 370 and/or PEF 375) that allows the end-user device restricted access to the DIF.

The various types of notifications delivered to an end-user device by DIF 371 include, without limitation, notifications associated with service usage amount (including percentage or other fraction of service used or remaining), service limit reached or imminent, service overage, a service overage indication with request for end-user acknowledgement, a service condition that may expect or may benefit from a service plan purchase or upgrade (with offer for such purchase or upgrade provided with notification of the service condition), notification of a roaming condition (including a roaming condition that may expect or benefit from an end-user acknowledgment or other response), provision of one or more service offers, provision of one or more service offers together with a request or prompt for an end-user response (e.g., selection of one of multiple offered service options, thus constituting an acceptance of a service offer), provide a message or offer associated with a marketing interceptor trigger.

DIF 371 may forward notification responses (or information derived therefrom) received from end-user devices to various other functions within policy system architecture 366, including SPMF 378, which maintains service policy configuration information for a end-user device in a device (or subscriber) group and uses that information to manage active service policy sets for respective end-user devices. When a service plan is changed or an aspect is modified, SPMF 378 instructs the PDF 370 to implement the new service plan policies, and the PDF in turn instructs PEF 375 to implement the appropriate real-time policy implementation instructions to realize the service plan policies.

The Classification Definition Update Function (CDUF) 368 provides updates to classification definitions, for example, to enable associative classification. Associative classification provides for changing filter definitions as additional filter parameters are determined to be necessary due to the changing nature of some websites and other internet destinations.

The simplified policy architecture provides numerous significant advantages over conventional arrangements, including without limitation:

All the policy definitions required to commercialize new service offers are accomplished in a single service plan definition environment, the SDC 360.

All traffic monitoring and processing is accomplished in one real time policy function, the PEF.

The PEF is the only policy function that processes the communication path (e.g. data path), and the simple nature of what the PEF does makes the simplified policy architecture highly scalable. All policies for control, accounting and notification are based on simply matching filters with communication parameters and executing a finite set of real time policy implementation instructions on the communication flows that match the filter parameters. Changes at the PEF level of policy occur when the PDF modifies the filters or associated policy implementation instructions provided to the PEF. The filters and associated policy implementation instructions implemented by the PEF are termed policy instruction sets. Since the PEF determines all of the communication events that trigger control, accounting and notifications, the policy definition environment is simplified and joint policy design is possible. Unifying policy event detection in one function also makes it possible to have simultaneous real time coordination between two or more of the control, accounting and notification events that are initiated by a policy event. Although the PEF comprises a simple architecture wherein it performs an ordered search for filter matches and then implements the policy instruction corresponding with the filter that is matched, the SDC policy object hierarchy, Z-order protocol for determining multi-match policy and the expansion of PEF command types provides for industry leading policy sophistication at the time this is being written.

Employing policy state as a qualifier or modifier of policy allows the decision logic in the PDF to be simplified. In one embodiment, the PDF in large part simply observes changes in policy state and when the policy state reaches a pre-defined state the PDA is pre-configured to simply look up a new pre-configured policy instruction set and pass it to the PEF. The SDC 360 may be used to define all the policy state transitions where PEF policy is desired to be changed, and for a defined Policy state a new PEF policy instruction set may be configured in the SDC 360 and provisioned into the PDF along with the information necessary to identify a policy state that corresponds to a policy instruction set.

Notifications may be triggered in real time off of the same policy events that cause changes in control policy and/or accounting policy. This provides for a very elegant and effective real time synchronization of user notifications about service use or changes in service status, making for a more comfortable and enjoyable user experience. Service usage reporting to the user may be easily done in real time. When a service plan upgrade or new service plan purchase may accomplish a service activity the user is interested in, the user's attempt to use the service activity may be instantly detected and an offer may be presented to the user interface of the device with very little delay. This makes the service experience more interactive and may be very attractive for certain markets where services are purchased in smaller increments and the user population is beleaguered with either being charged for service overage, or running out of service or purchasing more service than the user really may expect to avoid the former two conditions. With real time purchase capability users never need to worry about hassles or overages when they run out of service because they may use a service app or service processor agent to re-up their service plan in real time.

Service control, accounting and notification may be accomplished in real time at a very granular level, depending on the traffic inspection and/or application awareness capabilities of the PEF.

The simplified and unified environment also makes it simpler to define sponsored services and to virtualize services across mobile operator networks as disclosed herein while implementing a highly capable billing platform capable of billing any number of entities for various classifications of the service use consumed by a given device.

In the case of a device-assisted network, policy system architecture 366 may be implemented largely by service processor execution within an end-user device (e.g. PEF=PEA, PIA; PDF=PDA, PCA), with network elements (PEF=a simplified PCEF or GGSN; PDF=an enhanced OCS or PCRF), or with a combination of network elements and device agents.

Policy Enforcement

As discussed in the context of FIG. 62, the provisioning instructions output from the service design center (SDC) 360 are provided to various network elements and/or to one or more end-user devices to effectuate the plan catalog within selected end-user devices as designed and identified by the one or more service designers/subscriber managers. The network elements may include a diverse set of appliances, servers, systems and so forth, as needed to render the planned services, and may include, for example and without limitation, any number of the following: gateway server, GGSN, PCRF, PCEF, TDF, Home Agent, HLR, HSS, OCS, OFCS, push notification server, base station controller, network switch, SMSC, MMSC, and so forth. These network elements implement or enforce policies (e.g., control, accounting, and/or notification) to implement a service plan applicable to an end-user device.

Figure 64:
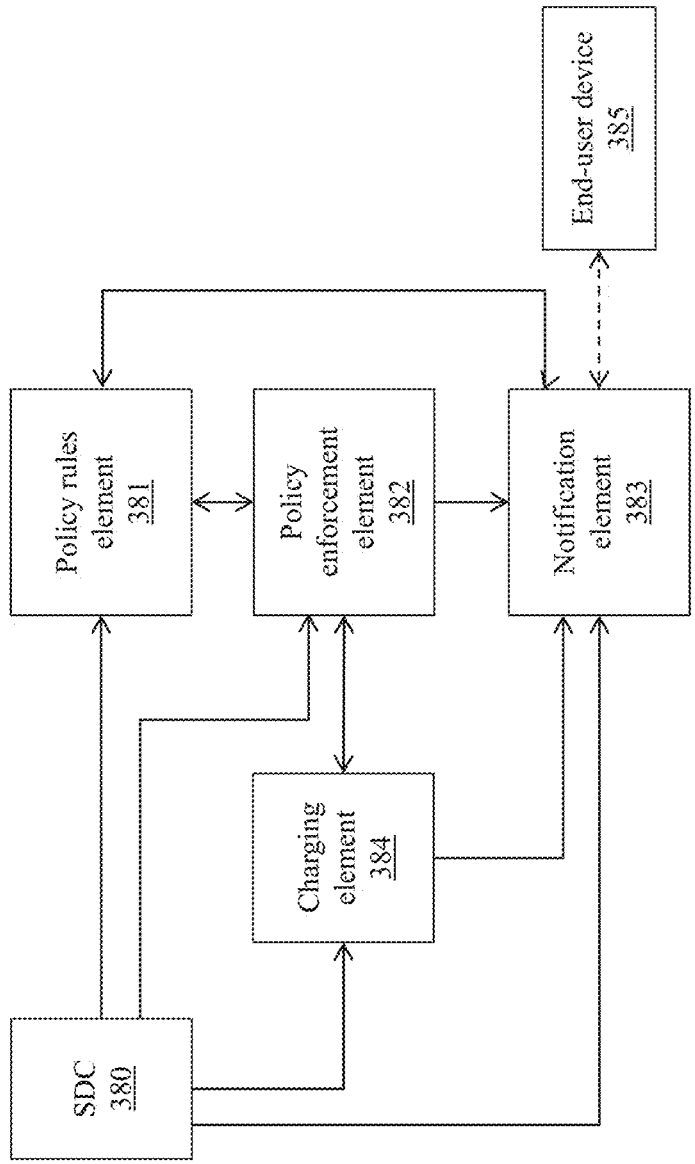
FIG. 64 illustrates various functions that may be involved in enforcing policies for an end-user device in embodiments in which the end-user device lacks a service processor.

FIG. 64 illustrates a further example of various functions that may be involved in enforcing policies for an end-user device in accordance with some embodiments in which end-user device 385 does not include a service processor.

Policy rules element 381 represents one or more network elements responsible for policy-making and control decisions, such as, for example, dynamically managing and controlling data sessions, or determining the applicable accounting policy for a data session. Policy rules element 381 may have, for example, some or all of the functionality of the 3GPP policy and charging rules function (PCRF). Policy rules element 381 determines the appropriate rules to apply to service usage by an end-user device to implement the appropriate policies. For example, In one embodiment, policy rules element 381 keeps track of the statuses of different service plans (or service plan components) associated with end-user device 385, such as whether usage under a plan is still allowed, or whether the plan has been exhausted. Policy rules element 381 may track any characteristic or variable that triggers or contributes to a policy change (e.g., any variable or characteristic that may expect a change in the notification policy or policies, the control policy or policies, and/or the accounting policy or policies associated with end-user device 385). Policy rules element 381 may identify, understand, or define policies in terms of one or more high-level rules or objective, such as, for example, "No streaming video allowed between the hours of 9:00 P.M. and midnight."

Policy enforcement element 382 represents one or more network elements responsible for enforcing policies applicable to end-user device 385. In one embodiment, policy enforcement element 382 enforces gating and/or quality-of-service for individual packet flows. In one embodiment, policy enforcement element 382 tracks service usage associated with end-user device 385 to support charging. Policy enforcement element 382 may have, for example, some or all of the functionality of a 3GPP policy and charging enforcement function (PCEF). Policy enforcement element 382 may be, for example, a gateway. Policy enforcement element 382 may operate using one or more low-level rules or instructions that implement the high-level rules or objectives identified, understood, or defined by policy rules element 381.

Charging element 384 represents one or more network elements responsible for real-time charging of subscribers based on service usage. Charging element 384 may have some or all of the functionality of the 3GPP online charging system (OCS).

Notification element 383 represents one or more network elements responsible for providing notification messages to end-user device 385. Notification element 383 is communicatively coupled over the wireless access network to end-user device 385 (indicated by the dashed-line arrow). Notification element 383 either itself sends notifications to end-user device 385, or notification element 383 initiates the sending of notifications to end-user device 385. Notification messages sent by notification element 383 are configured to assist end-user device 385 in presenting a notification to a user of end-user device 385 through a user interface of end-user device 385 (e.g., a visual notification through a display, an audible notification through a speaker, etc.).

SDC 380 sends provisioning instructions to one or more elements (i.e., policy rules element 381, policy enforcement element 382, charging element 384, and/or notification element 383) to allow the elements to implement the policies designed using SDC 380. For example, SDC 380 may provide information to policy rules element 381 to enable policy rules element to determine the policy or policies that currently apply to end-user device 385. This determination may be based on, for example, a network state, a time of day, or of the other factors previously discussed. After determining the applicable policy or policies for end-user device 385, policy rules element 381 provides information to policy enforcement element 382. The information (e.g., a setting, an instruction, a direction, a high-level objective, etc.) allows policy enforcement element 382 to enforce the applicable policy or policies for end-user device 385.

As a simple example to illustrate the interaction of policy rules element 381 and policy enforcement element 382, assume that SDC 380 has provided to policy rules element 381 provisioning instructions based on a determination that end-user device 385 is governed by a parental control that prohibits data usage between 9:00 P.M. and midnight. At 8:30 P.M., end-user device 385 requests access to YouTube. Policy rule element 381 has determined that, because the time is not between 9:00 P.M. and midnight, the applicable control policy is "allow." Policy rule element 381 has provided information to policy enforcement element 382 that instructs policy enforcement element 382 to allow the requested access to YouTube until further notice. At 9:00 P.M., policy rules element 381 determines that the applicable control policy for the device is no longer "allow" because the parental control applies. Policy rules element 381 determines the applicable control policy ("block") and provides information to policy enforcement element 382 to enable policy enforcement element 382 to enforce the policy. Thus, policy rules element 381 uses the information provided by SDC 380 to modify policies applicable to end-user device 385. In particular, policy rules element 381 provides information to policy enforcement element 382 to change the enforced policies based on changes detected by policy rules element 381.

Policy enforcement element 382 may also send information to policy rules element 381. For example, policy enforcement element 382 may inform policy rules element 381 that policy enforcement element 382 blocked (or allowed) a traffic stream or a traffic attempt.

As illustrated in FIG. 64, policy rules element 381 may communicate with notification element 383. In one embodiment, policy rules element 381 provides information (e.g., a trigger) to notification element 383 to cause notification element 383 to initiate or send a notification to end-user device 760. For example, if policy rules element 381 obtains information indicating that a new service plan or service plan option has been activated for end-user device 760, policy rules element 381 may provide information to notification element 383 that results in notification element 383 sending or initiating the sending of a notification configured to inform a user of end-user device 760 of the new service plan or service plan option. If end-user device 760 is capable of communicating a user response to the notification back to notification element 383 (e.g., if end-user device 760 includes an application program that enables end-user device 760 to establish a secure communication link with notification element 383 and send back a user response to the notification), notification element 383 may then send information to policy rules element 381 to inform policy rules element 381 of the user's response. It may be appreciated that policy rules element 381 may trigger a wide variety of notifications, including notifications described elsewhere in this document.

As also illustrated in FIG. 64, policy enforcement element 382 may provide information (e.g., a trigger) to notification element 383. In one embodiment, when policy enforcement element 382 applies a different policy to a service usage by end-user device 760, policy enforcement element 382 provides a trigger to notification element 383. The trigger provides information about the actions of policy enforcement element 382, such as, for example, that a previously-allowed service usage is now being blocked, or an accounting rate (cost) of a service usage has changed. In one embodiment, based on the trigger from policy enforcement element 382, notification element 383 determines whether to send a notification message to end-user device 760. In one embodiment, notification element 383 sends a notification message to end-user device 760 in response to the trigger from policy enforcement element 382 without any decision-making by notification element 383. It will be appreciated that policy enforcement element 382 may trigger a wide variety of notifications, including notifications described elsewhere in this document.

As also illustrated in FIG. 64, SDC 380 may provide information (e.g., a trigger) to notification element 383. For example, if an administrator configures a new service plan or service plan option that is available to end-user device 760, SDC 380 may provide information to notification element 383 that results in notification element 383 sending or initiating the sending of a notification configured to inform a user of end-user device 760 of the availability of the new service plan or service plan option. It will be appreciated that SDC 380 may trigger a wide variety of notifications, including notifications described elsewhere in this document.

As also illustrated in FIG. 64, charging element 384 may provide information (e.g., a trigger) to notification element 383. For example, if a billing amount associated with usage of the wireless access network by end-user device 760 reaches a specified limit, charging element 384 may provide information to notification element 383 that results in notification element 383 sending or initiating the sending of a notification configured to inform a user of end-user device 760 that the billing amount has reached the specified limit. It will be appreciated that charging element 384 may trigger a wide variety of notifications, including notifications described elsewhere in this document.

Notification element 383 may send a variety of different notification messages, such as any of the notifications described herein, in response to various triggers from policy enforcement element 382, policy rules element 381, charging element 384, or SDC 380. For example, if a service plan associated with end-user device 760 has been exhausted, notification element 383 may send a notification message that includes an offer to repurchase or replenish the service plan, or an offer for a different or additional service plan. As another example, if a service usage billing rate or cost has changed, notification element 383 may send a notification message informing end-user device 760 of the change. As described previously (e.g., in explaining FIGS. 59, 60, and 61), the notification message may request an acknowledgment of the change, or it may offer a different or more economical service plan option to the user.

In one embodiment, notification element 383 is able to receive information from end-user device 760. In one embodiment, end-user device 760 includes some intelligence (i.e., an application program, a software agent, a service processor, an operating system component, etc.) that enables end-user device 760 to establish a communication link with notification element 383 so that notification element 383 may conduct bi-directional communications with end-user device 760. In one embodiment, when a notification message provided by notification element 383 to end-user device 760 prompts a response from a user, the user response may be obtained by notification element 383, which may then communicate pertinent information (e.g., an acknowledgment of a billing rate change, acknowledgment or approval of a roaming condition, selection of a service plan or service plan option, etc.) to policy rules element 381. Policy rules element 381 may then adapt one or more policies based on the user response and provide updated information to policy enforcement element 382 so that policy enforcement element 382 may enforce the updated policy or policies. For example, if the response indicates that the user has agreed to purchase a new or additional service plan, policy rules element 381 determines the appropriate policy or policies based on the fact that the user has agreed to purchase a new or additional service plan.

It is to be understood that the functions described in the context of FIG. 64 may be disposed differently from those shown. For example, the functions of policy rules element 381, policy enforcement element 382, notification element 383, and charging element 384 may be performed by more or fewer elements than illustrated in FIG. 63. It is also to be understood that the functions illustrated in FIG. 64 may communicate differently (i.e., communications may be bi-directional where illustrated as uni-directional) without departing from the spirit of the disclosures herein.

Figure 65:
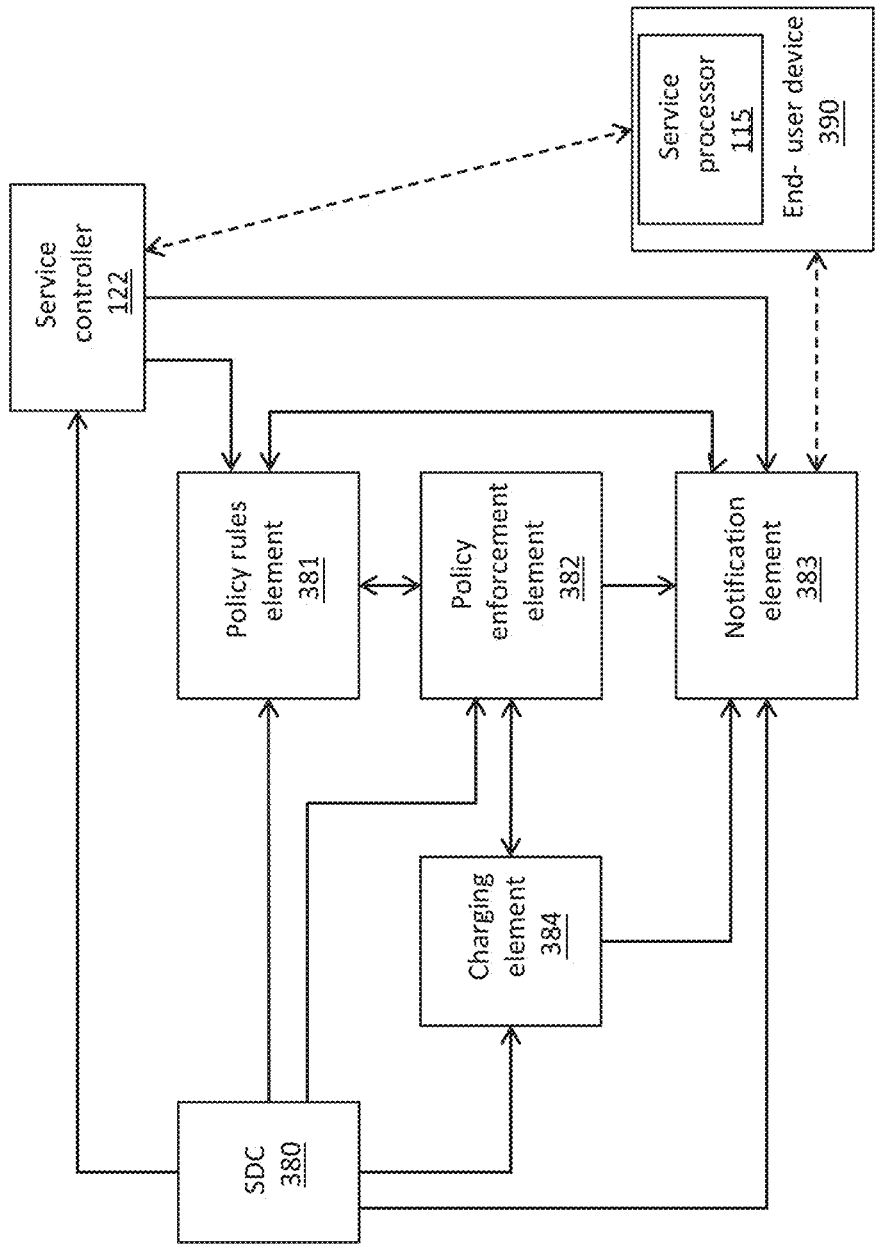
FIG. 65 illustrates various functions that may be involved in enforcing policies for an end-user device in embodiments in which the end-user device includes service processor.

In one embodiment, a portion of policy implementation/enforcement is performed by the end-user device, and a portion is performed by network elements. FIG. 65 illustrates the various functions that may be involved in enforcing policies for an end-user device in accordance with some embodiments in which end-user device 390 includes service processor 115. As compared to FIG. 64, FIG. 65 adds service processor 115 to end-user device 390 and service controller 122, which resides in the network system. Service controller 122 is communicatively coupled to service processor 115 over the wireless access network (illustrated by a dashed-line arrow). Service controller 122 may be software, hardware, or a combination of software and hardware. Service processor 115 may be software, hardware, or a combination of software and hardware. In one embodiment, service processor 115 comprises one or more operating system (OS) components. In one embodiment, service processor 115 comprises one or more application programs. In one embodiment, service processor 115 comprises one or more software agents.

In one embodiment, service controller 122 obtains provisioning instructions or information from SDC 380 and, based on the instructions or information from SDC 380, communicates policy control and/or implementation information (e.g., a setting, an instruction, a high-level objective, a policy, etc.) to service processor 115. In one embodiment, service processor 115 has one or more policy enforcement agents (or policy implementation agents) in an operating system kernel or stack, and these one or more policy enforcement agents enforce one or more of the applicable policies. In one embodiment, service processor 115 also has one or more policy decision agents that modify the one or more policies that are enforced by the one or more policy enforcement agents in a manner similar to how policy rules element 381 modifies policies that are enforced by policy enforcement element 382. In one embodiment, the one or more policy decision agents identify, define, or understand one or more high-level policy objectives or rules. In one embodiment, the one or more policy enforcement agents operate using low-level settings or instructions provided by the one or more policy decision agents.

In one embodiment in which end-user device 390 includes service processor 115, notification element 383 performs the notification functions described in the context of FIG. 63. In one embodiment, notification element 383 sends part of the content of a notification message that is to be presented through a user interface of end-user device 390 (e.g., text for presentation through a device display, an indication that a user has one minute left of a voice plan, etc.), and end-user device 390 obtains, from memory on end-user device 390, the rest of the content of the notification message (e.g., formatting information for the notification, predetermined text or background for display through the device display, or an MP3 file corresponding to an audible notification when a user has one minute left of a voice plan, etc.).

In one embodiment, service processor 115 sends information (e.g., a trigger) to notification element 383. In one embodiment, service controller 122 is able to perform some or all of the functions of notification element 383.

In one embodiment, when a notification message sent by notification element 383 to end-user device 760 prompts a response from a user, the user response may be sent by service processor 115 to service controller 122, which may then communicate pertinent information (e.g., an acknowledgment of a billing rate change, acknowledgment or approval of a roaming condition, selection of a service plan or service plan option, etc.) to policy rules element 381. Policy rules element 381 then adapts one or more of the network-enforced policies that are enforced by policy enforcement element 382 based on the user response and provides updated information to policy enforcement element 382 so that policy enforcement element 382 may enforce the updated network-enforced policy or policies.

In one embodiment, service processor 115 establishes a secure (e.g., encrypted) communication link with service controller 122. In one embodiment, service controller 122 communicates over the secure communication link to provide policy information enabling service processor 115 to implement a device-portion of a service policy.

It is to be understood that the functionalities described in the context of FIG. 65 may be disposed differently from how they are shown in FIG. 65. For example, service controller 122 may perform some or all of the functions of policy rules element 381 and/or policy enforcement element 382, and/or notification element 383, and/or charging element 384. Likewise, one or more of policy rules element 381, policy enforcement element 382, notification element 383, and charging element 384 may perform some or all of the functions of service controller 122. Additionally, the functions of service controller 122, policy rules element 381, policy enforcement element 382, charging element 384, and notification element 383 may be performed by more or fewer elements than illustrated in FIG. 64. It is also to be understood that the functions illustrated in FIG. 64 may communicate differently (i.e., communications may be bi-directional where illustrated as uni-directional) without departing from the spirit of the disclosures herein.

It should be appreciated in view of the disclosures herein that the functions illustrated in FIGS. 63-65 and described above may be used to implement "multi-match" classification and the triggering of multiple policy events per match described previously.

Figure 66:
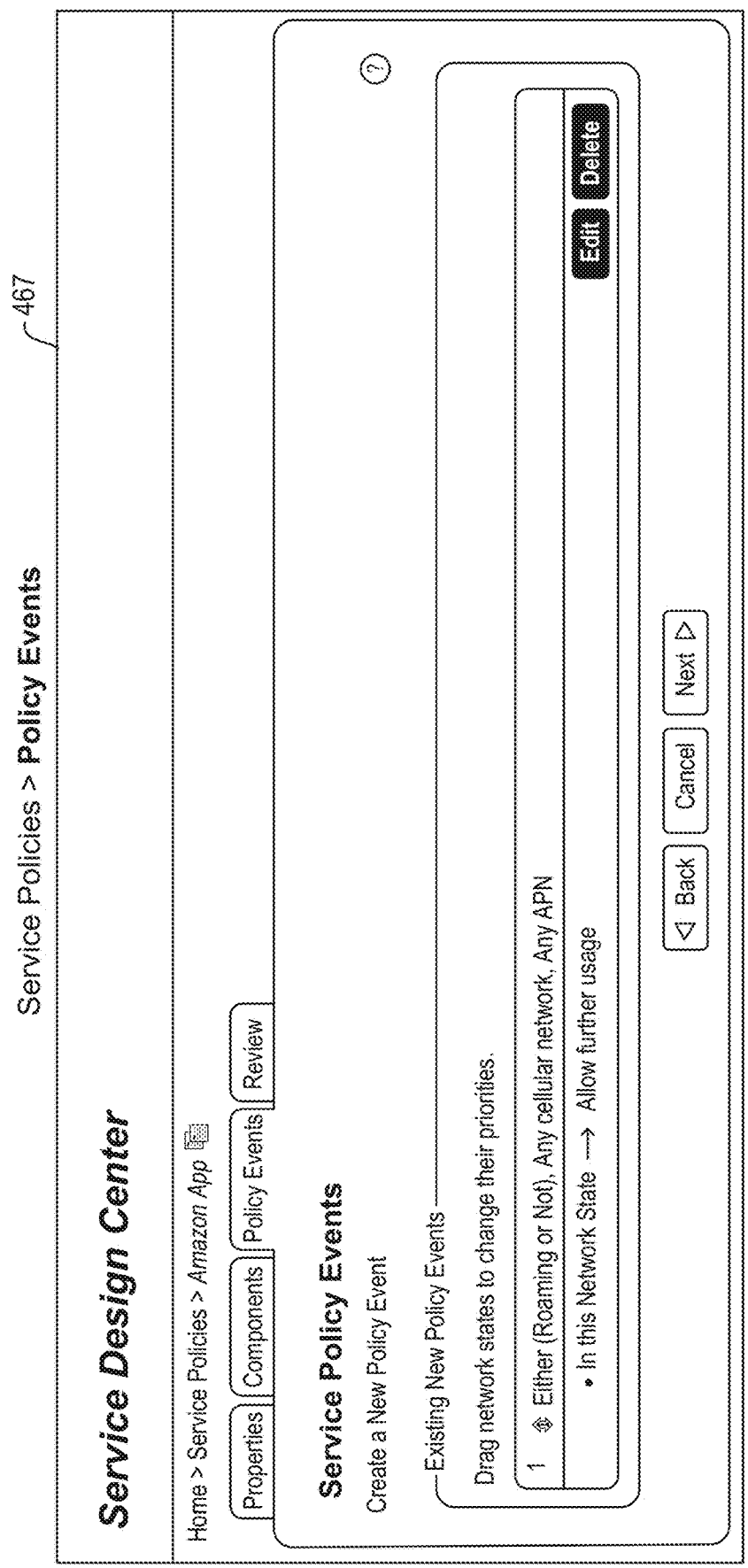
FIG. 66 illustrates a tabbed "Service Policy Events" display presented in response to navigation input within another service policy design display.
Figure 67:
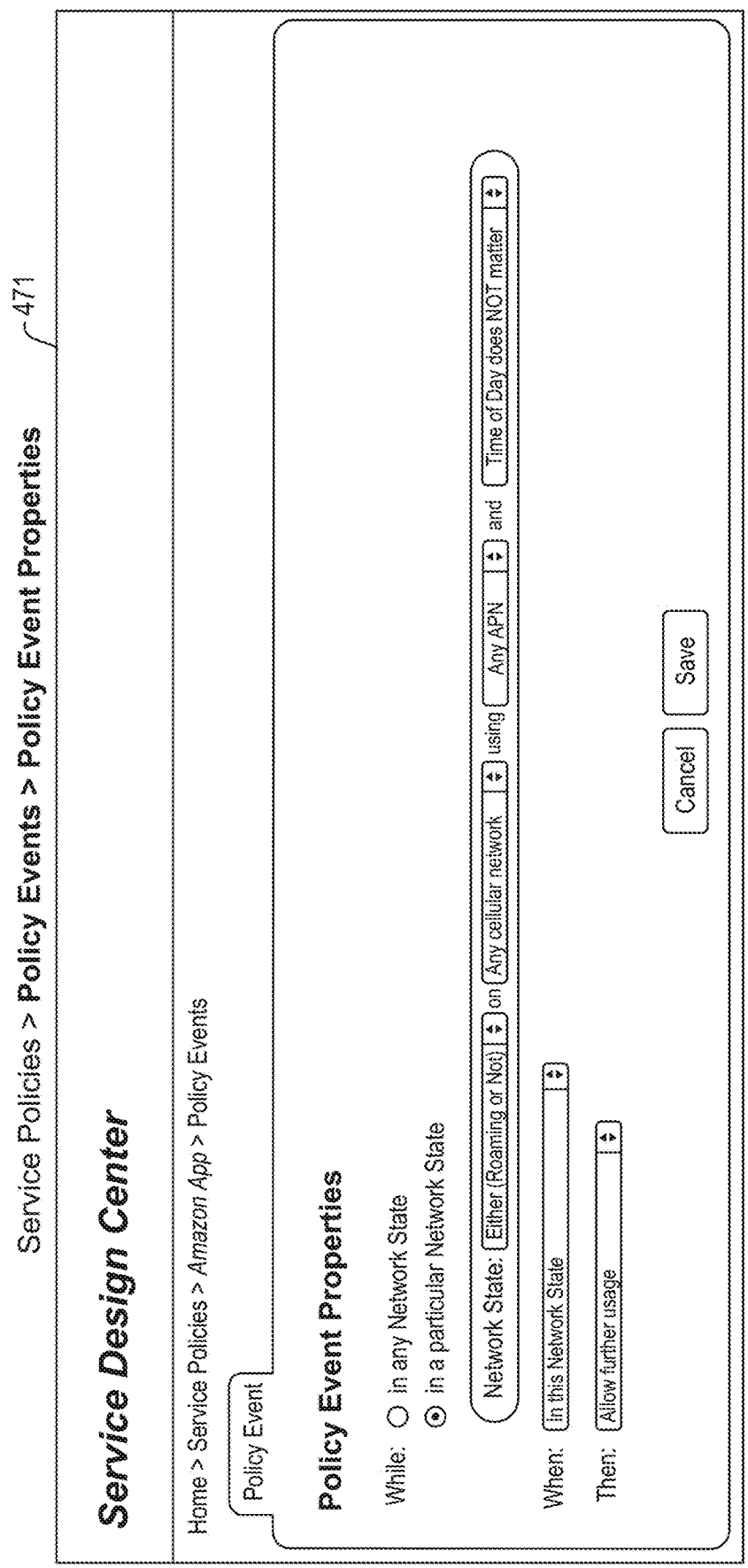
FIGS. 67-75 illustrate views of an exemplary "Policy Event Properties" display presented in response to navigation input from the "Service Policy Events" display and showing examples of user-selectable options in connection with policy state definition.
Figure 68:
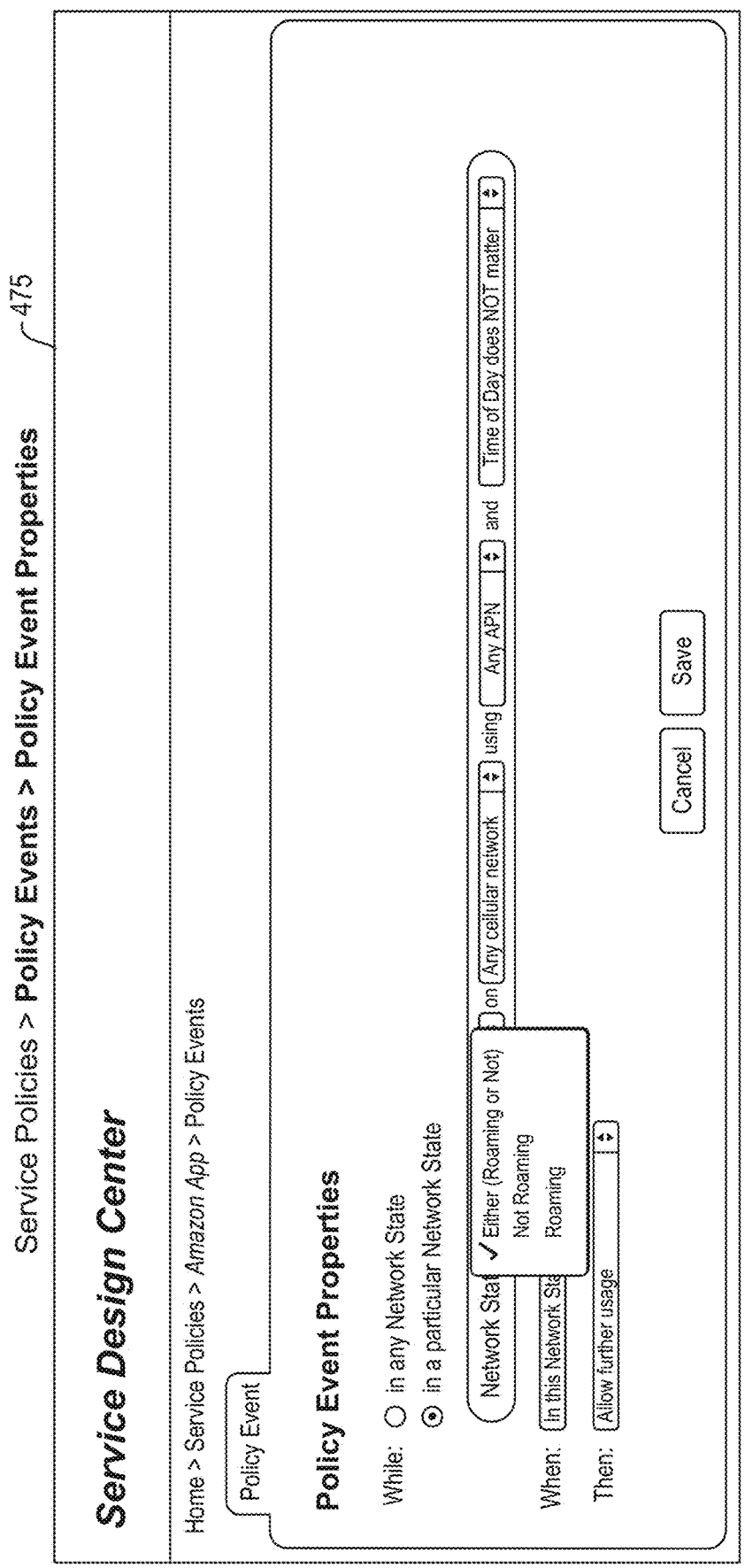
Figure 69:
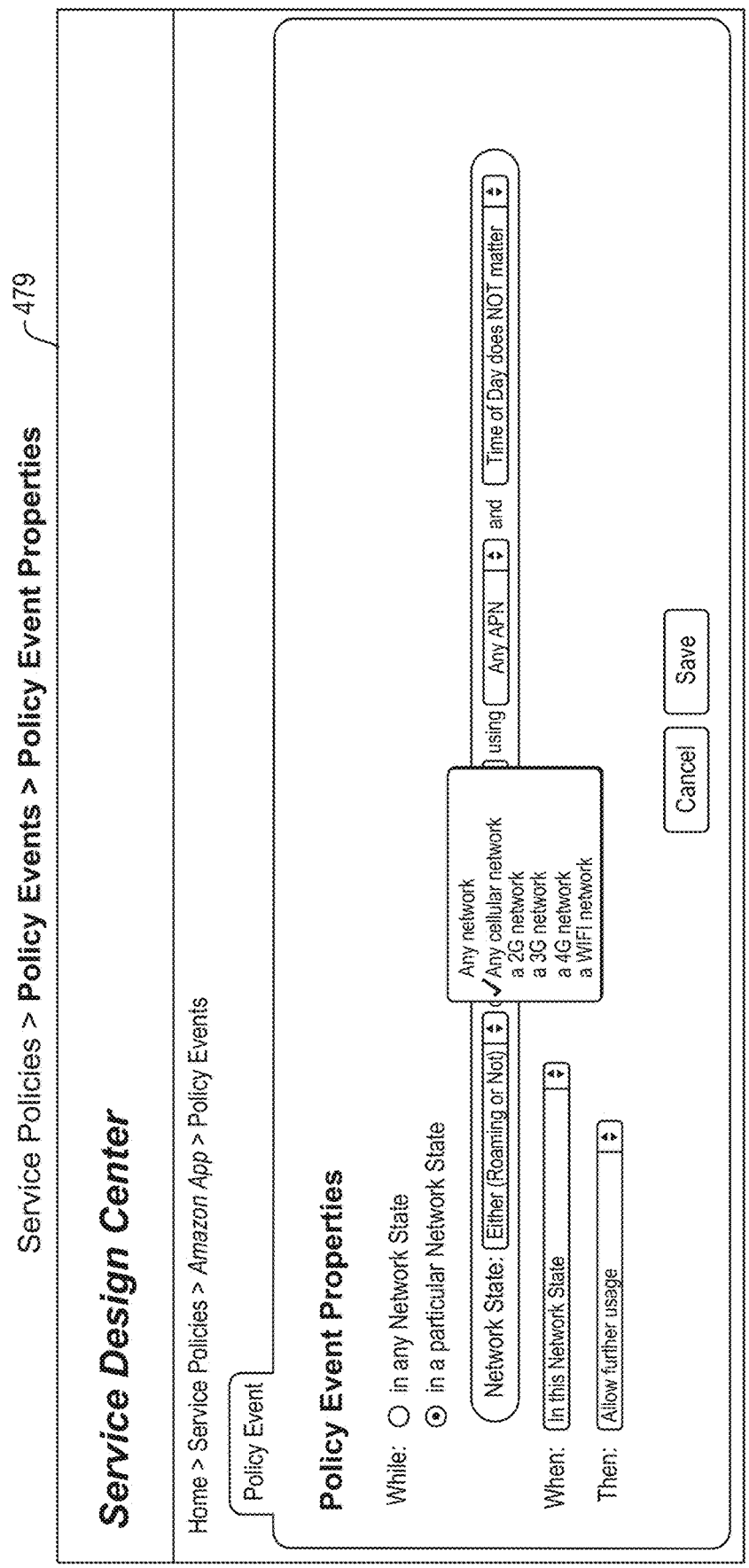
Figure 70:
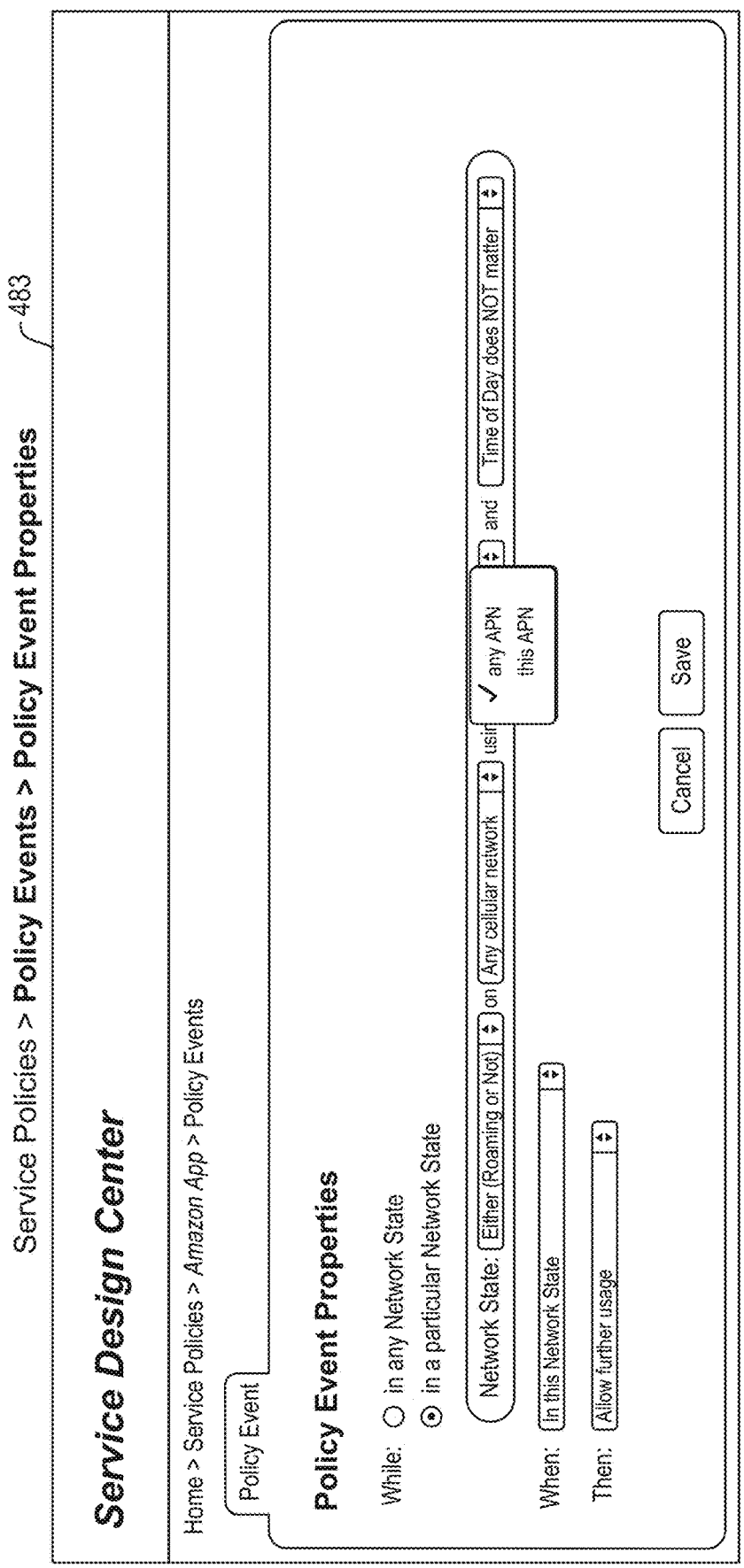
Figure 71:
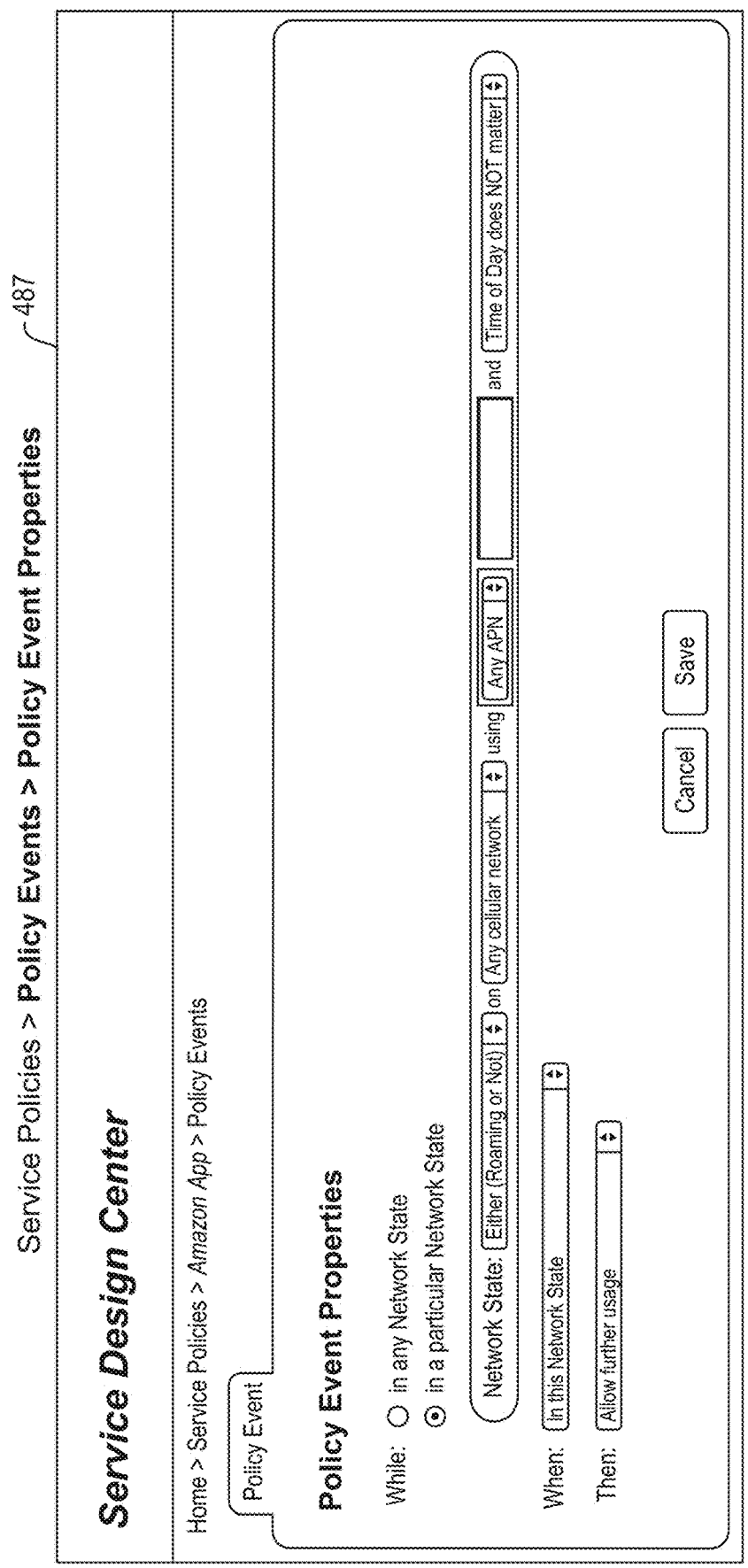
Figure 72:
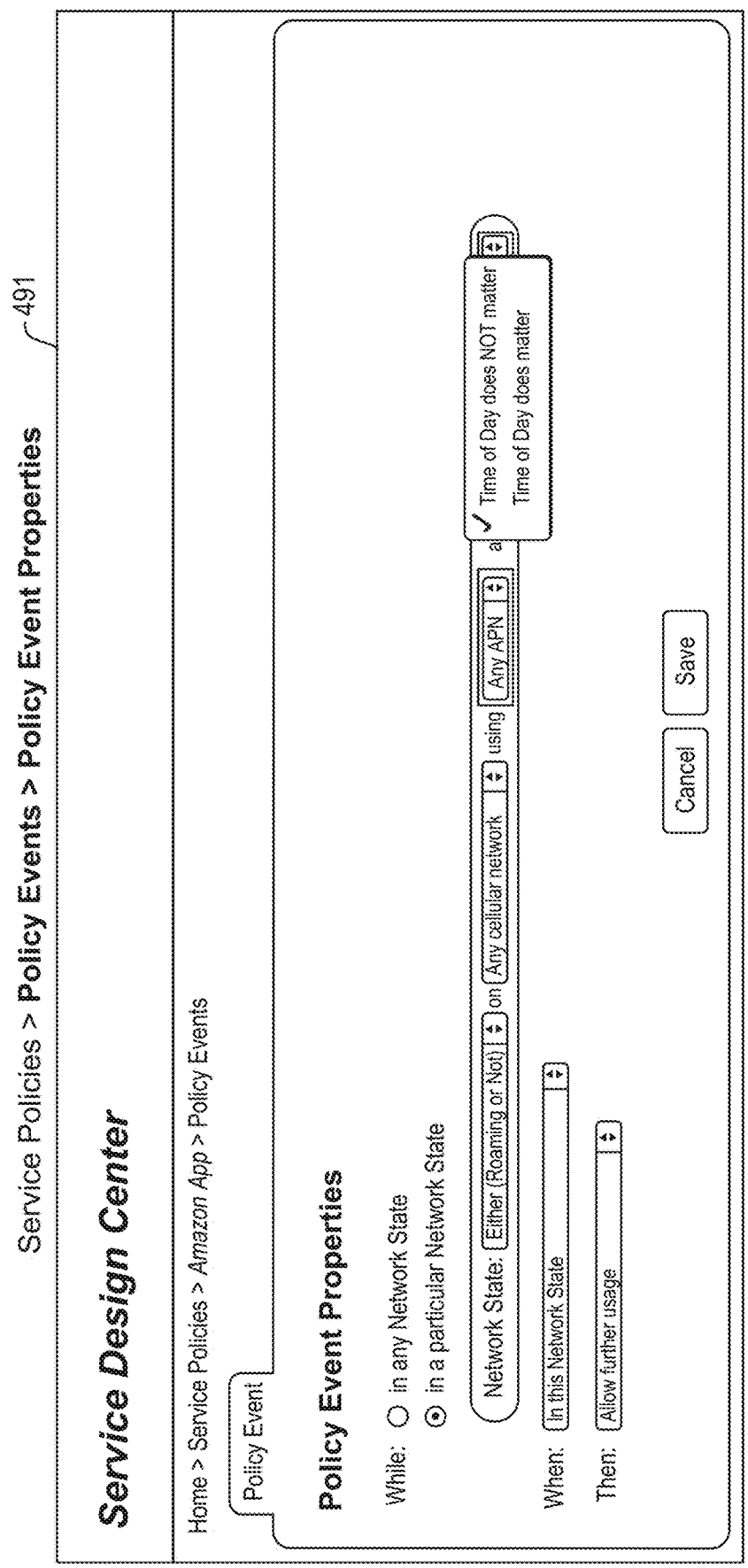

FIG. 66 illustrates a tabbed "Service Policy Events" display 467 presented in response to navigation input within another service policy design display and which corresponds to the policy event aspect of service policy design depicted in FIG. 54. In the embodiment shown, the Service Policy Events display lists all existing policy event definitions included by the service policy under design, prompts the user to edit or delete any of the policy events, create a new policy event and/or change the relative priorities between policy events by dragging policy events definitions to desired positions within the policy event list. Thus, the SDC user may associate multiple policy events with a service policy and control the order in which the policy events are to be evaluated in connection with policy application. For example, the SDC user may define different policy states for one of a set of policy events, and then control the operational sequence effected by those policy events (e.g., executing the action specified under policy event A, but not policy event B if a particular policy state is detected in connection with a classification event) to provide precise control over end-user device operation and/or plan usage.

FIGS. 67-75 illustrate views of an exemplary "Policy Event Properties" display presented in response to navigation input from the "Service Policy Events" display and showing examples of user-selectable options in connection with policy state definition. Display 471 shown in FIG. 67, for example, illustrates a set of network state definition fields presented in response to SDC user selection of an "in a particular Network State" condition. In the depicted embodiment, the network state definition enables specification of a roaming state (e.g., roaming, not roaming, or either (roaming or not) as shown in display 475 of FIG. 68), a network type (e.g., any cellular network, 2G network, 3G network, 4G network or WiFi network as shown in display 479 of FIG. 69, though various other network types may also be specified), a network access point name (APN) specification (e.g., any APN or a particular APN as shown in display 483 of FIG. 70, with the particular APN selection triggering display of an APN selection or entry field as shown in display 487 of FIG. 71), and a time of day specification (e.g., a temporal condition allowing indication of whether time of day does or may not matter as shown in display 491 of FIG. 72). Specifying that "Time of Day DOES matter" in connection with the network state definition triggers an additional prompt (i.e., display field) for the user to enter or select a time of day and/or time interval within a day or other period.

Figure 73:
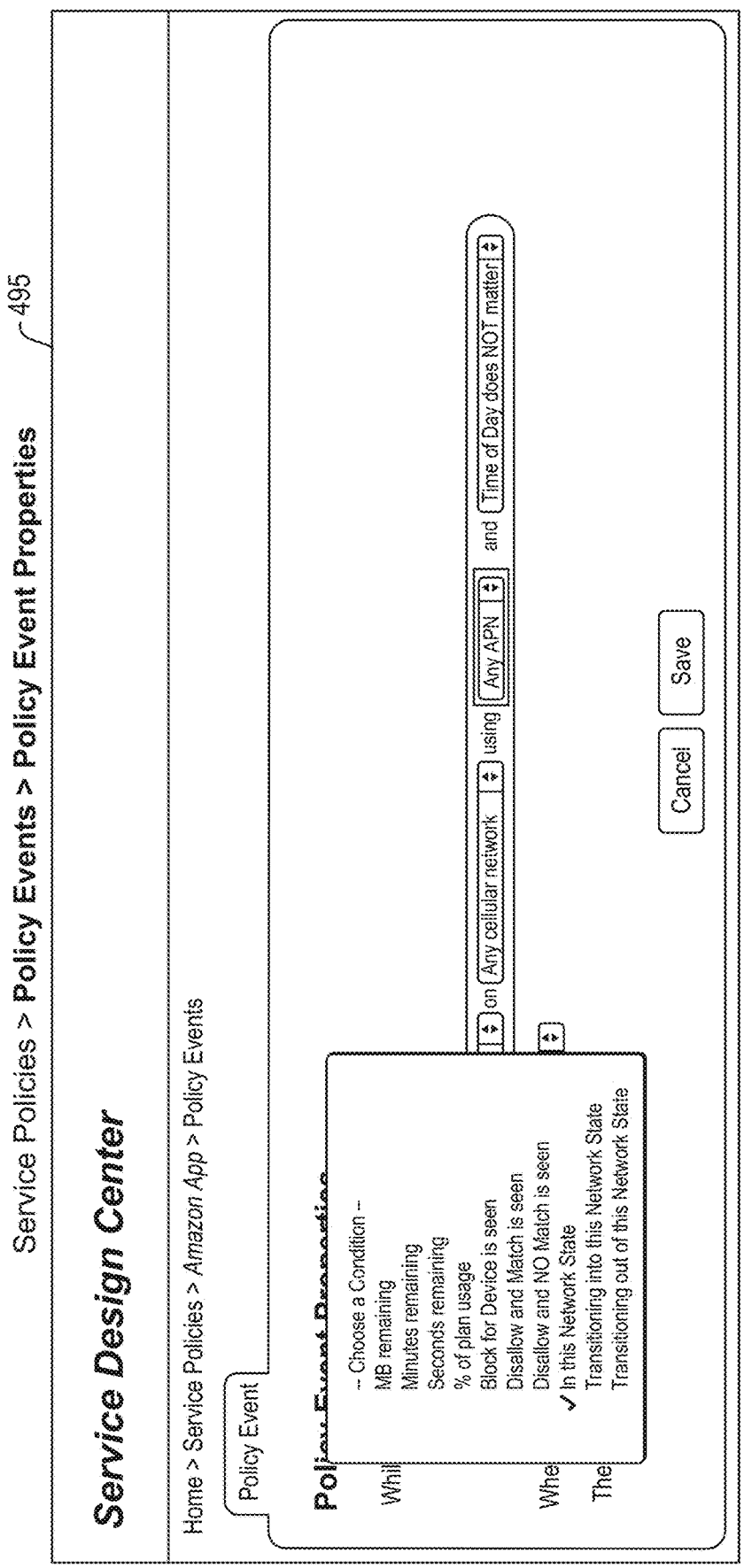

Still referring to the exemplary Policy Event Properties displays, FIG. 73 illustrates user-selectable options presented in connection with a temporal condition prompt ("When"), including service usage states (e.g., megabytes (MB) remaining, minutes remaining, seconds remaining), classification scanning states (e.g., block for device is seen, disallow and match is seen, disallow and no match is seen), qualifiers to the network state definition described above (e.g., in this network state, transitioning into this network state, transitioning out of this network state), and thus joining with the network state/time-of-day qualifier to form an overall policy-state specification. The classification scanning states may relate, for example and without limitation, to multi-match classification results and/or application of multiple policy events. For example, the "disallow and match is seen" (also referred to herein as "cap and match") corresponds to a multi-match result in which an initial classification match results in a disallow policy action (i.e., disallowing further usage with respect to the subject service policy due to reaching a usage limit or completing a plan cycle), but with continued classification that results in a secondary classification match. Similarly, the "disallow and no match is seen" (cap and no match) corresponds to a multi-match result in which an initial classification match triggers a disallow policy action, but with continued classification that yields no further match. The "block for device is seen" is a classification scanning state indicating that the requested service is not to be permitted and further matching is to be prevented (i.e., hard stop) and may be used to trigger a notification to that effect.

The exemplary policy state definitions permitted under the SDC examples shown in FIGS. 66-75 are intended to be illustrative and not exhaustive. More generally, the SDC enables definition of arbitrarily complex, multi-dimensional (i.e., tuple) policy states that may be used qualify filter matching events (including "always true" classification event settings as discussed above), including, for example and without limitation:

Define roaming network conditions (e.g. device is communicating over a roaming network)

Define filters into components for certain classifications of service activities that are to be restricted during roaming conditions (e.g. background application traffic, OS updates, synch service updates)

Associate filters/components with control policies (e.g. block, delay, defer, aggregate or time window, random back off, throttle) and condition control policy on network roaming conditions.

Define roaming network conditions (e.g. device is communicating over a roaming network)

Define filters into components for certain classifications of service activities that are to be restricted during roaming conditions (e.g. background application traffic, OS updates, synch service updates)

Define roaming usage levels (e.g. below limit 1, from limit 1 to below limit 2, from limit 2 and up)

Associate filters/components with control policies (e.g. block, delay, defer, aggregate or time window, random back off, throttle) and condition control policy on network roaming conditions and roaming usage level (e.g. from 0 to limit 1 allow, from limit 1 to limit 2 defer/delay/aggregate or time window/random back off/throttle, above limit 2 block).

Amount of use, limit not reached, limit reached, multi-limit definitions

Type of network (carrier identifier, 2G, 3G, 4G, home, roaming, cellular, WiFi, femto/indoor/macro, partner roaming/non-partner roaming)

Time of day

Geography/location

Foreground/background

Network busy state or network performance level

Figure 74:
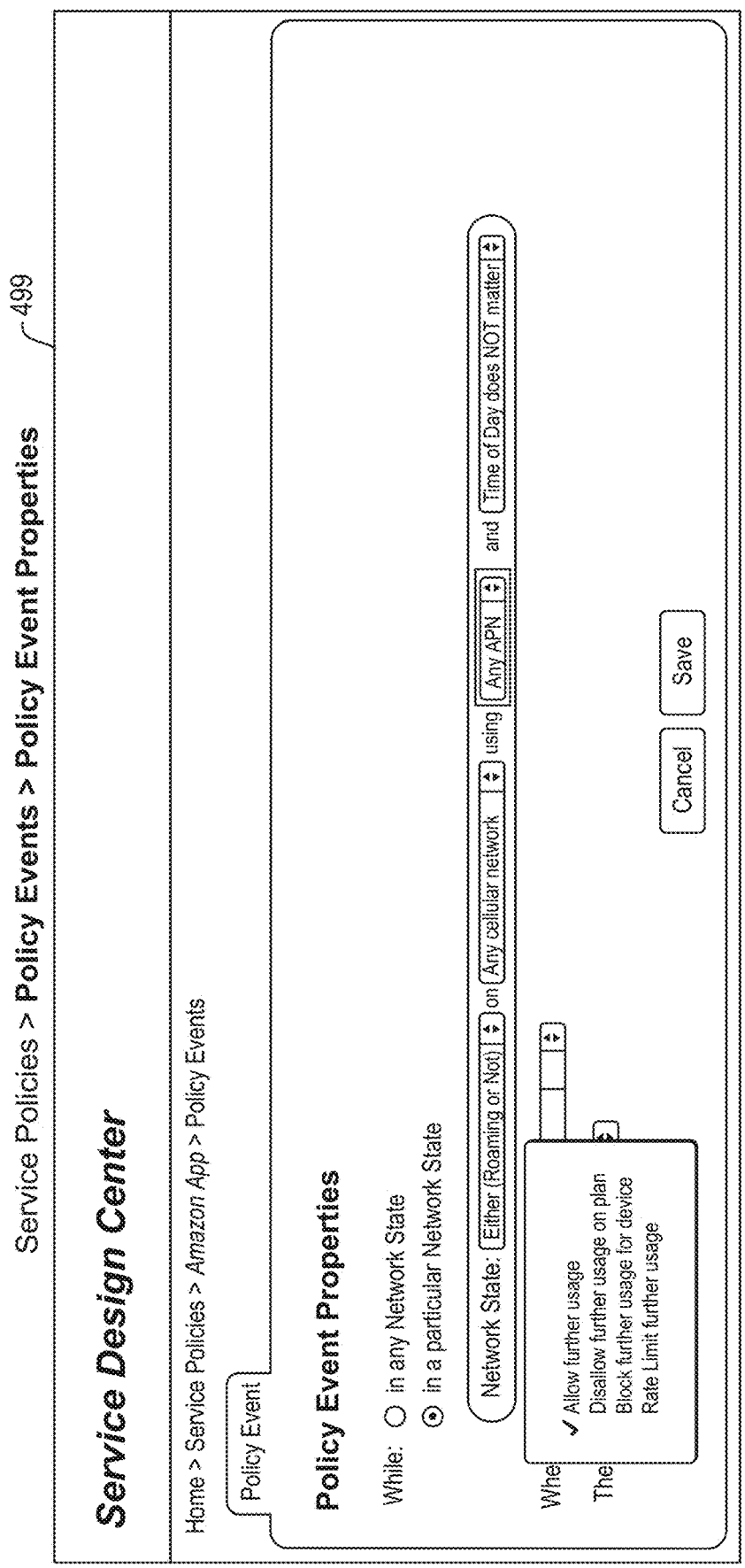

FIG. 74 illustrates, within another view of the Policy Event Properties display (499), an exemplary set of user-selectable control policy actions to be applied when the corresponding policy state is reached, including without limitation: allow ("allow further usage"), disallow ("disallow further usage on plan" or "block further usage for device"), and rate-limit or throttle ("rate limit further usage"). Various additional control policy actions may be specified in alternative embodiments.

Figure 75:
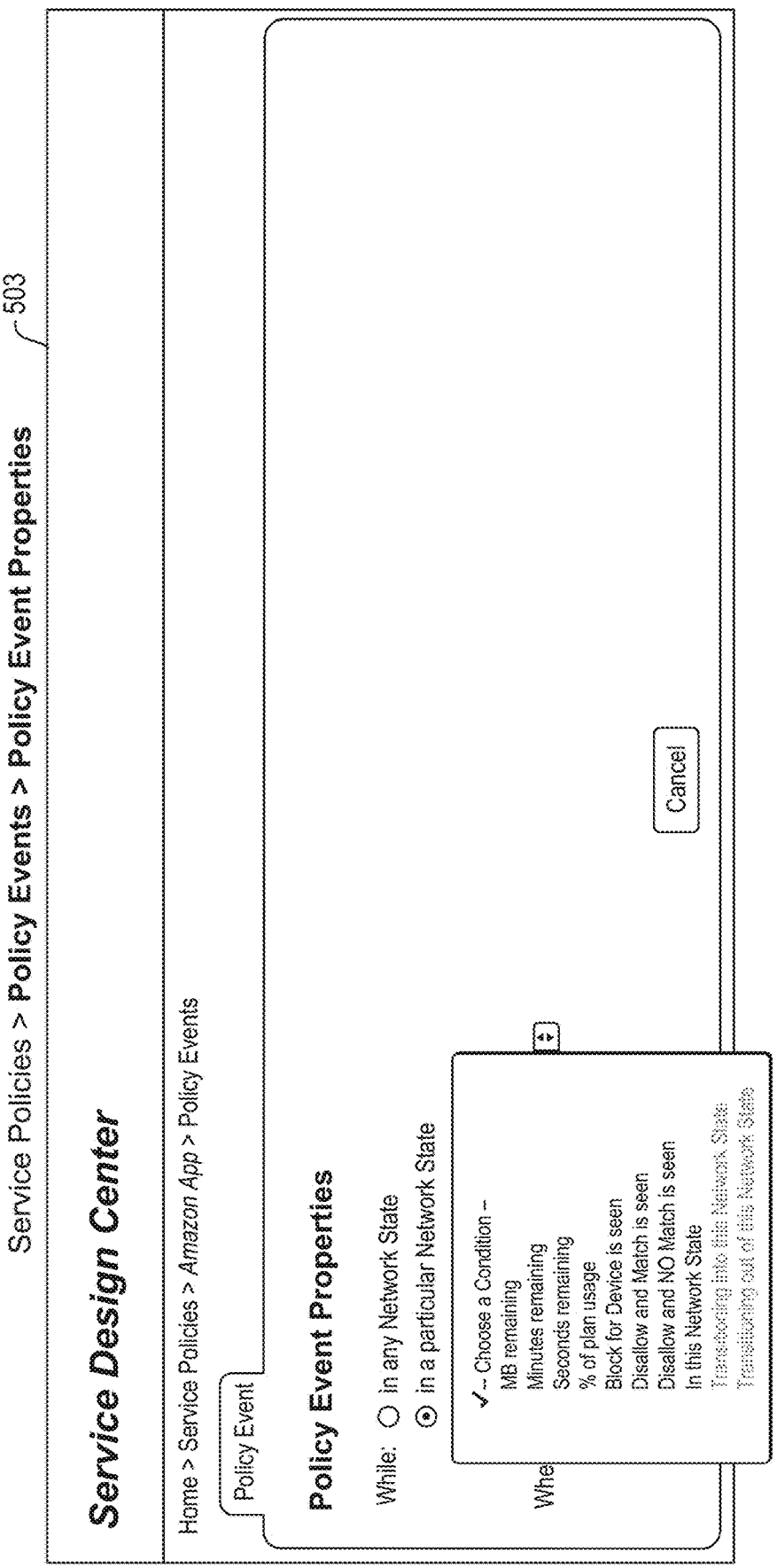

FIG. 75 illustrates another view of the Policy Event Properties display (503), in this case after the SDC user selects "in any network state" as the network state definition. The "in any network state" setting ensures that the network state criteria may be met at all times (i.e., yielding a Boolean "True" result in all cases), effectively removing the network state as a factor in the policy state determination. As shown, the network state qualifiers "transitioning into this network state" and "transitioning out of this network state" are rendered unavailable within the list of selectable temporal conditions as those qualifiers have no logical effect when "in any network state" is selected as the network state definition.

Virtualizing all Higher Levels of Policy

Figure 76:
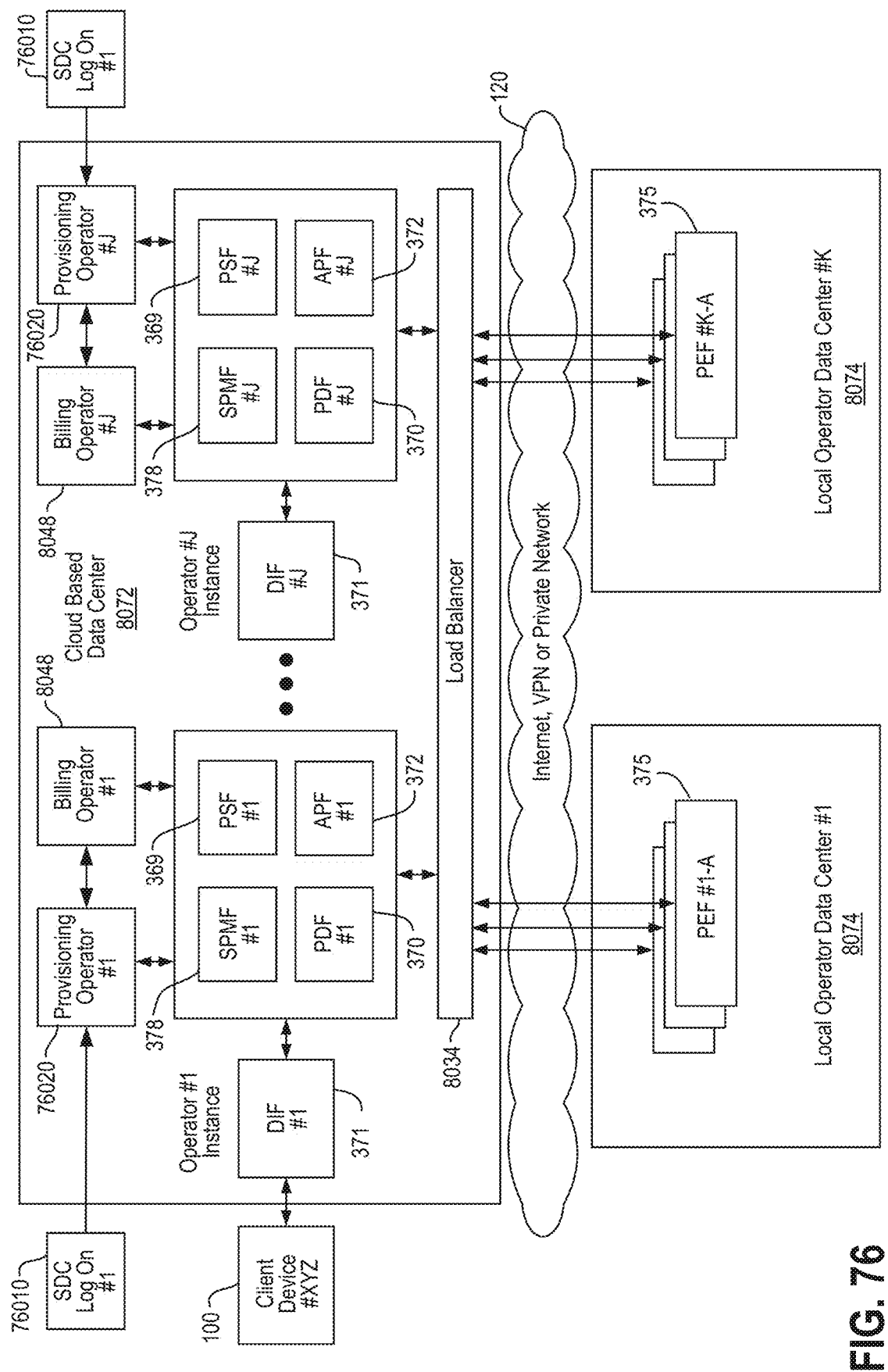
FIG. 76 illustrates a simplified service cloud solution for non-data path functions of the simplified policy architecture in accordance with some embodiments.

Another advantage of the simplified service architecture disclosed herein is that the PCF performs its functions autonomously and may not expect real-time interaction with the other policy functions to operate properly. This feature allows the policy functions other than the PEF (e.g., PCEF, which is best implemented on dedicated hardware due to the need to process large numbers of device communication flows while performing filter match searches, applying policy instructions, and accounting in real time) to be virtualized. For all of the other policy elements, additional scalability, cost savings, and flexibility for service design and service deployment are made possible by moving all non-PEF functions into a server cloud, which herein is referred to as the "simplified service policy cloud" or the "simplified service cloud solution." An example embodiment of a simplified service cloud solution for all non-data path functions of the simplified policy architecture is illustrated in FIG. 76. As shown in FIG. 76, the PEF 375 remains on the data path in a given mobile operator data center, and all other functions run virtually on servers located wherever it is convenient, cost effective, and appropriate.

Figure 77:
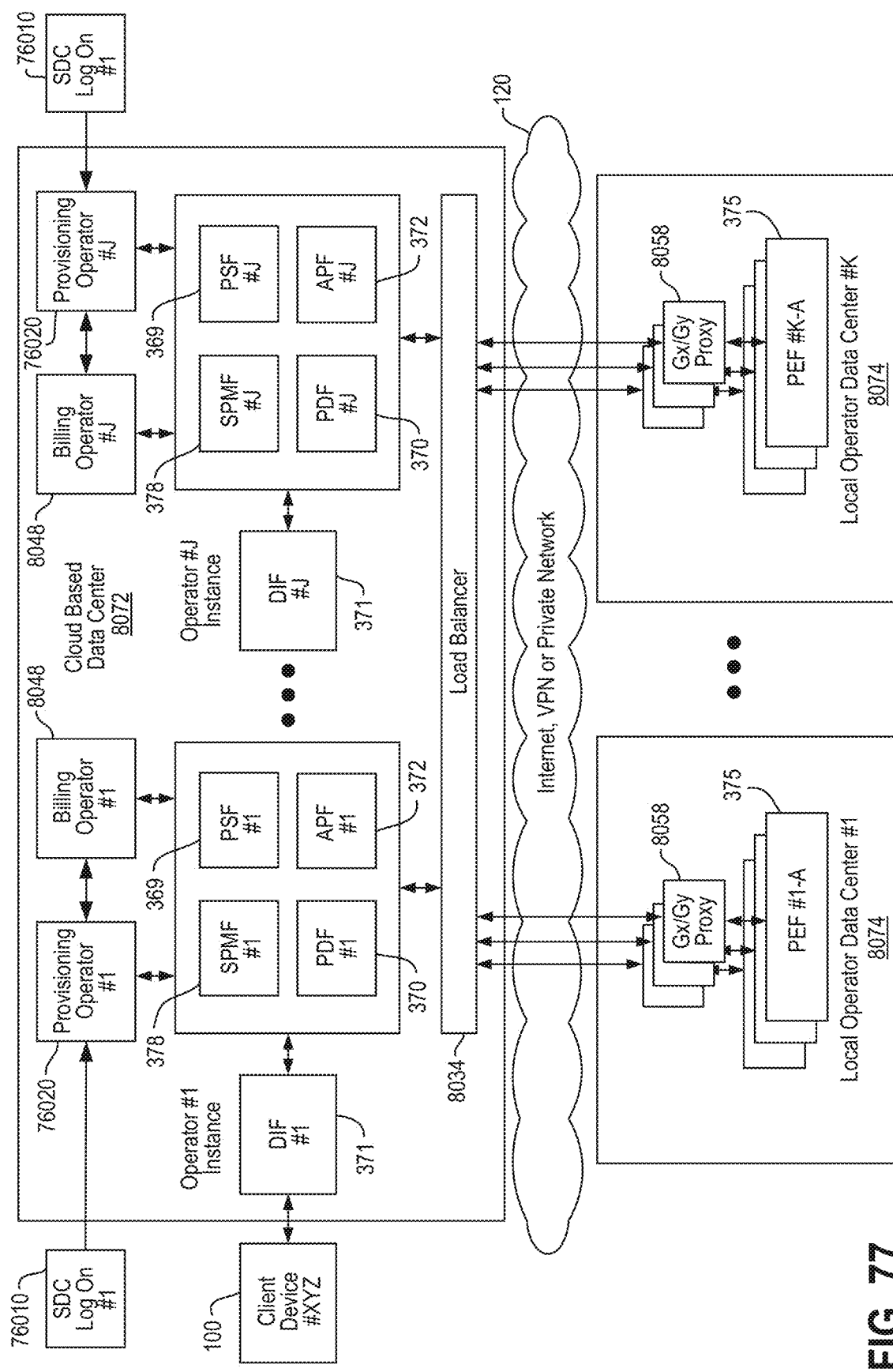
FIG. 77 illustrates the use of a GX and/or GY proxy to reduce latency and jitter issues with the interface to the policy enforcement function, in accordance with some embodiments.

In FIG. 76, the PDF 370, APF 372, PSF 369, DIF 371, SPMF 378, billing 8048, and provisioning 76020 functions are configured from server cloud technology, whereas the PEF 375 remains in hardware on the data path. In one embodiment, an API may be designed into the PEF hardware that is robust to the latency and jitter that is typical in cloud based interfaces so that a GX or GY proxy is not necessary for long distance remoting of the non-PEF functions. As illustrated in FIG. 77, in other embodiments, a GX and/or GY proxy 8058 is used to reduce latency and jitter issues with the interface to the PEF, as described herein for other embodiments.

In FIGS. 76 and 77, one of the policy functions located in the simplified service policy cloud may be implemented as a stateless process. A load balancer assigns the correct number of threads for the PDF 370, APF 372, PSF 369, DIF 371, and SPMF 378 policy functions as required to meet the processing demand generated by the number of device/subscriber traffic flows in the aggregate number of PEFs serviced by the simplified service policy cloud by one or more mobile operator networks. In one embodiment, the communication protocol between the PEF 375 and the policy function threads that interface with it may include a state-completed transaction receipt process or protocol by which the PEF 375 may not discard a communication provided to a thread in the simplified service policy cloud (such as an accounting report provided to an APF thread) until the thread has completed its processing of the information and has either deposited a result in storage or passed a result to another thread. At this time, the thread provides a "communication received and state completed" message to the PEF so that the PEF may discard the communication. If the PEF does not receive the "communication received and state completed" message, the PEF retransmits the communication provided to the thread until the PEF receives the "communication received and state completed" message. Likewise, the PEF may perform a reciprocal protocol (e.g., to acknowledge receipt of communications) for information it receives. The inter-process threads in the simplified policy architecture cloud may also have stateless processes and may exchange receipts before discarding information so that the system may be made to be robust to server faults or communication faults.

The cloud-based architecture disclosed herein is advantageous because the simplicity of the PEF instruction set and linear filter match search allows for a large number of simultaneous users/devices for a given amount of hardware processing power. In addition, because the higher layers of the policy are virtual, a large number of service plans may be configured and supported. This makes it possible to create a larger number of granular service plans to meet more market needs using the device group capabilities of the SDC. The software-defined nature of policy and the SDC capabilities described herein also make it possible to define small beta test device groups, test services on the beta test groups, and perfect the user satisfaction and profitability of services before rolling them out commercially.

Another significant advantage of the cloud-based architecture is the ability to harmonize networks that currently have different hardware configurations and service policy configurations. For example, many large global mobile operators have grown in size by acquiring smaller mobile operators. The legacy network equipment of one of the acquired companies creates a large number of small networks that do not have the same equipment as the acquiring company, thus increasing the difficulty associated with offering a common service design and deployment platform for the larger acquiring company. With the present simplified cloud policy disclosure, it becomes possible to replace all the disparate equipment solutions with a small amount of data path equipment common to a network and a common cloud service for the entire company. The cloud service policy network may be managed by a core team, and a local mobile operator in a country may create its own device/subscriber group using its own secure login to the SDC and use the SDC features described herein to develop disparate and unique service offers.

In another embodiment, a multi-national mobile operator may configure all of its networks with PEFs compatible with the simplified policy cloud, and devices may be offered the local country services when they roam by configuring the service offer policies in the SDC to offer different service plans based on country network indicated by the network type policy state.

In one embodiment, the simplified service architecture cloud is provided as a software-as-a-service (SaaS) offer. In one embodiment, the simplified service architecture is provided as a sale of PEF hardware and a simplified service architecture cloud software license.

As with other embodiments described herein, changes to service policy for the simplified service policy cloud are largely software updates rather than hardware updates, making product development both more flexible and more rapid. In another embodiment, the PEF may also be configured as a software application on dedicated or accelerated hardware.

Virtualizing Billing

Another advantage of the simplified service policy cloud solution is that billing may also be virtualized in the cloud. Because the service accounting records are stored in the cloud, the billing software to rate the accounting records to translate service use into a monetary amount or a billing (or accounting) record may also be configured to run on the server cloud the policy functions run on. Taxation policies may also be implemented with additional cloud software. Separating partner billing (e.g., sponsored services), enterprise billing, and consumer billing may be accomplished by configuring the rating software settings according to the contract with the entity being billed, and the billing software may send the billing statements to the appropriate mailing center, transfer them electronically, bill to credit card or bill with direct debit, all depending on the preferences of the partner or customer.

The following combination are provided in accordance with one or more embodiments:
  a service policy definition environment with integrated joint policy design capability for control, accounting, notification;
  real time interaction between policy and users with real time service notification and service offers;
  simplified yet highly capable policy decision logic using policy state qualifiers or indexing;
  an expanded set of policy enforcement instructions to make the policy enforcement function more autonomous and enable multi-match processing;
  virtual cloud based network policy functions; and
  software based virtual billing solutions provide for a significant upgrade in the capabilities of mobile networks.

There are several advantageous constructs within the SDC for a Z-order policy system. In the embodiments disclosed herein, and in the incorporated disclosures, these constructs include the definition or design of policy application priorities and the provisioning of policy application priorities:

SDC configured to enable an administrator to define or design an implied or literal filter list or sequence test (search) ordering, associate one of the filters in the test ordering with one or more policy instructions.

Create a provisioning file to provision a PEF (and possibly a PDF) to identify filter matches according to the test ordering and apply the policies in the desired priority for filter matches.

See other specific embodiments herein for specifics on filter list or sequence ordering, association with policies and association with policy state qualifiers.

Define a group of device or subscriber credentials that are to have the above policies applied to them.

There are several advantageous features within the SDC embodiments for designing and provisioning multi-match filter policy systems. In the embodiments disclosed herein, and in the incorporated disclosures, these constructs include multi-match filtering and policy enforcement capability:

SDC configured to enable an administrator to define or design enhanced policy instructions with multi-match capability provides for new policy constructs configured to apply communication policies to communication flows that match a filter and are associated with a device credential associated with the communication policies.

SDC to accept administrator inputs to define filters and policies.

Define a group of device or subscriber credentials that are to have the above policies applied to them.

There are several advantageous features within the SDC embodiments for designing and provisioning policy state qualifiers. In the embodiments disclosed herein and in the incorporated disclosures these constructs include the design and provisioning of policy state qualifiers that modify policies applied to communication flows that match a filter and are associated with a device or subscriber credential:

SDC configured to enable an administrator to define or design policy state qualifiers that are associated with a policy instruction set.

SDC configured to accept administrator inputs to define filters and policies.

SDC configured to transform administrator defined or designed filters and policies with policy state qualifiers into provisioning instructions to implement the filters, policies and policy state qualifiers utilizing one or more policy functions.

See other specific embodiments herein for specifics on filter list or sequence ordering, association with policy state qualifiers and association with policies.

Define a group of device or subscriber credentials that are to have the above policies applied to them.

There are several advantageous features within the SDC embodiments for designing and provisioning joint policy enforcement constructs. In the embodiments disclosed herein and in the incorporated disclosures these constructs include designing or defining filters and associated policies or policy instructions that define joint application of two or more of a control policy, an accounting policy or a notification policy to communication flows that match a filter and are associated with a device or subscriber credential.

Joint policies transformed into one or more provisioning instructions for one or more policy enforcement elements.

Joint policies designed to be applied on common filter and policy enforcement function.

Joint policies transformed into one or more provisioning instructions for the common policy enforcement element.

There are several advantageous features within the SDC embodiments for designing and provisioning joint service plan or bundle policy and billing rating or pricing rules. In the embodiments disclosed herein and in the incorporated disclosures the embodiments include designing or defining filters and associated policies or policy instructions that define a service plan or bundle, and jointly designing or defining the rating or pricing rules that result in a bill for communications provided under the service plan or bundle:

SDC configured to provide an integrated design environment for service plan or service bundle policies and the billing rules associated with the policies. SDC configured to accept service administrator service policy designs or definitions to construct the policies comprising a service plan or service bundle, and also accept service administrator design or definition of billing rules to rate or price the service provided under the service plan or bundle policies.

SDC further configured to produce a joint provisioning output, the joint provisioning output comprising service provisioning instructions for one or more policy elements to implement the service plan or bundle policies, and billing function provisioning or configuration policies to implement the rating or pricing rules and bill a user entity or a sponsor entity.

Billing configured to bill a user of a device that receives service under the service plan or bundle.

Billing configured to bill an enterprise entity responsible for the device that receives service under the service plan or bundle.

Billing configured to bill a sponsor entity responsible for sponsoring a portion of the communication used by the device.

Billing function comprises a cloud based billing function wherein the rating or pricing rules are implemented with server software that distributes the billing computations among a multitude of servers.

There are several advantageous features within the SDC embodiments for designing and provisioning policies for cloud based policy systems with hardware based PEF. In the embodiments disclosed herein and in the incorporated disclosures these constructs include an SDC configured to accept service policy definition or design inputs comprising filters and associated policies, and create a provisioning output to configure a first aspect of the filters and policies that are intended to be implemented by a cloud based service policy system, the cloud based service policy system comprising cloud software that implements one or more of the PDF, APF, DFI and SBF, and the SDC is also configured to create a provisioning output to configure a second aspect of the filters and policies that are intended to be implemented by a hardware based PEF. Other SDC embodiments are disclosed herein and in the incorporated documentation.

There are several advantageous features within the simplified PEF embodiments. In the embodiments disclosed herein and in the incorporated disclosures the simplified PEF embodiments include:

A PEF configured to execute enhanced policy instructions with multi-match capability provides for new policy constructs configured to apply communication policies to communication flows associated with a device credential associated with the communication policies. In the embodiments disclosed herein and in the incorporated disclosures these constructs include multi-match filtering and policy enforcement capability.
Wherein filter comprises a filter to identify a voice activity, a text activity or a data activity.
Wherein filter comprises a filter to identify a classification of voice activity.
Wherein filter comprise a filter to identify a classification of data activity.
Wherein policy includes taking a policy action
- Wherein policy action comprises a communication control action, a communication accounting action, a communication notification trigger or delivery action, or a combination of these.
  - Wherein communication control action comprises one or more of:
    - block,
    - allow,
    - throttle,
    - cap,
    - throttle,
    - delay,
    - defer,
    - aggregate,
    - prioritize,
    - cap and re-match,
    - cap and no-match,
    - hold and wait for user response,
    - cap and wait for user response,
    - increase priority,
    - decrease priority.
  - Wherein the communication accounting action comprises one or more of:
    - allocate accounting to a service accounting bucket identifier,
    - allocate accounting to a user service accounting bucket,
    - stop allocating accounting to a user plan service accounting bucket,
    - allocate accounting to a service sponsor accounting bucket,
    - stop allocating accounting to a service sponsor accounting bucket,
    - allocate to a carrier accounting bucket,
    - stop allocating to a carrier accounting bucket.
- Wherein policy action comprises a first policy action to initiate a notification trigger and a second policy action that is conditioned on a user response to a notification associated with the trigger.
  - Second policy action comprises a control action.
  - Second policy action comprises changing a service plan or service policy.
- Wherein policy instruction includes a joint policy action associated with the same filter, the joint policy action comprising of two or more of a communication control action, a communication accounting action, or a communication notification trigger or delivery action.
- Wherein the policy instruction constructs may include one or more of:
  - identify filter match, take policy action, do not seek further match;
  - identify filter match, take policy action, seek further match
  - identify match, send notification trigger, seek further match;
  - identify match, send notification trigger, condition further action on user response to notification;
  - identify filter match according to a filter match testing order that assists in implementing a hierarchy of filter and/or policy application priorities, take policy action, do not seek further match;
  - identify filter match according to a filter match testing order that assists in implementing a hierarchy of filter and/or policy application priorities, take policy action, seek further match;
  - identify filter match according to a filter match testing order that assists in implementing a hierarchy of filter and/or policy application priorities, send notification trigger, seek further match;
  - identify filter match according to a filter match testing order that assists in implementing a hierarchy of filter and/or policy application priorities, send notification trigger, condition further action on user response to notification.

Marketing interceptor may be implemented by identifying a notification trigger and associating the trigger with notification content that comprises marketing or advertising information
- No other policy action is taken other than notification trigger
  - Action command comprises notify and continue to search for match
- Notification configured with action features (e.g. buttons that indicate user acceptance of an offer or refusal of an offer)
  - Notification configured to link action back to a network server element
- Trigger detected and notification in a network element
- Trigger detected in a device agent
  - Trigger based on successful or attempted communication
  - Trigger based on successful or attempted use of an app
  - Trigger based on a policy state transition In one embodiment, it may be advantageous for the PEF to implement policy instructions that include a policy state qualifier to reduce the interaction with the PDF.
- Wherein the policy instruction constructs may include one or more of:
  - identify filter match, condition filter match on policy state, take policy action that is specified for the combination of filter and policy state, do not seek further match;
  - identify filter match, condition filter match on policy state, take policy action that is specified for the combination of filter and policy state, seek further match;
  - identify match, condition filter match on policy state, send notification trigger that is specified for the combination of filter and policy state, seek further match;
  - identify match, condition filter match on policy state, send notification trigger that is specified for the combination of filter and policy state, condition further action on user response to notification;
  - identify filter match according to a filter match testing order that assists in implementing a hierarchy of filter and/or policy application priorities, condition filter match on policy state, take policy action that is specified for the combination of filter and policy state, do not seek further match;
  - identify filter match according to a filter match testing order that assists in implementing a hierarchy of filter and/or policy application priorities, condition filter match on policy state, take policy action that is specified for the combination of filter and policy state, seek further match;

identify filter match, according to a filter match testing order that assists in implementing a hierarchy of filter and/or policy application priorities, condition filter match on policy state, send notification trigger that is specified for the combination of filter and policy state, seek further match;

identify filter match according to a filter match testing order that assists in implementing a hierarchy of filter and/or policy application priorities, condition filter match on policy state, send notification trigger that is specified for the combination of filter and policy state, condition further action on user response to notification.

PEF is configured with a PEF policy interface or API configured to accept policy instructions from a PDF, send accounting reports to an APF, send notification triggers or deliver notification information to a DIF, or a combination of these.

PEF policy interface or API comprises a network interface.

wherein the policy interface or API includes a communication protocol configured to operate in the presence of latency and/or jitter consistent with a communication API to a cloud based solution for one or more of the PDF, the APF or the DIF.

PEF policy interface or API comprises an interface on a device between one or more PEF agents and one or more PDF agents.

Wherein the policy interface or API comprises a communication link between a kernel based PEF agent and one or more agents that operate above the kernel (e.g. one or more of the PDF, APF or DIF are application space programs).

Enhanced policy instructions with multi-match capability that allow the PEF to implement a multi-match filter test (or search, linear test or linear search) at least in part by implementing an ordered test (or ordered search, ordered linear test or ordered linear search), identifying a first match, possibly taking an action, continuing the ordered test (or ordered search, ordered linear test or ordered linear search) to determine if a second match may be found.

Wherein continuing the filter match is based on a policy instruction that includes a re-match instruction construct.

Wherein the ordered test (or ordered search, ordered linear test or ordered linear search) is continued from a point in the test (search) ordering where the first match was identified.

Wherein the ordered test (search) is based on a literal or implied ordering specified in a policy instruction set provided to the PEF.

There are several advantageous features within the simplified PDF embodiments. In the embodiments disclosed herein and in the incorporated disclosures the simplified PDF embodiments include:

The PDF is configured to obtain a particular policy instruction set associated with a particular device or subscriber credential and provide it to the PEF:

Wherein obtain a particular policy instruction set comprises obtaining a first policy instruction set from a multitude of policy instruction sets; one of the multitude of policy instruction sets comprising a list of filter definitions associated with one or more policy instructions; a policy instruction set indexed by a policy state characterization; the policy state characterization comprising one or more characterizations of policy state variables; a characterization of a policy state variable comprising a measure, value, threshold or index associated with a policy state variable that has a bearing on a desired service policy or a desired service policy transition, change or modification; and wherein:

the PDF is further configured to: determine at a first time that a current policy state is a first policy state, determine that the first policy instruction set is associated with the first policy state, and choose the first policy instruction set from the multitude of policy instruction sets based on the current policy state being the first policy state.

Wherein the PDF is further configured to determine at a second time that the current policy state has changed to a second policy state, determine that the second policy state is associated with a second policy instruction set, and select the second policy instruction set as the particular policy instruction set that is provided to the PEF.

Policy state comprises one or more of:
a state of service use (e.g. an amount of use, amount of use below a service limit, amount of use above a service limit, a rate of service use),
a period of time,
foreground or background access,
a type of network (e.g. home cellular, roaming cellular, mobile operator, 2G, 3G, 4G, WiFi),
a network busy state or network performance state, one or more available QoS states, or
a geography.

Wherein the particular policy instruction set comprises list or sequence of filters, a filter in the list or sequence comprising a parameter definition configured to identify one or more communication activities, a filter in the ordered list further associated with one or more policy instructions Wherein the list or sequence of filters comprises an ordered list or sequence of filters.

Wherein the ordering of the ordered list specifies a filter test sequencing priority that is to be implemented by the PEF.

Wherein the ordered list or sequence of filters is ordered according to a literal order.

Wherein the ordered list or sequence of filters is ordered according to an implied order.

PDF is configured with a PDF policy interface or API configured to do one or more of the following: receive one or more of the multitude of policy instruction sets from a SPMF, provide the policy instructions to the PEF, receive accounting reports from an APF, receive notification triggers or deliver notification information to a DIF, or a combination of these.

PDF policy interface or API comprises a network interface.

wherein the policy interface or API includes a communication protocol configured to operate in the presence of latency and/or jitter consistent with a communication API to a cloud based implementation for the PDF to maintain successful communication with a remote implementation for one or more of the PEF, APF, DIF or SPMF.

PDF policy interface or API comprises an interface on a device between one or more PDF agents and one or more PEF agents.

Wherein the policy interface or API comprises a communication link between a kernel based PEF agent and wherein the PDF operates above the kernel level (e.g. PDF comprises one or more application space programs).

There are several advantageous features within the notification trigger and delivery function. In the embodiments disclosed herein and in the incorporated disclosures the notification trigger and delivery function embodiments include a notification trigger system that utilizes filter capabilities in PEF function to identify communication notification event triggers for communication flows associated with a credential of the device or device user.

Notification trigger system shares a PEF that is also used to enforce other communication policies for communications associated with the credential of the device or user of the device.

There are several advantageous features within the cloud based billing function (cloud based SBF). In the embodiments disclosed herein and in the incorporated disclosures the cloud based billing function embodiments include a Cloud based billing function configured to accept accounting or service configuration record from a APF or SDC, identify a device or user credential associated with the accounting or service configuration record, determine a device or user group the device or user credential belongs to, determine a rating or pricing rule associated with the device or user group, apply the rating or pricing rule to the accounting or service configuration record to generate a bill.

Device group definition and rating or pricing rule associated with the device or user group are obtained from an SDC provisioning output.

Billing function is cloud based. Billing function comprises software configured to run in a distributed manner on a server farm communicatively coupled to the APF and/or SDC.

There are several advantageous features within the cloud based policy system. In the embodiments disclosed herein and in the incorporated disclosures the cloud based policy system embodiments include a cloud based policy system configured to communicate with a hardware based PEF function to provide high level policy functions in cooperation with the hardware based PEF.

Cloud based policy system is further configured as software capable of executing on a distributed server system.

Software execution comprises threads that implement one or more of a PDF, APF, DIF, and SBF.

Cloud based policy system is further configured with the hardware based PEF via an API that is configured to tolerate the latency and jitter that is typical in cloud based interfaces.

Cloud based policy system is further configured with the hardware based PEF via an API that is configured to tolerate the latency and jitter that is typical in cloud based interfaces.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 78A:
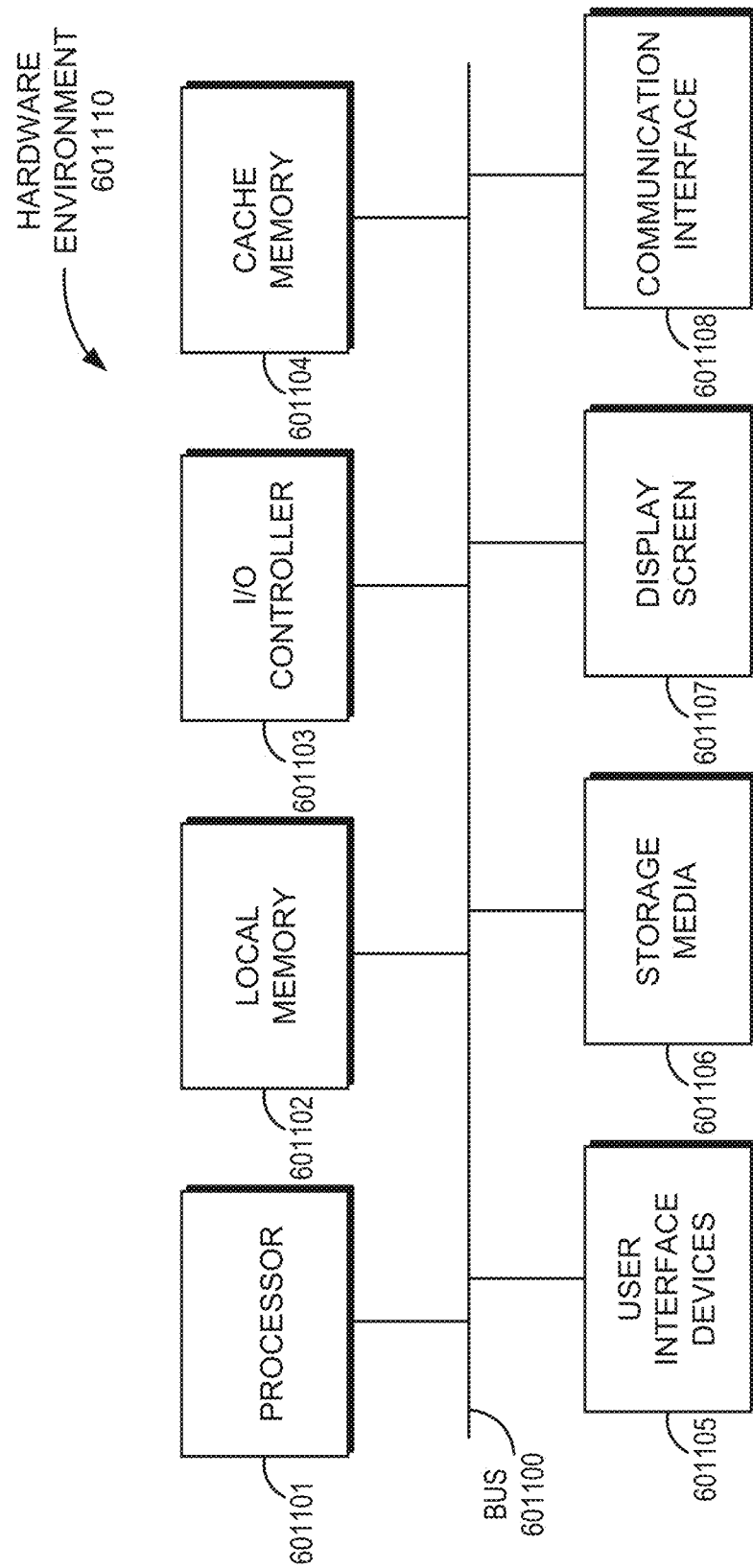
FIGS. 78A and 78B are block diagrams of hardware and software environments in which the disclosed systems and methods may operate, in accordance with one or more embodiments.
Figure 78B:
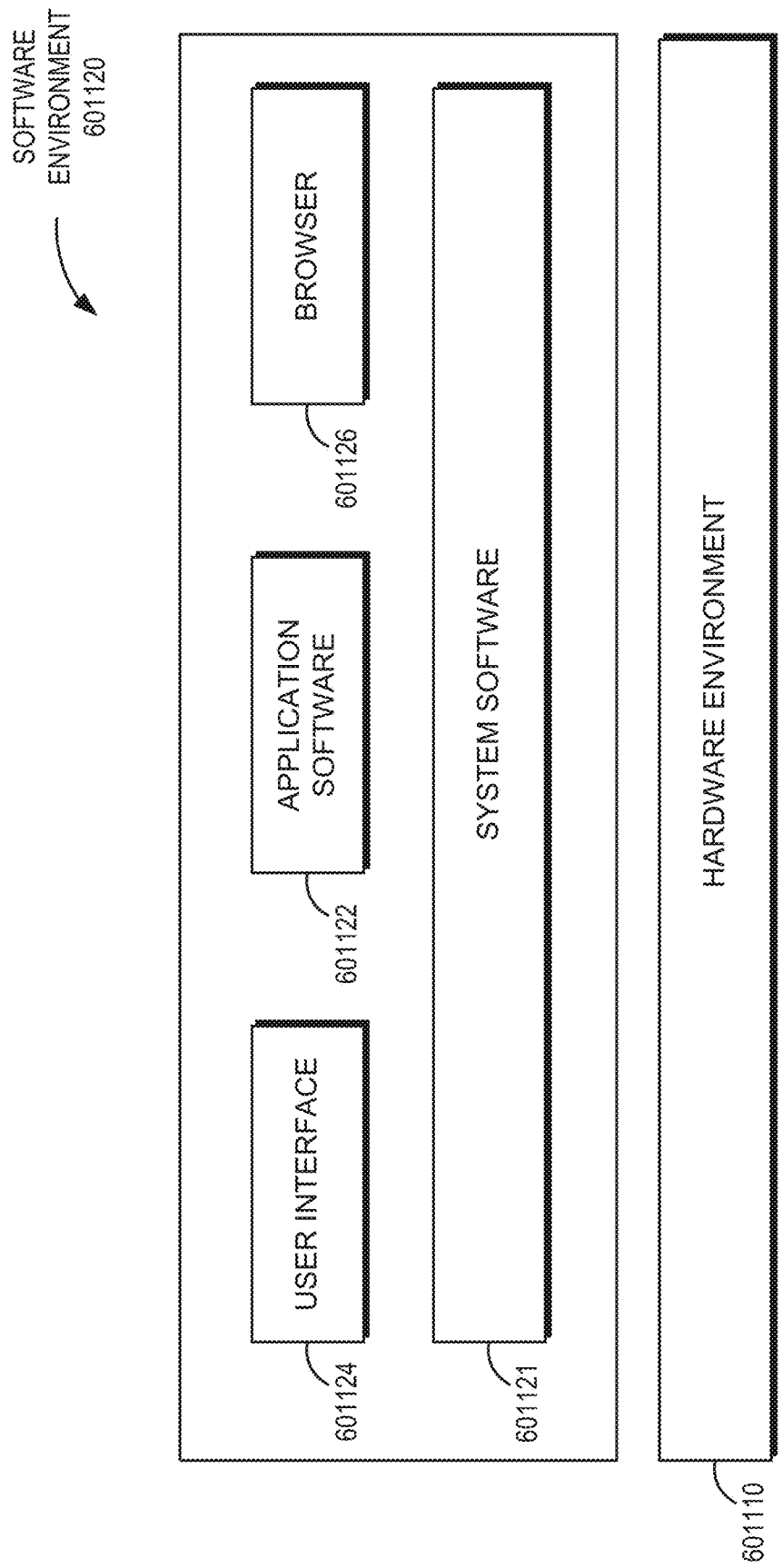

Referring to FIGS. 78A and 78B, a computing system environment in accordance with an exemplary embodiment may be composed of a hardware environment 601110 and a software environment 1120. The hardware environment 601110 may comprise logic units, circuits or other machinery and equipment that provide an execution environment for the components of software environment 1120. In turn, the software environment 1120 may provide the execution instructions, including the underlying operational settings and configurations, for the various components of hardware environment 601110.

Referring to FIG. 78A, the application software and logic code disclosed herein may be implemented in the form of machine readable code executed over one or more computing systems represented by the exemplary hardware environment 601110. As illustrated, hardware environment 110 may comprise a processor 601101 coupled to one or more storage elements by way of a system bus 601100. The storage elements, for example, may comprise local memory 601102, storage media 601106, cache memory 601104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 601101 loads executable code from storage media 601106 to local memory 601102. Cache memory 601104 optimizes processing time by providing temporary storage that helps reduce the number of times code is loaded for execution. One or more user interface devices 601105 (e.g., keyboard, pointing device, etc.) and a display screen 601107 may be coupled to the other elements in the hardware environment 601110 either directly or through an intervening I/O controller 601103, for example. A communication interface unit 601108, such as a network adapter, may be provided to enable the hardware environment 601110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 601110, in certain implementations, may not include some or all the above components, or may comprise additional components to provide supplemental functionality or utility. Depending on the contemplated use and configuration, hardware environment 601110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 601108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 78B, software environment 1120 may be generally divided into two classes comprising system software 601121 and application software 601122 as executed on one or more hardware environments 601110. In one embodiment, the methods and processes disclosed here may be implemented as system software 601121, application software 601122, or a combination thereof. System software 601121 may comprise control programs, such as an operating system (OS) or an information management system, that instruct one or more processors 601101 (e.g., microcontrollers) in the hardware environment 601110 on how to function and process information. Application software 601122 may comprise but is not limited to program code, data structures, firmware, resident software, microcode or any other form of information or routine that may be read, analyzed or executed by a processor 601101.

In other words, application software 601122 may be implemented as program code embedded in a computer program product in form of a machine-usable or computer readable storage medium that provides program code for use by, or in connection with, a machine, a computer or any instruction execution system. Moreover, application software 601122 may comprise one or more computer programs that are executed on top of system software 601121 after being loaded from storage media 601106 into local memory 601102. In a client-server architecture, application software 601122 may comprise client software and server software. For example, in one embodiment, client software may be executed on a client computing system that is distinct and separable from a server computing system on which server software is executed.

Software environment 1120 may also comprise browser software 601126 for accessing data available over local or remote computing networks. Further, software environment 1120 may comprise a user interface 601124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

EXEMPLARY EMBODIMENTS

The following clauses provide exemplary embodiments based on the disclosures herein.

1. A network system for providing one or more services to one or more end-user devices communicatively coupled to the network system over a wireless access network, the network system comprising: a policy enforcement function; a first policy element; a second policy element; and a network element communicatively coupled to the policy enforcement function, the first policy element, and the second policy element, wherein the network element is configured to: communicate first policy information between the policy enforcement function and the first policy element, and communicate second policy information between the first policy enforcement function and the second policy element.

2. The network system recited in clause 1, wherein the network element comprises a proxy or a router.

3. The network system recited in clause 1, wherein communicate first policy information between the policy enforcement function and the first policy element comprises communicate the first policy information over a standardized interface or an application programming interface (API) that is compatible with a policy information communication interface of the policy enforcement function.

4. The network system recited in clause 3, wherein communicate the first policy information over a standardized interface or an application programming interface (API) that is compatible with a policy information communication interface of the policy enforcement function comprises switch, route, or multiplex the first policy information over the standardized interface or the API.

5. The network system recited in clause 1, wherein communicate first policy information between the policy enforcement function and the first policy element comprises communicate the first policy information over a Gx interface or using a Gx communication protocol.

6. The network system recited in clause 5, wherein communicate the first policy information over a Gx interface comprises switch, route, or multiplex the first policy information over the Gx interface or using the Gx communication protocol.

7. The network system recited in clause 1, wherein communicate first policy information between the policy enforcement function and the first policy element comprises communicate the first policy information over a Gy interface or using a Gy communication protocol.

8. The network system recited in clause 7, wherein communicate the first policy information over a Gy interface comprises switch, route, or multiplex the first policy information over the Gy interface or using the Gy communication protocol.

9. The network system recited in clause 1, wherein communicate first policy information between the policy enforcement function and the first policy element comprises communicate the first policy information over an Rx interface or using an Rx communication protocol.

10. The network system recited in clause 9, wherein communicate the first policy information over an Rx interface comprises switch, route, or multiplex the first policy information over the Rx interface or using the Rx communication protocol.

11. The network system recited in clause 1, wherein communicate first policy information between the policy enforcement function and the first policy element comprises communicate the first policy information over a RADIUS interface or using a RADIUS communication protocol.

12. The network system recited in clause 11, wherein communicate the first policy information over a RADIUS interface comprises switch, route, or multiplex the first policy information over the RADIUS interface or using the RADIUS communication protocol.

13. The network system recited in clause 1, wherein communicate first policy information between the policy enforcement function and the first policy element comprises communicate the first policy information over a diameter interface or using a diameter communication protocol.

14. The network system recited in clause 13, wherein communicate the first policy information over a diameter interface comprises switch, route, or multiplex the first policy information over the diameter interface or using the diameter communication protocol.

15. The network system recited in clause 1, wherein the first policy element comprises a virtual policy element instance or thread that executes in a policy element cloud system, and wherein the virtual policy element instance or thread is configured to process the first policy information, and further comprising a load balancer configured to select or assign the virtual policy element instance or thread.

16. The network system recited in clause 15, wherein the first policy element comprises a policy decision function.

17. The network system recited in clause 15, wherein the first policy element comprises a policy and charging rules function (PCRF).

18. The network system recited in clause 15, wherein the first policy element comprises an on-line charging system (OCS).

19. The network system recited in clause 15, wherein the first policy element comprises an accounting policy function.

20. The network system recited in clause 15, wherein the first policy element comprises a policy state function.

21. The network system recited in clause 15, wherein the first policy element comprises a service policy management function.

22. The network system recited in clause 15, wherein the virtual policy element instance or thread comprises a first virtual policy element instance or thread, and wherein the second policy element comprises a second virtual policy element instance or thread that executes in the policy element cloud system, and wherein the second virtual policy element instance or thread is configured to process the second policy information, and wherein the load balancer is further configured to select or assign the second virtual policy element instance or thread.

23. The network system recited in clause 22, wherein select or assign the first virtual policy element instance or thread or select or assign the second virtual policy element instance or thread is based on an estimate of a processing demand associated with implementing one or more policies for at least a portion of the one or more end-user devices communicatively coupled to the network system over the wireless access network.

24. The network system recited in clause 22, wherein select or assign the first virtual policy element instance or thread or select or assign the second virtual policy element instance or thread is based on an estimate of a processing demand associated with (a) processing the first policy information, (b) processing the second policy information, or (c) processing both the first policy information and the second policy information.

25. The network system recited in clause 22, wherein select or assign the first virtual policy element instance or thread is based on an association of the first policy information with a first end-user device of the one or more end-user devices communicatively coupled to the network system over the wireless access network, and wherein select or assign the second virtual policy element instance or thread is based on an association of the second policy information with a second end-user device of the one or more end-user devices communicatively coupled to the network system over the wireless access network.

26. The network system recited in clause 22, wherein select or assign the first virtual policy element instance or thread is based on an association of the first policy information with a first service activity available to at least a portion of the one or more end-user devices communicatively coupled to the network system over the wireless access network, and wherein select or assign the second virtual policy element instance or thread is based on an association of the second policy information with a second service activity available to at least a portion of the one or more end-user devices communicatively coupled to the network system over the wireless access network, wherein the first service activity differs in at least an aspect from the second service activity.

27. The network system recited in clause 22, wherein select or assign the first virtual policy element instance or thread is based on an association of the first policy information with a first device group or a first user group associated with a first subset of the one or more end-user devices communicatively coupled to the network system over the wireless access network, and wherein select or assign the second virtual policy element instance or thread is based on an association of the second policy information with a second device group or a second user group associated with a second subset of the one or more end-user devices communicatively coupled to the network system over the wireless access network.

28. The network system recited in clause 22, wherein select or assign the first virtual policy element instance or thread is based on an association of the first policy information with a first network operator or a first service design center administrator, and wherein select or assign the second virtual policy element instance or thread is based on an association of the second policy information with a second network operator or a second service design center administrator.

29. The network system recited in clause 22, wherein select or assign the first virtual policy element instance or thread is based on an association of the first policy information with a first network or network type, and wherein select or assign the second virtual policy element instance or thread is based on an association of the second policy information with a second device group or a second user group associated with a second network or network type.

30. The network system recited in clause 1, wherein the second policy element comprises hardware, and wherein the network element is further configured to provide a migration from a management of one or more policies by the second policy element to a management of the one or more policies by a policy element cloud system.

31. The network system recited in clause 1, wherein the second policy element comprises hardware, and wherein the network element is further configured to assist in providing management of a first set of one or more service activities by the second policy element and management of a second set of one or more service activities by the first policy element.

32. The network system recited in clause 31, wherein the first set of one or more service activities is associated with a first subset of the one or more end-user devices communicatively coupled to the network system over the wireless access network, and wherein the second set of one or more service activities is associated with a second subset of the one or more end-user devices communicatively coupled to the network system over the wireless access network.

33. The network system recited in clause 31, wherein the first set of one or more service activities is associated with a first set of one or more services available over the wireless access network, and wherein the second set of one or more service activities is associated with a second set of one or more services available over the wireless access network.

34. The network system recited in clause 1, wherein the policy enforcement function comprises a virtual policy enforcement function instance or thread.

35. The network system recited in clause 1, wherein the policy enforcement function comprises a policy control enforcement function (PCEF).

36. The network system recited in clause 1, wherein the policy enforcement function comprises a gateway GPRS support node (GGSN).

37. The network system recited in clause 1, wherein the policy enforcement function comprises a switch.

38. The network system recited in clause 1, wherein the policy enforcement function comprise a packet inspection element.

39. The network system recited in clause 1, wherein the second policy element is a local policy element, and wherein the first policy element is a virtual policy element.

40. The network system recited in clause 1, wherein the first policy element is located in a first data center, and wherein the second policy element is located in a second data center.

41. The network system recited in clause 1, wherein the second policy element comprises hardware, and wherein the first policy element comprises a virtual policy element that executes in a policy element cloud system.

42. The network system recited in clause 1, wherein the first policy element comprises a first virtual policy element, and wherein the second policy element comprises a second virtual policy element, and wherein the first virtual policy element and the second virtual policy element execute in one or more policy element cloud systems.

43. The network system recited in clause 42, wherein the first policy element is configured to process a first set of one or more policies, and wherein the second policy element is configured to process a second set of one or more policies, the first set of one or more policies and the second set of one or more policies being defined or managed by a common administrator or service provider.

44. The network system recited in clause 43, further comprising a service design center (SDC) system configured to enable the common administrator or service provider to define or manage the first set of one or more service policies and the second set of one or more service policies.

45. The network system recited in clause 42, wherein the first policy element is configured to process a first set of one or more policies, the first set of one or more policies being defined or managed by a first administrator or service provider, and wherein the second policy element is configured to process a second set of one or more policies, the second set of one or more policies being defined or managed by a second administrator or service provider.

46. The network system recited in clause 45, further comprising a service design center (SDC) system configured to: provide a first user interface to enable the first administrator or service provider to define or manage the first set of one or more policies, and provide a second user interface to enable the second administrator or service provider to define or manage the second set of one or more policies.

47. The network system recited in clause 46, wherein the first set of one or more policies is associated with a first device group or a first user group associated with a first subset of the one or more end-user devices communicatively coupled to the network system over the wireless access network, and wherein define or manage the first set of one or more policies comprises define or manage a first set of credentials associated with the first device group or the first user group, and wherein the second set of one or more policies is associated with a second device group or a second user group associated with a second subset of the one or more end-user devices communicatively coupled to the network system over the wireless access network, and wherein define or manage the second set of one or more policies comprises define or manage a second set of credentials associated with the second device group or the second user group.

48. The network system recited in clause 46, wherein the SDC system is further configured to: determine whether a first user is authorized to define or manage the first set of one or more policies before providing the first user interface to the first user, and determine whether a second user is authorized to define or manage the second set of one or more policies before providing the second user interface to the second user.

49. The network system recited in clause 48, wherein the first set of one or more policies is associated with a first device group or a first user group associated with a first subset of the one or more end-user devices communicatively coupled to the network system over the wireless access network, and wherein the second set of one or more policies is associated with a second device group or a second user group associated with a second subset of the one or more end-user devices communicatively coupled to the network system over the wireless access network.

50. The network system recited in clause 48, wherein the first set of one or more policies is associated with a first set of one or more network services, and wherein the second set of one or more policies is associated with a second set of one or more network services.

51. The network system recited in clause 1, wherein the first policy element comprises hardware, and wherein the second policy element is a cloud-based policy element.

52. The network system recited in clause 1, wherein the first policy element comprises a first virtual policy element instance or thread that executes in a policy element cloud system, and wherein the second policy element comprises a second virtual policy element instance or thread that executes in the policy element cloud system.

53. The network system recited in clause 52, wherein the network element is further configured to: determine to communicate first policy information between the policy enforcement function and the first policy element, and determine to communicate second policy information between the first policy enforcement function and the second policy element.

54. The network system recited in clause 53, wherein determine to communicate first policy information between the policy enforcement function and the first policy element is based on (a) a measure or estimate of an available processing load of the first policy element, (b) a measure or estimate of an available processing load of the second policy element, (c) a communication session being established by a user device, or (d) a combination of two or more of (a) through (c).

55. The network system recited in clause 52, wherein the network element is further configured to bring up or establish the first virtual policy element instance or thread or the second virtual policy element instance or thread based on a measure or estimate of processing demand on the network system.

56. The network system recited in clause 52, wherein the network element is further configured to bring up or establish the first virtual policy element instance or thread or the second virtual policy element instance or thread based on a number of the one or more end-user devices managed by the network system.

57. The network system recited in clause 52, wherein the network element is further configured to bring up or establish a third virtual policy element instance or thread based on a measure or estimate of an available processing load on (a) the first virtual policy element instance or thread, (b) the second virtual policy element instance or thread, or (c) both the first virtual policy element instance or thread and the second virtual policy element instance or thread.

58. The network system recited in clause 42, wherein the first policy element and the second policy element are managed by a common administrator entity.

59. The network system recited in clause 42, wherein the first policy element is managed by a first administrator entity, and wherein the second policy element is managed by a second administrator entity.

60. The network system recited in clause 1, wherein the first policy element comprises a first virtual policy element instance or thread in a first policy element processing cloud, and wherein the second policy element comprises a second virtual policy element instance or thread in a second policy element processing cloud.

61. The network system recited in clause 1, wherein the first policy element comprises a policy decision function (PDF).

62. The network system recited in clause 61, wherein the PDF comprises a virtual PDF instance or thread.

63. The network system recited in clause 62, wherein the second policy element comprises a hardware-based PDF.

64. The network system recited in clause 62, wherein the second policy element comprises a second virtual PDF instance or thread.

65. The network system recited in clause 1, wherein the first policy element comprises a policy control function (PCF).

66. The network system recited in clause 65, wherein the PCF comprises a virtual PCF instance or thread.

67. The network system recited in clause 66, wherein the second policy element comprises a hardware-based PCF.

68. The network system recited in clause 66, wherein the second policy element comprises a second virtual PCF instance or thread.

69. The network system recited in clause 1, wherein the first policy element comprises a policy and charging rules function (PCRF).

70. The network system recited in clause 69, wherein the PCRF comprises a virtual PCRF instance or thread.

71. The network system recited in clause 70, wherein the second policy element comprises a hardware-based PCRF.

72. The network system recited in clause 70, wherein the second policy element comprises a second virtual PCRF instance or thread.

73. The network system recited in clause 1, wherein the first policy element comprises an on-line charging system (OCS).

74. The network system recited in clause 73, wherein the OCS comprises a virtual OCS instance or thread.

75. The network system recited in clause 74, wherein the second policy element comprises a hardware-based OCS.

76. The network system recited in clause 74, wherein the second policy element comprises a second virtual OCS instance or thread.

77. The network system recited in clause 1, wherein the first policy element comprises an accounting policy function (APF).

78. The network system recited in clause 77, wherein the APF comprises a virtual APF instance or thread.

79. The network system recited in clause 78, wherein the second policy element comprises a hardware-based APF.

80. The network system recited in clause 78, wherein the second policy element comprises a second virtual APF instance or thread.

81. The network system recited in clause 1, wherein the first policy element comprises a policy state function (PSF).

82. The network system recited in clause 81, wherein the PSF comprises a virtual PSF instance or thread.

83. The network system recited in clause 82, wherein the second policy element comprises a hardware-based PSF.

84. The network system recited in clause 82, wherein the second policy element comprises a second virtual PSF instance or thread.

85. The network system recited in clause 1, wherein the first policy element comprises a service policy management function (SPMF).

86. The network system recited in clause 85, wherein the SPMF comprises a virtual SPMF instance or thread.

87. The network system recited in clause 86, wherein the second policy element comprises a hardware-based SPMF.

88. The network system recited in clause 86, wherein the second policy element comprises a second virtual SPMF instance or thread.

89. The network system recited in clause 1, wherein the first policy element comprises a device interface function (DIF).

90. The network system recited in clause 89, wherein the DIF comprises a virtual DIF instance or thread.

91. The network system recited in clause 89, wherein the second policy element comprises a hardware-based DIF.

92. The network system recited in clause 86, wherein the second policy element comprises a second virtual DIF instance or thread.

93. The network system recited in clause 1, wherein the first policy element comprises a classification definition update function (CDUF).

94. The network system recited in clause 93, wherein the CDUF comprises a virtual CDUF instance or thread.

95. The network system recited in clause 94, wherein the second policy element comprises a hardware-based CDUF.

96. The network system recited in clause 94, wherein the second policy element comprises a second virtual CDUF instance or thread.

97. The network system recited in clause 1, wherein the first policy element comprises a policy rules element (PRE).

98. The network system recited in clause 97, wherein the PRE comprises a virtual PRE instance or thread.

99. The network system recited in clause 98, wherein the second policy element comprises a hardware-based PRE.

100. The network system recited in clause 98, wherein the second policy element comprises a second virtual PRE instance or thread.

101. The network system recited in clause 1, wherein the first policy element comprises a charging element (CE).

102. The network system recited in clause 101, wherein the CE comprises a virtual CE instance or thread.

103. The network system recited in clause 102, wherein the second policy element comprises a hardware-based CE.

104. The network system recited in clause 102, wherein the second policy element comprises a second virtual CE instance or thread.

105. The network system recited in clause 1, wherein the first policy element comprises a notification element (NE).

106. The network system recited in clause 105, wherein the NE comprises a virtual NE instance or thread.

107. The network system recited in clause 106, wherein the second policy element comprises a hardware-based NE.

108. The network system recited in clause 106, wherein the second policy element comprises a second virtual NE instance or thread.

109. The network system recited in clause 1, wherein the first policy information comprises information associated with traffic control.

110. The network system recited in clause 1, wherein the first policy information comprises information associated with session control.

111. The network system recited in clause 1, wherein the first policy information comprises information associated with service permission.

112. The network system recited in clause 1, wherein the first policy information comprises information associated with one or more service control attributes.

113. The network system recited in clause 1, wherein the first policy information comprises information associated with service accounting or charging.

114. The network system recited in clause 1, wherein the first policy information comprises information associated with service billing.

115. The network system recited in clause 1, wherein the first policy information comprises information associated with service plan management.

116. The network system recited in clause 1, wherein the first policy information comprises information associated with service plan modification.

117. The network system recited in clause 1, wherein the first policy information comprises information associated with service plan selection.

118. The network system recited in clause 1, wherein the first policy information comprises information associated with a service plan limit.

119. The network system recited in clause 1, wherein the first policy information comprises information associated with a service limit or cap.

120. The network system recited in clause 1, wherein the first policy information comprises information associated with a service quality-of-service (QoS) level.

121. The network system recited in clause 1, wherein the first policy information comprises information associated with a service performance level.

122. The network system recited in clause 1, wherein the first policy information comprises information associated with a user notification.

123. The network system recited in clause 1, wherein the first policy information comprises service allowance information.

124. The network system recited in clause 1, wherein the first policy information comprises service wallet information.

125. The network system recited in clause 1, wherein the first policy information comprises information associated with a service notification trigger.

126. The network system recited in clause 1, wherein the policy enforcement function is configured to classify traffic from at least a portion of the one or more end-user devices communicatively coupled to the network system over the wireless access network, and wherein the first policy information comprises one or more instructions defining a classification of service, the classification of service enabling the network system to provide or perform granular service accounting, granular service notification, or granular service control.

127. The network system recited in clause 126, wherein the classification of service is associated with one or more attributes of the traffic.

128. The network system recited in clause 126, wherein the classification of service is associated with a particular access point name (APN).

129. The network system recited in clause 126, wherein the classification of service is associated with a particular device application.

130. The network system recited in clause 126, wherein the classification of service is associated with a particular network server.

131. The network system recited in clause 126, wherein the classification of service is associated with a particular network traffic path, tunnel, or data session identifier.

132. The network system recited in clause 126, wherein the classification of service is associated with a particular network connection identifier.

133. The network system recited in clause 126, wherein the classification of service is associated with a particular network type.

134. The network system recited in clause 126, wherein the classification of service is associated with a particular service type.

135. The network system recited in clause 126, wherein the classification of service is associated with a time of day.

136. The network system recited in clause 126, wherein the classification of service is associated with a quality-of-service (QoS) level.

137. The network system recited in clause 126, wherein the classification of service is associated with a network performance or congestion level.

138. The network system recited in clause 1, wherein the first policy element is configured to make a traffic control decision, and wherein the first policy information comprises an instruction from the first policy element to the policy enforcement function to enforce the traffic control decision.

139. The network system recited in clause 1, wherein the policy enforcement function is configured to determine a service charge, and wherein the first policy information or the second policy information comprises information associated with the service charge.

140. The network system recited in clause 1, wherein the first policy information comprises information about or associated with first traffic, the first traffic being associated with a first end-user device of the one or more end-user devices communicatively coupled to the network system over the wireless access network, and wherein the second policy information comprises information about or associated with second traffic, the second traffic being associated with a second end-user device of the one or more end-user devices communicatively coupled to the network system over the wireless access network.

141. The network system recited in clause 1, wherein the first policy information comprises information about or associated with first traffic, the first traffic being associated with a first service available to at least a portion of the one or more end-user devices communicatively coupled to the network system over the wireless access network, and wherein the second policy information comprises information about or associated with second traffic, the second traffic being associated with a second service available to the at least a portion of the one or more end-user devices communicatively coupled to the network system over the wireless access network.

142. The network system recited in clause 1, wherein the first policy information assists in implementing a first service plan associated with a first mobile operator network or a first country network of a multi-country mobile operator, and wherein the second policy information assists in implementing a second service plan associated with a second mobile operator network or a second country network of the multi-country mobile operator.

143. The network system recited in clause 1, wherein the first policy information assists in implementing a first control policy, a first accounting policy, or a first notification policy associated with a first service plan offered by a first mobile service operator or offered over a first mobile service network of a multi-country mobile network, and wherein the second policy information assists in implementing a second control policy, a second accounting policy, or a second notification policy associated with a second service plan offered by a second mobile service operator or offered over a second mobile service network of a multi-country mobile network.

144. The network system recited in clause 1, wherein the first policy information assists in implementing a first control policy, a first accounting policy, or a first notification policy associated with a first service plan associated with a first device group or a first user group associated with a first subset of the one or more end-user devices communicatively coupled to the network system over the wireless access network, and wherein the second policy information assists in implementing a second control policy, a second accounting policy, or a second notification policy associated with a second service plan associated with a second device group or a second user group associated with a second subset of the one or more end-user devices communicatively coupled to the network system over the wireless access network, and further comprising a device group management system configured to: associate the first device group or the first user group with the first service plan, and associate the second device group or the second user group with the second service plan.

145. The network system recited in clause 144, wherein the first device group or the first user group comprises a first set of one or more end-user devices associated with a first demographic, and wherein the second device group or the second user group comprises a second set of one or more end-user devices associated with a second demographic.

146. The network system recited in clause 144, wherein the first device group or the first user group comprises a first set of one or more end-user devices associated with a first country, and wherein the second device group or the second user group comprises a second set of one or more end-user devices associated with a second country.

147. The network system recited in clause 144, wherein the first device group or the first user group comprises a first set of one or more end-user devices associated with a first mobile operator, and wherein the second device group or the second user group comprises a second set of one or more end-user devices associated with a second mobile operator.

148. The network system recited in clause 144, wherein the first device group or the first user group comprises a first set of one or more end-user devices associated with a first geography, and wherein the second device group or the second user group comprises a second set of one or more end-user devices associated with a second geography.

149. The network system recited in clause 144, wherein the first device group or the first user group comprises a first set of one or more end-user devices associated with a first device type, and wherein the second device group or the second user group comprises a second set of one or more end-user devices associated with a second device type.

150. The network system recited in clause 144, wherein the first device group or the first user group comprises a first set of one or more end-user devices associated with a home network service, and wherein the second device group or the second user group comprises a second set of one or more end-user devices associated with a roaming network service.

151. The network system recited in clause 144, wherein the first service plan is of a first service plan type, and wherein the second service plan is of a second service plan type.

152. The network system recited in clause 144, wherein the first device group or the first user group comprises a first set of one or more end-user devices associated with a first mobile virtual network operator (MVN), and wherein the second device group or the second user group comprises a second set of one or more end-user devices associated with a second MVNO.

153. The network system recited in clause 144, wherein the first device group or the first user group comprises a first set of one or more end-user devices associated with a first machine-to-machine (M2M) service, and wherein the second device group or the second user group comprises a second set of one or more end-user devices associated with a second M2M service.

154. The network system recited in clause 144, wherein the first device group or the first user group comprises a first set of one or more end-user devices associated with a first beta service group, and wherein the second device group or the second user group comprises a second set of one or more end-user devices associated with a second beta service group or a production service group.

155. The network system recited in clause 1, wherein the first policy element comprises a virtual policy element instance or thread that runs in a policy element cloud system located in a centralized data center, and wherein the second policy element is located in a local network data center.

156. The network system recited in clause 155, wherein a first policy associated with the first policy element is managed by a first service controller, and wherein a second policy associated with the second policy element is managed by a service policy management system.

157. The network system recited in clause 155, wherein the second policy element comprises hardware.

158. The network system recited in clause 155, further comprising a service decision element configured to: determine a first set of the one or more end-user devices to be managed by the first policy element, and determine a second set of the one or more end-user devices to be managed by the second policy element.

159. The network system recited in clause 1, further comprising: a service design center (SDC) system configured to: assist in obtaining, through a user interface of the SDC system, one or more service administrator inputs; and a policy management system configured to: based on at least a first portion of the one or more service administrator inputs, define a first service policy associated with the first policy information, and based on at least a second portion of the one or more service administrator inputs define a second service policy associated with the second policy information.

160. The network system recited in clause 159, wherein the first service policy comprises a first accounting policy, a first control policy, or a first notification policy, and wherein the second service policy comprises a second accounting policy, a second control policy, or a second notification policy.

161. The network system recited in clause 159, wherein the first service policy is associated with a first service plan, and wherein the second service policy is associated with a second service plan.

162. The network system recited in clause 159, wherein the SDC system is further configured to: create or modify a service policy catalog comprising one or more existing service policies, and present at least a portion of the service policy catalog through the user interface of the SDC system.

163. The network system recited in clause 159, wherein the one or more service administrator inputs comprise a first input from a first service administrator and a second input from a second service administrator.

164. The network system recited in clause 163, wherein the first service administrator is associated with a first mobile operator, a first mobile virtual network operator (MVNO), a first machine-to-machine (M2M) provider, or a first country service manager, and wherein the second service administrator is associated with a second mobile operator, a second MVNO, a second M2M provider, or a second country service manager.

165. The network system recited in clause 159, wherein the one or more service administrator inputs at least assist in defining a hierarchy to assist the network system in determining whether to apply the first service policy or the second service policy when both the first service policy and the second service policy apply.

166. The network system recited in clause 159, wherein the one or more service administrator inputs at least assist in defining a policy state to qualify or modify the first service policy or the second service policy.

167. The network system recited in clause 159, wherein the one or more service administrator inputs at least assist in defining a user notification trigger.

168. The network system recited in clause 167, wherein the SDC system is further configured to associate the user notification trigger with notification content to be delivered to at least a portion of the one or more end-user devices communicatively coupled to the network system over the wireless access network when the user notification trigger occurs.

169. The network system recited in clause 159, wherein the one or more service administrator inputs at least assist in defining a joint policy, the joint policy comprising two or more of (a) an accounting policy, (b) a notification policy, (c) a control policy, the joint policy to be applied based on a common trigger event or filter.

170. The network system recited in clause 1, wherein the first policy element is a virtual policy element instance or thread that runs in a policy element cloud system, and wherein communicate first policy information between the policy enforcement function and the first policy element comprises communicate the first policy information over an application programming interface (API) that provides for interoperability between the policy element cloud system and the policy enforcement function.

171. A network system for providing one or more services to one or more end-user devices communicatively coupled to the network system over a wireless access network, the network system comprising: one or more policy enforcement functions; a policy element cloud system configured to run a plurality of virtual policy element instances or threads, wherein the policy element cloud system is configured to: run a first virtual policy element, the first virtual policy element configured to communicate first policy information with at least one of the one or more policy enforcement functions, and run a second virtual policy element, the second virtual policy element configured to communicate second policy information with at least one of the one or more policy enforcement functions; and a load balancer configured to: determine a processing demand associated with the policy element cloud system, and based on the processing demand associated with the policy element cloud system, assign communication of the first policy information to the first virtual policy element, and assign communication of the second policy information to the second virtual policy element.

172. The network system recited in clause 171, further comprising a policy information router or proxy configured to route, switch, or multiplex the first policy information and the second policy information to the one or more policy enforcement functions.

173. The network system recited in clause 172, wherein the one or more policy enforcement functions comprise a first policy enforcement function and a second policy enforcement function, and wherein the policy information router or proxy is configured to: route, switch, or multiplex the first policy information to the first policy enforcement function, and route, switch, or multiplex the second policy information to the second policy enforcement function.

174. The network system recited in clause 172, wherein the one or more policy enforcement functions comprise a first policy enforcement function, and wherein the policy information router or proxy is configured to: route, switch, or multiplex the first policy information to the first policy enforcement function, and route, switch, or multiplex the second policy information to the first policy enforcement function.

175. The network system recited in clause 171, wherein assign communication of the first policy information to the first virtual policy element and assign communication of the second policy information to the second virtual policy element are based on an indication of an end-user device load.

176. The network system recited in clause 171, wherein assign communication of the first policy information to the first virtual policy element and assign communication of the second policy information to the second virtual policy element are based on an indication of a service processing load.

177. The network system recited in clause 171, wherein the first policy information comprises information associated with a first end-user device of the one or more end-user devices communicatively coupled to the network system over the wireless access network, and wherein the second policy information comprises information associated with a second end-user device of the one or more end-user devices communicatively coupled to the network system over the wireless access network.

178. The network system recited in clause 171, wherein the first policy information comprises information associated with a first service activity available to at least a portion of the one or more end-user devices communicatively coupled to the network system over the wireless access network, and wherein the second policy information comprises information associated with a second service activity available to the at least a portion of the one or more end-user devices communicatively coupled to the network system over the wireless access network.

179. The network system recited in clause 171, wherein the first policy information comprises information associated with a first network or network type, and wherein the second policy information comprises information associated with a second network or network type.

180. The network system recited in clause 171, wherein the first policy information comprises information associated with a first mobile operator or service policy administrator, and wherein the second policy information comprises information associated with a second network operator or service policy administrator.

181. The network system recited in clause 171, wherein the one or more policy enforcement functions comprise at least one hardware-based policy enforcement function.

182. The network system recited in clause 181, wherein the one or more policy enforcement functions further comprise at least one virtual policy enforcement function.

183. The network system recited in clause 171, wherein the one or more policy enforcement functions comprise at least one virtual policy enforcement function.

184. The network system recited in clause 171, wherein the one or more policy enforcement functions comprise at least two policy enforcement functions located in a common data center.

185. The network system recited in clause 184, wherein the at least two policy enforcement functions comprise a first policy enforcement function and a second policy enforcement function, and wherein the first policy element communicates the first policy information with the first policy enforcement function, and wherein the second policy element communicates the second policy information with the second policy enforcement function.

186. The network system recited in clause 171, wherein the one or more policy enforcement functions comprise a first policy enforcement function located in a first data center and a second policy enforcement function located in a second data center.

187. The network system recited in clause 184, wherein the first policy element communicates the first policy information with the first policy enforcement function, and wherein the second policy element communicates the second policy information with the second policy enforcement function.

188. The network system recited in clause 171, wherein the one or more policy enforcement functions comprise a first policy enforcement function.

189. The network system recited in clause 188, wherein the first policy element communicates the first policy information with the first policy enforcement function, and wherein the second policy element communicates the second policy information with the first policy enforcement function.

190. The network system recited in clause 188, further comprising a third policy element configured to communicate third policy information, and wherein the policy information router or proxy is further configured to route, switch, or multiple the first policy information and the third policy information to the first policy enforcement function.

191. The network system recited in clause 190, wherein the third policy element comprises hardware.

192. The network system recited in clause 191, wherein the third policy element and the policy element cloud system are located in a common data center.

193. The network system recited in clause 191, wherein the third policy element is located in a first data center, and wherein the policy element cloud system is located in a second data center.

194. The network system recited in clause 190, wherein the third policy element is located in a first data center, and wherein the first policy element is located in a second data center.

195. The network system recited in clause 194, wherein the first policy information assists in implementing a first control policy, a first accounting policy, or a first notification policy associated with a first service plan offered by a first mobile service operator or offered over a first mobile service network of a multi-country mobile network, and wherein the second policy information assists in implementing a second control policy, a second accounting policy, or a second notification policy associated with a second service plan offered by a second mobile service operator or offered over a second mobile service network of a multi-country mobile network.

196. A network system for providing one or more services to one or more end-user devices communicatively coupled to the network system over a wireless access network, the network system comprising: a first policy enforcement function, the first policy enforcement function being located in a first mobile operator network or a first country network of a multi-country mobile operator; a second policy enforcement function, the second policy enforcement function being located in a second mobile operator network or a second country network of the multi-country mobile operator; a policy element cloud system configured to: run a first virtual policy element, the first virtual policy element configured to communicate first policy information with the first policy enforcement function, and run a second virtual policy element, the second virtual policy element configured to communicate second policy information with the second policy enforcement function; and a load balancer configured to: assign communication of the first policy information to the first virtual policy element, and assign communication of the second policy information to the second virtual policy element.

197. The network system recited in clause 196, further comprising a policy information router or proxy configured to: route, switch, or multiplex the first policy information between the first policy element and the first policy enforcement function, and route, switch, or multiplex the second policy information between the second policy element and the second policy enforcement function.

198. The network system recited in clause 196, wherein the first policy information assists in implementing a first control policy, a first accounting policy, or a first notification policy associated with a first service plan offered over the first mobile operator network or a first country network of the multi-country mobile operator, and wherein the second policy information assists in implementing a second control policy, a second accounting policy, or a second notification policy associated with a second service plan offered over the second mobile operator network or a second country network of the multi-country mobile operator.

199. The network system recited in clause 196, wherein the first policy information assists in implementing a first control policy, a first accounting policy, or a first notification policy associated with a first service plan offered over the first mobile operator network or a first country network of the multi-country mobile operator, and wherein the second policy information assists in implementing the first control policy, the first accounting policy, or the first notification policy associated with the first service plan offered over the second mobile operator network or a second country network of the multi-country mobile operator.

200. The network system recited in clause 196, further comprising a service controller configured to determine whether to apply a first service plan policy or a second service plan policy to end-user device traffic processed by the first policy enforcement function.

201. The network system recited in clause 196, wherein the first policy information assists in implementing a first control policy, a first accounting policy, or a first notification policy associated with a first service plan offered over the first mobile operator network or a first country network of the multi-country mobile operator, and wherein the second policy information assists in implementing a second control policy, a second accounting policy, or a second notification policy associated with a second service plan associated with a second mobile service operator or a second mobile service network of the multi-country mobile network.

202. A network system for providing one or more services to one or more end-user devices communicatively coupled to the network system over a wireless access network, the network system comprising: one or more policy enforcement functions; a first policy element instance or thread; a second policy element instance or thread; a policy information proxy or router configured to: communicate first policy information between the one or more policy enforcement functions and the first policy element, and communicate second policy information between the one or more policy enforcement functions and the second policy element.

203. The network system recited in clause 202, wherein the one or more policy enforcement functions comprise a first policy enforcement function and a second policy enforcement function, and wherein communicate first policy information between the one or more policy enforcement functions and the first policy element comprises communicate the first policy information between the first policy enforcement function and the first policy element, and wherein communicate second policy information between the one or more policy enforcement functions and the second policy element comprises communicate the second policy information between the second policy enforcement function and the second policy element.

204. The network system recited in clause 202, wherein the first policy information assists in implementing a first control policy, a first accounting policy, or a first notification policy of a first service plan associated with a first mobile service operator or a first mobile service network of a multi-country mobile network, and wherein the second policy information assists in implementing a second control policy, a second accounting policy, or a second notification policy of a second service plan associated with a second mobile service operator or a second mobile service network of the multi-country mobile network.

205. A network system for providing one or more services to one or more end-user devices communicatively coupled to the network system over a wireless access network, the network system comprising: one or more policy enforcement functions including a first policy enforcement function, the first policy enforcement function configured to assist in implementing a traffic plane aspect of a first service policy for application to network service for the one or more end-user devices and a second service policy for application to network service for the one or more end user devices, the first service policy comprising: (a) a first accounting policy, (b) a first notification policy, (c) a first control policy, (d) a first service plan purchase process, (e) a first service plan modification process, or (f) a combination of two or more of (a) through (e), and the second service policy comprising one of: (i) a second accounting policy, (ii) a second notification policy, (iii) a second control policy, (iv) a second service plan purchase process, (v) a second service plan modification process, or (vi) a combination of two or more of (i) through (v); a first policy element configured to assist in implementing a first control plane aspect of the first service policy and to communicate first control plane policy information with the first policy enforcement function, the first control plane policy information comprising: (x) information communicated from the first policy element to the first policy enforcement function that indicates one or more first traffic plane instructions to aid the first policy enforcement function in assisting in implementing the first service policy, (y) information communicated from the first policy enforcement function to the first policy element that indicates traffic plane activity or first policy enforcement function traffic plane actions associated with the first service policy, or (z) both (x) and (y); a second policy element configured to assist in implementing a second control plane aspect of the second network service policy and to communicate second control plane policy information with the first policy enforcement function, the second control plane policy information comprising: (p) information communicated from the second policy element to the first policy enforcement function that indicates one or more second traffic plane instructions to aid the first policy enforcement function in assisting in implementing the second service policy, (q) information communicated from the first policy enforcement function to the second policy element that indicates traffic plane activity or first policy enforcement function traffic plane actions associated with the second service policy, or (r) both (p) and (q); and a network element communicatively coupled to the first policy enforcement function, the first policy element, and the second policy element, wherein the network element is configured to: assist in establishing or maintaining a first control plane communication path for communicating the first traffic plane policy information between the first policy enforcement function and the first policy element, and assist in establishing or maintaining a second control plane communication path for communicating the second traffic plane policy information between the first policy enforcement function and the second policy element.

206. The network system recited in clause 205, wherein the first policy element is a first virtual policy element instance or thread that runs in a policy element cloud, and wherein the second policy element is a second virtual policy element instance or thread that runs in the policy element cloud.

207. The network system recited in clause 205, wherein the first policy element is a virtual policy element instance or thread that runs in a policy element cloud, and wherein the second policy element is a conventional policy element.

208. The network system recited in clause 205, wherein the first and second policy elements are conventional policy elements.

209. The network system recited in clause 205, wherein the first policy enforcement function is a virtual policy enforcement function instance or thread that runs in a policy enforcement function cloud.

210. The network system recited in clause 205, wherein the first policy enforcement function is a conventional policy enforcement function.

211. The network system recited in clause 205, wherein the network system is further configured to: determine and implement an assignment of the first policy element to assist in implementing the first service policy and to communicate the first policy information with the first policy enforcement function, and determine and implement an assignment of the second policy element to assist in implementing the second service policy and to communicate the second policy information with the first policy enforcement function.

212. A network system for providing one or more services to one or more end-user devices communicatively coupled to the network system over a wireless access network, the network system comprising: one or more policy enforcement functions including a first policy enforcement function and a second policy enforcement function, wherein the first policy enforcement function is configured to assist in implementing a traffic plane aspect of a first service policy for application to network service for one or more end user devices and the second policy enforcement function configured to assist in implementing a second service policy for application to network service for one or more end user devices, the first service policy comprising: (a) a first accounting policy, (b) a first notification policy, (c) a first control policy, (d) a first service plan purchase process, (e) a first service plan modification process, or (f) a combination of two or more of (a) through (e), and the second service policy comprising one of: (i) a second accounting policy, (ii) a second notification policy, (iii) a second control policy, (iv) a second service plan purchase process, (v) a second service plan modification process, or (vi) a combination of two or more of (i) through (v); a first policy element configured to assist in implementing a control plane aspect of the first network service policy and to communicate first control plane policy information with the first policy enforcement function, the first control plane policy information comprising: (x) information communicated from the first policy element to the first policy enforcement function that indicates one or more first traffic plane instructions to aid the first policy enforcement function in assisting in implementing the first service policy, (y) information communicated from the first policy enforcement function to the first policy element that indicates traffic plane activity or first policy enforcement function traffic plane actions associated with the first service policy, or (z) both (x) and (y); a second policy element configured to assist in implementing a control plane aspect of the second network service policy and to communicate second control plane policy information with the second policy enforcement function, the second control plane policy information comprising: (p) information communicated from the second policy element to the second policy enforcement function that indicates one or more second traffic plane instructions to aid the second policy enforcement function in assisting in implementing the second service policy, (q) information communicated from the second policy enforcement function to the second policy element that indicates traffic plane activity or second policy enforcement function traffic plane actions associated with the second service policy, or (r) both (p) and (q); and a network element communicatively coupled to the first policy enforcement function, the second policy enforcement function, the first policy element, and the second policy element, wherein the network element is configured to: assist in establishing or maintaining a first control plane communication path for communicating the first traffic plane policy information between the first policy enforcement function and the first policy element, and assist in establishing or maintaining a second control plane communication path for communicating the second traffic plane policy information between the second policy enforcement function and the second policy element.

213. The network system recited in clause 212, wherein the first policy element is a first virtual policy element instance or thread that runs in a policy element cloud, and wherein the second policy element is a second virtual policy element instance or thread that runs in the policy element cloud.

214. The network system recited in clause 212, wherein the first policy element is a virtual policy element instance or thread that runs in a policy element cloud, and wherein the second policy element is a conventional policy element.

215. The network system recited in clause 212, wherein the first and second policy elements are conventional policy elements.

216. The network system recited in clause 212, wherein the first policy enforcement function is a first virtual policy enforcement function instance or thread that runs in a policy enforcement function cloud, and wherein the second policy enforcement function is a second virtual policy enforcement function instance or thread that runs in the policy enforcement function cloud.

217. The network system recited in clause 212, wherein the first policy enforcement function is a first virtual policy enforcement function instance or thread that runs in a policy enforcement function cloud, and wherein the second policy enforcement function is a conventional policy enforcement function.

218. The network system recited in clause 212, wherein the first and second policy enforcement functions are virtual policy enforcement functions.

219. The network system recited in clause 212, wherein the network system is further configured to: determine and implement an assignment of the first policy element to assist in implementing the first service policy and to communicate the first policy information with the first policy enforcement function, and determine and implement an assignment of the second policy element to assist in implementing the second service policy and to communicate the second policy information with the second policy enforcement function.

220. The network system recited in clause 212, wherein the network system is further configured to: determine and implement an assignment of the first policy enforcement function to assist in implementing the first service policy and to communicate the first policy information with the first policy element, and determine and implement an assignment of the second policy enforcement function to assist in implementing the second service policy and to communicate the second policy information with the second policy element.

221. A network system for providing one or more services to one or more end-user devices communicatively coupled to the network system over a wireless access network, the network system comprising: one or more policy enforcement functions, including at least a first policy enforcement function; one or more policy elements, including at least a first policy element and a second policy element; and a policy control plane proxy or router configured to: route first policy information between the first policy enforcement function and the first policy element, the first policy information configured to assist in implementing at least a first service policy, the first policy enforcement function configured to assist in implementing the first service policy, and route second policy information between the first policy enforcement function and the second policy element, the second policy information configured to assist in implementing at least a second service policy, the first policy enforcement function further configured to assist in implementing the second service policy.

222. The network system recited in clause 221, wherein the first service policy is a service policy applied to communication associated with a first end-user device of the one or more end-user devices communicatively coupled to the network system over the wireless access network, and wherein the second service policy is a service policy applied to communication associated with a second end-user device credential or a second end user credential.

223. The network system recited in clause 221, wherein the first service policy and the second service policy are applied to communication associated with a first end-user device credential or a first end user credential.

224. The network system recited in clause 221, wherein the first service policy comprises a set of one or more service policies for application to communication associated with a first end-user device credential or a first end user credential, and wherein the second service policy is the same set of one or more service policies for application to communication associated with a second end-user device credential or a second end user credential.

225. The network system recited in clause 221, wherein the first service policy is a first set of one or more service policies for application to communication associated with a first end-user device credential or a first end user credential, and wherein the second service policy is a second set of one or more service policies for application to communication associated with a second end-user device or a second end user.

226. The network system recited in clause 221, wherein the first service policy is for application to a first set of communication associated with a first end-user device or a first end user, and wherein the second service policy differs from the first service policy and is for application to the first set of communication associated with the first end-user device or the end user.

227. The network system recited in clause 221, wherein the first service policy is for application to a first set of communication associated with a first end-user device or a first end user, and wherein the second service policy differs from the first service policy and is for application to a second set of communication associated with the first end-user device or the first end user.

228. The network system recited in clause 221, wherein the first service policy is associated with a first network service, and wherein the second service policy is associated with a second network service.

229. The network system recited in clause 221, wherein the first service policy is associated with a first service plan, and wherein the second service policy is associated with a second service plan.

230. The network system recited in clause 221, wherein the first service policy and the second service policy are components of the same service plan.

231. The network system recited in clause 221, wherein the first service policy is a sponsor paid service policy, and wherein the second service policy is a user paid service policy.

232. The network system recited in clause 221, wherein the first service policy is associated with a first mobile operator or service administrator, and wherein the second service policy is associated with a second mobile operator or service administrator.

233. The network system recited in clause 221, wherein the first service policy and the second service policy are associated with a particular mobile operator or service administrator.

234. The network system recited in clause 221, wherein the first service policy is associated with a first device group or user group, and wherein the second service policy is associated with a second device group or user group.

235. The network system recited in clause 234, wherein the first device group or user group or the second device group or user group is defined by a set of device credentials or user credentials.

236. The network system recited in clause 221, wherein the network system is further configured to assign the first policy element to assist in implementing the first service policy.

237. The network system recited in clause 236, wherein the network system is further configured to assign the second policy element to assist in implementing the second device service policy.

238. The network system recited in clause 221, wherein the network system is further configured to: assign the first policy enforcement function to assist in implementing the first service policy, and based on the assignment of the first policy enforcement function, route the first policy information between the first policy enforcement function and the first policy element.

239. The network system recited in clause 221, wherein the network system is further configured to: determine that the first policy enforcement function is assisting to implement the first service policy or is assigned to assist to implement the first service policy, and based on the determination that the first policy enforcement function is assisting to implement the first service policy or is assigned to assist to implement the first service policy, route the first policy information between the first policy enforcement function and the first policy element.

240. The network system recited in clause 221, wherein the first policy element is a virtual policy element that runs in a policy element cloud, and wherein the second policy element is a conventional policy element.

241. The network system recited in clause 240, wherein routing first policy information between the first policy enforcement function and the first policy element and routing the second policy information between the second policy enforcement function and the second policy element assists in partitioning service policy management between the first policy element and the second policy element.

242. The network system recited in clause 240, wherein routing the first policy information between the first policy enforcement function and the first policy element and routing the second policy information between the second policy enforcement function and the second policy element assists in migrating service policy management from the second policy element to the first policy element.

243. The network system recited in clause 221, wherein the first and second policy elements are virtual policy elements that run in a policy element cloud.

244. The network system recited in clause 221, wherein the first policy enforcement function is a conventional policy enforcement function.

245. The network system recited in clause 221, wherein the first policy enforcement function is a virtual policy enforcement function.

246. The network system recited in clause 221, wherein at least one of the one or more policy enforcement functions is a virtual policy enforcement function that runs in a policy enforcement function cloud.

247. A network system for providing one or more services to one or more end-user devices communicatively coupled to the network system over a wireless access network, the network system comprising: one or more policy enforcement functions, including at least a first policy enforcement function and a second policy enforcement function; one or more policy elements, including at least a first policy element and a second policy element; and a policy control plane proxy or router configured to: route first policy information between the first policy enforcement function and the first policy element, the first policy information configured to assist in implementing at least a first service policy, the first policy enforcement function configured to assisting in implementing the first service policy, and route second policy information between the first policy enforcement function and the second policy element, the second policy information configured to assist in implementing at least a second service policy, the first policy enforcement function further configured to assisting in implementing the second service policy.

248. The network system recited in clause 247, wherein the first service policy is a service policy applied to communication associated with a first end-user device, and wherein the second service policy is a service policy applied to communication associated with a second end-user device credential or end user credential.

249. The network system recited in clause 247, wherein the first service policy and the second service policy are applied to communication associated with a first end-user device credential or end user credential.

250. The network system recited in clause 247, wherein the first service policy comprises a set of one or more service policies for application to a communication associated with a first end-user device credential or end user credential, and wherein the second service policy is the same set of one or more service policies for application to communication associated with a second end-user device credential or end user credential.

251. The network system recited in clause 247, wherein the first service policy comprises a first set of one or more service policies for application to communication associated with a first end-user device credential or end user credential, and wherein the second service policy comprises a second set of one or more service policies for application to communication associated with a second end-user device or end user.

252. The network system recited in clause 247, wherein the first service policy is for application to a first set of communication associated with a first end-user device or end user, and wherein the second service policy differs from the first service policy and is for application to the first set of communication associated with the first end-user device or end user.

253. The network system recited in clause 247, wherein the first service policy is for application to a first set of communication associated with a first end-user device or end user, and wherein the second service policy differs from the first service policy and is for application to a second set of communication associated with the first end-user device or end user.

254. The network system recited in clause 247, wherein the first service policy is associated with a first network service, and wherein the second service policy is associated with a second network service.

255. The network system recited in clause 247, wherein the first service policy is associated with a first service plan, and wherein the second service policy is associated with a second service plan.

256. The network system recited in clause 247, wherein the first service policy and second service policy are components of the same service plan.

257. The network system recited in clause 247, wherein the first service policy is a sponsor paid service policy, and wherein the second service policy is a user paid service policy.

258. The network system recited in clause 247, wherein the first service policy is associated with a first mobile operator or service administrator, and wherein the second service policy is associated with a second mobile operator or service administrator.

259. The network system recited in clause 247, wherein the first service policy and second service policy are associated with a particular mobile operator or service administrator.

260. The network system recited in clause 247, wherein the first service policy is associated with a first device group or user group, and wherein the second service policy is associated with a second device group or user group.

261. The network system recited in clause 260, wherein the device group or user group is defined by a set of device credentials or user credentials.

262. The network system recited in clause 247, wherein the network system is further configured to assign the first policy element to assist in implementing the first device service policy.

263. The network system recited in clause 262, wherein the network system is further configured to assign the second policy element to assist in implementing the second device service policy.

264. The network system recited in clause 247, wherein the network system is further configured to: assign the first policy enforcement function to assist in implementing the first service policy, and based on the assignment of the first policy enforcement function, route the first policy information between the first policy enforcement function and the first policy element.

265. The network system recited in clause 247, wherein the network system is further configured to: determine that the first policy enforcement function is assisting to implement the first service policy or is assigned to assist to implement the first service policy, and based on the determination that the first policy enforcement function is assisting to implement the first service policy or is assigned to assist to implement the first service policy, route the first policy information between the first policy enforcement function and the first policy element.

266. The network system recited in clause 247, wherein the first policy element is a virtual policy element that runs in a policy element cloud, and wherein the second policy element is a conventional policy element.

267. The network system recited in clause 266, wherein routing the first policy information between the first policy enforcement function and the first policy element and routing the second policy information between the second policy enforcement function and the second policy element assists in partitioning service policy management between the first policy element and the second policy element.

268. The network system recited in clause 266, wherein routing the first policy information between the first policy enforcement function and the first policy element and routing the second policy information between the second policy enforcement function and the second policy element assists in migrating service policy management from the second policy element to the first policy element.

269. The network system recited in clause 247, wherein the first and second policy elements are virtual policy elements that run in a policy element cloud.

270. The network system recited in clause 247, wherein the first policy enforcement function is a conventional policy enforcement function.

271. The network system recited in clause 247, wherein the first policy enforcement function is a virtual policy enforcement function.

272. The network system recited in clause 247, wherein at least one of the one or more policy enforcement functions is a virtual policy enforcement function that runs in a policy enforcement function cloud.

273. A method comprising: providing a first response to a first network resource access request, wherein the first response is based on a first indicator provided to a first decision layer in a resource management system; and providing a second network resource access request, based on an aspect of the first network resource access request, to a second decision layer in the resource management system, wherein the second decision layer provides a second response to the second network resource access request, wherein the second response comprises an updated network resource access policy for the first decision layer.

274. The method of clause 273, wherein the first response comprises a first network resource access policy that provides for limited access to network resources.

275. The method of clause 273, wherein the updated network resource access policy provides for additional access to network resources in comparison to the first network resource access policy.

276. The method of clause 273, wherein the updated network resource access policy is more restrictive than the first network resource access policy.

277. The method of clause 273, wherein the updated network resource access policy is different from the first network access policy.

278. The method of clause 273, wherein application of the updated network resource access policy is deferred until at least another network resource access request is received.

279. The method of clause 273, wherein the updated network resource access policy is applied prior to receiving a second network resource access request.

280. The method of clause 273, wherein the updated network resource access policy is applied immediately.

281. The method of clause 273, wherein the first decision layer is implemented over a real-time interface.

282. The method of clause 273, wherein the second decision layer is implemented over a non-real-time interface.

283. The method of clause 281, wherein the real-time interface comprises at least one of Gx, Gy, RADIUS, or Diameter protocols.

284. The method of clause 282, wherein the non-real-time interface comprises at least one of Gx, Gy, RADIUS, JSON, XML, Web Services, REST, or Diameter protocols.

285. The method of clause 273, wherein the second decision layer is implemented over a real-time interface.

286. The method of clause 285, wherein the real-time interface comprises at least one of Gx, Gy, RADIUS, or Diameter protocols.

287. The method of clause 273, wherein the first indicator reflects an unknown state.

288. The method of clause 273, wherein the first indicator reflects a known state.

289. The method of clause 273, wherein the first indicator reflects a default state.

290. The method of clause 273, wherein the first indicator reflects a fraud state.

291. The method of clause 273, wherein the first indicator reflects a non-fraud state.

292. The method of clause 273, wherein the first indicator reflects a limited access enablement state.

293. The method of clause 273, wherein the first decision layer is implemented over a hardware-based computing platform.

294. The method of clause 273, wherein the second decision layer is implemented over a virtualized computing platform.

295. The method of clause 273, wherein the first decision layer is implemented over a hardware-based computing platform and the second decision layer is implemented over a virtualized computing platform, wherein the first decision layer communicates with the second decision layer over a remotely established communications network.

296. The method of clause 294, wherein the first decision layer authorizes limited access to network resources, in response to the first network resource access request and authorizes additional access to network resources upon the second decision layer verifying that the additional access may be granted.

297. The method of clause 274, wherein the limited access is based on at least one of: a level of bandwidth allocation, level of access to a network resource, level of access to a content type, or level of connection speed used for accessing one or more network resources.

298. The method of clause 296 wherein the network resource comprises at least one of: a host name, a MAC address, a TCP/IP address, a server name, or a URL.

299. The method of clause 273 further comprising initiating, by the second decision layer, a first message comprising an updated network resource access policy for the first decision layer.

300. The method of clause 273, wherein the updated network resource access policy denies additional access to one or more network resources.

301. A method for controlling resource allocation, the method comprising:
responsive to a request submitted for network resource access, allocating a first network resource allowance to a subscriber, based on a first network resource allocation policy associated with the subscriber, wherein the allocation is for a first set of network resources, and the request for network resource allocation is for a second network resource allowance, the first allowance being more restrictive than the second allowance; communicating an authorization request to a virtualized network element to verify a subscription policy associated with the subscriber, wherein the subscription policy provides information about the subscriber's resource access authorization for using resources of a service provider; and receiving, from the virtualized network element, a reply providing information about the subscription policy, wherein the reply indicates whether the subscriber is authorized to an allocation of network resource allowance beyond the first network resource allowance.

302. The method of clause 301, further comprising updating the first resource allocation policy associated with the subscriber based on the information provided in the reply.

303. The method of clause 301, wherein the information provided in the reply indicates that no additional network resources are to be allocated to the subscriber.

304. The method of clause 301, wherein the information provided in the reply indicates that at least one or more additional network resources are to be allocated to the subscriber.

305. The method of clause 301, wherein the information provided in the reply indicates a priority with which the first resource allocation policy associated with the subscriber is to be updated.

306. The method of clause 305, wherein the priority is associated with an immediacy with which the first resource allocation policy is to be updated.

307. The method of clause 305, wherein the priority is associated with the timing with which the first resource allocation policy is to be updated.

308. The method of clause 302, further comprising applying the first resource allocation policy to limit additional allocation of network resources to the subscriber.

309. The method of clause 302, further comprising applying the first resource allocation policy to prevent additional allocation of network resources to the subscriber.

310. The method of clause 302, further comprising applying the first resource allocation policy to allow additional allocation of network resources to the subscriber.

311. The method of clause 301, wherein the service provider is a mobile communications service provider and the subscriber seeks access to resources of the mobile communications service provider by way of the request for network resource allowance allocation submitted through a network element in communication with a mobile communications device used by the subscriber.

312. The method of clause 301, wherein the allocating is performed by a charging module in real-time.

313. The method of clause 312, wherein the charging module is a non-virtualized logic element implemented in hardware.

314. The method of clause 313, wherein the communicating of the authorization request to the virtualized network element is performed by the charging module.

315. The method of clause 314, wherein the virtualized network element is a cloud-based charging module.

316. The method of clause 314, wherein the virtualized network element determines the subscription policy associated with the subscriber in none real-time.

317. The method of clause 314, wherein the virtualized network element determines the subscription policy associated with the subscriber in near-time.

318. The method of clause 312, wherein the charging module is an online charging system (OCS) in a communications data center implemented utilizing a gateway general packet radio service (GPRS) support node (GGSN).

319. The method of clause 312, wherein the charging module is a policy and charging rules function (PCRF) in a communications data center implemented utilizing a gateway general packet radio service (GPRS) support node (GGSN).

320. The method of clause 318, wherein the request for network resource access is received from a network element in communication with the subscriber's communication device.

321. The method of clause 320, wherein the request for network resource access is received from a serving GPRS support node (SGSN).

322. The method of clause 318, wherein the network element communicates with the OCS via a first proxy agent, and wherein the OCS is connected to the GGSN in a local network.

323. The method of clause 319, wherein the network element communicates with the PCRF via a second proxy agent, and wherein the PCRF is connected to the network element in a local network.

324. The method of clause 322, wherein the first proxy agent monitors resource usage by the subscriber in real-time.

325. The method of clause 323, wherein the second proxy agent provisions service data flow based on charging rules in real-time.

326. The method of clause 324, wherein the first proxy agent further monitors resource allocation requests received in associated with the subscriber to determine whether the resource allocation request is to be serviced by a virtualized OCS or a non-virtualized OCS based on at least one of a subscription policy associated with the subscriber, the subscriber's credentials, rules based on the subscriber's service plans, capabilities of the subscriber's device, one or more service providers associated with the subscriber, geo-location of the subscriber or the location of network where subscriber traffic is routed through.

327. The method of clause 325, wherein the second proxy agent further monitors resource allocation requests received in associated with the subscriber to determine whether the resource allocation request is to be serviced by a virtualized PCRF or a non-virtualized PCRF based on at least one of a subscription policy associated with the subscriber, the subscriber's credentials, rules based on the subscriber's service plans, capabilities of the subscriber's device, one or more service providers associated with the subscriber, geo-location of the subscriber or the location of network where subscriber traffic is routed through.

328. The method of clause 322, wherein the first proxy agent is a Gy proxy.

329. The method of clause 323, wherein the second proxy agent is a Gx proxy.

330. The method of clause 301, wherein the virtualized network element is provisioned in a remote communications network in relation to a system that performs processes associated with the allocating, the communicating and the receiving, and wherein said system is implemented in hardware.

331. A method for controlling resource allocation for a subscriber device, the method comprising: responsive to a first request for network resource access submitted on behalf of a subscriber device, allocating a first network resource allowance to the subscriber device based on a first resource allocation policy associated with the subscriber device, wherein the first network resource allowance allocated is for a first set of network resources and the request submitted for network resource access is for a second amount of resources, the first amount being less than the second amount; communicating an authorization request to a virtualized network element, instead of a non-virtualized network element, to determine a subscription policy associated with the subscriber device, wherein the subscription policy provides information about the subscriber device resource access authorization for using resources of a mobile communications service provider; receiving, from the virtualized network element, a first reply providing information about the subscription policy, wherein the first reply provides policy information about whether the first resource allocation policy is to be updated to authorize allocation of network resource allowance beyond the first network resource allowance to the subscribe device and an indicator to indicate a time factor for when the resource allocation policy is to be updated; updating the first resource allocation policy to a second resource allocation policy according to the information about the subscription policy received from the virtualized network element based on the indicator's value, wherein the second amount of resources is allocated to the subscriber device when the indicator has a first value and a third amount of resources is allocated to the subscriber device when the indicator has a second value; and responsive to a second request for network resource access submitted on behalf of the subscriber device, communicating a usage update message to the virtualized network element to determine an updated subscription policy associated with the subscriber device, wherein the updated subscription policy provides information about remaining level of resources that may be allocated to the subscriber device based on updated use access authorization.

332. The method of clause 331 further comprising: receiving, from the virtualized network element, a second reply responsive to the second request, the second reply providing information about the updated subscription policy indicating whether the second resource allocation policy is to be updated to authorize additional allocation of network resource allowance to the subscribe device and an indicator to indicate a time factor for when the second resource allocation policy is to be updated.

333. The method of clause 331 wherein the third amount is smaller than the second amount.

334. The method of clause 331 wherein the third amount is approximately equal to zero.

335. The method of clause 331, wherein the information provided in the first reply indicates that no additional resources are to be allocated to the subscriber device.

336. The method of clause 331, wherein the information provided in the first reply indicates that additional network resources are to be allocated to the subscriber device.

337. The method of clause 331, wherein the information provided in the first reply indicates a priority with which the first resource allocation policy associated with the subscriber device is to be updated.

338. The method of clause 337, wherein the priority is associated with an immediacy with which the first resource allocation policy is to be updated.

339. The method of clause 337, wherein the priority is associated with timing with which at the first resource allocation policy is to be updated.

340. The method of clause 332, further comprising applying the first resource allocation policy to limit additional allocation of resources to the subscriber.

341. The method of clause 331, wherein the information provided in the second reply indicates that no additional network resources are to be allocated to the subscriber device.

342. The method of clause 331, wherein the information provided in the second reply indicates that additional network resources are to be allocated to the subscriber device.

343. The method of clause 331, wherein the information provided in the second reply indicates a priority with which the second resource allocation policy associated with the subscriber device is to be updated.

344. The method of clause 337, wherein the priority is associated with an immediacy with which the second resource allocation policy is to be updated.

345. The method of clause 337, wherein the priority is associated with timing with which at the second resource allocation policy is to be updated.

346. The method of clause 332, further comprising applying the second resource allocation policy to limit additional allocation of resources to the subscriber device.

347. The method of clause 331, wherein the authorization request is communicated to the non-virtualized network element, instead of a virtualized network element, based on at least one of a subscription policy associated with the subscriber device, the subscriber device credentials, rules based on the subscriber's service plans, capabilities of the subscriber device, one or more service providers associated with the subscriber device, geo-location of the subscriber device or the location of network where traffic communicated with the subscriber device is routed through.

348. The method of clause 331, wherein the communication of the authorization request to the virtualized network element, instead of a non-virtualized network element, provide the subscriber device with enhanced capabilities that are unavailable to the subscriber device over the non-virtualized network element.

349. The method of clause 348, wherein the enhanced capabilities comprises at least one of enhanced notifications, unique service plans, enhanced billing services, or device assisted services.

350. The method of clause 349, wherein the enhanced billing services comprise at least one of: sponsored services, application based services, content-type based services, or simultaneous multiple service plans.

351. The method of clause 347, wherein the authorization request comprises at least one of a flow tag, or a header.

352. The method of clause 350, wherein the content-type based services comprise at least one of: streaming audio, streaming video, VOIP, or P2P.

353. The method of clause 304, wherein the one or more additional network resources are defined by at least one of content type, server address, TCP/IP address, MAC address, VOIP, p2p, or host address.

354. The method of clause 301 wherein network resource allowance is defined based on at least one of: resource destination, resource usage measured in bandwidth or resource usage measured in time.

355. The method of clause 326, wherein a resource allocation request comprises a flow tag or header information.

356. A method comprising: communicating one or more policy messages between a network element and a device element communicatively coupled over a wireless communications network, wherein the policy messages are configured for managing one or more service policies associated with at least a service plan provided by a communications service provider, wherein the device element is implemented over a wireless communications device, wherein the network element is implemented over a virtualized computing platform supported by the communications service provider.

357. The method of clause 356, wherein a policy message associated with the service plan is communicated from the device element to the network element, when a usage threshold limit associated with the service plan is reached.

358. The method of clause 357 wherein the threshold limit is determined to have been reached based on at least one of: a measure of network bandwidth usage, a measure of time associated with usage of a service provided by the service plan, or a measure of network related transactions between the communication device and the communications network resource.

359. The method of clause 356 wherein at least one policy message comprises one or more service plan parameters.

360. The method of clause 359 wherein at least one service plan parameter provides one or more threshold limits for one or more of: a service plan resource usage allowance, a service plan use time allowance, or a service plan transaction allowance.

361. The method of clause 360 wherein a notification message is communicated, when at least one threshold limit is reached.

362. The method of clause 361 wherein the notification comprises an offer to purchase a new service plan.

363. The method of clause 361 wherein the notification comprises information related to service plan usage.

364. The method of clause 359 wherein at least one service plan parameter provides a quality of service (QoS) level for a service plan.

365. The method of clause 359 wherein the policy message provides one or more authorized network destinations.

366. The method of clause 365 wherein the one or more authorized network destinations are provided based on which communications between the device element and the network element are routed.

367. The method of clause 365 wherein the authorized network destinations comprise at least one of a host name, a TCP/IP address, a MAC address, a URL, or a server name.

368. The method of clause 359 wherein the policy message provides one or more unauthorized destinations based on which communications between the device element and the network element are denied.

369. The method of clause 367 wherein the unauthorized destinations comprise at least one of a host name, a TCP/IP address, a MAC address, a URL, or a server name.

370. The method of clause 359 wherein the policy message provides one or more authorized content types supported for communications between the device and the network.

371. The method of clause 370 wherein the authorized content types comprise at least one of: streaming audio, streaming video, peer to peer messaging, or voice over internet protocol (VOIP).

372. The method of clause 369 wherein the policy message provides one or more unauthorized content types not supported for communications between the device and the network.

373. The method of clause 372 wherein the unauthorized content types comprise at least one of: streaming audio, streaming video, peer to peer messaging, or voice over internet protocol (VOIP).

374. The method of clause 356 wherein the policy provisioning instructions are provided to the network element from a policy provisioning element.

375. The method of clause 374 wherein the policy provisioning element is implemented over a non-virtualized computing platform supported by the communications service provider.

376. The method of clause 374 wherein the policy provisioning element is implemented over the device on which the device element is implemented.

377. The method of clause 356 wherein an indication of a service plan change is communicated to the network element by the device element.

378. The method of clause 377 wherein the network element comprises at least one of: a PCRF, an OCS, a PCEF, a TDF, a GGSN, an HA, a PGW, an HLR, an HSS, or a AAA server.

379. The method of clause 356 wherein the communications service provider is a wireless service provider.

380. The method of 356 wherein the communications service provider is a third party entity.

381. The method of 356 wherein the communications service provider is a provider of virtualized services.

382. A communications system comprising: one or more network service elements for servicing resource access requests submitted under a service plan; and a network traffic management element implemented over a virtualized computing environment to balance load of traffic between the one or more network service elements.

383. The system of clause 382 wherein at least one of the network service elements comprises one or more policy enforcement elements for enforcing policy associated with the service plan.

384. The system of clause 382 wherein at least one of the network service elements comprises one or more service controller elements for managing service policy associated with the service plan.

385. The system of clause 382 wherein at least one of the network service elements comprises: one or more policy enforcement elements for enforcing policy associated with the service plan; and one or more service controller elements for managing service policy associated with the service plan.

386. The system of clause 383 wherein the network traffic management element comprises at least one of: a diameter routing agent or a diameter proxy.

387. The system of clause 383 wherein the one or more policy enforcement elements comprise at least one of: a GGSN, a PCEF, a AAA server, a HLR, a HSS, or an HA.

388. The system of clause 382 wherein the network traffic management element distributes the load of traffic to the one or more network service elements based on information in flow of the traffic.

389. The system of clause 388 wherein at least one of the network service elements comprises a services controller element for managing service policy associated with the service plan.

390. The system of clause 388 wherein the information in the flow of traffic comprises at least one of: a host name, a header tag, information in a request message, or information in a response message.

391. The system of clause 384 wherein at least one of the service controller elements is associated with at least one of: an MNO, an MVNO, or wireless service provider.

392. The system of clause 382 wherein the network traffic management element balances the load of traffic between the one or more network service elements based on identity of a service provider associated with communicated traffic.

393. The system of 382 further comprising a proxy network element for managing connections between the one or more network service elements and the network traffic management element.

394. The system of clause 393 wherein the proxy network element is implemented to support the diameter communications protocol.

395. The system of clause 393 wherein the proxy network element comprises at least one of: a diameter routing agent or a diameter proxy.

396. The system of clause 383 wherein the network service element comprises a primary policy enforcement element and a secondary policy enforcement element.

397. The system of clause 396 wherein: the primary policy enforcement element comprises at least one of: a GGSN, a PCEF, or an HA, and the secondary policy enforcement element comprises at least one of: OCS, TDF or PCEF.

398. The system of clause 397 wherein a network proxy routes a service request to at least one of a service controller or the secondary policy enforcement element.

399. The system of clause 398 wherein the network proxy routes the service request to at least one of a service controller or the secondary policy enforcement element based on information included in the service request.

400. The system of clause 399 wherein the information included in the service request comprises at least one of: a host name, a header tag, information in a request message, or information in a response message.

401. The system of clause 383 wherein the network traffic management element and at least one of the policy enforcement elements communicate in real time.

402. The system of clause 384 wherein the network traffic management element and at least one of the service controller elements communicate in real time.

403. The system of clause 383 wherein the network traffic management element and at least one of the policy enforcement elements communicate via diameter communications protocol.

404. The system of clause 384 wherein the network traffic management element and at least one of the service controller elements communicate via diameter communications protocol.

405. The system of clause 383 wherein the network traffic management element and at least one of the policy enforcement elements communicate via at least one of JSON, REST, web services, or XML.

406. A communication system comprising: a policy enforcement layer (PEL) and a decision enforcement layer (DEL), wherein policy-related functions are enforced by the PEL, and wherein the decision-related functions are enforced by the DEL.

407. The system of clause 406, wherein the PEL enforces the policy-related functions in realtime.

408. The system of clause 406, wherein the DEL enforces the decision-related functions in non-realtime.

409. The system of clause 406, wherein the PEL enforces the policy-related functions in with a first level of responsiveness and the DEL enforces the decision-related functions with a second level of responsiveness.

410. The system of clause 409 wherein a first request is serviced, at least partially, by a PEL network element, during a first time period.

411. The system of clause 410, wherein the first access request is further serviced by a DEL network element, during a second time period.

412. The system of clause 411, wherein at least a portion of the first time period precedes the second time period.

413. The system of clause 411, wherein at least a portion of the first time period and the second time period overlap.

414. The system of clause 411, wherein the first request is for access to network resources.

415. The system of clause 411, wherein the first request comprises a control related portion and a data transmission related portion, wherein the control related portion of the first request is serviced by the PEL and the data transmission related portion is serviced by the DEL.

416. The system of clause 411, wherein the PEL is supported by a first interface comprising at least one of Gx, Gy, RADIUS, or Diameter protocols.

417. The system of clause 411, wherein the DEL is supported by a second interface comprising at least one of Gx, Gy, RADIUS, JSON, XML, Web Services, REST, or Diameter protocols.

418. The system of clause 411, wherein the PEL is implemented over a hardware-based computing platform.

419. The system of clause 411, wherein the DEL is implemented over a virtualized computing platform.

420. The system of clause 411, wherein the PEL is implemented over a hardware-based computing platform and the DEL is implemented over a virtualized computing platform, wherein the PEL communicates with the DEL over a remotely established communications network.

421. The system of clause 420, wherein the PEL authorizes limited access to network resources and authorizes additional access to network resources upon the DEL verifying that the additional access may be granted.

422. The system of clause 421, wherein the limited access is based on at least one of: a level of bandwidth allocation, level of access to a destination, level of access to a content type, or level of connection speed used for accessing one or more network resources.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

INCORPORATION BY REFERENCE

This application incorporates by reference, for all purposes, the following U.S. nonprovisional applications: application Ser. No. 12/380,780, filed Mar. 2, 2009, entitled AUTOMATED DEVICE PROVISIONING AND ACTIVATION; U.S. application Ser. No. 14/158,980, filed Jan. 20, 2014, entitled DEVICE ASSISTED CDR CREATION, AGGREGATION, MEDIATION AND BILLING; U.S. application Ser. No. 13/588,965, filed Aug. 17, 2012, entitled ADAPTIVE AMBIENT SERVICES; U.S. application Ser. No. 12/694,445, filed Jan. 27, 2010, entitled SECURITY TECHNIQUES FOR DEVICE ASSISTED SERVICES; U.S. application Ser. No. 14/037,321, filed Sep. 25, 2013, entitled DEVICE GROUP PARTITIONS AND SETTLEMENT PLATFORM; U.S. application Ser. No. 14/158,206, filed Jan. 17, 2014, entitled DEVICE ASSISTED SERVICES INSTALL; U.S. application Ser. No. 13/718,917, filed Dec. 18, 2012, entitled QUALITY OF SERVICE FOR DEVICE ASSISTED SERVICES; U.S. application Ser. No. 13/718,952, filed Dec. 18, 2012, entitled ENHANCED ROAMING SERVICES AND CONVERGED CARRIER NETWORKS WITH DEVICE ASSISTED SERVICES AND A PROXY; U.S. application Ser. No. 13/134,028, filed May 25, 2011, entitled DEVICE-ASSISTED SERVICES FOR PROTECTING NETWORK CAPACITY; U.S. application Ser. No. 13/229,580, filed Sep. 9, 2011, entitled WIRELESS NETWORK SERVICE INTERFACES; U.S. application Ser. No. 13/237,827, filed Sep. 20, 2011, entitled ADAPTING NETWORK POLICIES BASED ON DEVICE SERVICE PROCESSOR CONFIGURATION; U.S. application Ser. No. 13/253,013, filed Oct. 4, 2011, entitled SYSTEM AND METHOD FOR PROVIDING USER NOTIFICATIONS; U.S. application Ser. No.

13/239,321, filed Sep. 21, 2011, entitled SERVICE OFFER SET PUBLISHING TO DEVICE AGENT WITH ON-DEVICE SERVICE SELECTION; U.S. application Ser. No. 13/248,028, filed Sep. 28, 2011, entitled ENTERPRISE ACCESS CONTROL AND ACCOUNTING ALLOCATION FOR ACCESS NETWORKS; U.S. application Ser. No. 13/247,998, filed Sep. 28, 2011, entitled COMMUNICATIONS DEVICE WITH SECURE DATA PATH PROCESSING AGENTS; U.S. application Ser. No. 13/309,556, filed Dec. 1, 2011, entitled END USER DEVICE THAT SECURES AN ASSOCIATION OF APPLICATION TO SERVICE POLICY WITH AN APPLICATION CERTIFICATE CHECK; U.S. application Ser. No. 13/309,463, filed Dec. 1, 2011, entitled SECURITY, FRAUD DETECTION, AND FRAUD MITIGATION IN DEVICE-ASSISTED SERVICES SYSTEMS; U.S. application Ser. No. 13/248,025, filed Sep. 28, 2011, entitled SERVICE DESIGN CENTER FOR DEVICE ASSISTED SERVICES; U.S. application Ser. No. 13/374,959, filed Jan. 24, 2012, entitled FLOW TAGGING FOR SERVICE POLICY IMPLEMENTATION; U.S. application Ser. No. 13/441,821, filed Apr. 6, 2012, entitled MANAGING SERVICE USER DISCOVERY AND SERVICE LAUNCH OBJECT PLACEMENT ON A DEVICE; U.S. application Ser. No. 13/134,005, filed May 25, 2011, entitled SYSTEM AND METHOD FOR WIRELESS NETWORK OFFLOADING; U.S. application Ser. No. 13/802,483, filed Mar. 13, 2013, entitled MOBILE DEVICE ACTIVATION VIA DYNAMICALLY SELECTED ACCESS NETWORK; U.S. application Ser. No. 13/842,172, filed Mar. 15, 2103, entitled NETWORK SERVICE PLAN DESIGN; U.S. application Ser. No. 13/748,152, filed Jan. 23, 2013, entitled SERVICE PLAN DESIGN, USER INTERFACES, APPLICATION PROGRAMMING INTERFACES, AND DEVICE MANAGEMENT; U.S. application Ser. No. 14/208,236, filed Mar. 13, 2014, entitled AUTOMATED CREDENTIAL PORTING FOR MOBILE DEVICES; U.S. application Ser. No. 14/098,523, filed Dec. 5, 2013, entitled INTERMEDIATE NETWORKING DEVICES; U.S. application Ser. No. 13/947,099, filed Jul. 21, 2013, entitled VIRTUALIZED POLICY & CHARGING SYSTEM; and U.S. application Ser. No. 14/181,910, filed Feb. 17, 2014, entitled ENHANCED CURFEW AND PROTECTION ASSOCIATED WITH A DEVICE GROUP.

This document also incorporates by reference for all purposes the following provisional patent applications: U.S. Provisional Application No. 61/206,354, filed Jan. 28, 2009, entitled SERVICES POLICY COMMUNICATION SYSTEM AND METHOD; U.S. Provisional Application No. 61/206,944, filed Feb. 4, 2009, entitled SERVICES POLICY COMMUNICATION SYSTEM AND METHOD; U.S. Provisional Application No. 61/207,393, filed Feb. 10, 2009, entitled SERVICES POLICY COMMUNICATION SYSTEM AND METHOD; and U.S. Provisional Application No. 61/207,739, entitled SERVICES POLICY COMMUNICATION SYSTEM AND METHOD, filed Feb. 13, 2009; U.S. Provisional Application No. 61/270,353, filed on Jul. 6, 2009, entitled DEVICE ASSISTED CDR CREATION, AGGREGATION, MEDIATION AND BILLING; U.S. Provisional Application No. 61/275,208, filed Aug. 25, 2009, entitled ADAPTIVE AMBIENT SERVICES; and U.S. Provisional Application No. 61/237,753, filed Aug. 28, 2009, entitled ADAPTIVE AMBIENT SERVICES; U.S. Provisional Application No. 61/252,151, filed Oct. 15, 2009, entitled SECURITY TECHNIQUES FOR DEVICE ASSISTED SERVICES; U.S. Provisional Application No. 61/252,153, filed Oct. 15, 2009, entitled DEVICE GROUP PARTITIONS AND SETTLEMENT PLATFORM; U.S. Provisional Application No. 61/264,120, filed Nov. 24, 2009, entitled DEVICE ASSISTED SERVICES INSTALL; U.S. Provisional Application No. 61/264,126, filed Nov. 24, 2009, entitled DEVICE ASSISTED SERVICES ACTIVITY MAP; U.S. Provisional Application No. 61/348,022, filed May 25, 2010, entitled DEVICE ASSISTED SERVICES FOR PROTECTING NETWORK CAPACITY; U.S. Provisional Application No. 61/381,159, filed Sep. 9, 2010, entitled DEVICE ASSISTED SERVICES FOR PROTECTING NETWORK CAPACITY; U.S. Provisional Application No. 61/381,162, filed Sep. 9, 2010, entitled SERVICE CONTROLLER INTERFACES AND WORKFLOWS; U.S. Provisional Application No. 61/384,456, filed Sep. 20, 2010, entitled SECURING SERVICE PROCESSOR WITH SPONSORED SIMS; U.S. Provisional Application No. 61/389,547, filed Oct. 4, 2010, entitled USER NOTIFICATIONS FOR DEVICE ASSISTED SERVICES; U.S. Provisional Application No. 61/385,020, filed Sep. 21, 2010, entitled SERVICE USAGE RECONCILIATION SYSTEM OVERVIEW; U.S. Provisional Application No. 61/387,243, filed Sep. 28, 2010, entitled ENTERPRISE AND CONSUMER BILLING ALLOCATION FOR WIRELESS COMMUNICATION DEVICE SERVICE USAGE ACTIVITIES; U.S. Provisional Application No. 61/387,247, filed September 28, entitled SECURED DEVICE DATA RECORDS, 2010; U.S. Provisional Application No. 61/407,358, filed Oct. 27, 2010, entitled SERVICE CONTROLLER AND SERVICE PROCESSOR ARCHITECTURE; U.S. Provisional Application No. 61/418,507, filed Dec. 1, 2010, entitled APPLICATION SERVICE PROVIDER INTERFACE SYSTEM; U.S. Provisional Application No. 61/418,509, filed Dec. 1, 2010, entitled SERVICE USAGE REPORTING RECONCILIATION AND FRAUD DETECTION FOR DEVICE ASSISTED SERVICES; U.S. Provisional Application No. 61/420,727, filed Dec. 7, 2010, entitled SECURE DEVICE DATA RECORDS; U.S. Provisional Application No. 61/422,565, filed Dec. 13, 2010, entitled SERVICE DESIGN CENTER FOR DEVICE ASSISTED SERVICES; U.S. Provisional Application No. 61/422,572, filed Dec. 13, 2010, entitled SYSTEM INTERFACES AND WORKFLOWS FOR DEVICE ASSISTED SERVICES; U.S. Provisional Application No. 61/422,574, filed Dec. 13, 2010, entitled SECURITY AND FRAUD DETECTION FOR DEVICE ASSISTED SERVICES; U.S. Provisional Application No. 61/435,564, filed Jan. 24, 2011, entitled FRAMEWORK FOR DEVICE ASSISTED SERVICES; U.S. Provisional Application No. 61/472,606, filed Apr. 6, 2011, entitled MANAGING SERVICE USER DISCOVERY AND SERVICE LAUNCH OBJECT PLACEMENT ON A DEVICE; U.S. Provisional Application No. 61/550,906, filed Oct. 24, 2011, entitled SECURITY FOR DEVICE-ASSISTED SERVICES; U.S. Provisional Application No. 61/589,830, filed Jan. 23, 2012, entitled METHODS AND APPARATUS TO PRESENT INFORMATION ABOUT VOICE, MESSAGING, AND DATA SERVICES ON WIRELESS MOBILE DEVICES; U.S. Provisional Application No. 61/610,876, filed Mar. 14, 2012, entitled METHODS AND APPARATUS FOR APPLICATION PROMOTION AND SPONSORSHIP; U.S. Provisional Application No. 61/610,910, filed Mar. 14, 2012, entitled WIFI ACTIVATION BACKUP PROCESS; U.S. Provisional Application No. 61/658,339, filed Jun. 11, 2012, entitled MULTI-DEVICE MASTER SERVICES ACCOUNTS, SERVICE PLAN SHARING AND ASSIGNMENTS, AND DEVICE MANAGEMENT FROM A MASTER DEVICE; U.S. Provisional Application No. 61/667,927, filed Jul. 3, 2012, entitled FLEXIBLE MULTI-DEVICE MASTER SERVICE ACCOUNTS, SERVICE PLAN SHARING AND ASSIGNMENTS, AND DEVICE MANAGEMENT; U.S. Provisional Application No. 61/674,331, filed Jul. 21, 2012, entitled SERVICE CONTROLLER FOR MANAGING CLOUD-BASED POLICY; U.S. Provisional Application No. 61/724,267, filed Nov. 8, 2012, entitled FLEXIBLE SERVICE PLAN DESIGN, USER INTERFACE AND DEVICE MANAGEMENT; U.S. Provisional Application No. 61/724,837, filed Nov. 9, 2012, entitled SERVICE PLAN DISCOVERY, CUSTOMIZATION, AND MANAGEMENT; U.S. Provisional Application No. 61/724,974, filed Nov. 10, 2012, entitled SERVICE PLAN DISCOVERY, CUSTOMIZATION, AND MANAGEMENT; U.S. Provisional Application No. 61/732,249, filed Nov. 30, 2012, entitled APPLICATION PROGRAMMING INTERFACES FOR SMART SERVICES; U.S. Provisional Application No. 61/734,288, filed Dec. 6, 2012, entitled INTERMEDIATE NETWORKING DEVICE SERVICES; and U.S. Provisional Application No. 61/745,548, filed Dec. 22, 2012, entitled SERVICE PLAN DESIGN, USER INTERFACES, APPLICATION PROGRAMMING INTERFACES, AND DEVICE MANAGEMENT; U.S. Provisional Application No. 61/756,332, filed Jan. 24, 2013, entitled MOBILE HOTSPOT; and U.S. Provisional Application No. 61/758,964, filed Jan. 30, 2013, entitled MOBILE HOTSPOT; U.S. Provisional Application No. 61/765,978, filed Feb. 18, 2013, entitled ENHANCED CURFEW AND PROTECTION ASSOCIATED WITH A DEVICE GROUP; U.S. Provisional Application No. 61/785,988, filed Mar. 14, 2013, entitled AUTOMATED CREDENTIAL PORTING FOR MOBILE DEVICES; U.S. Provisional Application No. 61/794,116, filed Mar. 15, 2013, entitled ENHANCED INTERMEDIATE NETWORKING DEVICE; U.S. Provisional Application No. 61/792,765, filed Mar. 15, 2013, entitled DEVICE GROUP AND SERVICE PLAN MANAGEMENT; U.S. Provisional Application No. 61/793,894, filed Mar. 15, 2013, entitled SIMPLIFIED POLICY DESIGN, MANAGEMENT, AND IMPLEMENTATION; U.S. Provisional Application No. 61/799,710, filed Mar. 15, 2013, entitled AMBIENT OR SPONSORED SERVICES; and U.S. Provisional Application No. 61/801,074, filed Mar. 15, 2013, entitled DEVICE GROUP AND SERVICE PLAN MANAGEMENT.

What is claimed is:

1. A network system for providing device management and policy services to a plurality of devices communicatively coupled to a network operator system over a wireless access network, the network operator system comprising a policy enforcement function to provide access control for one or more network services provided to the plurality of end-user devices, the network system comprising:
   a first policy element comprising a first on-line charging system (OCS) decision layer;
   a second policy element comprising a second OCS decision layer; and
   a network element communicatively coupled to the policy enforcement function, the first policy element, and the second policy element, wherein the network element is configured to:
      communicate first policy information between the policy enforcement function and the first policy element, and
      communicate second policy information between the first policy enforcement function and the second policy element.

2. The network system recited in claim 1, wherein the network element is communicatively coupled to the policy enforcement function via the Internet.

3. The network system recited in claim 1, further comprising an OCS interaction layer interposed between the policy enforcement function and the network element.

4. The network system recited in claim 1, wherein the first and second policy elements comprise virtual policy element instances or threads that executes in a policy element cloud system, and wherein the network element comprises a load balancer configured to select or assign the virtual policy element instance or thread for communication of the first and second policy information.

5. The network system recited in claim 4, wherein select or assign the virtual policy element instance or thread is based on an estimate of a processing demand associated with implementing one or more policies for at least a portion of the plurality of end-user devices communicatively coupled to the network operator system over the wireless access network.

6. The network system recited in claim 4, wherein select or assign the virtual policy element instance or thread is based on an estimate of a processing demand associated with (a) processing the first policy information, (b) processing the second policy information, or (c) processing both the first policy information and the second policy information.

7. The network system recited in claim 4, wherein select or assign the first virtual policy element instance or thread is based on an association of the first policy information with a first end-user device of the plurality of end-user devices communicatively coupled to the network operator system over the wireless access network, and wherein select or assign the second virtual policy element instance or thread is based on an association of the second policy information with a second end-user device of the plurality of end-user devices communicatively coupled to the network operator system over the wireless access network.

8. The network system recited in claim 4, wherein select or assign the first virtual policy element instance or thread is based on an association of the first policy information with a first service activity available to at least a portion of the plurality of end-user devices communicatively coupled to the network operator system over the wireless access network, and wherein select or assign the second virtual policy element instance or thread is based on an association of the second policy information with a second service activity available to at least a portion of the plurality of end-user devices communicatively coupled to the network operator system over the wireless access network, wherein the first service activity differs in at least an aspect from the second service activity.

9. The network system recited in claim 4, wherein select or assign the first virtual policy element instance or thread is based on an association of the first policy information with a first device group or a first user group associated with a first subset of the plurality of end-user devices communicatively coupled to the network operator system over the wireless access network, and wherein select or assign the second virtual policy element instance or thread is based on an association of the second policy information with a second device group or a second user group associated with a second subset of the plurality of end-user devices communicatively coupled to the network operator system over the wireless access network.

10. The network system recited in claim 4, wherein select or assign the first virtual policy element instance or thread is based on an association of the first policy information with a first network operator or a first service design center administrator, and wherein select or assign the second virtual policy element instance or thread is based on an association of the second policy information with a second network operator or a second service design center administrator.

11. The network system recited in claim 4, wherein select or assign the first virtual policy element instance or thread is based on an association of the first policy information with a first network or network type, and wherein select or assign the second virtual policy element instance or thread is based on an association of the second policy information with a second network or network type.

12. The network system recited in claim 1, wherein the policy enforcement function comprises a policy control enforcement function (PCEF).

13. The network system recited in claim 1, wherein the policy enforcement function comprises a gateway GPRS support node (GGSN).

14. The network system recited in claim 1, wherein the second policy element is a local policy element, and wherein the first policy element is a virtual policy element.

15. The network system recited in claim 1, wherein the first policy element is configured to process a first set of one or more policies, and wherein the second policy element is configured to process a second set of one or more policies, the first set of one or more policies and the second set of one or more policies being defined or managed by a common administrator or service provider.

16. The network system recited in claim 15, further comprising a service design center (SDC) system configured to enable the common administrator or service provider to define or manage the first set of one or more service policies and the second set of one or more service policies.

17. The network system recited in claim 15, wherein the first policy element is configured to process a first set of one or more policies, the first set of one or more policies being defined or managed by a first administrator or service provider, and wherein the second policy element is configured to process a second set of one or more policies, the second set of one or more policies being defined or managed by a second administrator or service provider.

18. The network system recited in claim 17, further comprising a service design center (SDC) system configured to: provide a first user interface to enable the first administrator or service provider to define or manage the first set of one or more policies, and provide a second user interface to enable the second administrator or service provider to define or manage the second set of one or more policies.

19. The network system recited in claim 18, wherein the first set of one or more policies is associated with a first device group or a first user group associated with a first subset of the plurality of end-user devices communicatively coupled to the network system over the wireless access network, and wherein define or manage the first set of one or more policies comprises define or manage a first set of credentials associated with the first device group or the first user group, and wherein the second set of one or more policies is associated with a second device group or a second user group associated with a second subset of the plurality of end-user devices communicatively coupled to the network system over the wireless access network, and wherein define or manage the second set of one or more policies comprises define or manage a second set of credentials associated with the second device group or the second user group.

20. The network system recited in claim 1, further comprising a device group management system accessible to the first and second policy elements.

* * * * *